(12) United States Patent
Subramanian et al.

(10) Patent No.: US 7,511,718 B2
(45) Date of Patent: *Mar. 31, 2009

(54) MEDIA INTEGRATION LAYER

(75) Inventors: Sriram Subramanian, Kirkland, WA (US); Leonardo E. Blanco, Redmond, WA (US); Donald B. Curtis, Bellevue, WA (US); Joseph S. Beda, Seattle, WA (US); Gerhard A. Schneider, Seattle, WA (US); Greg D. Schechter, Seattle, WA (US); Adam M. Smith, Kirkland, WA (US); Eric S. Vandenberg, Seattle, WA (US); Matthew W. Calkins, Seattle, WA (US); Kevin T. Gallo, Woodinville, WA (US); Michael Stokes, Eagle, ID (US); Rajat Goel, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 35 days.

This patent is subject to a terminal disclaimer.

(21) Appl. No.: 10/693,630

(22) Filed: Oct. 23, 2003

(65) Prior Publication Data

US 2005/0140694 A1 Jun. 30, 2005

(51) Int. Cl.
*G09G 5/00* (2006.01)
(52) U.S. Cl. ............... 345/619; 345/622; 345/630; 345/473
(58) Field of Classification Search .......... 345/619–641
See application file for complete search history.

(56) References Cited

U.S. PATENT DOCUMENTS

| 5,261,041 A | 11/1993 | Susman | 395/152 |
| 5,487,172 A | 1/1996 | Hyatt | 395/800 |
| 5,500,933 A | 3/1996 | Schnorf | 395/154 |

(Continued)

FOREIGN PATENT DOCUMENTS

WO   WO99/00725 A   1/1999

(Continued)

OTHER PUBLICATIONS

SVG 1.1 specification, from the web, W3C Consortium, See attached.*

(Continued)

*Primary Examiner*—Kee M Tung
*Assistant Examiner*—Jwalant Amin
(74) *Attorney, Agent, or Firm*—Workman Nydegger

(57) ABSTRACT

A media integration layer including an application programming interface (API) and an object model allows program code developers to interface in a consistent manner with a scene graph data structure in order to output graphics. Via the interfaces, program code adds child visuals to other visuals to build up a hierarchical scene graph, writes Instruction Lists such as geometry data, image data, animation data and other data for output, and may specify transform, clipping and opacity properties on visuals. The media integration layer and API enable programmers to accomplish composition effects within their applications in a straightforward manner, while leveraging the graphics processing unit in a manner that does not adversely impact normal application performance. A multiple-level system includes the ability to combine different media types (such as 2D, 3D, Video, Audio, text and imaging) and animate them smoothly and seamlessly.

36 Claims, 29 Drawing Sheets

U.S. PATENT DOCUMENTS

| | | | |
|---|---|---|---|
| 5,509,115 | A | 4/1996 | Butterfield |
| 5,553,222 | A | 9/1996 | Milne .......................... 395/154 |
| 5,555,368 | A | 9/1996 | Orton .......................... 395/157 |
| 5,727,141 | A | 3/1998 | Hoddie |
| 5,745,761 | A | 4/1998 | Celi |
| 5,752,029 | A | 5/1998 | Wissner |
| 5,790,130 | A | 8/1998 | Gannett |
| 5,852,449 | A | 12/1998 | Esslinger .................... 345/473 |
| 5,920,325 | A | 7/1999 | Morgan ....................... 345/473 |
| 5,930,810 | A * | 7/1999 | Farros et al. ................ 715/506 |
| 5,936,632 | A | 8/1999 | Cunniff |
| 5,986,667 | A | 11/1999 | Jevans ........................ 345/433 |
| 5,986,675 | A | 11/1999 | Anderson ................... 345/473 |
| 5,987,627 | A | 11/1999 | Rawlings |
| 6,014,139 | A * | 1/2000 | Watson et al. ............... 715/764 |
| 6,075,532 | A | 6/2000 | Colleran ...................... 345/340 |
| 6,092,107 | A * | 7/2000 | Eleftheriadis et al. ....... 709/217 |
| 6,115,713 | A | 9/2000 | Pascucci |
| 6,151,134 | A | 11/2000 | Depa |
| 6,154,215 | A | 11/2000 | Hopcroft .................... 345/418 |
| 6,160,907 | A | 12/2000 | Robotham |
| 6,195,694 | B1 | 2/2001 | Chen ............................. 709/22 |
| 6,215,495 | B1 | 4/2001 | Grantham ................... 345/419 |
| 6,237,092 | B1 * | 5/2001 | Hayes, Jr. ................... 713/100 |
| 6,243,856 | B1 | 6/2001 | Meyer ............................ 717/1 |
| 6,259,451 | B1 | 7/2001 | Tesler ......................... 345/419 |
| 6,266,053 | B1 | 7/2001 | French ........................ 345/302 |
| 6,272,650 | B1 | 8/2001 | Meyer ............................ 714/38 |
| 6,275,857 | B1 * | 8/2001 | McCartney ................. 709/226 |
| 6,314,470 | B1 * | 11/2001 | Ward et al. ................... 719/328 |
| 6,377,263 | B1 | 4/2002 | Falacara ...................... 345/473 |
| 6,411,297 | B1 | 6/2002 | Tampieri ...................... 345/426 |
| 6,487,565 | B1 | 11/2002 | Schechter ................ 707/500.1 |
| 6,538,656 | B1 | 3/2003 | Cheung ....................... 345/519 |
| 6,570,578 | B1 | 5/2003 | Smirnov |
| 6,626,211 | B2 | 10/2003 | Chartier |
| 6,631,403 | B1 | 10/2003 | Deutsch |
| 6,654,931 | B1 | 11/2003 | Haskell |
| 6,675,230 | B1 * | 1/2004 | Lewallen ..................... 719/328 |
| 6,707,456 | B1 | 3/2004 | Marrin ........................ 345/473 |
| 6,714,201 | B1 | 3/2004 | Grinstein .................... 345/474 |
| 6,717,599 | B1 * | 4/2004 | Olano .......................... 715/853 |
| 6,731,314 | B1 | 5/2004 | Cheng ......................... 345/848 |
| 6,732,109 | B2 | 5/2004 | Lindberg ..................... 707/101 |
| 6,741,242 | B1 * | 5/2004 | Itoh et al. .................... 345/419 |
| 6,751,655 | B1 | 6/2004 | Deutsch ....................... 709/203 |
| 6,765,571 | B2 | 7/2004 | Sowizral ..................... 345/420 |
| 6,833,840 | B2 | 12/2004 | Lifshitz |
| 6,919,891 | B2 | 7/2005 | Schneider ................... 345/440 |
| 6,986,101 | B2 | 1/2006 | Cooper ........................ 707/513 |
| 7,012,606 | B2 | 3/2006 | Swedberg .................... 345/420 |
| 7,055,092 | B2 | 5/2006 | Yardumian .................. 715/513 |
| 7,064,766 | B2 | 6/2006 | Beda ............................ 345/557 |
| 7,069,503 | B2 | 6/2006 | Tanimoto ..................... 715/513 |
| 7,076,332 | B2 | 7/2006 | Cifra ............................ 700/245 |
| 7,088,374 | B2 | 8/2006 | David ........................... 345/420 |
| 7,102,651 | B1 * | 9/2006 | Louveaux et al. ............ 345/629 |
| 7,103,581 | B1 | 9/2006 | Suen |
| 7,103,873 | B2 | 9/2006 | Tanner ......................... 717/109 |
| 7,126,606 | B2 | 10/2006 | Beda ............................ 345/473 |
| 7,143,339 | B2 | 11/2006 | Weinberg .................... 707/500 |
| 7,161,599 | B2 | 1/2007 | Beda ............................ 345/418 |
| 2001/0000962 | A1 | 5/2001 | Rajan ...................... 375/240.01 |
| 2002/0019844 | A1 | 2/2002 | Kurowski |
| 2002/0032697 | A1 | 3/2002 | French ......................... 345/440 |
| 2002/0046394 | A1 | 4/2002 | Do ............................... 717/100 |
| 2002/0063704 | A1 | 5/2002 | Sowizral ..................... 345/522 |
| 2002/0116417 | A1 * | 8/2002 | Weinberg et al. ........... 707/517 |
| 2003/0028901 | A1 | 2/2003 | Shae ............................ 370/487 |
| 2003/0110297 | A1 * | 6/2003 | Tabatabai et al. ........... 709/246 |
| 2003/0120823 | A1 | 6/2003 | Kim ............................. 709/310 |
| 2003/0126557 | A1 * | 7/2003 | Yardumian et al. .......... 715/513 |
| 2003/0132937 | A1 * | 7/2003 | Schneider et al. ........... 345/473 |
| 2003/0139848 | A1 * | 7/2003 | Cifra et al. ................... 700/245 |
| 2003/0194207 | A1 | 10/2003 | Chung |
| 2003/0210267 | A1 | 11/2003 | Kylberg |
| 2004/0015740 | A1 | 1/2004 | Dautelle ......................... 710/5 |
| 2004/0039496 | A1 | 2/2004 | Dautelle ..................... 345/619 |
| 2004/0093604 | A1 * | 5/2004 | Demsey et al. .............. 719/310 |
| 2004/0110490 | A1 * | 6/2004 | Steele et al. .............. 455/412.1 |
| 2004/0189645 | A1 * | 9/2004 | Beda et al. .................. 345/473 |
| 2004/0189669 | A1 * | 9/2004 | David et al. ................. 345/619 |
| 2004/0216139 | A1 | 10/2004 | Rhoda ......................... 709/320 |
| 2004/0220956 | A1 | 11/2004 | Dillon ......................... 707/102 |
| 2005/0050471 | A1 * | 3/2005 | Hallisey et al. ............. 715/734 |
| 2005/0060648 | A1 | 3/2005 | Fennelly ..................... 715/523 |

FOREIGN PATENT DOCUMENTS

| | | |
|---|---|---|
| WO | WO99/52080 A | 10/1999 |

OTHER PUBLICATIONS

Notice of Allowance dated Jul. 2, 2007 cited in related Issued Patent No. 7,265,756.
Office Action dated Apr. 4, 2008 cited in related U.S. Appl. No. 11/454,719.
Office Action dated Sep. 11, 2007 cited in related U.S. Appl. No. 10/693,822.
Office Action dated Nov. 16, 2007 cited in related U.S. Appl. No. 10/401,717.
Office Action dated Nov. 16, 2007 cited in related U.S. Appl. No. 10/693,683.
Conal Elliot, Declarative event-oriented programming, Proceedings of the 2nd ACM SIGPLAN international conference on Principles and practice of declaratice programming, p. 56-67, Sep. 20-23, 2000, Montreal, Quebec, Canada.
Office Action dated Oct. 5, 2007 cited in related U.S. Appl. No. 10/693,673.
Office Action dated Jan. 10, 2008 cited in related U.S. Appl. No. 10/693,673.
Office Action dated Apr. 3, 2008 cited in related U.S. Appl. No. 11/499,257.
Notice of Allowance dated Apr. 1, 2008 cited in related U.S. Appl. No. 10/693,822.
U.S. Appl. No. 11/555,040, filed Oct. 31, 2006, Beda.
U.S. Appl. No. 11/165,756, filed Jun. 23, 2005, Schneider.
U.S. Appl. No. 11/455,166, filed Jun. 16, 2006, Beda.
U.S. Appl. No. 11/454,719, filed Jun. 16, 2006, Beda.
U.S. Appl. No. 10/693,822, filed Oct. 23, 2003, Blanco.
U.S. Appl. No. 10/401,717, filed Mar. 27, 2003, Beda.
U.S. Appl. No. 10/693,673, filed Oct. 23, 2003, Beda.
U.S. Appl. No. 10/693,633, filed Oct. 23, 2003, Beda.
U.S. Appl. No. 10/693,630, filed Oct. 23, 2003, Subramanian.
U.S. Appl. No. 11/499,257, filed Aug. 4, 2006, David.
PCT Int'l Search Report & Written Opinion on App. No. PCT/US04/25723.
Partial European Search Report in EP 02023604 documents considered relevant.
Australian Search Report, Application No. SG 200302787-7 completed Jan. 12, 2005.
Hyun Suk Kim et al: "Scene Graph for Dynamic Virtual Environment: Spangraph" International Journal of Virtual Reality, IPI Press, Colorado Springs, CO, US, vol. 4, No. 2, 2000, pp. 12-18, OP001039706 ISSN: 1081-1451.
Hudson, S.E. and Stasko, J.T., Animation Support in a User Interface Toolkit: Flexible, Robust, and Reusable Abstractions, ACM SIGGRAPH Symposium on User Interface Software and Technology, Atlanta, GA, 57-67, 1993.
X3D specification (one section from Google cache), sections 6 and 18—http://www.web3d.org/x3dspecifications/ISO-IEC-19775-IS-X3DAbstractSpecifiction/....
Walczak, K. and W. Cellary. "Building Database Applications of Virtual Reality with X-VRML". Proc. 7$^{th}$. Int. Conf. on 3D Web Technology. 2002, SIGGRAPH. pp. 11-120. ISBN 1-58113-468-1.

Parr, T. And T. Rohaly. "A language for creating and manipulating VRML." Proc. 1st Symposium on Virtual Reality Modeling Lang. 1995, pp. 123-131.

Hesina, G.; Schmalistieg, D.; Furhmann, A.; Purgathofer, W. "Distributed Open Inventor: a practical approach to distributed 3D graphics." Proc. ACM Symp. On Virt. Reality Soft. And Tech. 1999, pp. 74-81.

Strauss, P. and R. Carey. "An Object-Oriented 3D Graphics Toolkit" SIGGRAPH (Proc. 19th Ann. Conf. on Comp. Graph. And Int. Tech.) 1992, pp. 341-349.

Rikk Cary, Gavin Bell, Chris Marrin: "International Standard iso/iec 14772-1: 1997 Virtual Reality Modeling Language (vrml97)" VRML 97, 1997, pp. 1-236 XP002133320 p. 7, paragraph 3.18: pp. 89-99 section 6.20; p. 149, paragraph B.2.

SVG specification version 1.1, Jan. 14, 2003 all sections. http://www.w3.org/TR/SVG.

Java 3D API Specification: Scene Graph Basics. Sun Microsystems, Inc. 1999. http://java.sun.com/products/java-media/3D/forDevelopers/j3dguide/SceneGraphOverview.doc.html.

SVG Tools, Adobe Illustrator, Jul. 6, 2001—http://web.archive.org/web/20010706131221/http://www.adobe.com/svg/tools/other.html.

Scalable Vector Graphics, Adobe SVG Viewer download area, Nov. 2001—http://www.adobe.com/svg/viewer/install/mail.html.

W3C Scalable Vector Graphics (SVG)-History-http://www.w3.org/graphics/SVG/History.

W3C consortium,/ "XML Base", W3c recommendation Jun. 27, 2001.

W3C Scalable Vector Graphics (SVG)-History-http://www.w3.org/Graphics/SVG/History.

Scalable Vector Graphics, Adobe SVG Viewer download area, Nov. 2001—http://www.adobe.com/svg/viewer/install/main.html.

SVG Tools, Adobe Illustrator, Jul. 6, 2001—http://web.archive.org/web/20010706131221/http://www.adobe.com/svg/tools/other.html.

Notice of Allowance dated May 30, 2008 cited in related U.S. Appl. No. 10/693,633.

* cited by examiner

MEDIA INTEGRATION LAYER

FIELD OF THE INVENTION

The invention relates generally to computer systems, and more particularly to the processing of graphical and other video information for display on computer systems.

BACKGROUND OF THE INVENTION

The limits of the traditional immediate mode model of accessing graphics on computer systems are being reached, in part because memory and bus speeds have not kept up with the advancements in main processors and/or graphics processors. In general, the current (e.g., WM_PAINT) model for preparing a frame requires too much data processing to keep up with the hardware refresh rate when complex graphics effects are desired. As a result, when complex graphics effects are attempted with conventional graphics models, instead of completing the changes that result in the perceived visual effects in time for the next frame, the changes may be added over different frames, causing results that are visually and noticeably undesirable.

A new model for controlling graphics output is described in U.S. patent application Ser. Nos. 10/184,795, 10/184,796, 10/185,775, 10/401,717, 10/402,322 and 10/402,268, assigned to the assignee of the present invention and hereby incorporated by reference. This new model provides a number of significant improvements in graphics processing technology. For example, U.S. Ser. No. 10/184,795 is generally directed towards a multiple-level graphics processing system and method, in which a higher-level component (e.g., of an operating system) performs computationally intensive aspects of building a scene graph, updating animation parameters and traversing the scene graph's data structures, at a relatively low operating rate, in order to pass simplified data structures and/or graphics commands to a low-level component. Because the high-level processing greatly simplifies the data, the low-level component can operate at a faster rate, (relative to the high-level component), such as a rate that corresponds to the frame refresh rate of the graphics subsystem, to process the data into constant output data for the graphics subsystem. When animation is used, instead of having to redraw an entire scene with changes, the low-level processing may interpolate parameter intervals as necessary to obtain instantaneous values that when rendered provide a slightly changed scene for each frame, providing smooth animation.

U.S. Ser. No. 10/184,796 describes a parameterized scene graph that provides mutable (animated) values and parameterized graph containers such that program code that wants to draw graphics (e.g., an application program or operating system component) can selectively change certain aspects of the scene graph description, while leaving other aspects intact. The program code can also reuse already-built portions of the scene graph, with possibly different parameters. As can be appreciated, the ability to easily change the appearance of displayed items via parameterization and/or the reuse of existing parts of a scene graph provide substantial gains in overall graphics processing efficiency.

U.S. Ser. No. 10/185,775 generally describes a caching data structure and related mechanisms for storing visual information via objects and data in a scene graph. The data structure is generally associated with mechanisms that intelligently control how the visual information therein is populated and used. For example, unless specifically requested by the application program, most of the information stored in the data structure has no external reference to it, which enables this information to be optimized or otherwise processed. As can be appreciated, this provides efficiency and conservation of resources, e.g., the data in the cache data structure can be processed into a different format that is more compact and/or reduces the need for subsequent, repeated processing, such as a bitmap or other post-processing result.

While the above improvements provide substantial benefits in graphics processing technology, there still needs to be a way for programs to effectively use this improved graphics model and its other related improvements in a straightforward manner. What is needed is a comprehensive yet straightforward model for programs to take advantage of the many features and graphics processing capabilities provided by the improved graphics model and thereby output complex graphics and audiovisual data in an efficient manner.

SUMMARY OF THE INVENTION

Briefly, the present invention provides a media integration layer which provides an API for programmers to accomplish possibly complex composition effects within their applications in a straightforward manner, while leveraging the graphics processing unit in a manner that does not adversely impact normal application performance. One aspect provides the ability to combine different media types (e.g., 2D, 3D, Video, Audio, text, imaging and so forth) and animate them together smoothly and seamlessly.

The MIL provides a graphics architecture for multi-stage composition, and a programming model that allows for functional parity at the programmatic and scripted interfaces. An API and script allows the creation of a retained structure or scene description that is composited when rendered, yet includes areas that have a more immediate-mode nature.

Via the interfaces, the MIL provides access to a data structure for storing visual information so that applications can take advantage of the graphics capabilities provided by the computer hardware. The interfaces support an element object model and a vector graphics markup language for using that element object model in a manner that allows program code developers to consistently interface with a scene graph data structure to produce graphics. The data structure may also be used for either directly rendering or for "compiling" the visual information so that it can be provided to a lower level graphics system for fast composition and animation.

The vector graphics element object model generally corresponds to shape elements and other elements including image and video elements that correlate with a scene graph object model of the scene graph. Markup may be parsed into data including elements in an element tree that is translated into the objects of a scene graph data structure. Other markup may be translated directly into data and calls that create the scene graph objects. The markup language provides distinct ways to describe an element, including a simple string format or complex property syntax, which may be named, enabling reuse in other locations in the markup.

An aspect of the MIL is the integration of animation and timing across the API set, providing animation as an inherent base-level concept. To facilitate smooth animation, the MIL provides s multiple-level graphics processing system and method (e.g., of an operating system). One such multiple-level graphics processing system comprises two components, including a tick-on-demand or slow-tick high-level component, and a fast-tick (e.g., at the graphics hardware frame refresh rate) low-level component. In general, the high-level, less frequent component performs computationally intensive aspects of updating animation parameters and traversing scene data structures, in order to pass simplified data structures to the low-level component. The low-level component operates at a higher frequency, such as the frame refresh rate of the graphics subsystem, to process the data structures into constant output data for the graphics subsystem. The low-level processing includes interpolating any parameter intervals as necessary to obtain instantaneous values to render the scene for each frame of animation.

Top level MIL objects include a visual tree, which is an object that contains the main content to be drawn. Controls will derive from visuals of the tree directly. Visuals are device and parent context independent. A render target is the device to which the visual is drawn. This object (e.g., screen) may have its own dirty or invalidation mechanism. Various render targets include a screen in a window, a Printer, a Metafile, a Surface, a streaming media file (for example, DVD) and a "Sub-window" which is a part of the scene that is drawn separately from the rest of the scene. Other drawing related objects include a Visual Renderer, comprising an object that is configured to draw a visual tree onto a render target, and a Display Scheduler object that knows when to draw the visual tree on to the render target. A Time Manager is a context object for a set of timing nodes, and is the object that the scheduler calls tick on.

A Visual API is provided, which is essentially a starting point for drawing via the media integration layer, and comprises multiple types of objects, including a VisualManager object, which connects a Visual Tree to a medium. The different types of VisualManagers (e.g., Screen, Printer, and Surface) are responsible for rendering a Visual Tree to their particular medium. A visual is where the programmer does the drawing; it is a node in the visual tree and provides a place for a program to draw.

The DrawingContext APIs presents a context-based programming model for how to construct visual content that populates a Visual or are rendered to an ImageData. DrawingContext classes are provided, as well as the classes and entrypoints necessary to acquire a DrawingContext and enumerate the visual content in a RetainedVisual/DrawingVisual.

To enable mutability, there is provided a single set of types that derive from a common Changeable base class. Any type for which mutability is desired change may derive from the Changeable class. For example, in a graphics programming, the object model includes Brushes, Pens, Geometries, FloatAnimations, GradientStops, Segments, and so forth. An IsChangeable property specifies whether the changeable object can be modified or not, depending on its current value, which defines a state.

A brush is an object that represents a method to fill a plane. In addition to being able to fill a plane in an absolute way, brushes of the media integration layer are also able to adapt how they fill the plane relative to the size of the object that they are filling. Examples of types of brushes include SolidColorBrush, VisualBrush (which can reference a vector graphics resource/Visual), DrawingBrush, LinearGradient, RadialGradient, ImageBrush and NineGridBrush. Certain brush objects will have an idea of how they relate to the coordinate system when they are used, and an idea of how they relate to the bounding box of the geometry with which they are used. This size is based on from the object that the brush is filling. Certain type of brushes (for example VisualBrush) also may be tiled to create programmer defined patterns. The Brush base class has a Transform, a general opacity, and a blend mode. Brush (and other object resources in Vector Graphics and the MIL API) objects are Changeables and are writable after they have been created, and follow the general Changeable pattern for how they behave after they are used in qualified use.

A Geometry class of objects can be used for clipping, hit-testing, and rendering of 2D vector-based data with the Pen and Brush. The derived Geometry classes provide more specific building and enumeration semantics. A number of shape-specific Geometry types are provided, as well as a generalized PathGeometry that allows for explicit definition of more complex shaped Geometry. Geometry is an abstract base class. A GeometryCollection is a collection of multiple Geometry objects that have been combined using particular CombineMode operations on their defined area. This object allows easier building visual combinations of Geometry objects than is possible using strictly PathFigure objects within a PathGeometry.

ImageSource is an abstract class, comprising a basic building block for imaging. An ImageSource conceptually represents a single, constant set of pixels at a certain size and resolution. For example, an ImageSource may be a single frame in an image file that a Decoder could provide, or it may be the results of a transform that operates on a certain ImageSource of its own. An ImageSource is changeable, not because its own properties can be changed, but because the properties of its sub-classes can potentially be changed.

A Transform class of objects is provided for scaling, rotating, translating and skewing vector and raster graphics. The derived Transform classes provide friendly usage and enumeration semantics.

Effects provide a means to alter the visual contents of a scene in a rendering-centric manner. For example, ImageEffectss (raster-based bitmap effects) operate on the image-based, fully composited representation of a portion of a scene. Effects are broken down into various types including ImageEffectss, BlendModes and VectorEffects. ImageEffectss can be used in a retained-mode scene by applying it to a sub-graph or an Element, or it can be used in the standalone image pipeline. BlendModes are a specific form of image-based effects, and can be applied to the retained mode scene in generally the same manner as ImageEffectss. Blend modes perform a combination of the source and destination colors as the source is composited, e.g., multiply or add.

Hit testing is used to pick visuals in a scene, and operates by starting from the top of the control tree, and returning a control or set of controls by a point or geometry. A control can define whether it is hit or not with support services including rendered geometry, bounding box, out-of-band geometry (hit region), image opacity or mask, and its own logic. The control can return specific hit-related data on hit. The hit test mechanism can filter hit test results in an efficient manner. The hit test walk is a deep right to left walk of the visual tree, with hits reported through a callback in z-order, top-to-bottom fashion. When descending, the hit tester views the filtering in terms of element level relationships, for example, a canvas with shapes, or a dock panel with an inner canvas. When a hit occurs, the hit tester can either continue processing further hits (if any), or stop.

An animation system is provided, comprised of a timing control engine and a set of animation objects. The timing engine is a service that can be used by any objects that exhibit time-varying behaviors, e.g., animations and audio or video media objects. Animation objects implement a set of functions that map time spans into other data types, which are then used as inputs into other higher-level objects. Graphical animation is achieved by associating an animation collection with a rendering operation. Each animation used in a rendering operation may be run on a separate clock, referred to as a called a "timeline." Multiple timelines can be organized in a timing tree to support hierarchical timing. Once an animated primitive is drawn and animation parameters specified, the low-level rendering system takes care of redrawing the scene at regular intervals. Each time a frame is rendered the current value of the animations involved in the scene is computed, based on the elapsed time (in most cases measured by the system clock), and then the animated primitives are redrawn.

Various primitive types, color features and media support is also provided via the MIL. MediaData can be used to play any audio/video content.

Other benefits and advantages will become apparent from the following detailed description when taken in conjunction with the drawings, in which:

DETAILED DESCRIPTION

Exemplary Operating Environment

Figure 1:
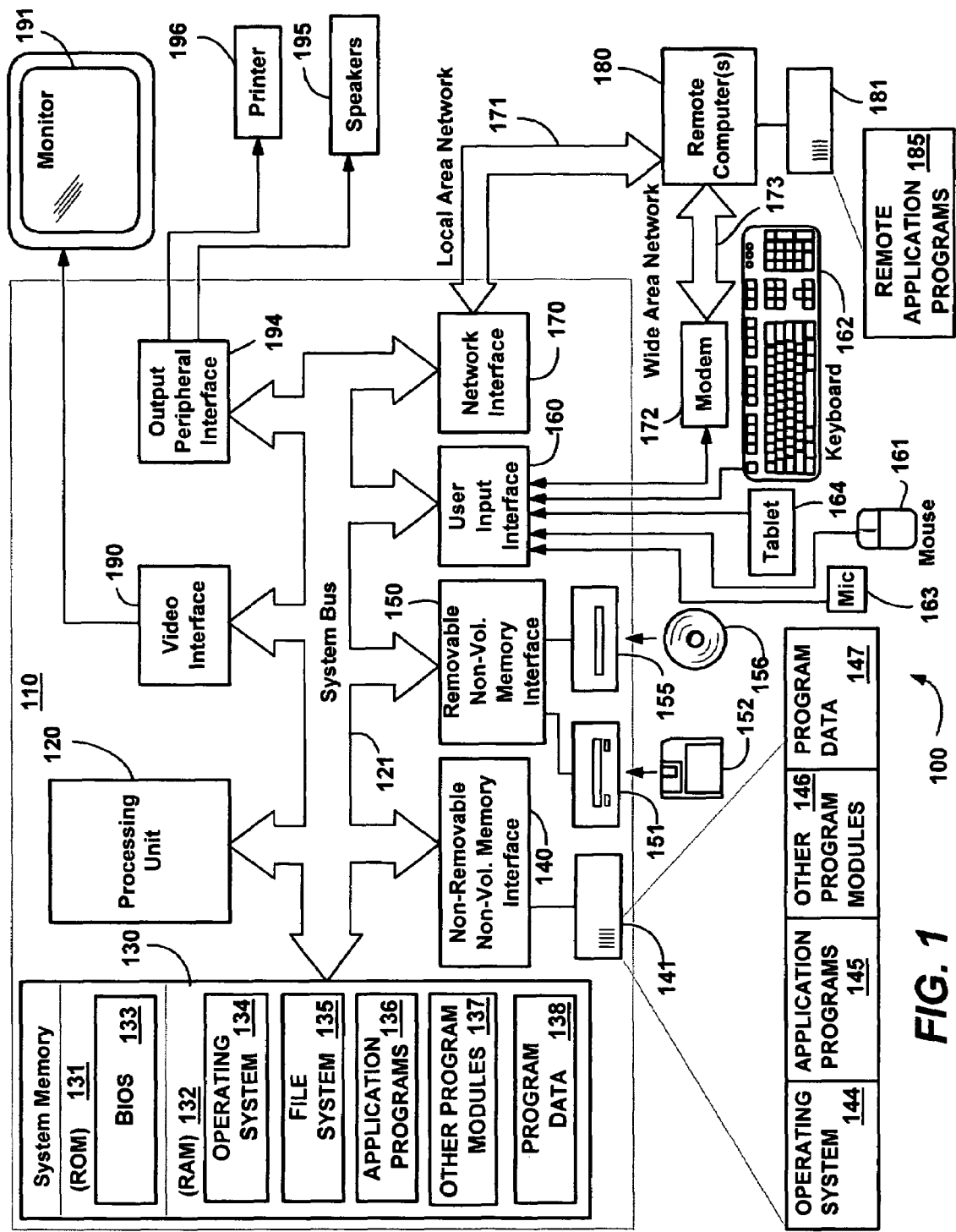
FIG. 1 is a block diagram representing an exemplary computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Accelerated Graphics Port (AGP) bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet (electronic digitizer) 164, a microphone 163, a keyboard 162 and pointing device 161, commonly referred to as mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel 193 or the like that can input digitized input such as handwriting into the computer system 110 via an interface, such as a touch-screen interface 192. Note that the monitor and/or touch screen panel can be physically coupled to a housing in which the computing device 110 is incorporated, such as in a tablet-type personal computer, wherein the touch screen panel 193 essentially serves as the tablet 164. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Media Integration Layer (MIL)

One aspect of the present invention is generally directed to an architecture referred to as the media integration layer (MIL), that includes an immediate mode graphics application programming interface (API), a screen-partitioning data structure and API that also plays a role in caching drawing instructions, a set of control level objects, and a markup language. In general, the architecture allows program code, such as an application or operating system component, to communicate drawing instructions and other information (e.g., image bitmaps) to graphics components in order to render graphical output on the system display. An aspect of the present invention provides a number of defined functions and methods, e.g., in the form of APIs to an object model, that enable programs to populate a scene graph with data structures, instruction lists (drawing primitives/commands), and other graphics-related data. When processed, the scene graph results in graphics being displayed on the screen.

In accordance with an aspect of the present invention, the MIL is a composited system which works in layers. Each item to be composited is conceptually drawn into a bitmap that has a full alpha channel. That alpha channel is then used when compositing that bitmap to the back buffer. The individual objects are composited from back to front. Note that while this is a conceptual model, in actuality, the system understands when a full intermediary bitmap surface is not needed and composites directly to the back buffer or other backing surface. The system also can understand incremental changes and do minimal repaint.

Figure 2:
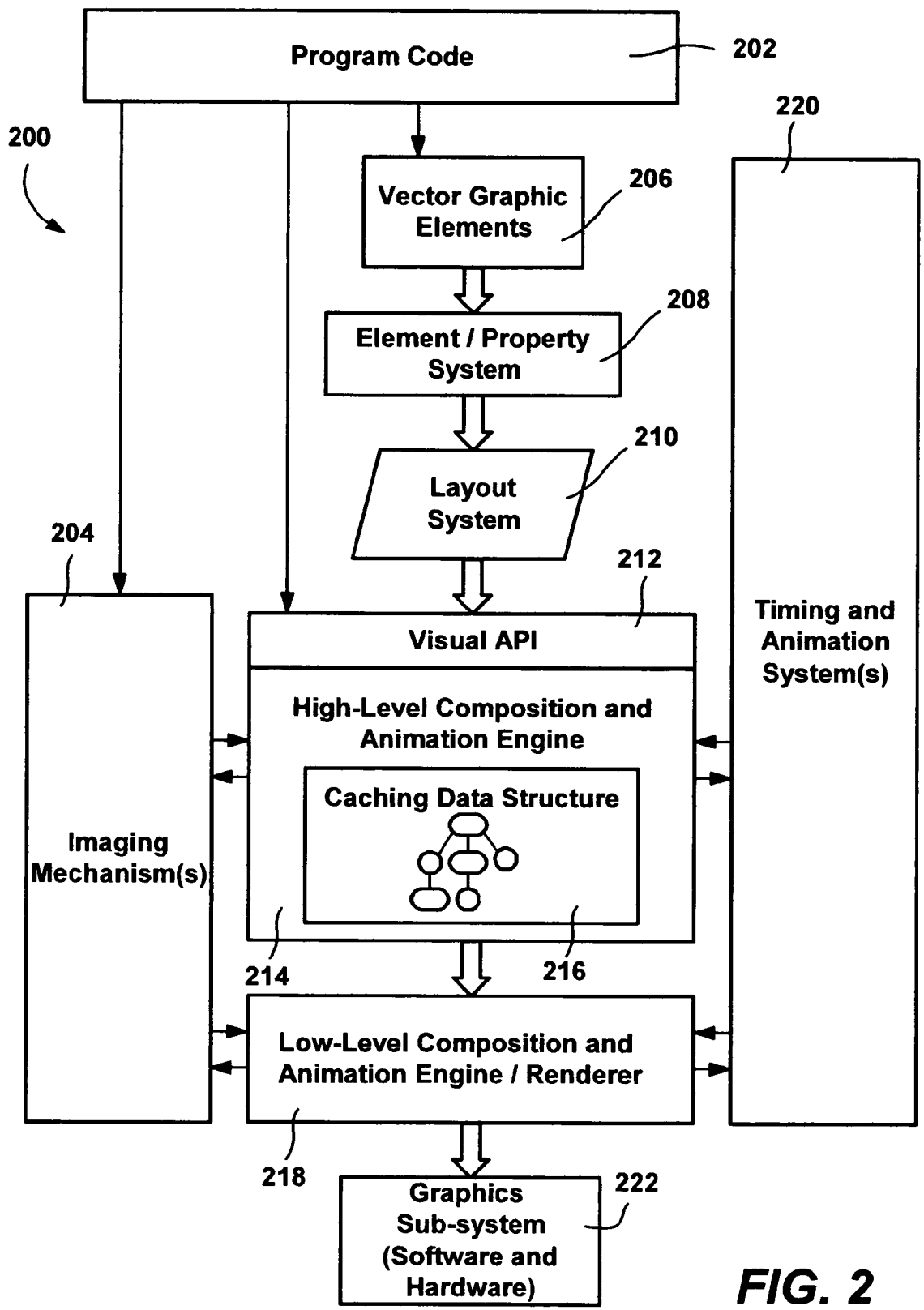
FIG. 2 is a block diagram generally representing a graphics layer architecture into which the present invention may be incorporated.

FIG. 2 represents a general, layered architecture (the MIL) 200 into which the present invention may be implemented. As represented in FIG. 2, program code 202 (e.g., an application program or operating system component or the like) may be developed to output graphics data in one or more various ways, including via imaging 204, via vector graphic elements 206, and/or via function/method calls placed directly to a visual application programming interface (API) layer 212. In general, imaging 204 provides the program code 202 with a mechanism for loading, editing and saving images, e.g., bitmaps. As described below, these images may be used by other parts of the system, and there is also a way to use the primitive drawing code to draw to an image directly. Vector graphics elements 206 provide another way to draw graphics, consistent with the rest of the object model (described below). Vector graphic elements 206 may be created via a markup language, which an element/property system 208 and layout system 210 interprets to make appropriate calls to the visual API layer 212. Vector graphic elements 206, along with the element/property system 208 and layout system 210, are described in the aforementioned copending patent application Ser. No. 10/401,717.

Thus, the MIL 200 includes different levels that a programmer can program to, including imaging 204, which is the pipeline for loading, editing and saving images. These images can be used in the rest of the system as desired. Furthermore, there is a way to use the primitive drawing code to draw to an image directly.

Another level comprises the Visual API 212, which is an API that primarily provides access to the data structure 216 for organizing items to be drawn. Each of those items can be loaded with drawing instructions that can be cached by the system. There is a variety of ways to specify this data structure and what is drawn; inside of a typical MIL-aware application, this API may be used from within a layout system 210.

A third level for programming comprises the vector graphics elements level 206, which is a markup language to describe and draw graphics in a way that is consistent with the rest of the control/Element object model. Vector Graphics Elements expose the graphics system through the element system. This includes a set of elements for rendering and a set of properties that work on any arbitrary element. In one implementation, there are two subsets, including Element level Vector Graphics, which gets parsed into and creates elements, and Resource level vector graphics, which gets parsed and stored in an efficient manner. Element level object model refers to operating at the higher level control world that brings in the element tree, the property system and the layout system 210. With respect to parsing, many dynamic properties at the Element level are of MIL types. In general, the markup is resolved to objects, in which an XML scheme for the XAML markup is usually declared at top of a markup file as follows:

```
<Canvas xmlns="http://schemas.microsoft.com/2003/xaml"
    xmlns:def="Definition"
def:Class="Surfin.ChannelBrowser"
def:CodeBehind="ChannelBrowser.xaml.cs"
ID="mainCanvas" Background="Black" Width="100%" Height="100%"
Loaded="PageLoaded">
```

When <Path> tag is used for example, the parser uses the schema to look up the relevant namespace (for example, System.Windows.Shapes) to resolve and build the object. As generally described in the aforementioned copending patent application Ser. No. 10/401,717, the parser relies on type converters to convert from a string to an instance of a MIL object. These types which require complex syntax have each writeable CLR (common language runtime) property exposed as an optional XML attribute, which is parsed in the same manner as a dynamic property. Some types (notably Brushes) can be parsed in either simple or complex form.

It should be noted that the function calls directed to any of these layers or to any of these classes may be handled directly or indirectly. For example, a request handler may comprise middleware code that converts the requests received in one operating system to API calls handled by another operating system. Thus, as used herein, functions are called by programs that "cause" the requested behavior to occur, regardless of where the actual processing occurs or where the data structures and classes are provided.

As will be understood, and also represented in FIG. 2, an animation system 220 pervades the entire API. As described herein, animate values can be passed essentially anywhere, including at the element property level 208, inside of the Visual API 212 and in any of the other resources. The timing system is also exposed at both the element and visual levels.

In one implementation, the graphics layer architecture 200 includes a high-level composition and animation engine 214, which includes or is otherwise associated with a caching data structure 216. The caching data structure 216 contains a scene graph comprising hierarchically-arranged objects that are managed according to a defined object model, as described below. In general, the visual API layer 212 provides the program code 202 (and the layout system 210) with an interface to the caching data structure 216, including the ability to create objects, open and close objects to provide data to them, and so forth. In other words, the high-level composition and animation engine 214 exposes a unified media API layer 212 by which developers may express intentions about graphics and media to display graphics 10 information, and provide an underlying platform with enough information such that the platform can optimize the use of the hardware for the program code. For example, the underlying platform will be responsible for caching, resource negotiation and media integration.

In one implementation, the high-level composition and animation engine 214 passes an instruction stream and possibly other data (e.g., pointers to bitmaps) to a fast, low-level compositing and animation engine 218. In general, the low-level composition and animation engine/renderer 218, provides a set of systems that manages the actual drawing and compositing onto the screen. Note that as used herein, the terms "high-level" and "low-level" are similar to those used in other computing scenarios, wherein in general, the lower a software component is relative to higher components, the closer that component is to the hardware. Thus, for example, graphics information sent from the high-level composition and animation engine 214 may be received at the low-level compositing and animation engine 218, where the information is used to send graphics data to the graphics subsystem including the hardware 222. Note that the present invention may be extended to multi-tiered composition beyond two layers.

Further, note that in order to facilitate resolution and device independent user interfaces, the concept of a pixel is not exposed as a fundamental unit in the main APIs. Instead, the initial coordinate system is set so that one unit in that coordinate system is equal to 1/96th of an inch. This may be referred to as a dip, or alternatively a px, even though on some systems (such as a high resolution monitor or a printer) it does not map to a pixel. In Length, the dip unit is translated directly to one user unit. The multiplier between other physical units (in, cm, pt, and the like) is locked at 1/96th of an inch. This means that if a scale transform is used it will affect everything that is drawn, even if it is specified in physical issues. The value of 1/96th of an inch was chosen so that a default user unit is equivalent to a pixel on contemporary displays with default settings. Note that a mechanism may be provided to provide hints to the layout system and other user code so that they can optimize for the output resolution of the device to which they are rendering.

The high-level composition and animation engine 214 in conjunction with the program code 202 builds a scene graph to represent a graphics scene provided by the program code 202. For example, each item to be drawn may be loaded with drawing instructions, which the system can cache in the scene graph data structure 216. As will be described below, there are a number of various ways to specify this data structure 216, and what is drawn. Further, the high-level composition and animation engine 214 integrates with timing and animation systems 220 to provide declarative (or other) animation control (e.g., animation intervals) and timing control. Note that the animation system allows animate values to be passed essentially anywhere in the system, including, for example, at the element property level 208, inside of the visual API layer 212, and in any of the other resources. The timing system is exposed at the element and visual levels.

The low-level compositing and animation engine 218 manages the composing, animating and rendering of the scene, which is then provided to the graphics subsystem 222. The low-level engine 218 composes the renderings for the scenes of multiple threads (e.g., from one or more applications), and with rendering components, implements the actual rendering of graphics to the screen. Note, however, that at times it may be necessary and/or advantageous for some of the rendering to happen at higher levels. For example, while the lower layers service requests from multiple threads, the higher layers are instantiated on a per-thread basis, whereby is possible via the imaging mechanisms 204 to perform time-consuming or thread-specific rendering at higher levels, and pass references to a bitmap to the lower layers.

The MIL 200 provides a number of concepts which are integrated to provide improvements in graphics and audiovisual programming, such as a set of resources and classes that are shared through this entire layered stack, including Pens, Brushes, Geometry, Transforms and Effects. Also, simple primitive types are provided, including Points, Rectangles, and so forth. Pen and Brush are complex types that describe how to affect rendering at these various levels. Also provided is a special type of Brush, referred to as VisualBrush, that allows programmers to use an arbitrary graphics "metafile" to fill an area (via a VisualBrush explicitly or a Pen that references a VisualBrush). Since this is a compressed form for storing and using arbitrary graphics, it plays the role of a graphics resource. There is a specific profile of the vector graphics markup syntax used to create these objects directly. Although generally similar to VisualBrush, the DrawingBrush is more compressed and digested, and is essentially a metafile brush whereas the VisualBrush is a scene graph brush.

Other classes include Geometry, which is a complex type that is used to define an area for filling, stroking or clipping. Transform is another complex type hierarchy for defining how to transform coordinate spaces. Effects describe a system for putting arbitrary filter effects on a section of content, e.g., a blur. Note that this also includes an add-in extensibility model.

A Visual API is provided that uses the above types to get bits to the screen or other targets. This includes base level hookup to the rest of the system (via an hWnd or other mechanism) along with the screen partitioning data structure introduced above. Imaging allows the programmer to get images into, and out of the MIL-based system. Media provides the ability to use other forms of media, including audio and video. In general, the Visual API refers to the API set that operates below the element system and the layout system, and refers to programming with and to Visuals directly, instead of at a higher level. Note that a visual is a basic object in the caching data structure 216, which comprises s a retained data structure for visual things on the screen, and also caches the Instruction Lists and device specific resources for performance reasons.

Figure 3:
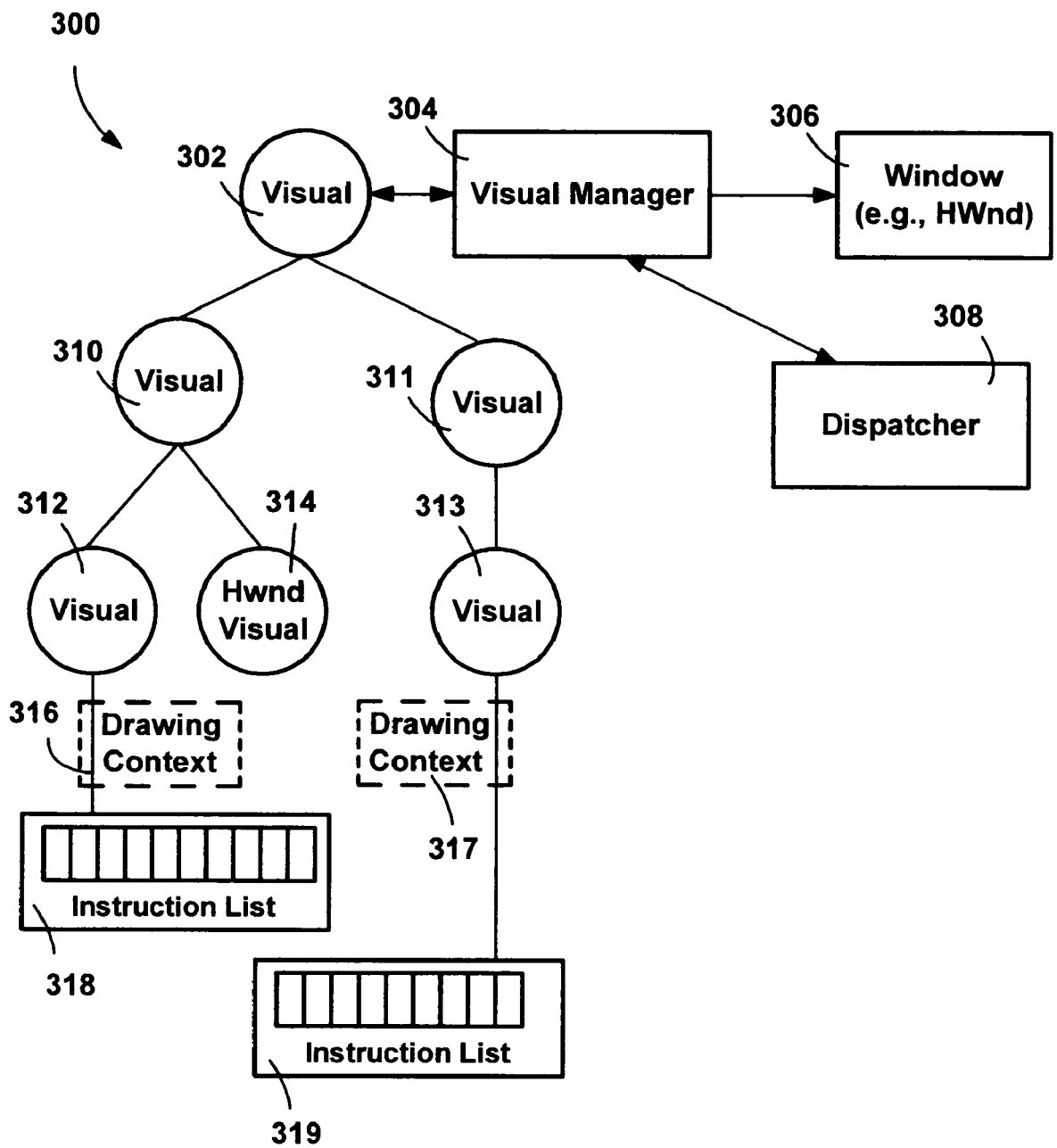
FIG. 3 is a representation of a scene graph of visuals and associated components for processing the scene graph such as by traversing the scene graph to provide graphics commands and other data in accordance with an aspect of the present invention.
Figure 4:
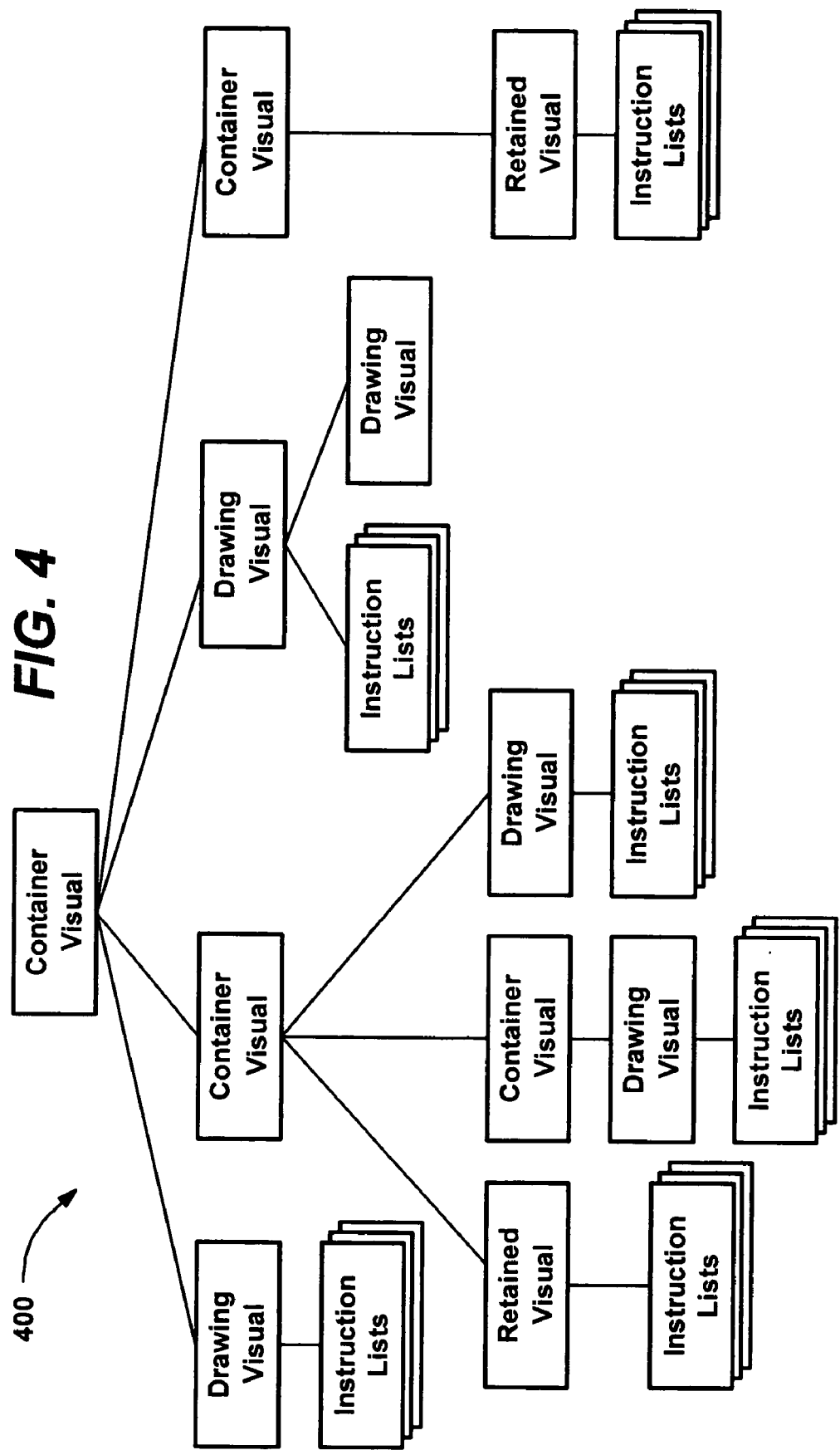
FIG. 4 is a representation of a scene graph of validation visuals, drawing visuals and associated Instruction Lists constructed in accordance with an aspect of the present invention.
Figure 5:
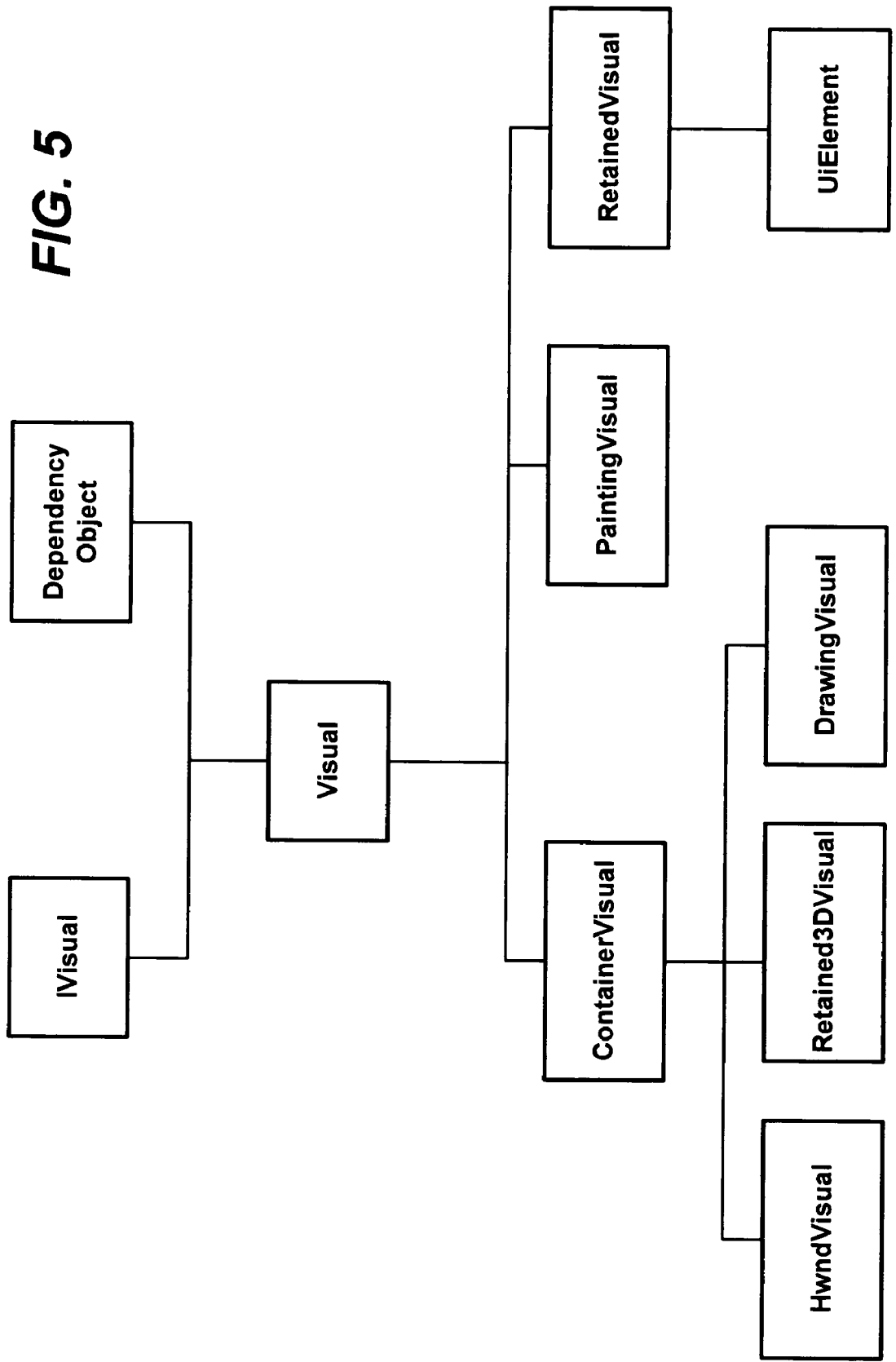
FIG. 5 is a representation of a visual class, of an object model, in accordance with an aspect of the present invention.

FIGS. 3 and 4 show example scene graphs 300 and 400, respectively, including a base object referred to as a Visual. In general, a Visual comprises an object that represents a virtual surface to the user and has a Visual representation on the display. As represented in FIG. 5, a base class Visual provides the base functionality for other Visual types, that is, the Visual class is an abstract base class from which Visual types derive.

Figure 6:
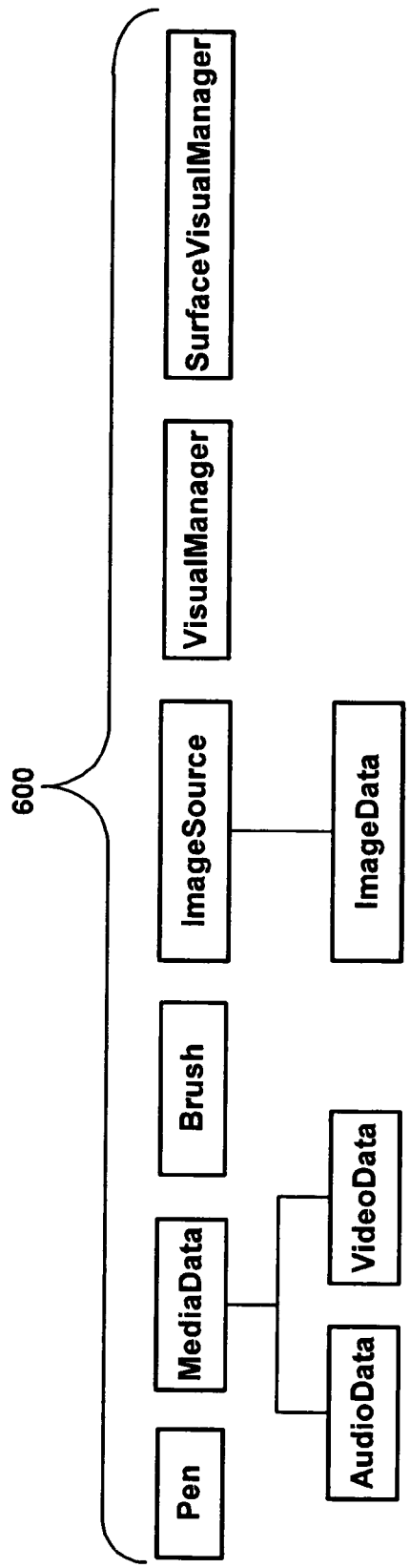
FIG. 6 is a representation of various other objects of the object model, in accordance with an aspect of the present invention.

As represented in FIG. 3, a top-level (or root) Visual 302 is connected to a Visual manager object 304, which also has a relationship (e.g., via a handle) with a window (HWnd) 306 or similar unit in which graphic data is output for the program code. The VisualManager 304 manages the drawing of the top-level Visual (and any children of that Visual) to that window 306. FIG. 6 shows the VisualManager as one of a set of other objects 620 in the object model of the graphics system described herein.

To draw, the VisualManager 304 processes (e.g., traverses or transmits) the scene graph as scheduled by a dispatcher 308, and provides graphics instructions and other data to the low level component 218 (FIG. 2) for its corresponding window 306, such as generally described in the aforementioned U.S. Patent Applications. The scene graph processing will ordinarily be scheduled by the dispatcher 308 at a rate that is relatively slower than the refresh rate of the lower-level component 218 and/or graphics subsystem 222. FIG. 3 shows a number of child Visuals 310-314 arranged hierarchically below the top-level (root) Visual 302, some of which are represented as having been populated via drawing contexts 316, 317 (shown as dashed boxes to represent their temporary nature) with associated instruction lists 318 and 319, respectively, e.g., containing Instruction Lists and other Visuals. The Visuals may also contain other property information. In general, most access on the base visual class comes via an IVisual interface, and visual derives from DependencyObject, as represented in FIG. 5. Visuals (further described in the Appendix) may also contain other property information, as shown in the following example Visual class:

```
public class Visual : IVisual, DependencyObject
{
    protected Visual( );
    protected Visual(UIContext context);
    bool IVisual.HasChildren { get; }
    VisualCollection IVisual.Children { get; }
    Visual IVisual.Parent { get; }
    Geometry IVisual.Clip { get; set; }
    Bool IVisual.Show { get; set; }
    double IVisual.Opacity { get; set; }
    BlendMode IVisual.BlendMode {get; set;}
    Matrix IVisual.TransformToAncestor(Visual ancestor);
    Matrix IVisual.TransformToDescendant(Visual descendant);
    Matrix IVisual.TransformFromAncestor(Visual ancestor);
    Matrix IVisual.TransformFromDescendant(Visual descendant);
    Matrix IVisual.TransformToVisual(Visual visual);
    Matrix IVisual.TransformFromVisual(Visual visual);
    bool IVisual.IsAncestorOf(Visual descendant);
    bool IVisual.IsDescendantOf(Visual ancestor);
    Visual IVisual.FindCommonVisualAncestor(Visual otherVisual);
    PointHitTestResult IVisual.HitTest(Point point);
    void IVisual.HitTest(
        HitTestFilterDelegate filterHitDelegate,
        HitTestResultDelegate resultHitDelegate,
        HitTestParameters hitTestParams);
    Rect IVisual.VisualContentBounds { get; }
    Rect IVisual.VisualDescendantBounds { get; }
    protected virtual PointHitTestResult HitTestCore(
        PointHitTestParameters point);
    protected virtual GeometryHitTestResult HitTestCore(
        GeometryHitTestParameters geometry);
    protected virtual Rect HitTestBounds { get; }
}
```

A Visual is a container for graphical content and a set of children. Various properties on a Visual can be used to control the rendering behavior of a Visual. For example by setting a clip on a Visual the content of a Visual is clipped to the shape specified. Other properties are transform, blend mode, opacity, show, etc. All those properties can be controlled via get and set properties.

A Show property is used to show/hide the visual, e.g., when false the visual is invisible, otherwise the visual is visible. Furthermore, MIL objects (whether Visuals at the Visual API layer or elements at the element layer) exist in a hierarchy. A coordinate system is inherited down through this hierarchy. In this way, a parent can push a coordinate transform that modifies the rendering pass and gets applied to that parent's children.

The transform for a visual is on the connection to that visual. In other words, it is set via the [Get|Set]ChildTransform on the parent's VisualCollection Children property. See also the VisualCollection described later on.

Figure 8:
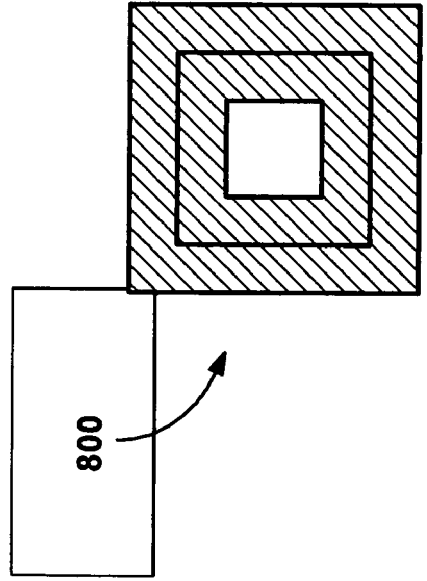
FIGS. 8 and 9 are representations of transformations of a visual's data in a geometry scale and a non-uniform scale, respectively, in accordance with an aspect of the present invention.
Figure 9:
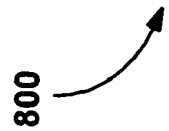

Note that the coordinate transforms may be applied in a uniform way to everything, as if it were in a bitmap. Note that this does not mean that transformations always apply to bitmaps, but that what gets rendered is affected by transforms equally. By way of example, if the user draws a circle with a round pen that is one inch wide and then applies a scale in the X direction of two to that circle, the pen will be two inches wide at the left and right and only one inch wide at the top and bottom. This is sometimes referred to as a compositing or bitmap transform (as opposed to a skeleton or geometry scale that affects the geometry only). FIG. 8 is a representation of scaling transformation, with a non-transformed image 800 appearing on the left and a transformed image 802 with a non-uniform scale appearing on the right. FIG. 9 is a representation of scaling transformation, with the non-transformed image 800 appearing on the left and a transformed image 904 with geometry scaling appearing on the right.

With respect to coordinate transformation of a visual, TransformToDescendant returns a transform that reflects the coordinate space change going from the reference visual to the descendant visual. The transform can then be used to for example transform a point from the coordinate space of the reference visual to the coordinate space of the descendant visual. TransformFromDescendant returns similarity a transform that describes the coordinate space change going from the descendant Visual to the reference Visual. The transformation can then be used to transform a point from coordinate space of the descendant visual to coordinate space of the reference visual. For convenience the Visual API also provides the TransformToAncestor, TransformFromAncestor, TransformFromVisual, and TransformToVisual which also return transforms for the respective coordinate space changes. Note that in the latter two APIs, the relationship between the Visuals is not specified. They can even be peers in the Visual tree as long as they share a common ancestors. The implementation will find the common ancestor and then calculate the coordinate transformation from the reference Visual to the common ancestor, and then from the common ancestor to the target Visual. The resulting transform can be used to for example transform a point between the specified Visuals.

Two get properties are available that may be used to determine the bounding box of the content of the Visual, namely VisualDescendantBounds, which is the bounding box of all the graphical content of the descendants, and VisualContentBounds which is the bounds of the content. Applying a Union to these provides the total bounds of the Visual.

Figure 10:
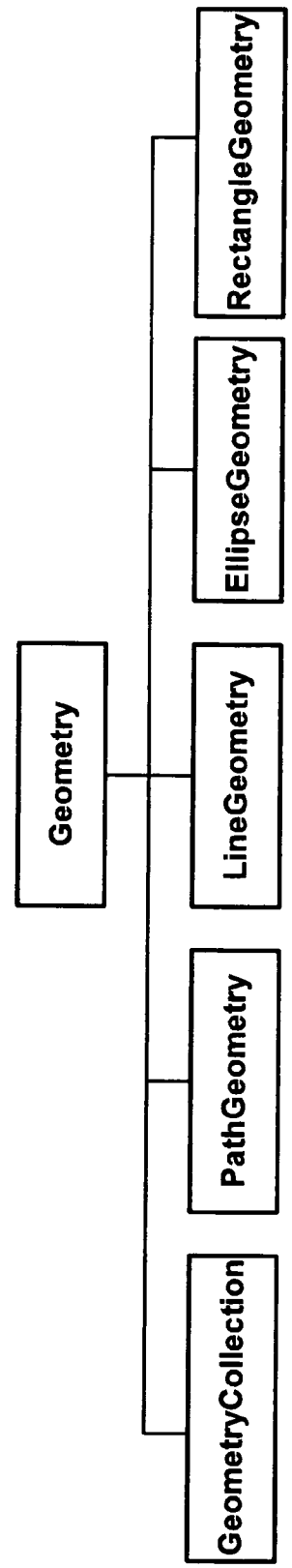
FIG. 10 is a representation of geometry classes of the object model, in accordance with an aspect of the present invention.

The clip property sets (and gets) the clipping region of a visual. Any Geometry (the geometry class is shown in FIG. 10 and described in the Geometry section below) can be used as a clipping region. In one implementation, a default setting for the clipping region is null, i.e., no clipping, which can be thought of as an infinite big clipping rectangle from $(-\infty, -\infty)$ to $(+\infty, +\infty)$.

The Opacity property gets/sets the opacity value of the visual, such that the content of the visual is blended on the drawing surface based on the opacity value and the selected blending mode. The BlendMode property can be used to set (or get) the blending mode that is used. For example, an opacity (alpha) value may be set between 0.0 and 1.0, with linear alpha blending set as the mode, e.g., Color=alpha*foreground color+(1.0-alpha)*background color). Other services, such as special effects properties, may be included in a visual, e.g., blur, monochrome, and so on.

The Visual has also a Children property for managing the set of children. It also provides a HasChildren property to check if the Visual has any children at all. The Children property returns a VisualCollection that lets the user perform operations like add, remove, insert, etc. on the set of children. The following shows an example of a VisualCollection:

```
public class Visual : ICollection, IEnumerable
{
        public Int32 Add(Visual visual)
        public Void Clear( )
        public Boolean Contains(Visual visual)
        public virtual sealed Void CopyTo(Array array, Int32 index)
        public Int32 get_Capacity( )
        public virtual sealed Int32 get_Count( )
        public virtual sealed Boolean get_IsSynchronized( )
        public Visual get_Item(Int32 index)
        public virtual sealed Object get_SyncRoot( )
        public virtual sealed IEnumerator GetEnumerator( )
        public Transform GetTransform(Int32 index)
        public Transform GetTransform(Visual child)
        public Int32 IndexOf(Visual visual)
        public Void Insert(Int32 index, Visual visual)
        public Void Remove(Visual visual)
        public Void RemoveAt(Int32 index)
        public Void RemoveRange(Int32 index, Int32 count)
        public Void set_Capacity(Int32 value)
        public Void set_Item(Int32 index, Visual value)
        public Void SetTransform(Int32 index, Transform transform)
        public Void SetTransform(Visual child, Transform transform)
    public Void TrimToSize( )
}
```

The order of the Visuals in the VisualCollection determines in which order the Visuals are rendered, i.e. Visuals are rendered from the lowest index to the highest index from back to front (painting order).

A ProxyVisual is a visual that may be added more than once into the scene graph, e.g., below a container visual. Since any visual referred to by a ProxyVisual may be reached by multiple paths from the root, read services (TransformToDescendent, TransformFromDescendent and HitTest) do not work through a ProxyVisual. In essence, there is one canonical path from any visual to the root of the visual tree and that path does not include any ProxyVisuals.

FIG. 4 shows an example scene graph 400 in which ContainerVisuals and DrawingVisuals are related in a scene graph, and have associated data in the form of Instruction Lists, (e.g., in corresponding drawing contexts). The ContainerVisual is a Visual that has only structural content that is derived from the Visual base class. Visuals can be arbitrarily nested into each other. In particular it is legal to nest ContainerVisuals. The main purpose of the ContainerVisual is to provide a container for Visuals that can be conveniently accessed without going throught the IVisual interface. The ContainerVisual therefore reimplements all the IVisual methods as public methods again. The children of a ContainerVisual can be manipulated can be manipulated with methods on the VisualCollection Children property of the ContainerVisual.

Returning to FIG. 5, yet another visual is an HwndVisual 505, which positions a Win32 child HWnd in the scene graph. More particularly, legacy programs will still operate via the WM_PAINT method (or the like) that draws to a child HWnd (or the like) based on prior graphics technology. To support such programs in the new graphics processing model, the HwndVisual allows the Hwnd to be contained in a scene graph and moved as the parent visual is repositioned. Other types of visuals 506 are also feasible, such as three-dimensional (3D) visuals which enable a connection between two-dimensional and three dimensional worlds, e.g., a camera-like view is possible via a two-dimensional visual having a view into a three-dimensional world. Such a 3D visual is described below.

As described above, visuals can be drawn on by populating their drawing contexts with various drawing primitives, including Geometry, ImageSource and MediaData. Furthermore, there are a set of resources and classes that are shared through this entire stack. This includes Pens, Brushes, Geometry, Transforms and Effects. The DrawingContext abstract class exposes a set of drawing and context state operations that can be used to populate a DrawingVisual, RetainedVisual, ImageData, etc. In other words, the drawing context abstract class exposes a set of drawing operations and push/pop operations; for each drawing and push operation there are two methods, one that takes constants as arguments, and one that takes animators as arguments. Examples for push/pop operations are PushTransform, PopTarnsform, PushClip, PopClip, PushOpacity, PopOpacity, etc.

The various services (including transform, opacity, and clip) can be pushed and popped on a drawing context, and push/pop operations can be nested, as long as there is an appropriate pop call for each push call.

The PushTransform method pushes a transformation. Subsequent drawing operations are executed with respect to the pushed transformation. The pop call pops the transformation pushed by the matching PushTransform call:

void PushTransform(Transform transform);
    void PushTransform(Matrix matrix);
    void Pop( );.

Similarly, the PushOpacity method pushes an opacity value. Subsequent drawing operations are rendered on a temporary surface with the specified opacity value and then composite into the scene. Pop( ) pops the opacity pushed by the matching PushOpacity call:

void PushOpacity(float opacity);
    void PushOpacity(FloatAnimation opacity);
    void Pop( );.

The PushClip method pushes a clipping geometry. Subsequent drawing operations are clipped to the geometry. The clipping is applied in post transformation space. Pop( ) pops the clipping region pushed by the matching PushClip call:

void PushClip(Geometry clip);
    void Pop( );.

Note that push operations can be arbitrarily nested as long as the pop operations are matched with a push. For example, the following is valid:

```
PushTransform(...);
DrawLine(...);
PushClip(...);
DrawLine(...);
Pop( );
PushTransform(...);
DrawRect(...);
Pop( );
Pop( );
```

Geometry is a type of class (FIG. 10) that defines a vector graphics skeleton, without stroke or fill. Each geometry object is a simple shape (LineGeometry, EllipseGeometry, RectangleGeometry), a complex single shape (PathGeometry) or a list of such shapes GeometryCollection with a combine operation (e.g., union, intersection, and so forth) specified. These objects form a class hierarchy as represented in FIG. 10.

Figure 11:
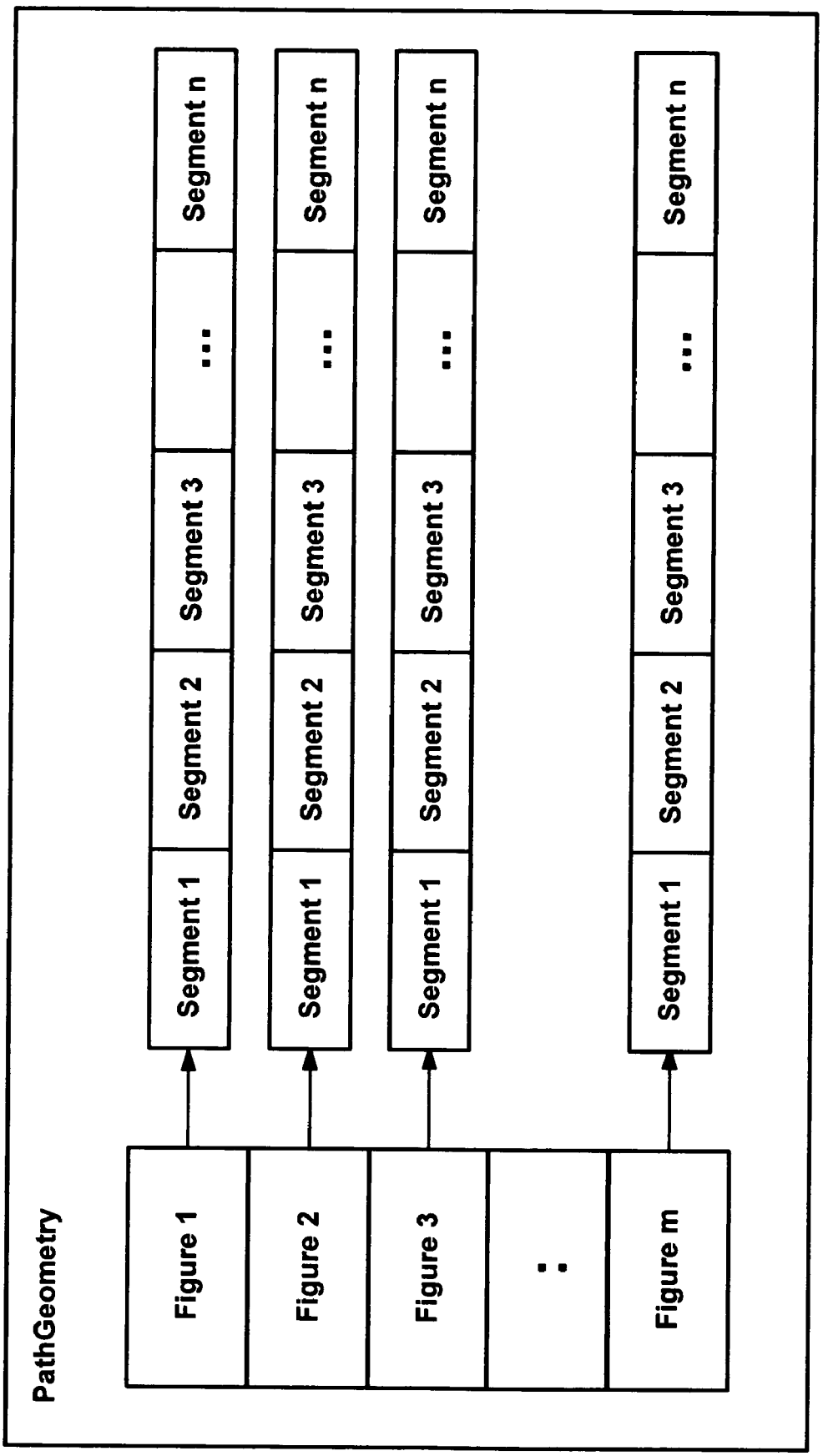
FIG. 11 is a representation of a PathGeometry structure, in accordance with an aspect of the present invention.

As represented in FIG. 11, the PathGeometry is a collection of Figure objects. In turn, each of the Figure objects is composed of one or more Segment objects which actually define the figure's shape. A Figure is a sub-section of a Geometry that defines a segment collection. This segment collection is a single connected series of two-dimensional Segment objects. The Figure can be either a closed shape with a defined area, or just a connected series of Segments that define a curve, but no enclosed area.

Figure 12:
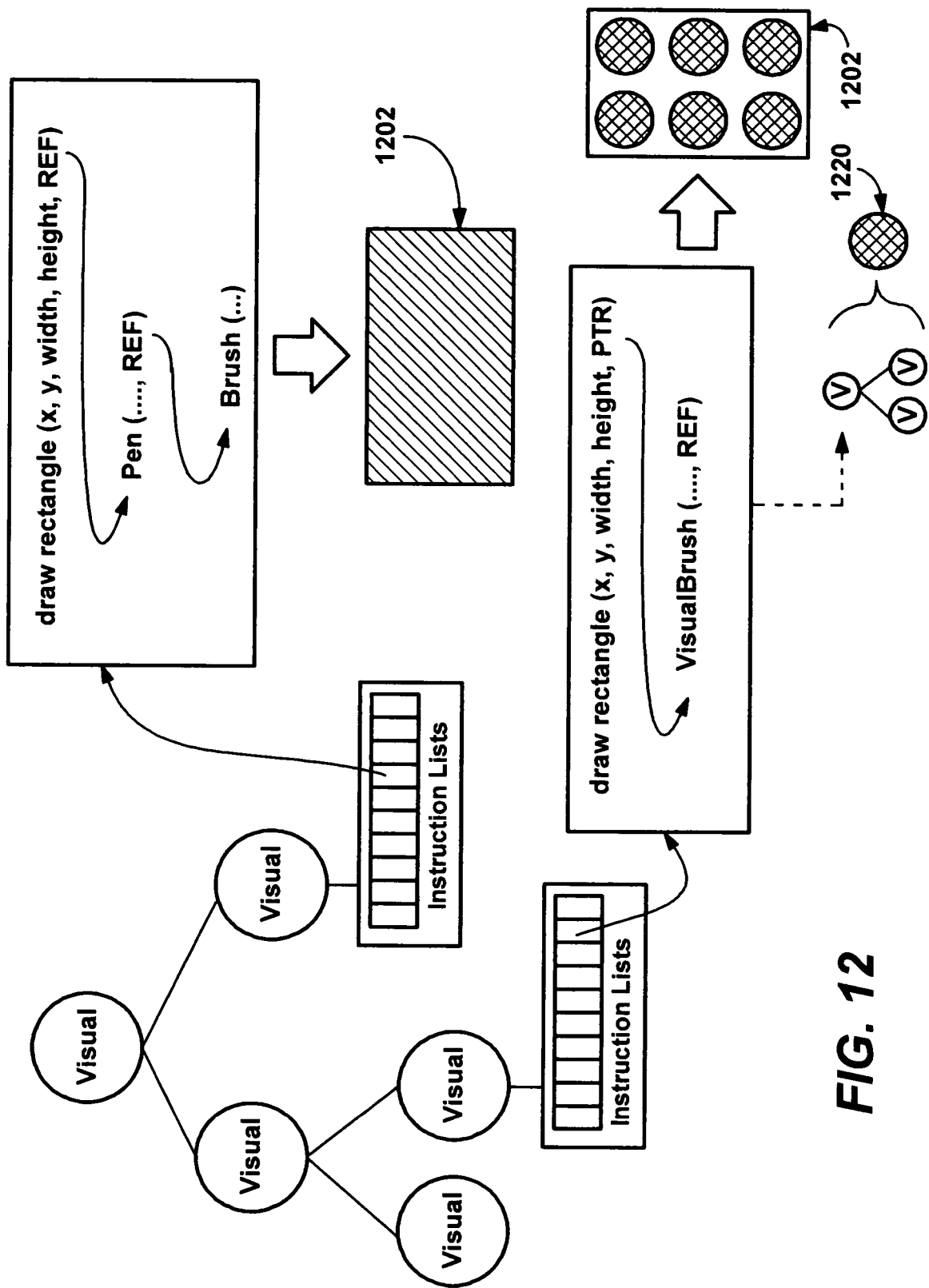
FIG. 12 is a representation of a scene graph of visuals and Instruction Lists showing example graphics produced by the primitives, in accordance with an aspect of the present invention.

As represented in FIG. 12, when geometry (e.g., a rectangle) is drawn, a brush or pen can be specified, as described below. Furthermore, the pen object also has a brush object. A brush object defines how to graphically fill a plane, and there is a class hierarchy of brush objects. This is represented in FIG. 12 by the filled rectangle 1202 that results when the visual including the rectangle and brush instructions and parameters is processed. A Pen object holds onto a Brush along with properties for Thickness, LineJoin, LineCap, EndCap, MiterLimit, DashArray and DashOffset, as described below. As also described below, some types of Brushes (such as gradients and nine grids) size themselves. When used, the size for these brushes is obtained from the bounding box, e.g., when the GradientUnits/DestinationUnits for the Brush is set to RelativeToBoundingBox, the bounding box of the primitive that is being drawn is used. If those properties are set to Absolute, then the coordinate space is used.

Figure 13:
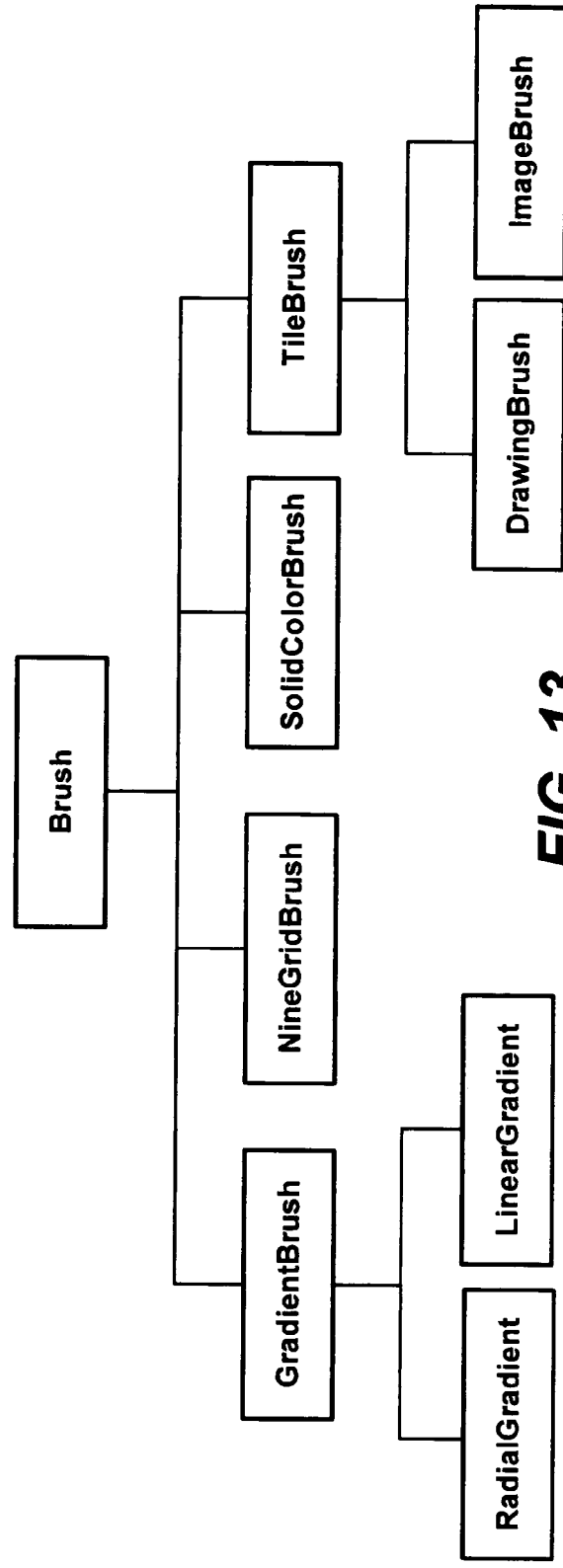
FIG. 13 is a representation of brush classes of the object model, in accordance with an aspect of the present invention.

As mentioned above and as further described below, the graphics object model of the present invention includes a Brush object model, which is generally directed towards the concept of covering a plane with pixels. Examples of types of brushes are represented in the hierarchy of FIG. 13, and, under a Brush base class, include Gradient Brush, NineGridBrush, SolidColorBrush and TileBrush. GradientBrush includes LinearGradient and RadialGradient objects. DrawingBrush and ImageBrush derive from TileBrush. Alternative arrangements of the classes are feasible, e.g., deriving from TileBrush may be ImageBrush, VisualBrush, VideoBrush, NineGridBrush and Drawing Brush. Note that Brush objects may recognize how they relate to the coordinate system when they are used, and/or how they relate to the bounding box of the shape on which they are used. In general, information such as size may be inferred from the object on which the brush is drawn. More particularly, many of the brush types use a coordinate system for specifying some of their parameters. This coordinate system can either be defined as relative to the simple bounding box of the shape to which the brush is applied, or it can be relative to the coordinate space that is active at the time that the brush is used. These are known, respectively, as RelativeToBoundingBox mode and Absolute mode.

Visual API

The Visual API is a starting point for drawing via the media integration layer, and comprises multiple types of objects, including a VisualManager object, which connects a Visual Tree to a medium. The different types of VisualManagers (e.g., Screen, Printer, Surface) manage the rendering process of a Visual Tree to their particular medium. The VisualManager is further described herein in the section entitled "Top Level MIL Objects."

A visual is where the user does drawing. It is a node in the visual tree (a container object that is the structure for a scene, as described below) and provides a place for a program to draw. There are various types of visuals, each tailored for different usages. A visual is similar to the visual/output side of a Win32 hWnd.

Visuals provide a number of capabilities, including parent visual access, child visual collection, clipping based on an arbitrary geometry, opacity, blendmode, transform that affects that visual and its children, hit testing, coordinate transformation services, bounding box services, and effects (raster and vector).

To render a visual scene, the visual tree is traversed, e.g., top-down, left-right, first rendering the content and then traversing the Visual's children from left to right. Any of a visual's children are drawn before the content of that visual itself. If the content requires a callback to the user, it happens synchronously during render time. Here is some pseudo-code for what the system does (via a VisualRenderer) to render a Visual tree to a device:

```
Visual.RenderToDevice(device)
{
    this.RenderContents(device);
    foreach (Visual child in this.Children)
    {
        Child.Walk(ctx);
    }
}
```

A derived visual may call back to the user during the RenderContents call.

FIG. 13 represents a Visual Class Hierarchy in one implementation. During callbacks that happen as part of the render pass, (comprising a callback to IRetainedVisual.Render or a callback to PaintingVisual.RenderCore) the Visual tree is "locked" for performance reasons. This locking happens on a context-wide basis, meaning that no context can modify the tree when locked, no matter which visual tree a visual belongs to. When the tree is locked, the children of a Visual cannot be changed, and another visual's contents may not be changed in any way (e.g., Open, set root 3D model, and so forth), Transform, Opacity, Clip, BlendMode or Effect on a Visual cannot be set, hit testing will not operate, nor will a Get bounding information operation work.

The capabilities on a Visual are exposed via the IVisual interface, thereby making the capabilities public, while protecting the object model. The following is the IVisual interface in one example implementation:

```
public interface IVisual
{
    bool HasChildren { get; }
    VisualCollection Children { get; }
    Visual Parent { get; }
    Geometry Clip { get; set; }
    bool Show {get; set; }
    double Opacity { get; set; }
    Matrix TransformToAncestor(Visual ancestor);
    Matrix TransformToDescendant(Visual descendant);
    Matrix TransformFromAncestor(Visual ancestor);
    Matrix TransformFromDescendant(Visual descendant);
    Matrix TransformToVisual(Visual visual);
    Matrix TransformFromVisual(Visual visual);
    bool IsAncestorOf(Visual descendant);
    bool IsDescendantOf(Visual ancestor);
    Visual FindCommonVisualAncestor(Visual otherVisual);
    PointHitTestResult HitTest(Point point);
    void HitTest(
        HitTestFilterDelegate filterHitDelegate,
        HitTestResultDelegate resultHitDelegate,
        HitTestParameters hitTestParams);
    Rect VisualContentBounds { get; }
    Rect VisualDescendantBounds { get; }
}
```

A Visual comprises render content and a collection of children. A number of properties, including transform, clip, opacity, blend mode, an so on can be used to control the actual rendering of the Visual tree. Note that a Visual does not have to have content and children at the same time. In an implementation, rendering content and child collection could be created on demand to optimize for memory usage. The Visual API allows the user of it to derive from a Visual and specialize it.

Transformations on children are preformed via a transform on the proprety Children of type VisualCollection.

```
public void SetChildTransform(Visual visual, Transform transform);
public Transform GetChildTransform(Visual visual);
```

Transformation Read Services provide methods that allow users to obtain a Matrix representing the aggregate transform from one coordinate frame to another:

```
        Matrix TransformToDescendant(Visual descendant);
        Matrix TransformFromDescendant(Visual descendant);
        Matrix TransformToAncestor(Visual ancestor);
        Matrix TransformFromAncestor(Visual ancestor);
        Matrix TransformToVisual(Visual visual);
        Matrix TransformFromVisual(Visual visual);
```

The TransformToAncestor and TransformToDescendant methods are more efficient but require the caller to know the relationship between two Visuals. The more general TransformTo/FromVisual methods find a common ancestor and compute the transform to that visual. Note that these may cause caches to be updated and OnRender to be called on arbitrary visuals. If the visuals are not connected or a degenerate transform is encountered, an exception is thrown.

Bounds calculation is also provided:

```
        protected Rect VisualDescendantBounds { get; }
        protected Rect VisualContentBounds { get; }
```

VisualDescendantBounds returns the union of the content bounding boxes for the descendants of the current visual, but not including the contents of the current visual. VisualContentBounds returns the bounding box for the contents of the current visual.

A Opacity property (e.g., a double) specifies an optional Opacity value to apply to a Visual when it is composited into its parent. By default, this value is 1.0, which will cause the contents to appear with their full Opacity. Note that since this value is multiplied with any other Opacity data in the subgraph, a Opacity of 1.0 alters nothing. A Opacity of 0.0 causes the entire contents to be transparent, a value of 0.25 causes Opacity to be twenty-five percent of its nominal values, and so forth. Opacity is applied before the BlendMode.

The BlendMode is a property that specifies an optional BlendMode to apply to the contents of a sub-graph and the destination when this Visual is composited. By default, this value is BlendMode.Normal, which performs an Alpha-channel aware composition into the destination. Setting this property to some other value will perform the composition with the Visual's contents as the source and the contents of the render target as the destination. This is applied after the Opacity property is applied.

The base visual class presents interfaces for the features that Visuals have in common:

```
public class System.Windows.Media.Visuals.Visual :
    DependencyObject, IVisual
{
    // Constructors
    protected Visual( );
    protected Visual(UiContext Context);
    // Finalizer
    ~Visual( );
        protected virtual PointHitTestResult HitTestCore(
            PointHitTestParameters point);
        protected virtual GeometryHitTestResult HitTestCore(
            GeometryHitTestParameters geometry);
        protected virtual Rect HitTestBounds { get; }
    // All methods for IVisual are implemented. These are implemented
    // explicitly only for the interface. Here is an example:
    bool IVisual.HasChildren { get; }
}
```

The ContainerVisual derives directly from the visual class and promotes the protected properties to be public. This is to enable a user to create visual containership without having to derive a new class.

```
public class System.Windows.Media.Visuals.ContainerVisual :
    Visual
{
    // Constructors
    public Visual( );
    public Visual(UiContext Context);
    // All IVisual methods are "reexposed" so that
    // they are public. This class is merely a convenience
    // above and beyond Visual
}
```

A RetainedVisual is a visual that introduces a "retained instruction stream" that can be used for drawing:

```
public class System.Windows.Media.Visuals.RetainedVisual : Visual
{
    protected RetainedVisual( );
    protected RetainedVisual(UiContext Context);
    // Open/Close semantics
    protected DrawingContext RenderOpen( );
    protected DrawingContext RenderAppend( );
    // Invalidation
    protected bool IsVisualInvalid { get; }
    protected bool InvalidateVisual( );
    Rect RenderBounds { set; get; }
}
public class System.Windows.Media.Visuals.IRetainedRender
{
    void Render(DrawingContext drawingContext);
}
```

The instruction stream can be used in an OnDemand mode, in which the user is called back to render as needed. The user is required to implement IRetainedRender. The instruction stream can be used in an Imperative mode, in which the user can directly call RenderOpen and get a drawing context. Generally a user will use one of these modes at a time, but it is possible for them to be used in a mixed way.

RenderOpen and RenderAppend will affect the current stream and are available in various scenarios. They will throw if this Visual is currently in a Render callback. RenderOpen clears all previous content that was in the RetainedVisual, while RenderAppend will tack new content on to the end of the stream. If the user has implemented IRetainedRender on the visual, then the user signals the system that the OnDemand mode also should be used. The system will use the value set in to the RenderBounds property as the bounds for the content to be provided by the Render call. The system may decide to optimize the scene and throw content away at any time, when IRetainedRender is implemented. RenderBounds will default to an empty rect, although Rect.Infinite or an unset value are feasible alternatives. To get the virtualization performance gains implied with the callback, the user will have to set in a reasonable value.

When rendering the scene, the system will examine each visual in concept (note that in reality the system will be able to ignore most visuals most of the time). If that visual has IsVisualInvalid set to true, and, based on RenderBounds, that visual's contents will be needed, then the system will call IRetainedVisual.Render to fill in the contents of that visual. This will replace any content that is already there. The user can manually tell the system to throw the content stream away by calling Invalidate.

If IRetainedRender is not implemented then IsVisualInvalid will always return false. Invalidate will do nothing. Note that IRetainedRender is so named (e.g., instead of IRender), because it is not general enough to be used in all rendering callback cases. For instance, the PaintingVisual calls back with an invalid rectangle.

A DrawingVisual is very similar to RetainedVisual but is designed to be used without derivation. The protected methods are "promoted" to public. Furthermore, there is no Render callback or need to implement the IRetainedRender interface. Because of this, the content is always retained, similar to when IRetainedRender is not implemented on a RetainedVisual.

```
public class System.Windows.Media.Visuals.DrawingVisual :
    ContainerVisual
{
    // Constructors
    public DrawingVisual( );
    public DrawingVisual(UiContext Context);
    // Tree interfaces
    public bool HasVisualChildren { get; }
    public Visual VisualParent { get; }
    public bool IsVisualAncestorOf(Visual descendant);
    public bool IsVisualDescendantOf(Visual ancestor);
    public Visual FindCommonVisualAncestor(Visual otherVisual);
    // Standard compositing properties
    public new Geometry VisualClip { get; set; }
    // Default value is 1.0
    public new double VisualOpacity { get; set; }
    public new DoubleAnimationCollection VisualOpacityAnimations
        { get; set; }
    // Default value is BlendModes.Normal
    public new BlendMode VisualBlendMode {get; set;}
    // Transformations
    public Transform TransformToDescendant(Visual descendant);
    public Transform TransformFromDescendant(Visual descendant);
    public Transform TransformToAncestor(Visual ancestor);
    public Transform TransformFromAncestor(Visual ancestor);
    public Transform TransformToVisual(Visual visual);
    public Transform TransformFromVisual(Visual visual);
    // Bounds calculation
    public new Rect VisualDescendantBounds { get; }
    public new Rect VisualContentBounds { get; }
    // Open/Close operations
    public new DrawingContext RenderOpen( );
    public new DrawingContext RenderAppend( );
}
```

A PaintingVisual is also provided:

```
public class System.Windows.Media.Visuals.PaintingVisual : Visual
{
    protected SurfaceVisual( );
    protected SurfaceVisual(UiContext Context);
    // Surface properties
    protected Rect PaintingBounds { get; set; }
    protected Color FillColor { get; set; } // defaults to transparent -
    more efficient if opaque
    // Open/Close semantics
    protected StaticDrawingContext PaintingOpen( );
    protected StaticDrawingContext PaintingAppend( );
    // RenderCore semantics
    protected abstract void RenderCore(Rect invalidRect);
    protected void InvalidateRender( );
    protected void InvalidateRender(Rect invalidationRect);
}
```

While the RetainedVisual adds a retained instruction stream, the PaintingVisual is essentially backed by a surface. The system may virtualize the surface and still keep rendering instructions as long as the performance requirements are met. Because of this, the surface is not accessible by the user.

One difference of a PaintingVisual relative to a RetainedVisual is that the methods provide a StaticDrawingContext which allows no animation. If an animated argument is used anywhere an exception will be thrown. Another difference is that "Append" will grow the instruction stream much cheaper in terms of memory cost. Further, PaintingBounds, which essentially sets a hard clip on the user, is required and is necessary. Note that this is different from the clip property, as this bounds the content of this visual whereas Clip will clip the content of this visual and all of its children. RenderCore (analogous to IRetainedVisual.Render) is also implemented, wherein if the resolution changes or if the system needs to re-render the content for some reason, the user provides this mechanism.

A PaintingVisual is potentially much more lightweight than a SurfaceVisual, as there is no explicit backing of this visual by a surface. Instead, this is a node in a display tree that is at some lower point backed by a surface.

To achieve a SurfaceVisual, the user should create a RetainedVisual, call DrawImage and then change the image behind the scenes. In that case the user is explicitly controlling the rasterization instead of letting the system call back. There will be an immediate mode API for working on the image directly. This API will allow the user to get a StaticDrawingContext that works on that image. Note that the API for a SurfaceVisual is similar to an hWnd, DUser Gadget or a Trident display tree node. "Appending" content (actually—making a small delta that composites over what is already there) is a cheap operation. There is, by and large, no memory penalty for appending content, unlike with a RetainedVisual whereby RenderAppend will cause the instruction stream to get longer and longer, potentially leading to exponential growth. Since the surface that may be backing this visual may come and go, the visual is required to implement an "on-demand" RenderCore virtual.

A main usage scenario for PaintingVisual is for porting of application code that is largely structured around a WM_PAINT painting model. This is also useful for static content that is rarely changing and dense. Note that the PaintingVisual may be backed by a metafile or by a true surface. The system can decide at runtime which is more appropriate, e.g., based on memory and performance concerns. However, it is guaranteed that, past a certain point, appending new content will not cost more memory. Note that the system can switch between metafile and surface storage as needed.

Top Level MIL Objects

As can be readily appreciated, various objects are provided for operating in a typical windowed scenario. Note that these are not necessarily formal classes (e.g., there is not an explicit scheduler interface or object).

One such object comprises a visual tree, which is an object that contains the main content to be drawn. Controls will derive from visuals of the tree directly. Visuals are device and context independent.

A render target is the device to which the visual is drawn. This object (e.g., screen) may have its own dirty or invalidation mechanism, which is necessary to back the visual system by a legacy hWnd. Various render targets include a screen in a window, a Printer, a Metafile, a Surface, and a "Sub-window" which is a part of the scene that is drawn separately from the rest of the scene. This is the mechanism to enable cross thread drawing, and is equivalent to a lower-level engine's compositable objects.

Other drawing related objects include a Visual Renderer, comprising an object that is configured to draw a visual tree onto a render target, and a Display Scheduler object that knows when to draw the visual tree on to the render target. A Time Manager is a context object for a set of timing nodes, and is the object that the scheduler calls tick on.

The following is an example flow of control for drawing to the screen:

1. The user acquires the UiContext in some way and starts modifying the Visual Tree. This may be during application start up or perhaps in response to a UI input event.
2. The dirty notification propagates up the Visual tree. The root visual knows which visual renderer it is associated with and forwards the dirty notification. This notification is private.
3. The visual renderer, via a public event, reports that it has been changed and is out of sync with its render target.
4. The scheduler decides when and where to actually rectify this situation and cause drawing to happen. Typically this is done by posting a work item to the dispatcher. However, the user can do something else.
5. The user yields the UiContext and allows the Dispatcher to run.
6. The Dispatcher runs and calls the scheduler deferred work item. (Most probably any deferred work items in a single context will be coalesced. Also, this may run lockstep with the layout system to reduce thrashing.)
7. The scheduler runs its main update loop:
   a. Ticks the TimeManager
   b. Runs layout, among other things
   c. Tells the visual renderer to render new changes to the render target. The renderer then:
      i. Walks the dirty parts Visual Tree and updates internal cached bounding boxes.
      ii. Calls all necessary "on demand" visuals to render. (By default "on demand" visuals will have an empty rect as their bounds and so they will not be called until layout runs and sets them up.)
      iii. Walks the dirty parts again and sends the necessary rendering updates to the lower level graphics systems.

Note that the visual system knows nothing about the dispatcher. It is up to the scheduler object to take care of those details. The scheduler can do any appropriate control flow.

Furthermore, there is the idea of an incremental visual renderer and a snap-shot visual renderer. It may be desirable for a visual to belong to one and only one incremental visual renderer at a time. This restriction is necessary for efficient caching of data on the visual itself. However, it is reasonable to also have a way to "snap-shot" an entire visual tree to a render target. In this case there are no persistent connections between the visual tree and the renderer. This might be use for getting a high resolution screen grab or for sending the visual tree (as it is on the screen) directly to a printer.

The Window plays the role of the render target, above. It is also a managed replacement for hWnd.

```
class System.Windows.Media.WindowContext
    : IDisposable
{
    public WindowContext( );
    // IDispose
    public void Dispose( );
    public bool IsDisposed { get; set; }
    // Window size
    public Size Size { get; }
    public event EventHandler SizeChanged { add; remove; }
    // Window validation
    public bool IsInvalid { get; }
    public event EventHandler IsInvalidChanged { add; remove; }
    // Resolution information
    public ResolutionInformation ResolutionInformation { get; }
    public event EventHandler ResolutionInformationChanged
        { add; remove; }
}
```

Window manager control is outside of this object, however it can be integrated with the WindowContext by making properties (e.g., such as Size) read/write values, and providing additional properties such as location, window title, and so forth. Note that Size represents the size of the Window in physical (1/96th of an inch) units. This is not a pixel size. Note that there may be situations where the data rendered to the window is lost for some reason, such as a video mode switch or a switch from a local console to a remote terminal server session.

VisualRenderers and VisualManagers are other objects, and responsible for rendering a tree of Visuals to a render target. A VisualRenderer provides a simple "one shot" model that will render to a medium while the VisualManager establishes a retained connection between the tree of visuals and the target they are being rendered to. It supports an "incremental" render to the medium.

The following is an example of what the base VisualRenderer looks like in one implementation:

```
public class System.Windows.Media.Visuals.VisualRenderer :
    System.Threading.ContextAffinityObject,
    IDisposable
{
    // Constructors
    internal VisualRenderer( );
    internal VisualRenderer(System.Threading.UiContext context);
    // ContextAffinityObject
    public UiContext Context { get; }
    public bool CheckContext( );
    public void VerifyContext( );
    public void SetContext(System.Threading.UiContext context);
    // IDisposable+
    public void Dispose( );
    public bool IsDisposed { get; }
    // Properties
    public Color BackgroundColor { get; set; }
    public Visual RootVisual { get; set; }
    // Device information
```

-continued

```
    public Size RootSize { get; }
    public ResolutionInformation ResolutionInformation { get; set; }
    // Render control
    public void RenderNow( );
}
```

The class cannot be publicly instantiated because as there is no "default" medium. The VisualRenderer is also a ContextAffinity object.

A BackgroundColor property is provided:

```
public Color BackgroundColor { get; set; }
```

This is the default background color of the visual manager, which may default this to transparent for VisualManagers. However, some mediums (such as rendering to legacy HWnds) cannot support per pixel transparency, and thus each VisualManager can define its own default for this property. Most applications would ignore this property, and for example may be set to the system window background color or transparent.

The RootVisual property identifies the root visual for rendering:

```
public Visual RootVisual { get; set; }
```

This defaults to null. When the RootVisual property is null the VisualManager draws the background color onto the medium.

The RootSize property returns, in virtual units, the size of the render target. For example, for a VisualManager backed by a window, this will be the client size of the window:

```
public abstract Size RootSize { get; }
```

Resolution Information is also provided:

```
public ResolutionInformation ResolutionInformation { get; set; }
```

Every medium is required to have a device resolution, even if it is not backed by pixels. For instance, when printing, even if capturing to a metafile, there needs to be resolution information made available through the VisualManager so that content can be optimized for that resolution. Note that in the case of a metafile capture, a relatively high default resolution may be used, while allowing the user to configure the resolution directly.

The initial "world to device" transform set up for the RootVisual makes it so that one unit in that visual is equal to 1/96th of an inch on the device. For instance, if there is a ScreenVisualManager that is backed by a device that is 192 dpi, then the initial transform must be set up so that one unit in the coordinate frame for the RootVisual must be equal to two units on the device. In this case, ResoultionInformation.PixelSize will return (0.5, 0.5) to signify that each pixel is 1/48th of an inch on a side.

A VisualManager establishes a long term connection to the root visual and the render target and tracks differences:

```
public System.Windows.Media.Visuals.VisualManager :
        System.Windows.Media.Visuals.VisualRenderer
{
    // Constructors
    internal VisualManager( );
    internal VisualManager(System.Threading.UiContext context);
    // Visual tree dirty
    public bool IsVisualTreeDirty { get; }
    public event EventHandler VisualTreeDirtyChanged { add; remove; }
}
```

The WindowVisualManager is a primary way to draw on the screen. It manages rendering a Visual Tree to a WindowContext:

```
public sealed class
System.Windows.Media.Visuals.ScreenVisualManager :
        VisualManager
{
    // Constructors
    public ScreenVisualManager(WindowContext windowContext);
    public ScreenVisualManager(WindowContext windowContext,
            System.Threading.UiContext context);
    // WindowContext
    public WindowContext WindowContext { get; set; }
}
```

Drawing Context

The DrawingContext APIs present a familiar, "context-based" programming model to those skilled in the art, for how to construct visual content that populates a Visual or are rendered to an ImageData. This section describes the DrawingContext classes, as well as the classes and entrypoints necessary to acquire a DrawingContext and enumerate the visual content in a RetainedVisual/DrawingVisual.

Applications do not directly construct a DrawingContext, and the exposed versions of DrawingContext are abstract classes. There are a number of ways to acquire a DrawingContext to put visual content into. These include RetainedVisual.RenderOpen( ) or RetainedVisual.RenderAppend( ), which each return a DrawingContext to issue instructions into. Other ways include IRetainedRender.Render( ), DrawingVisual.RenderOpen( ), DrawingVisual.RenderAppend( ), and PaintingVisual.PaintingOpen( ) or PaintingVisual.PaintingAppend( ) (although PaintingVisuals do not process animations). ImageData (or a subclass of ImageData) has a mechanism to return a DrawingContext for rendering onto a fixed-resolution bitmap surface. ImageData also does not process animations.

The following sets forth the DrawingContext API:

```
public abstract class System.Windows.Media.StaticDrawingContext :
                ContextAffinityObject, IDisposable
{
    // No public constructors
    // Vector graphics drawing methods
    public abstract void DrawLine(Pen pen, Point point0, Point
        point1);
    public abstract void DrawLine(Pen pen,
            Point point0, PointAnimationCollection point0Animations
            Point point1, PointAnimationCollection point1Animations);
    public abstract void DrawRectangle(Brush brush, Pen pen,
```

-continued

```
    Rect rectangle);
  public abstract void DrawRectangle(Brush brush, Pen pen,
      Rect rectangle, RectAnimationCollection rectangleAnimations);
  public abstract void DrawRoundedRectangle(Brush brush, Pen pen,
  Rect rectangle,
          double radiusX, double radiusY);
  public abstract void DrawRoundedRectangle(Brush brush, Pen pen,
      Rect rectangle, RectAnimationCollection rectangleAnimations,
      double radiusX, double radiusY);
  public abstract void DrawEllipse(Brush brush, Pen pen,
        Point center, double radiusX, double radiusY);
  public abstract void DrawEllipse(Brush brush, Pen pen,
      Point center, PointAnimationCollection centerAnimations,
      double radiusX, DoubleAnimationCollection
      radiusXAnimations,
      double radiusY, DoubleAnimationCollection
      radiusYAnimations);
  public abstract void DrawGeometry(Brush brush, Pen pen,
  Geometry geometry);
  public abstract void DrawDrawing(Drawing drawing, Point
  location);
  public abstract void DrawDrawing(Drawing drawing,
      Point location,
      PointAnimationCollection locationAnimation);
  // Image and Video Drawing
  public abstract void DrawImage(ImageData image, Rect rectangle);
  public abstract void DrawImage(ImageData image,
      Rect rectangle, RectAnimationCollection rectangleAnimations);
  public abstract void DrawVideo(MediaData video, Rect rectangle);
  public abstract void DrawVideo(MediaData video,
      Rect rectangle, RectAnimationCollection rectangleAnimations);
  // Text Drawing
  public abstract void DrawText(FormattedText text, Point origin);
  public abstract void DrawText(FormattedText text,
      Point origin, PointAnimationCollection originAnimations);
  public abstract void DrawGlyphs(GlyphRun glyphRun);
  // Context state methods
  public abstract void PushClip(Geometry clipGeometry);
  public abstract void PushOpacity(double opacity);
  public abstract void PushOpacity(double opacity,
              DoubleAnimationCollection doubleAnimations);
  public abstract void PushTransform(Transform transform);
  public abstract void PushBlendMode(BlendMode blendMode);
  public abstract void Pop( ); // applies to last Pushed state.
  // Quality metrics
  // Enumeration hints
  public abstract bool PreserveReadbackOrder { get; set; } //
  default = false
  // Close( ) can be called without all Push's having been Pop'd.
  public abstract void Close( ); // same as IDisposable.Dispose( );
}
```

Most of the methods of the DrawingContext object are self-explanatory to those skilled in the art, however it should be noted that DrawingContext is a ContextAffinityObject and is to be used only from a single UIContext. DrawingContext objects are also IDisposables, and the recommended pattern, in C#, is to use them in a "using" clause if received from a RenderOpen/Append, for instance. Further, note that methods such as DrawArc, DrawPie, DrawBezier and Draw-Polyline are not here. These require construction of the relevant Geometry, and use of DrawGeometry (as described below).

Further, while there are multiple Push* methods, there is only a single Pop method. This implies that there cannot be overlapped attributes. The attributes established by Push*( ) compose appropriately. For instance, Clip composes via the Intersection operator, Opacity via the Multiplication operation, and Transform via the ComposeTransform operation.

Since a user can call, for instance, DrawGeometry, with a null Brush, or with a null Pen, it is valid to call it with nulls for both Brush and Pen, however there will not be anything rendered or hit test against.

Any animate properties provided to the drawing context when used in a non-animate target (for instance, when rendering directly to a raster) will snap to time zero (although non-animate targets may alternatively snap to time "now"). This allows code that was written for a dynamic Drawing-Context to more easily transition over to using a Drawing-Context that does not process animation.

Enumeration of the content inside of a "retained" Visual is closely related to the DrawingContext by which that content was inserted. Enumeration of the contents of a Visual, and/or modification of the instruction stream may be performed via the Changeable mechanism, if desired, as described below. The general idea is to provide a "push-model" enumeration mechanism.

The DrawingContext class itself provides an interface to register for push-mode walking of content, a subclass of DrawingContext called DrawingContextWalker, (with most of the methods remaining abstract). Users subclass Drawing-ContextWalker, and then pass an instance into a Visual to begin enumeration. The Visual calls back the appropriate DrawingContext method to communicate the content that it has. DrawingContextWalker will also provide a piece of state that can be manipulated on it to control how the enumeration progresses (i.e., whether it should be stopped immediately, for instance).

The following is example code of for a DrawingContext-Walker object:

```
public class MyContextWalker : DrawingContextWalker
{
    public void DrawLine(Pen pen, Point point0, Point point1)
    {
        Console.WriteLine("Line from {0} to {1} with Pen {2}",
        point0, point1, pen);
    }
    public void DrawRectangle(Brush brush, Pen pen,
            Rect rectangle, RectAnimationCollection
            rectangleAnimations)
    {
        Console.WriteLine("AnimateRectangle with ...", ...);
    }
    // etc, etc...
}
// Get the contents of any RetainedVisual (including Controls,
Drawing Visuals, etc)
MyContextWalker ctxWalker = new MyContextWalker ( );
ctxWalker.WalkContent(myFancyControl, 0); // results in invocations
on ctxWalker
```

The WalkContent method is provided in the DrawingContextWalker base class:

```
public abstract class DrawingContextWalker : DrawingContext
{
    protected DrawingContextWalker( ); // this lets public
    subclasses start happening
    public void WalkContent (RetainedVisual visual,
        DrawingContextWalkOptions options);
    protected void StopWalking( );
    // implementation of abstract methods from DrawingContext
    // This doesn't make sense on the context walker, and will
    throw an exception
    // if accessed.
    public bool PreserveReadbackOrder { get; set; }
    // DrawText( ) expands into GlyphRun's, so it will never be
    called back,
    // therefore we don't want the user to have to implement it.
    public void DrawText(... regular ...); // should assert if ever
    called
```

```
-continued public void DrawText(... animate ...); // should assert if ever
    called
    // other methods remain abstract, and the subclasser implement.
}
```

Users subclass this and implement all abstract methods as desired. Users then create an instance of the object and call WalkContent on it. WalkContent then calls back the appropriate methods as it walks the Visual. The implementation of any of these methods can stop the walk, if desired, by calling the protected method StopWalking( ). Note that it is illegal to begin a walk when a DrawingContext on the Visual is open for rendering into.

The options determine how the walk proceeds:

```
    [Flags]
    public enum DrawingContextWalkOptions
    {
        IncludeAnimations = 0x1
    }
```

If IncludeAnimations is set, the walker invokes the appropriate methods with animate content. Otherwise, the instantaneous value of the content is provided to the DrawingContextWalker methods.

The DrawingContext has a PreserveReadbackOrder Boolean that may provide the order or structure of the content to the Visual in the order and structure returned via the DrawingContextWalker class. This defaults to false, but may be set to true before content is inserted when it is important to preserve the order. For example, as described above, DrawGeometry may be provided with a null Brush and a null Pen. If PreserveReadbackOrder is true, this instruction needs to be maintained in the Visual's state. If PreserveReadbackOrder is false, the implementation is free to discard this instruction.

Note that there are numerous advantages of this push approach over other type-safe approaches, including that there is no need for a parallel set of types to reflect the output of the enumeration, and that there is not necessarily a requirement for heap allocation in the callback interface. Further, the methods can be called directly without creating objects to pass back, the DrawingContext interface is already present, and there is no additional API needed on the Visual itself to allow for walking.

Modifying visual content is another consideration. One way of expressing modifications to VisualContent is to use resources (Pens, Brushes, etc), which as described herein are subclasses of Changeable, with StatusOfNextUse==UseStatus.ChangeableReference. This will allow references to be maintained by the application to data that is in the managed structures sent into the DrawingContext. This represents a uniform way of allowing changes to be made, and, because these objects are in a known state that they have been explicitly set into, the implementation knows which objects are likely to be modified. Note that it does not allow, for example, changes in ordering of instructions, or addition or deletion of instructions (although RenderAppend( ) is there for additions).

Drawing

The Drawing class contains a collection of drawing commands. It is exactly equivalent to the content stored on a DrawingVisual, and is built by a DrawingContext. The Drawing does not have context affinity when immutable, and thus it and the related class DrawingBrush can be used across contexts and in default property sheets when it itself is immutable.

It does not directly support hierarchy in that it provides no means of iterating children or finding a parent, but, via a DrawingContext, a Drawing can be drawn into another Drawing. A Drawing can be drawn into a DrawingContext via DrawDrawing(Drawing), and it can be used as the content description for a DrawingBrush.

The Drawing is fully animatable, and supports readback/iteration in the same manner as the RetainedVisual.

```
public class System.Windows.Media.DrawingCollection: Changeable
{
    // Constructors
    public Drawing Collection( );
    public new DrawingCollection Copy( );
    // Properties
    public Rect Bounds { get; }
    // Open/Close operations
    public DrawingContext Open( );
    public DrawingContext Append( );
}
```

The Changeable Pattern

For purposes of explanation, the present invention will primarily be described in the context of a programming environment in which example objects in a graphics scene are constructed, used and modified. However, as will be understood, although the present invention provides significant benefits in graphics-related programming environments, the present invention is not limited to graphics-related programming environments, but more generally applies to many other types of programming environments.

In one implementation, the present invention provides a single set of types that derive from a common base class, e.g., System.Windows.Changeable. Any class can be mutable, by deriving from the Changeable class and thereby obtaining the value-type semantics that the Changeable offers. For example, in a graphics programming, the object model includes Brushes, Pens, Geometries, FloatAnimations, GradientStops, Segments, and so forth, as generally described in the aforementioned U.S. patent application Ser. No. 10/402, 268. For example, the hierarchy for a drawing brush may be something like:

Object:Changeable:Animatable:Brush:TileBrush:DrawingBrush.

For purposes of basic usage, a changeable object includes the following property and methods:

```
public class System.Windows.Changeable
{
    public bool IsChangeable { get; } // defaults to true
    public Changeable Copy( );
    public void MakeUnchangeable( );
}
```

The IsChangeable property specifies whether the changeable object can be modified or not, depending on its current value. For example, an attempt to set the opacity property of a brush will only succeed if that brush object has the IsChangeable property equal to true. Otherwise, an exception will be raised. When constructed, changeable objects have the IsChangeable property equal to true by default, and are thus immediately modifiable.

Figure 14:
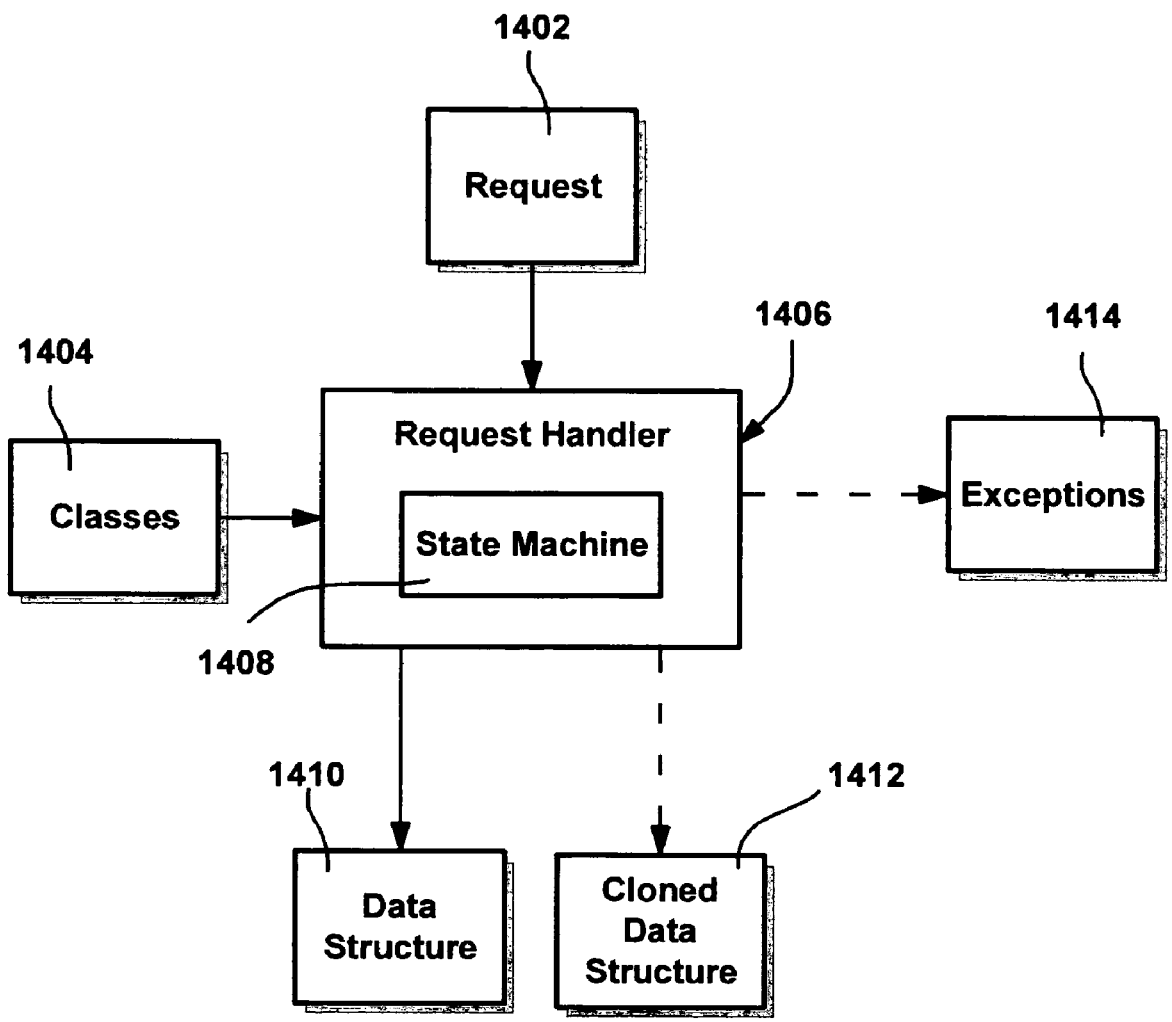
FIG. 14 is a block diagram generally representing a changeable architecture in which requests are processed by a state machine to control a type's mutability, in accordance with an aspect of the present invention.

As represented in FIG. 14, requests 1402 are received, such as via function calls originated from an application program, that are directed to changeable classes 1404. In general, a request handler 1406, including a state machine 1408, processes the requests and maintains state and object data via a supporting data structure 1410, cloning the data structure in a cloned copy 1412 with an appropriate property state, based on a current property state, as described below. Exceptions 1414 may be thrown, such as when the request seeks a transition that is not allowed from within a current property state. The property states are described below with reference to FIGS. 15-17.

It should be noted that the function calls directed to changeable classes may be handled directly or indirectly. For example, the request handler 1406 in FIG. 14 may include an API set that provides the interfaces to the state machine. Alternatively, the request handler 1406 may comprise middleware code that converts the requests received in one operating system to API calls handled by another operating system. Thus, as used herein, the requests, via the request handler, "cause" the requested behavior to occur, regardless of where the actual state machine processing occurs or where the data structures and classes are provided.

In this manner, (among other mechanisms), applications may construct changeable objects via a "new" request, set values into them, use them, continue setting values into them, and continue using them.

The following is an example of how an application creates a brush of a solid color (scb), modifies the brush to have a solid color (red) and uses the brush to color a button's background red:

```
SolidColorBrush scb = new SolidColorBrush( );
scb.Color = Colors.Red;
Button 1.Background = scb; // this qualifies as a "use" (as described below)
```

The notion of "using" a value has a specific meaning, that is, values are only considered to be used under certain conditions. These conditions include when a value is set into a Property System property, when a value is used as a sub-object in a more complex changeable, and when a value is used in a DrawingContext command or the like. Note that system extenders can easily define other instances of using a changeable object that qualifies as a "use" and modifies the changeable state of the object.

When a value is used in one of these qualified kinds of uses, from the user-model perspective, a clone of it is made, and that clone has its IsChangeable property set to false. Note that in actuality, a clone is not necessarily created, and when one is created, it is not necessarily deep (within the object hierarchy, as described below). Notwithstanding, from the perspective of a model, it is appropriate consider a clone being made, and thus as used herein, the concept of a "clone" covers a clone that is actually created, a clone that is created in part, and/or a clone that is logically created from the model's perspective even though not necessarily created. The clone is what actually gets used, and, by default, the clone cannot be modified.

As shown above, a changeable object also contains methods including Copy( ) and MakeUnchangeable( ). An explicit call to the Copy( ) method creates a copy of the changeable with the copy's IsChangeable property set to true. This call does not alter the object on which the method is called. The MakeUnchangeable( ) method may be called on any changeable, and modifies the IsChangeable property to make it false, (unless already false, in which case the call has no effect).

The above mechanisms facilitate a pattern for replacing a property. To change a changeable object, the IsChangeable property value needs to be true. Since a qualified use of an object creates a clone that is not changeable, that object needs to be copied out via the Copy( ) method, changed, and used again. This is effectively replacing the initial object that was present with a new object that is a modified copy of the original. Examples of this are set forth below. Note that an in-use changeable is one that has been used, and thus by the definition above, is not changeable because the IsChangeable property is set to false upon use. Thus, the changeable is not modified, but rather a changeable is copied out and replaced. Note that with changeables, there is only a single set of types, which is generally far more desirable from a programming perspective. Further, true mutability is provided by additional properties, as described below.

As described above, it is straightforward to create a brush, modify it and use it. An example of a simple use in a drawing operation is set forth below:

```
SolidColorBrush scb = new SolidColorBrush( );
scb.Color = Colors.Red;
ctx.DrawRectangle(scb, ...); // this is a "use"
scb.Color = Colors.Green;
ctx.DrawRectangle(scb, ...); // this is a "use"
```

Executing the above instructions draws one red rectangle, and one green rectangle. Note that 'scb' is, in effect, cloned on each usage of it.

A more complex construction using a linear gradient brush (lgb), in which colors vary (e.g., linearly) from one stop to another, is set forth below:

```
LinearGradientBrush lgb = new LinearGradientBrush( );
GradientStop gs1 = new GradientStop(Colors.Red, 0.3);
GradientStop gs2 = new GradientStop(Colors.Blue, 0.2);
lgb.Stops.Add(gs1); // this is a "use" of gs1
lgb.Stops.Add(gs2); // this is a "use" of gs2
Button2.Background = lgb; // this is a "use" of lgb
```

Here, the process is building values (GradientStops) and using them in definitions of more complex values.

Consider another example directed towards changing the opacity (which can range from zero to one) of a button's (Btn) background to 0.4. In this particular usage, the Background is copied into an object with IsChangeable property set to a true value, the background is modified, and set back in.

```
Brush b = Btn.Background.Copy( ); // get IsChangeable copy
b.Opacity = 0.4;
Btn.Background = b; // "use" modified value
```

Note also that the assignment to "Btn.Background" in the last line severs any inherited or property sheet value that might have come in.

Modifications that are deeper within the object hierarchy appear no different to the user than modifications that are shallow:

```
Brush b = Btn2.Background.Copy( );
LinearGradientBrush lgb = (LinearGradientBrush)b;
lgb.Stops[1].Color = Colors.Green;
lgb.Stops[0].Location = 0.2;
Btn2.Background = b;
```

Note that Copy( ) only needs to be called on the top level object, and not on the individual GradientStops. This is because the system takes care of ensuring that sub-objects of an object with a true IsChangeable property are themselves set with IsChangeable equal to true when they are accessed.

Figure 15:
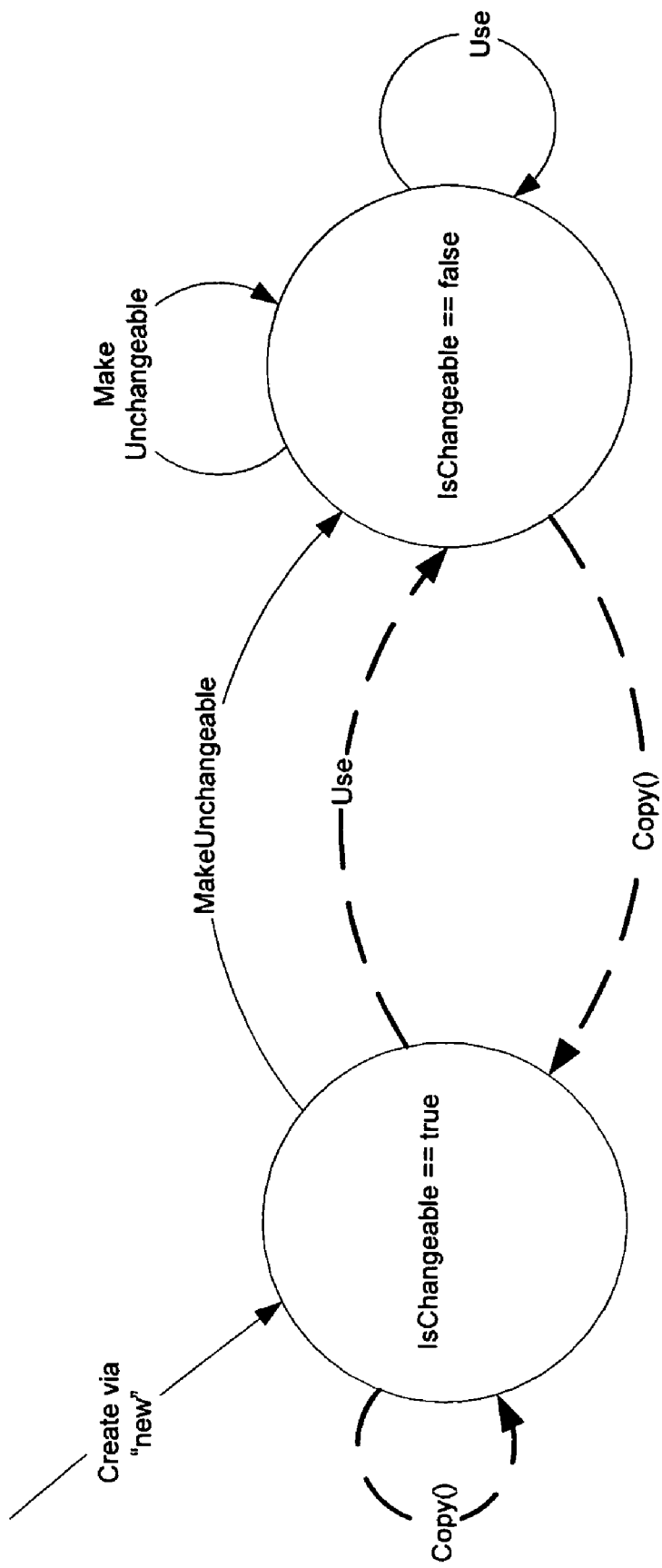
FIGS. 15-17 are state diagrams representing how property states control the behavior of mutable types, in accordance with an aspect of the present invention.

FIG. 15 shows a state diagram representing the states of a changeable object in basic usage, beginning with IsChangeable property equal to true when newly created. In general, the solid arrows show the states of the object transitioning from a current state to a target state, while any dashed arrow represents an operation that leaves the object the same, but creates a new object in the target state. In this state diagram, there are two states, and the transitions occur when either Copy( ) or MakeUnchangeable( ) are called, and when an object is used in a manner that qualifies as a use, as described above. Note that calling the Copy( ) method from either state results in a new value with its IsChangeable property set to true, while calling MakeUnchangeable( ) results in the target value being IsChangeable set to false.

The above description presents a straightforward, self-consistent model, that describes the basic usage with just two states, Copy( ) and MakeUnchangeable( ) methods, and the notion of "using" a Changeable value. However, with respect to changes, the modification examples above are based on the concept of replacement, that is, copying an existing item, changing it in place, and copying it back. This implies heap allocation (which may be potentially significant, depending on how deep the change to be made is, and how broad the object itself is for the shallow clones), as well as an additional burden on the programmer to maintain some mechanism to find the path to the attribute to modify.

In accordance with an aspect of the present invention, to add support for the concept of true mutability of values, another property is added to the model, named StatusOfNextUse of type UseStatus. Note that a fundamental issue preventing mutability in the single property model is that a qualified use of a value unconditionally results in the resultant value with the IsChangeable property equal to false. The StatusOfNextUse property resolves this issue.

```
public enum System.Windows.UseStatus
{
    Unchangeable,
    ChangeableCopy
}
```

By default, the StatusOfNextUse property is UseStatus.Unchangeable, but may be set to UseStatus.ChangeableCopy, whereby a use of the value on which it is set will result in a clone object being made that has the IsChangeable property set to true. As a result, the object value can be modified in-place, without any additional heap allocation.

Further, because in-use values can be mutated in this model, a notification is provided when such changes happen, via a simple changed event. Furthermore, since the object is no longer immutable, context-affinity is provided through a UIContext member. Note that when the object is mutable, this has a null value. Otherwise it belongs to the UIContext in which it was created. The resultant Changeable class definition becomes:

```
public class System.Windows.Changeable
{
    // Carryover from "basic usage" above
    public bool IsChangeable { get; } // defaults to true
    public Changeable Copy( );
    public void MakeUnchangeable( );
    // New members
    public bool CanMakeUnchangeable { get; } // will
        // MakeUnchangeable succeed?
    public UseStatus StatusOfNextUse { get; set; } // defaults
        // to Unchangeable
    public event EventHandler Changed { add; remove; }
    public UIContext UIContext { get; } // null when immutable
}
```

The above example of simple, shallow mutability described the requirements to change the opacity on a Brush, with the code needing to run each time opacity was to be changed. In contrast, with the mutability mechanism based on the StatusOfNextUse property, first the Btn.Background itself has an IsChangeable property value of true:

```
Brush b = Btn.Background.Copy( ); // get IsChangeable copy
b.StatusOfNextUse = UseStatus.ChangeableCopy;
Btn.Background = b;
```

The above has used (in a qualified use) a value with StatusOfNextUse of UseStatus.ChangeableCopy, so the result itself is changeable. Once set up, the programmer can make modifications as desired, as in the following example:

```
Btn.Background.Opacity = 0.3;
```

The programmer can make such modifications as often as desired, and the modification will happen directly, without any object allocation on subsequent settings.

Note that the above example does not describe how the Btn.Background came into being in the first place, and thus a copy of it needs to be made via the Copy( ) method. In a deliberate mutability situation where the programmer wants to create a background to be modified, a better way to do this might be directly, as in the following example:

```
SolidColorBrush b = new SolidColorBrush( );
b.Color = Colors.Red;
b.StatusOfNextUse = UseStatus.ChangeableCopy; // set this up
    // directly
Btn.Background = b;
```

At this point, the programmer can specify the opacity (Btn.Background.Opacity=. . . ) whenever desired, as the brush was created initially as StatusOfNextUse equal to UseStatus.ChangeableCopy.

It should be noted that using the replacement-based model rather than the mutating-based model is not particularly difficult given the above examples. This is because the changes are made at the first level, and it may not appear prohibitively expensive to always replace rather than mutate. Indeed, this is valid technique when only limited mutability is desired. However, when changes are made to values deeper an object, the mutating model is clearly superior.

As an example of such deeper mutability, consider the LinearGradientBrush (lgb), wherein the programmer repeatedly wants to change the color of the seventh stop (lgb.Stops [6]). The programmer can use the same instructions as above to install a mutable version into Btn.Background:

```
Brush b = Btn.Background.Copy( ); // get IsChangeable copy
b.StatusOfNextUse = UseStatus.ChangeableCopy;
Btn.Background = b;
```

Thereafter, the programmer can repeatedly make the desired changes:

```
LinearGradientBrush lgb = ((LinearGradientBrush)Btn.Background);
lgb.Stops[6].Color = ... some new color ...;
```

The programmer can also access the "lgb" variable once, store it away, and then repeatedly set into it, which is very efficient.

Figure 16:
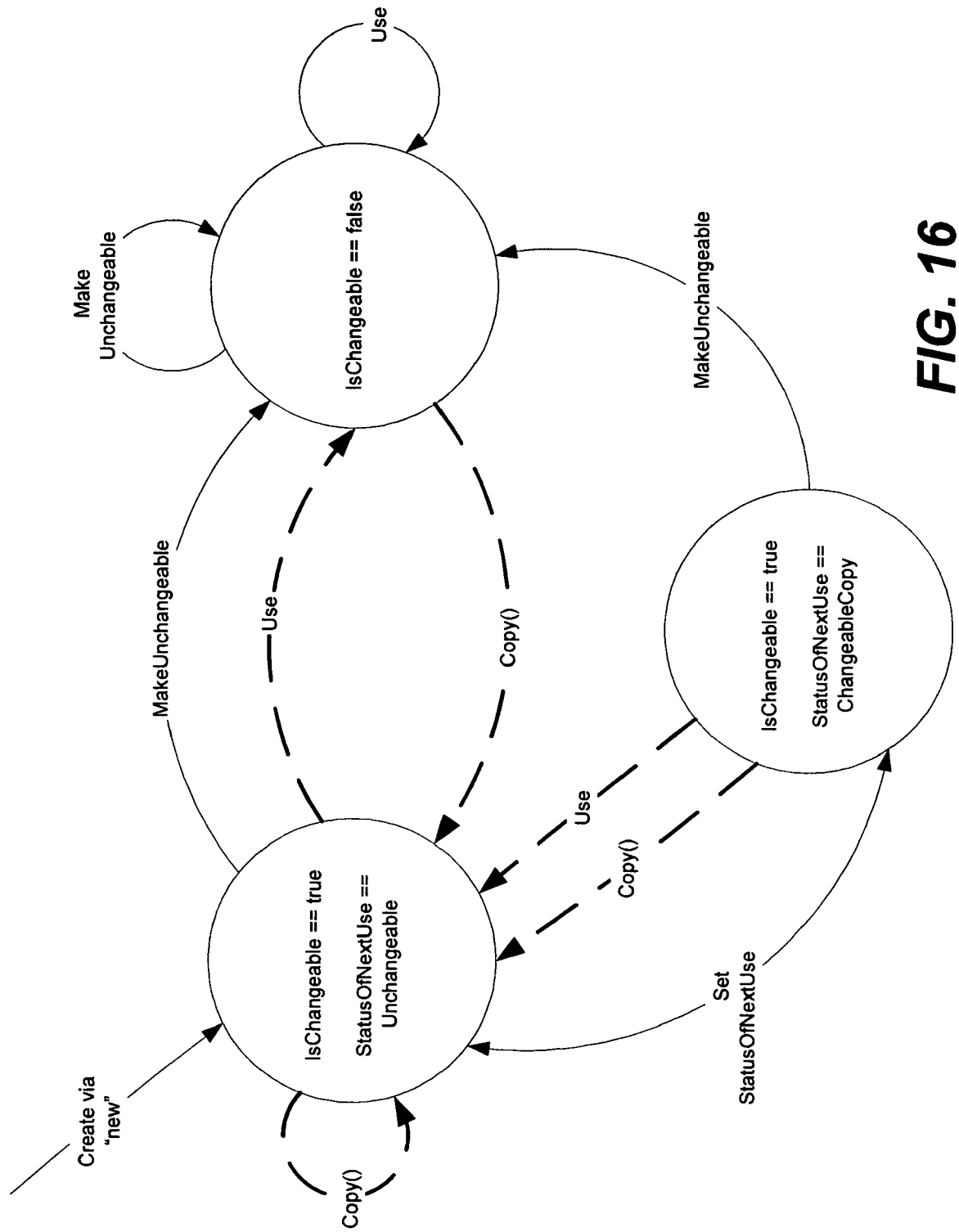

FIG. 16 is an extension of the state diagram of FIG. 15 with the additional state represented by the StatusOfNextUse property added. Note that the model is only slightly more complicated, as the basic state diagram of FIG. 16 has two states and seven transitions, whereas the mutability state diagram has three states and eleven transitions. As can be seen from FIG. 15, a significant addition is the (StatusOfNextUse==ChangeableCopy) state, and the "Use" transition out of that state, which results in a new copy with the IsChangeable property value set to true.

As in FIG. 15, calling the Copy( ) method results in a new value with an IsChangeable property equal to true, with the StatusOfNextUse property set to Unchangeable. Similarly, the MakeUnchangeable( ) method call results in the target value for the IsChangeable property set to false. Note that even though flexibility has been added via the mutability, these constants have not changed.

There are some situations where use as StatusOfNextUse equal to ChangeableCopy will not be allowed, because subsequent modifications are truly not well-defined, or are explicitly disallowed. Examples of this include attempting to modify values in a shared default style sheet, or setting non-local property engine properties. In such situations, the subsystems that disallow such use will either choose to raise an exception, or make the value unchangeable themselves. It is recommended that an exception be raised as a more clear indication to the programmer of what has occurred and thereby avoid later confusion.

Further, there are situations in which a changeable object cannot be made unchangeable. Examples include a VisualBrush, (as described in the aforementioned U.S. patent application Ser. No. 10/402,268), in which the underlying visual can not be restricted from changing, and therefore it would be nonsensical to state that the VisualBrush is "unchangeable." Animations and VideoData (because they are time varying) are also examples. Attempts to call MakeUnchangeable( ) on such objects will raise exceptions, or worse, may leave the object in a bad state, as portions of it may have been made unchangeable while others have not. These problems cam be avoided via another property, CanMakeUnchangeable. If this property returns a "true" value, then MakeUnchangeable( ) is guaranteed to succeed, provided no changes to the object happen between these calls.

There is a conflict in semantics that occasionally occurs between StatusOfNextUse and CanMakeUnchangeable. If CanMakeUnchangeable equals false, then a value of UseStatus.Unchangeable for StatusOfNextUse really does not make sense, as the next use cannot be unchangeable. Therefore, when StatusOfNextUse is queried when CanMakeUnchangeable equals false, it never will return UseStatus.Unchangeable. Instead, when it otherwise would have returned UseStatus.Unchangeable, it returns UseStatus.ChangeableCopy.

The above presents a model where every (qualified) use of a changeable (IsChangeable equals true) object results in a copy of that object being made, and, depending on the value of StatusOfNextUse, that "use" may or may not itself by changeable. What the above model does not provide is the use of a value in multiple places, and maintaining a shared reference to that value. For example, in the above model a programmer cannot create a LinearGradientBrush, use it on two Button controls, and then change the LinearGradientBrush once to affect both controls. Rather the programmer would need to use it twice, get the brush back out of the controls, and then set each one independently. In general, this model turns out to be the most expected and/or least surprising to programmers, but there are scenarios where additional functionality is desirable.

One such scenario is in Animation, where, if a programmer wants to create a scene with n elements that each respond to the same timeline, that timeline needs to be cloned n times, and asked to BeginIn( ) n times. A much better approach, from both a performance and efficiency point of view, as well as for programming model convenience, is to share out a reference to a single timeline, invoke BeginIn( ) on it, and have it propagate as appropriate.

To enable this scenario, a third value, ChangeableReference, is provided with the UseStatus enumeration. UseStatus now looks like:

```
public enum System.Windows.UseStatus
{
    Unchangeable,
    ChangeableCopy,
    ChangeableReference
}
```

When a changeable object that has StatusOfNextUse set to UseStatus.ChangeableReference is used (in a qualified manner), that value is no longer copied. Rather, a reference to the existing value is handed out, and subsequent modifications to that value (or any previously or subsequently handed out references) will affect the result of the use. In other words, the changeable value is now shared with potentially any number of uses.

The following is an example of element level usage:

```
Brush b = new SolidColorBrush(...);
b.Color = Colors.Yellow;
b.StatusOfNextUse = UseStatus.ChangeableReference;
Btn1.Background = b;
Btn2.Background = Btn1.Background;
Btn3.Background = Btn2.Background;
Btn4.Background = b;
// at this point, all four buttons are yellow
```

-continued

```
((SolidColorBrush)Btn3.Background).Color = Colors.Purple;
// They change to purple, and they are notified.
```

In an above example, a simple drawing operation was described which generated two rectangles, one red, and one blue:

```
SolidColorBrush scb = new SolidColorBrush( );
scb.Color = Colors.Red;
ctx.DrawRectangle(scb, ...); // this is a "use"
scb.Color = Colors.Green;
ctx.DrawRectangle(scb, ...); // this is a "use"
```

This is the desired behavior. However, if a programmer instead wanted the brush to be shared, and still be changeable, the following instructions could be used:

```
SolidColorBrush scb = new SolidColorBrush( );
scb.UseResult = UseResult.ChangeableReference;
scb.Color = Colors.Red;
ctx.DrawRectangle(scb, ...); // this is a "use"
scb.Color = Colors.Green; // initial rectangle becomes green
ctx.DrawRectangle(scb, ...); // this is a "use"
```

Here, both rectangles are green. If later the color is changed, e.g., scb.Color=Colors.Yellow, both rectangles will become yellow. Note that ctx.DrawRectangle( . . . ) appears to be an immediate mode drawing command, however it is actually building a display list/metafile to be retained and subsequently displayed.

From a user-model point of view, the ChangeableReference mode guarantees that the parties that are using a changeable object will be notified of any changes to that value. This will be done through the "Changed" event which, like other events, is a multicast delegate. To implement, the system need to be sure that multiple uses with a single notification sink do not notify that sink for each use. Further, cleanup mechanisms have requirements when removing items, so as to only remove a sink when the uses connected to that sink are gone. One approach for doing this is to reference count delegates. The current implementation may achieve these requirements via a private data structure, e.g., RefCountedMulticastEventHandler.

Figure 17:
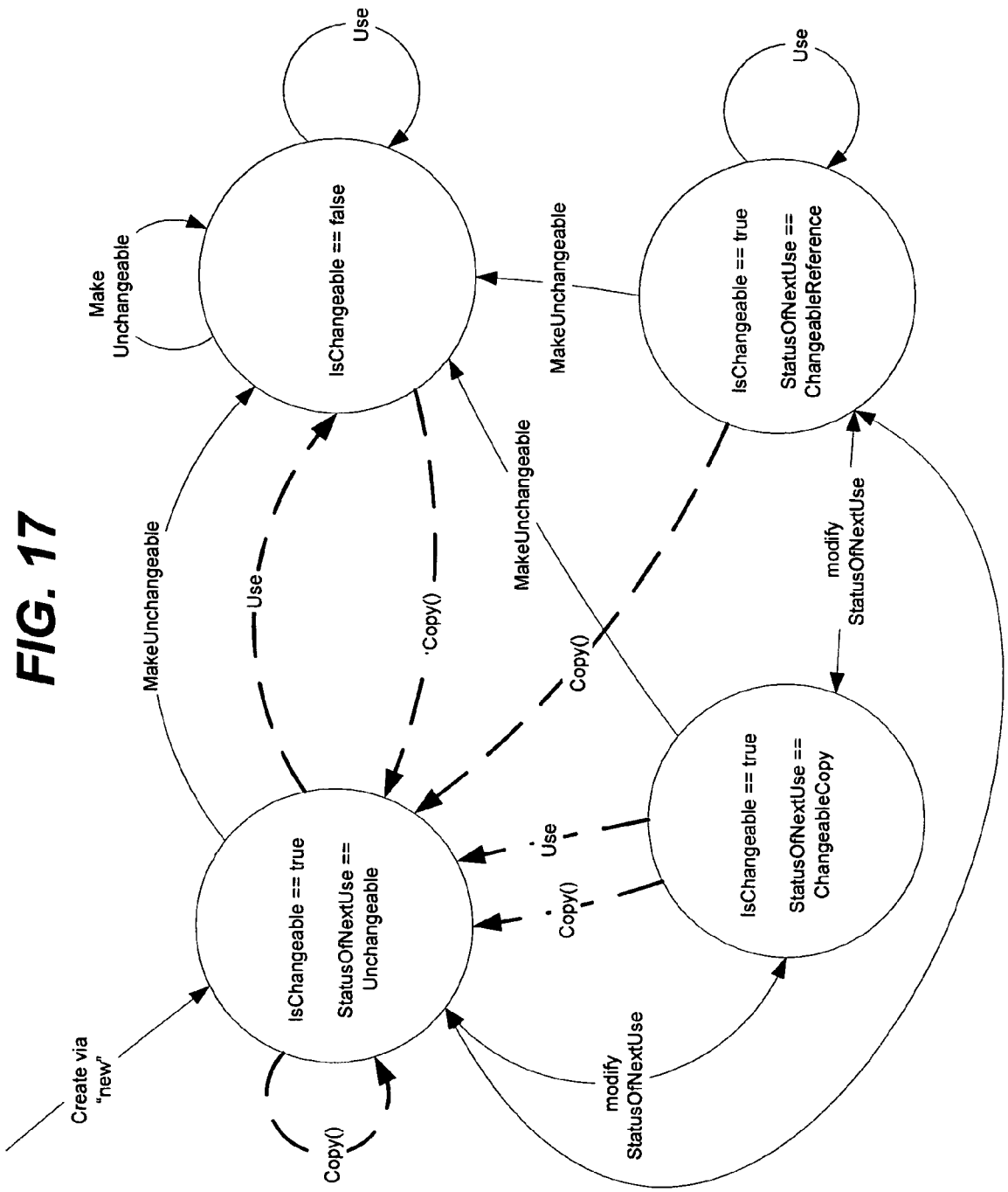

FIG. 17 is a state diagram based on FIGS. 15 and 16 but having a ChangeableReference state (via another setting in the StatusOfNextUse property) added. Note that in keeping with an aspect of the present invention, the ChangeableReference state and the Use transition off of that node does not make a copy. Rather, a qualified use results in the status of next use property remaining in the changeable reference state, thereby providing true mutability. Further, note that while FIG. 17 is more complex than those of FIGS. 15 and 16, the behavior of the Copy( ) and MakeUnchangeable( ) methods remain constant; the Copy( ) method still results in a new value object having the IsChangeable property of true and StatusOfNextUse property of Unchangeable, and the MakeUnchangeable( ) method still results in the target value object having a IsChangeable property of false.

It should be noted that along with the advantages of a single set of types, the present invention provides significant flexibility to programmers. For example, most values constructed by an application ordinarily will not be mutable, as immutable values are consume less resources. However, as described above, mutability is available, giving programmers a powerful and intuitive way to change values, particularly deep values, with high performance. Note also that although not represented in FIG. 17, the state in which a new type is created (the IsChangeable property of true, the StatusOfNextUse property of Unchangeable) is only one possible default state. Thus, in alternative implementations, the type may be in another state following creation, e.g., the IsChangeable property of true, the StatusOfNextUse property of ChangeableReference) such as to default to mutable values.

Turning to an explanation of the operation of the present invention, the present invention provides significant advantages when dealing with deep properties of an object, referred to as dotting-down. For example, consider the following:

```
GeometryCollection g;
g.Geometries[12].Figures[2].Segments[0].Points[17] =
    new Point(0.2, 0.3);
```

The deep access into the geometry object 'g' is an example of what is referred to as dotting-down. Note that the access to the properties (Geometries, [12], Figures, [2], Segments, [0], and Points) are calling property getters, not setters; [17] is the only property access that results in a setter being called. Programming languages generally cannot distinguish between access to a property for the sake of setting a property value deeper down versus access for reading a value deeper down.

When dotting-down starts from an unchangeable object, the local member variable is accessed. An example includes accessing an element that has not been made changeable through use of the "ChangeableValue" property.

When a property get happens from a changeable object, the resultant value is changeable as well, so that it can be mutated. To this end, the property getter on the parent returns the sub-object directly if already changeable, or makes a shallow clone of the sub-object, sets that into the local member, and returns that clone. Note that these attributes make the above code, after running the first time and allocating and assigning shallow clones, free in terms of not requiring heap allocation.

An aspect of the present invention is that on-demand, shallow cloning is performed only when necessary. This maximizes sharing, minimizes heap allocation, allows for modifications without heap allocation, and does not force the concept of cloning onto the user model. This becomes more important with deeper trees, and when working in three dimensions. To this end, the Copy( ) method provides the illusion of a deep copy, but really first only makes a shallow copy, and then lazily makes deeper copies as necessary. Such dotting-down provides significant performance improvements.

In accordance with an aspect of the present invention, another property on the changeable (generally invisible to applications) is that a changeable has a changed event (of type EventHandler). When a property of a Changeable changes, a Changed delegate on that changeable gets invoked, with the changing changeable as the sender. The act of making a shallow clone through dotting-down pushes the changed event handlers down into the shallow clone. This allows subsequent changes to occur on deeper elements and have the proper event handlers set up. Note that the Changed event also exists so that clients other than the property system can use this system and register for notifications.

Modifications to a changed event handler propagate down to sub-objects. In addition, modifications to a changeable itself involving other changeables (e.g., adding a changeable sub-object to a changeable object, removing one, and so forth) results in the containing changeable's event handlers being removed from the old ones and pushed into the new ones, recursively.

FIGS. 18-23 demonstrate how shallow-cloning and dotting down works, based on the following code for this example:

```
LinearGradientBrush lgb = new LinearGradientBrush( );
lgb.Stops.Add(new GradientStop(Colors.Red,0.3));
lgb.Stops.Add (new GradientStop(Colors.Blue,0.2));
lgb.Stops.Add (new GradientStop(Colors.Green,0.1));
Btn1.Background = lgb;
Btn2.Background = lgb;
```

Figure 18:
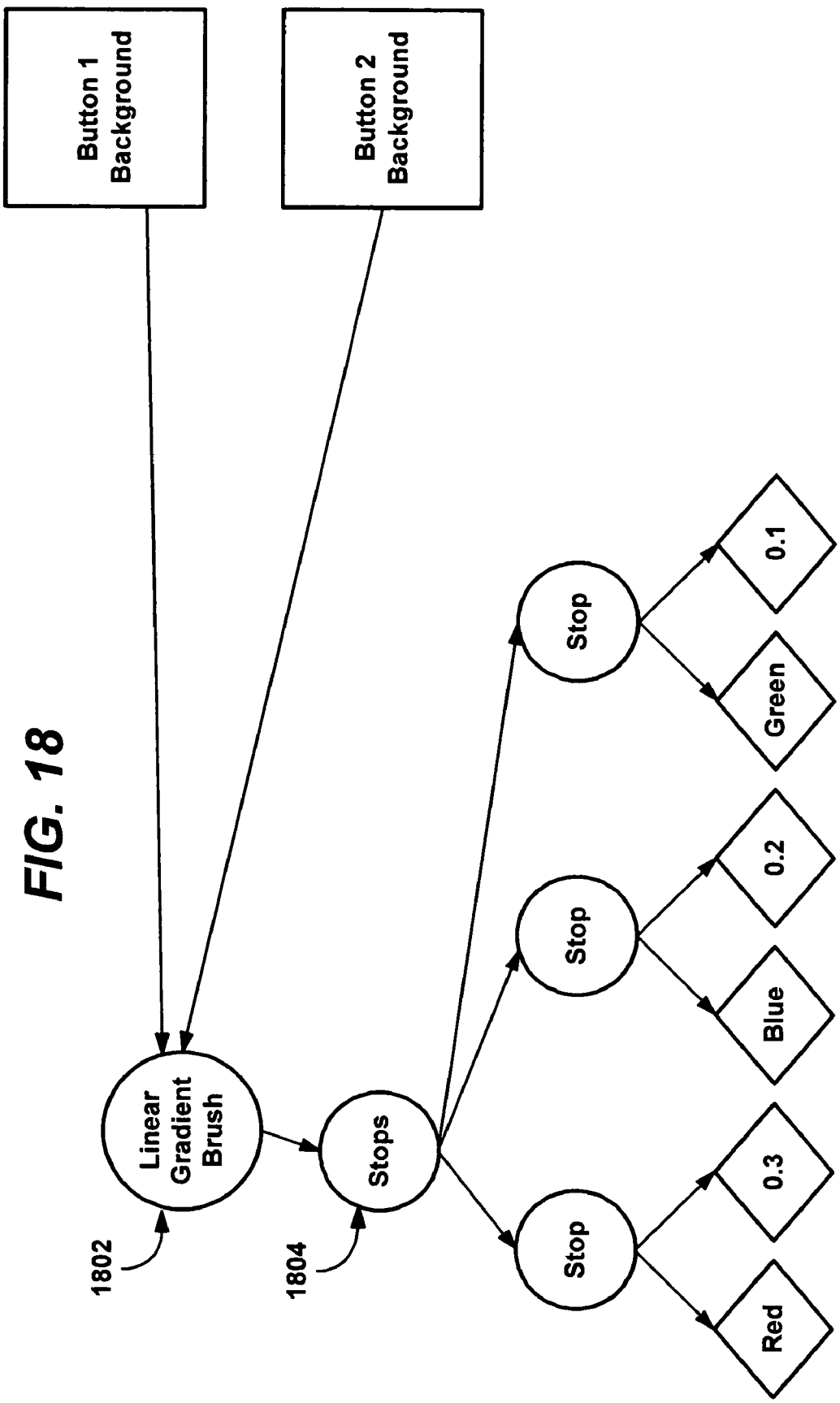
FIGS. 18-23 are hierarchical representations of objects in an example scene graph showing how the properties control state transitions and cloning behaviors for example code, in accordance with an aspect of the present invention.
Figure 19:
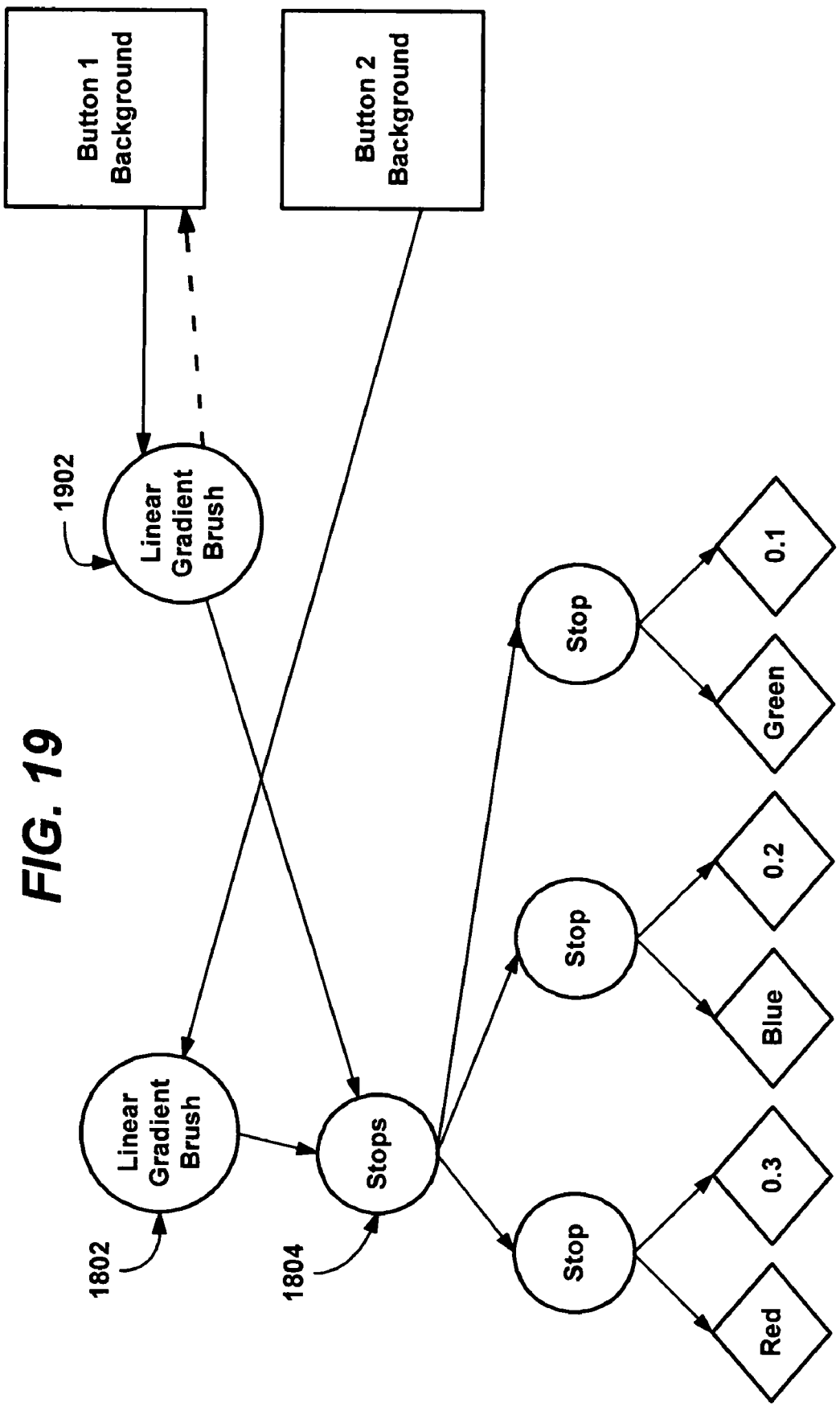

As shown in FIG. 18, both Button1 and Button2 point to the same linear gradient brush 1802, which has a stops node 1804 and the color and position properties for the specified stops arranged hierarchically below. Consider the code:
Btn1.Background=Btn1.Background.Copy( );

Executing this code results in a copy 1902 of the linear gradient brush 1802 being made and pointed to by Button1, as shown in FIG. 19.

Figure 20:
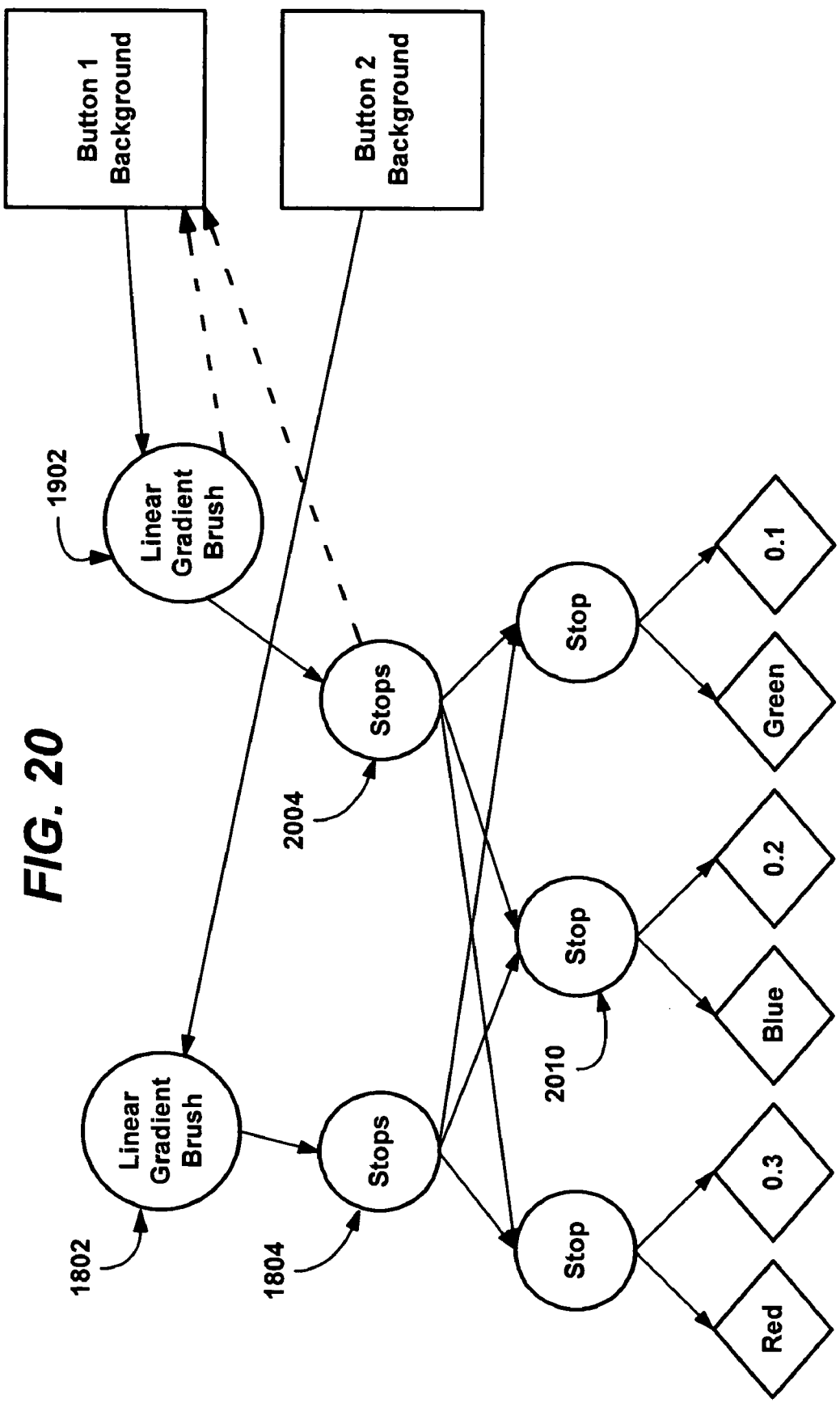
Figure 21:
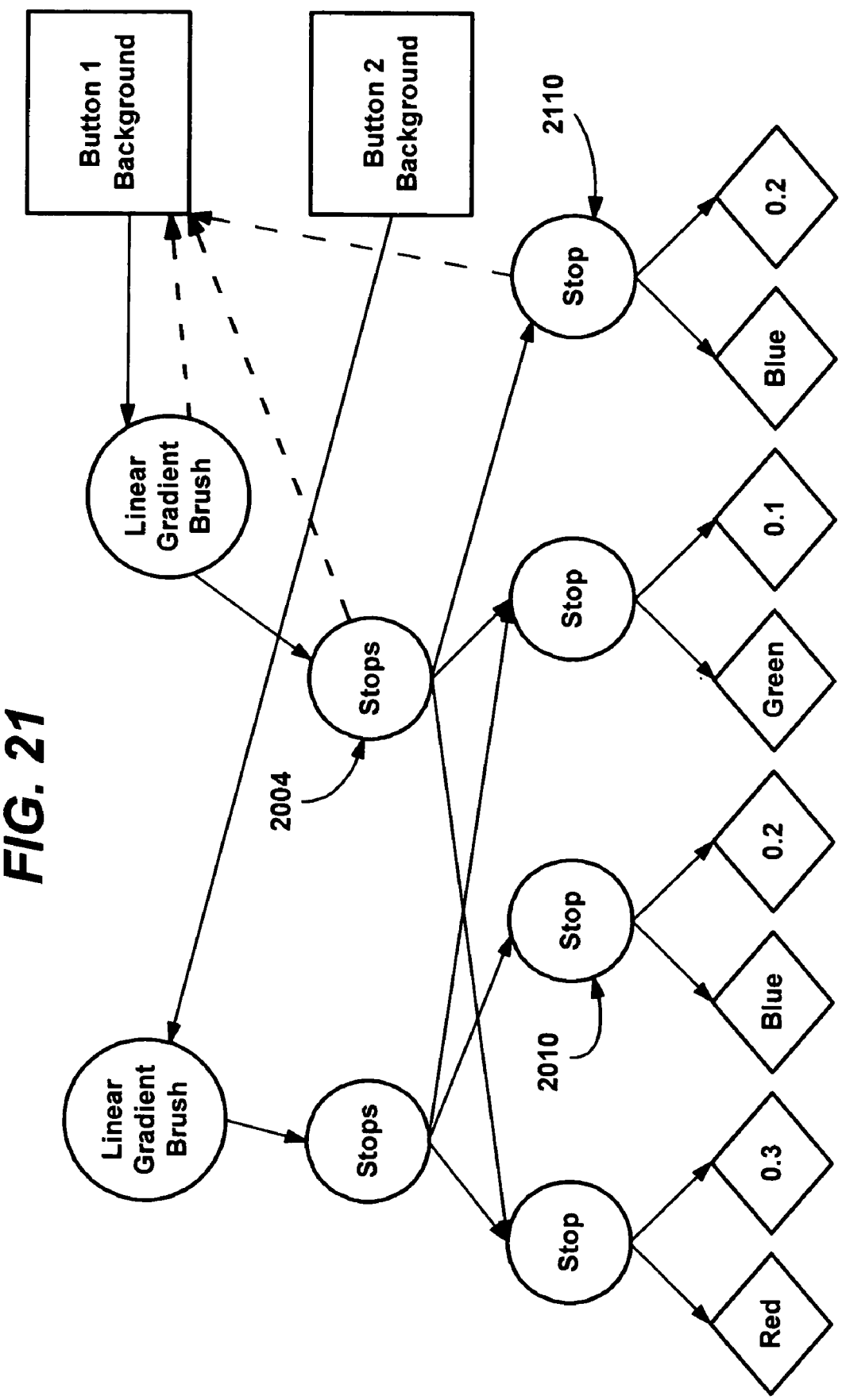
Figure 22:
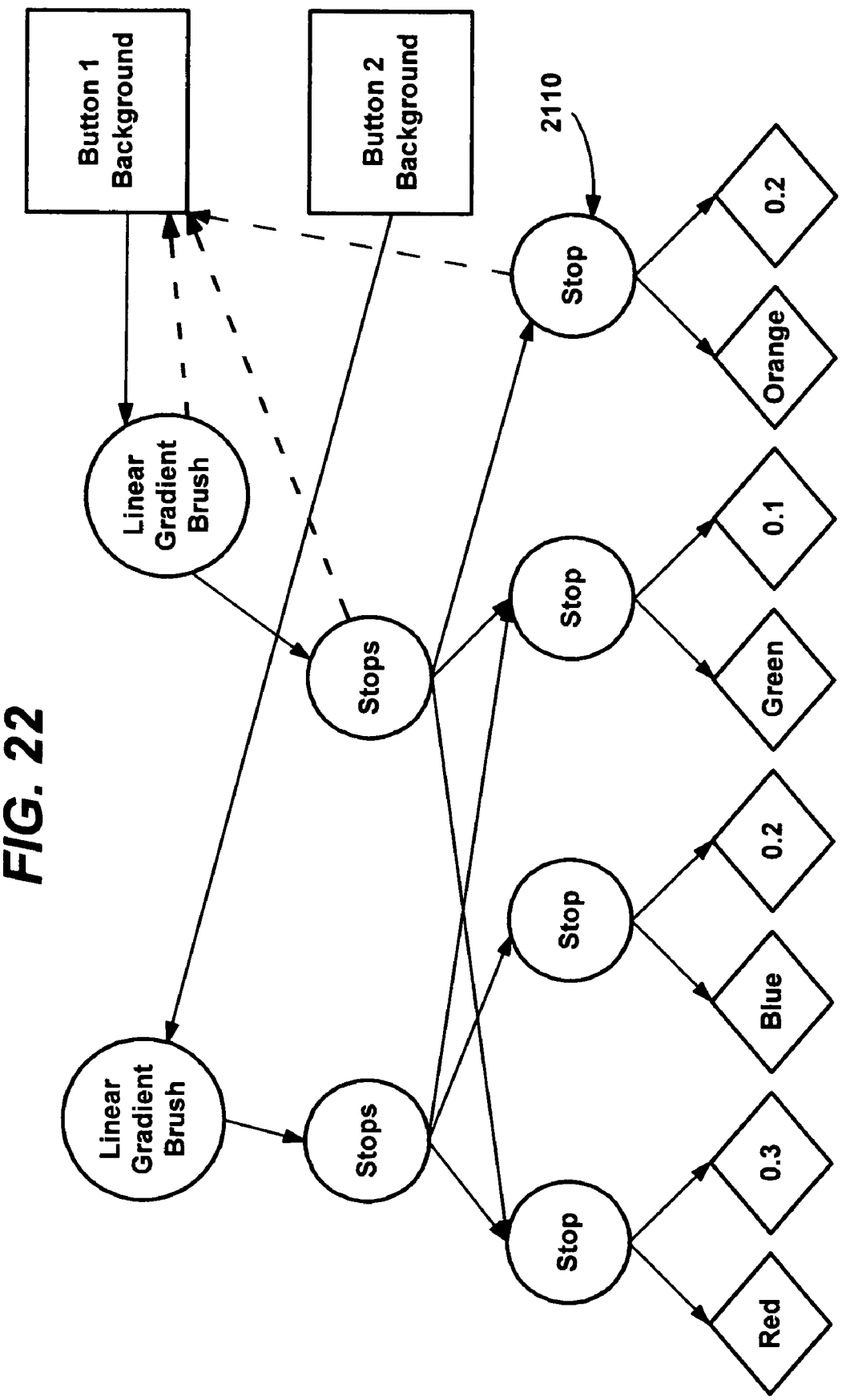
Figure 23:
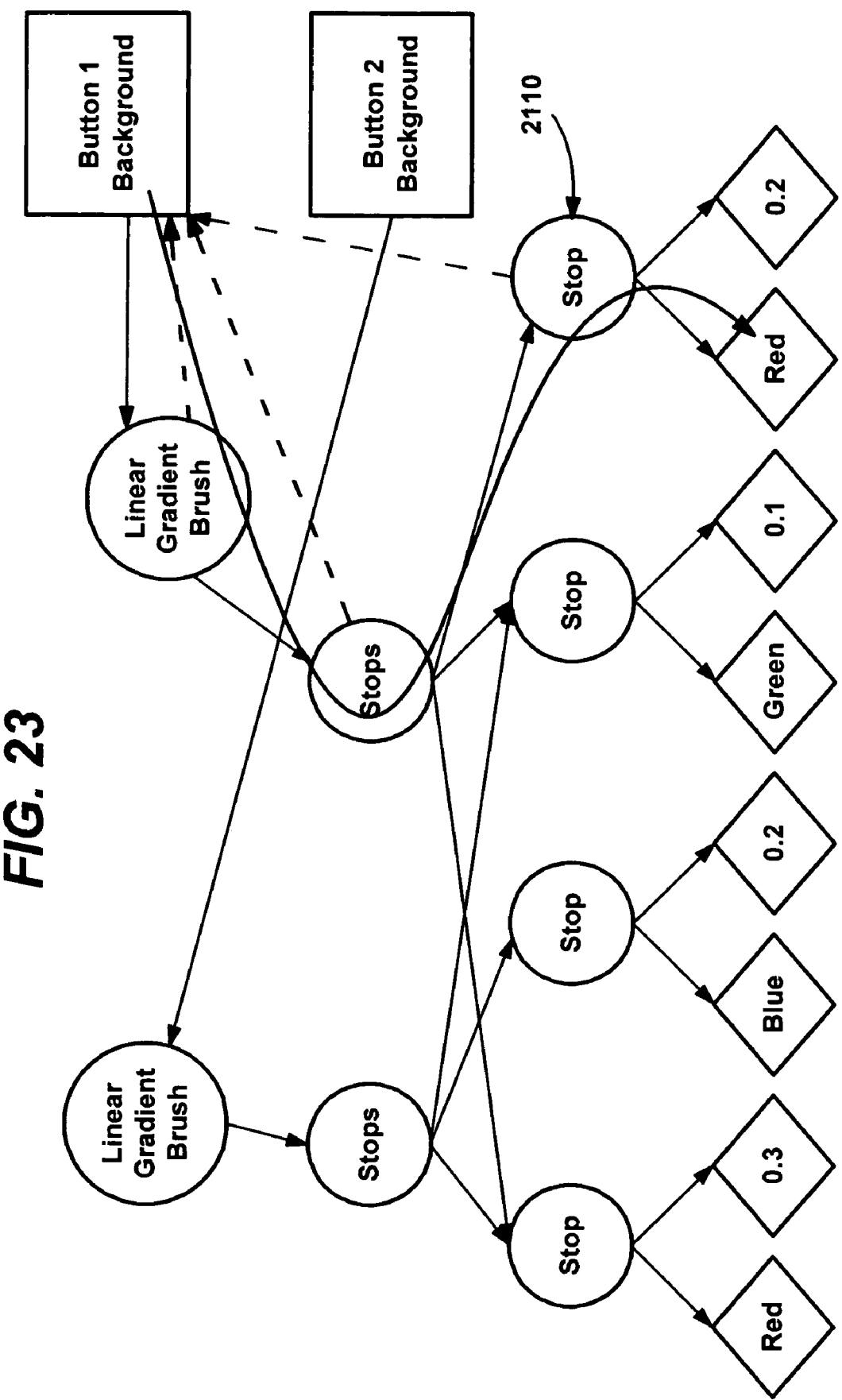

Executing the code:
LinearGradientBrush    lgb=((LinearGradientBrush) Btn1.Background);
lgb.Stops[1].Color=Colors.Orange;

provides access to a Changeable-valued property of a Changeable object that has IsChangeable==true, meaning that what is retrieved is guaranteed to be writable. As generally represented in FIGS. 20-22, executing this code results in (1) another stops node 2004 inserted into the hierarchy that points to each of the individual stops (FIG. 20); (2) a copy 2110 (FIG. 21) of the second stop node (stop node [1], labeled 2010 in FIGS. 20 and 21, that has the "blue" property below) to be made, such that the parent of this copy, the previously copied stops node 2004, has as its child this copy 2110 (instead of the original stop node 2010 for the blue property); and (3) changes the blue property of this node 2110 to orange, as represented in FIG. 20. Note that Orange is a value type denoted by the diamond shapes in the figures, and subsequent changes result in no allocation, such as the change to the color Red in FIG. 23.

When in an unchangeable state, a changeable object may be read from and written to from any context. If in a changeable state, then a UiContext, determined at construction time, may be used to associate with the changeable object so as to only allow access from that context. If MakeUnchangeable is later called, the context goes to null. Also, anytime a Copy( ) of a changeable is made, the new copy gets the UIContext from the caller, not from the context of the source changeable. The API provides a UIContext get-only property on changeable which is null when immutable. This property is public so that applications can tell whether a given object may be accessed.

Changeable objects constructed with null passed into the constructor will be defined with a null UIContext. If a changeable object has a null UIContext and the IsChangeable property is set to true, then the application needs to manage any possible thread contention issues that may arise. In this case, the system does not prevent concurrent access from multiple contexts.

A situation can arise whereby a changeable object is attempting to embed another changeable object into it (e.g., setting a gradient stop in a linear gradient brush), and the UIContexts do not match. For example, consider a LinearGradientBrush lgb having a UIContext of A, while a GradientStop gs has both a UIContext of B, and a StatusOfNextUse equal to ChangeableReference. Attempting to set gs into lgb will result in an exception being raised, as this is an attempt to mix UIContexts, which is disallowed.

When a change is made to a changeable object, the Changed event is raised, and that changeable is provided as the sender object for the event handler. However, there are situations when sending the object that actually changed is not desirable, and wherein having a different object as the sender would be more helpful. An example of this is with animated objects, where an animation (itself a changeable) holds onto a timeline (sometimes referred to as a clock) that describes its animation behavior. Events such as Pause( ) occur on the timeline, and not the animation, but generally applications want to know that the animation has paused.

Various solutions are possible, such as to fire changed events up the chain of changeables. This presents a number of problems, including deciding where to stop, causing notification storms with many more events fired even when nothing is receiving and/or using the events, and that changeables, by design, do not know their parents, but rather generally only know what to notify in the event of a change. Having a scheme in which changeables tracked their parents would require additional storage and bookkeeping. Notwithstanding, such a solution may be implemented.

Another solution is to implement a changeable such that the sender is the changeable object, and not the inner changeable that actually changed. The PropagateEventHandler is implemented to not push down the handler it receives, but rather store that handler off, create a new, local handler that, when invoked, calls the stored handler, but with the changeable as the sender argument. The new local handler is pushed down to PropagateEventHandler on the changeable children. Note that this technique intercepts every event handler, requiring that PropagateEventHandler is correctly handled when called with 'false' (when handlers are to be removed), thus requiring that bookkeeping be performed.

Note that this solution does not have an explicit BeginChange/EndChange scoping mechanism, making it more straightforward and robust in the face of exceptions (since there is no modality involved, and no EndChange( ) that can get skipped passed by an unexpected exception). However, Begin/EndChange existed to allow "getters" of objects to not have to make shallow clones of the values they are getting, when those clones were frozen and the system was not in write mode. Otherwise, those frozen values, in write mode, get a shallow clone made of them. As a result, the tree is exploded out more frequently than with Begin/EndChange, and can do so when there is absolutely no setting involved, just getting. Notwithstanding, if a getter is being invoked on an unchangeable value to begin with, it will not make a shallow clone (note this is distinct from the getter being invoked on a changeable value, and the value that is being obtained via "get" is unchangeable, which is where the clone operation happens).

By way of example, if accessing Btn.Background.Opacity, and Btn.Background is not changeable (e.g., as by default), then a copying is not made. Instead, the copying will occur when
"Btn.Background=Btn.Background.ChangeableValue"   or the like takes place, meaning that the copying expense only occurs if used. In other words, it an intent to change the value is not expressed, then arbitrary "getting" does not incur the copy cost. Note that if values maintain a notion of their "last created clone" then that clone can be handed out on use of the object, as long as the object has not been changed since the clone was made (such changes just result in letting go of that cached clone). This allows more sharing. Further, note that the control implementers are not as unduly burdened by participating in this pattern as it is for the pattern to be useful to users. Similarly, if type extensibility is provided, writing MediaTypes should not be overly complex.

The control implementer is presented with the same model for dealing with a Changeable as with any other value. For instance, the following code provides a Grid control with an AlternateBrush property of type Brush:

```
public static readonly DynamicProperty AlternateBrushID = ...;
private Brush _alternateBrush;
public Brush AlternateBrush
{
    get
    {
        return ComputeValue(AlternateBrushID,
                ref _alternateBrush);
    }
    set
    {
        WriteLocal(AlternateBrushID, value);
    }
}
```

Note that this is identical to a general property participating in the property system. That is because WriteLocal will do special handling for deep properties that derive from the Changeable class.

The changeable type implementer needs a one line preamble and a one line postscript on anything that modifies a changeable (e.g., properties). Also, a simple, one line preamble is needed on objects that access state of a changeable (e.g., property getters). Needed are implementations of CloneCore( ), MakeUnchangeableCore( ), PropagateEventHandlerCore( ), PropagateEventHandlers( ) (note that the last three are only needed for types that have other Changeables as properties), and also needed is a typesafe-wrapper for Copy( ).

The following examples come from the referenced prototype, including an (artificial) example of a GradientStop which is a simple changeable type (which is simplified in that none of its subtypes are changeables). Note that in practice, very few changeables will be this simplified, in that anything that contains an animation collection (itself a changeable) will be more complex:

```
public class GradientStop : Changeable
{
```

-continued

```
    public GradientStop( )
    {
    }
    public GradientStop(Color color, float location)
    {
        _color = color;
        _location = location;
    }
    public Color Color
    {
        get
        {
            ReadPreamble( );
            return _color;
        }
        set
        {
            // This is the pattern for setting simple value types.
            WritePreamble( );
            if (_color != value)
            {
                _color = value;
                WritePostscript( );
            }
        }
    }
    public float Location
    {
        get
        {
            ReadPreamble( );
            return _location;
        }
        set
        {
            // This is the pattern for setting simple value types.
            WritePreamble( );
            if (_location != value)
            {
                _location = value;
                WritePostscript( );
            }
        }
    }
    // Create a new, typesafe version of Copy( ).
    public new GradientStop Copy( )
    {
        return (GradientStop)base.Copy( );
    }
    protected override Changeable CloneCore(bool shallowClone)
    {
        // Shallow and deep are treated the same here when
        // all members are value types
        return new GradientStop(_color, _location);
    }
    private Color _color;
    private float _location;
}
```

The following is an example of a LinearGradientBrush which is a more complex changeable type (because some of its subtypes, namely GradientStops, are themselves changeable):

```
public class LinearGradientBrush : Brush
{
    public LinearGradientBrush( )
    {
    }
    public LinearGradientBrush(GradientStop stop1, GradientStop stop2,
                double opacity)
        : base(opacity)
```

```
{
    // Assigning through the properties results in "using" the
    // parameters.
    Stop1 = stop1;
    Stop2 = stop2;
}
public GradientStop Stop1
{
    get
    {
        _stop1 = (GradientStop)EmbeddedChangeableGetter(_stop1);
        return _stop1;
    }
    set
    {
        if (_stop1 != value)
        {
            _stop1 = (GradientStop)EmbeddedChangeableSetter(_stop1, value);
            WritePostscript( );
        }
    }
}
public GradientStop Stop2
{
    get
    {
        _stop2 = (GradientStop)EmbeddedChangeableReader(_stop2);
        return _stop2;
    }
    set
    {
        if (_stop2 != value)
        {
            _stop2 = (GradientStop)EmbeddedChangeableWriter(_stop2, value);
            WritePostscript( );
        }
    }
}
// In place modification to r/o (or check whether it can be done).
// Helpers check if arguments are null.
protected override bool MakeUnchangeableCore(bool checking)
{
    return Changeable.MakeUnchangeable(_stop1, checking);
        &&Changeable.MakeUnchangeable(_stop2, checking);
}
// Propagation of event changes
protected override void PropagateEventHandlerCore(EventHandler handler,
                    bool adding)
{
    Changeable.ModifyHandlerIfChangeable(_stop1, handler, adding);
    Changeable.ModifyHandlerIfChangeable(_stop2, handler, adding);
}
protected override Changeable CloneCore(bool shallowClone)
{
    // Always use member fields, not properties, for cloning.
    // Otherwise you inadvertently cause extra shallow copying.
    if (shallowClone)
    {
        return new LinearGradientBrush(_stop1, _stop2, _opacity);
    }
    else
    {
        return new LinearGradientBrush(
            (GradientStop)Changeable.CloneDownToUnchangeable(_stop1),
            (GradientStop)Changeable.CloneDownToUnchangeable(_stop2),
            _opacity);
    }
}
private GradientStop _stop1;
private GradientStop _stop2;
}
```

The changeable object model is divided into a public part, and a part which is what extenders and hosters see. Note again, though, that things are straightforward for the component writer that uses these types.

```
// PUBLIC API. Everyone expected to use this portion of the API.
// Anything outside of this section will be hidden
// from the editors.
public abstractclass System.Windows.Changeable
{
    public bool IsChangeable { get; } // defaults to true
    public Changeable Copy( );
    public void MakeUnchangeable( );
    public bool CanMakeUnchangeable { get; }
    public UseStatus StatusOfNextUse { get; set; } // defaults to false
    public event EventHandler Changed { add; remove; }
    public UIContext UIContext { get; } // null if IsChangeable==false
    public bool AllowChangeableReferenceOverride { get; set; }
        // defaults to false
    // protected stuff shown below.
}
Public enum System.Windows.UseStatus
{
    Unchangeable,
    ChangeableCopy,
    [EditorState.Advanced]
    ChangeableReference
} public class System.Windows.Changeable
{
// COMPONENT WRITER API. This is for use by Component Writers
// (Note: there is nothing that component writers need to know about)
// EXTENDER API. This is for use by those who write new Changeables
protected Changeable( ); // use UIContext.CurrentContext
protected Changeable(UIContext context);
// Subtypes implement this to provide cloning as described above.
protected abstract Changeable CloneCore(bool shallowClone);
// Subclasses implement to freeze their complex subtypes (when
// 'checking' is false, or to check whether they can (when
// 'checking' is true. Note that when checking is false, the return
// boolean doesn't really make sense, but implementers are to return
// 'true' in this case, so that calling code (like the above example)
// will work correctly. If a call is made with 'true' that cannot
// actually make the value unchangeable, then the implementation
should
// raise an exception.
// The default implementation returns true in these cases.
protected virtual bool MakeUnchangeableCore(bool checking);
// Subclasses implement to push down changes to event handlers
// that happen up above (default impl is empty). If adding is true
// then the handler should be added to sub-changeables, else it
// should be removed from them as described above
protected virtual void PropagateEventHandler(EventHandler handler,
                bool adding);
// Subclasses implement to validate that their in a good state. They
// throw a meaningful exception if not. This will be called on
// WritePostscript( ), EmbeddedChangeableWriter( ).
// Default impl is empty.
protected virtual void ValidateObjectState( );
// Called when there's a change to the value. Default implementation
// invokes registered Changed handlers.
protected virtual void OnChanged( );
// Call from anything that reads an embedded changeable out of
// a changeable (Reader) or writes an embedded changeable into
// a changeable (Writer). The primary uses of these are for property
// sets and gets. See examples above.
protected Changeable EmbeddedChangeableReader(Changeable property);
protected Changeable EmbeddedChangeableWriter(Changeable
originalChangeable,
                Changeable newChangeable);
// Call from simple property setters and getters, or anything that
// access non-Changeable state on a Changeable. See examples above.
protected void ReadPreamble( );
protected void WritePreamble( );
// Call from both simple and complex property setters and anything else
// that sets state on a Changeable. See examples above.
protected void WritePostscript( );
//// Static helper methods
```

```
-continued

// Create a deep, unchangeable clone of the provided Changeable,
but stop at nodes
// that are already unchangeable (since those can just be "cloned"
by handing
// out references to them). If null is passed in, null is returned
static protected Changeable CloneDownToUnchangeable(Changeable
changeable);
// Make the specified Changeable be unmodifiable (IsChangeable ==
false) and
// returns true when the 'checking' parameter is 'false'. Otherwise,
it checks
// to see if the changeable can be made unchangeable, returning true or
false
// as appropriate. If null is passed in as the changeable, this operation
// doesn't do anything and returns 'true'.
static protected bool MakeUnchangeable(Changeable changeable, bool
checking);
}
// UsageOverride to be used in ChangeableHelper.UseChangeable
public enum ChangeableUsageOverride
{
    NoOverride, // default, use as prescribed
    ForceUnchangeable, // force the "use" to be unchangeable
    PreferChangeableReference // as described above.
}
// This helper class exists to reduce OM clutter on
// the core Changeable type.
public class System.Windows.ChangeableHelper
{
// HOSTING API. This is for use by systems other than the Property
System
// that are going to host these values. The Property System will use
// these entry points for their own hosting in WriteLocal
// remove handler from getting notified of changes to oldChangeable
static public void UnsubscribeChangeable(Changeable changeable,
                EventHandler handlerToRemove);
// return a Changeable, adding handler to getting notified of changes
to it,
// if any. Note that this is a "use" of the Changeable, and the
returned value
// will follow the "use" semantics. If "usageOverride" is NoOverride,
all
// proceeds as expected, if it's "ForceUnchangeable", then
// always treat the Changeable as
StatusOfNextUse==UseStatus.Unchangeable.
// See above for a description
static public Changeable UseChangeable(Changeable changeable,
                EventHandler handlerToAssociate,
                ChangeableUsageOverride usageOverride);
}
```

Note that the act of a qualified use of a Changeable, relying solely on its StatusOfNextUse, does not work exactly in every situation. In general, the problem is that when a changeable object (such as Brush, VideoData, and so forth) gets assigned into a Element property (like VideoSource), that changeable is "used" in a qualified use. In the case of animate Changeables (such as VideoData, but also any animation), the act of "using" creates a clone, which is the correct and expected behavior. Then, when the elements' OnRender( ) method is invoked, the OnRender( ) implementation typically pushes the value into a DrawingContext, e.g., through DrawingContext.DrawVideo(videoData, . . . ). This call into the DrawingContext also "uses" the Changeable (videoData in this case), resulting in another clone being made.

Both behaviors of when changeables are "used" in this manner are correct and make sense, when considered in isolation. However, the problem occurs when they combine, in that the implementer of the control does not expect a qualified use every time OnRender( ) is invoked, and there really is no benefit in doing so, since this use is not exposed to the application, and indeed, is pure overhead that should be eliminated. Moreover, when dependent animations and independent animations combine, OnRender( ) will be frequently called, and animations will be repeatedly copied, which is not correct behavior. A mechanism called ChangeableReference allows for a "use" to not actually copy, but to instead only obtain a reference to the value being used.

A solution is to have cooperation between an entity like the DrawingContext and the DependencyProperties on a DependencyObject. In particular, the DependencyProperty of a control, when having a value set into it, needs to indicate that it will "allow" the Changeable to be treated as a ChangeableReference if the particular context in which it is subsequently used wants it to be such. Then, the DrawingContext operations say indicate that they would "prefer" for the Changeable to be treated as a ChangeableReference, provided the Changeable itself will allow it.

To this is, there is provided a Boolean property named Changeable.AllowChangeableReferenceOverride and the enumeration ChangeableUsageOverride, used in ChangeableHelper.UseChangeable. In this implementation, UseChangeable works as before with true/false mapping to ForceUnchangeable/NoOverride. If UseChangeable is called with PreferChangeableReference and the changeable has IsChangeable==true, and the changeable has AllowChangeableReferenceOverride==true, then the use of the Changeable will be as a ChangeableReference.

This is used by having DependencyObject.SetValue( ) set the Changeable it has retained (when it is modifiable) to AllowChangeableReferenceOverride, and having DrawingContext methods invoke UseChangeable with UsageOverridePreferChangeableReference.

Note that when both conditions are not true, the correct behavior also occurs, in that Elt2.Prop=Elt1.Prop will use the property as expected in a qualified use, copying it if it is modifiable, unless it has been explicitly set to ChangeableReference, since UseChangeable will not be invoked with the PreferChangeableReference. Direct usage of the DrawingContext will also function appropriately, since the Changeables being sent down to it will not have AllowChangeableReferenceOverride.

Note that when there is a changeable where a subobject of it is ChangeableReference, a shallow clone and a deep clone may be made. A Shallow Clone should work, as the CloneCore method will create a new shallow "shell", and assign over the children, not going deeper into them. With deep clones, the process is straightforward in the case of a tree of ChangeableCopys and Unchangeables, by cloning down to Unchangeables, making each clone along the way itself be Unchangeable (assuming CanMakeUnchangeable is true). This results in a deep clone where the top level is Changeable, and everything below it is Unchangeable. Note that dotting down will make the sub-elements modifiable again.

However, when there is a ChangeableReference, the clone operation needs to be effectively performed, however a reference is maintained for a "Changeable" path down to the ChangeableReference. This is needed so that when there is a notification from the ChangeableReference, the correct handlers get invoked for everywhere that it is hosted.

Consider the following example:

```
Brush b = new LinearGradientBrush( );
b.Stops = new GradientStopCollection( );
GradientStop gs = new GradientStop( );
gs.StatusOfNextUse = UseStatus.ChangeableReference;
b.Stops.Add(gs);
Button button1, button2;
button1.Background = b;
button2.Background = b; (or button2.Background = button1.Background)
gs.Color = Colors.Purple;
```

Here, a LinearGradientBrush is created, as is its Stops collection and a single Stop, and is made a ChangeableReference. The brush may be used in multiple places, and a modification to the ChangeableReference GradientStop needs to affect both brushes.

EXAMPLES

Valid an Invalid of Using Changeable Objects

The following section provides a summary of using and manipulating objects that derive from the Changeable class, by which objects, such as brushes, pens, and animations, are mutable as controlled by a programmer. Classes that derive from Changeable simulate mutability by automatically building an immutable version of themselves when used in a qualified use. As described above, a Changeable is considered used in a qualified use when the object is set into a Property System property, used as a sub-object in a complex Changeable object, or used in a DrawingContext command.

When developing applications with such objects, graphics and media system objects are generally created, set, used, and then never modified. For example, to set the background of a Button a programmer might use a SolidColorBrush, which derives from Changeable; but the programmer might never modify the button's background again over the course of the application. The following is one example:

```
// C#
SolidColorBrush myBrush = new SolidColorBrush(Colors.Yellow);
myBrush.Opacity = 0.5;
// A "use" of myBrush.
myButton.Background = myBrush;
    ' VB .NET
Dim myBrush As new _
    System.Windows.Media.SolidColorBrush(System.Windows.Media.Colors.Yellow)
myBrush.Opacity = 0.5
' A "use" of myBrush.
myButton.Background = myBrush
```

When used in this manner, a Changeable behaves like a value type, such as a Rect or Color. The Changeable is copied into its destination, and changes to the original do not affect changes to the used value. However, there are situations where the programmer might need to modify such an object after it has been used. For example, suppose that the programmer want to change the background of the button in the previous code after the user clicks it.

The Changeable pattern exists to meet the needs of a variety of situations such as the one above. In general, a Changeable is a value that may or may not be modifiable, denoted by the value of the IsChangeable property. Attempting to modify the value when IsChangeable is false results in an exception. Furthermore, IsChangeable objects that can be modified raise their Changed events when they change or when any of their members is changed. When working with Changeables, it is thus important to understand when a Changeable is "used" in a qualified use.

By default, when a Changeable object is used in a qualified use, an immutable copy is created and that copy is actually used. The copy has an IsChangeable value of false. The following code causes an exception to be thrown because the code attempts to modify the unmodifiable copy of myBrush that was used to set the button's background:

```
// C#
SolidColorBrush myBrush = new SolidColorBrush(Colors.Yellow);
myBrush.Opacity = 0.5;
myButton.Background = myBrush;
// Causes an exception to be thrown.
((SolidColorBrush)myButton.Background).Color = Colors.Blue;
' VB .NET
Dim myBrush As new _
    System.Windows.Media.SolidColorBrush(System.Windows.Media.Colors.Yellow)
myBrush.Opacity = 0.5
myButton.Background = myBrush
' Causes an exception to be thrown.
CType(myButton.Background, System.Windows.Media.SolidColorBrush).Color = _
    System.Windows.Media.Colors.Blue
```

Modifying the original Changeable object does not update the copies:

```
// C#
SolidColorBrush my Brush = new SolidColorBrush(Colors.Yellow);
myBrush.Opacity = 0.5;
myButton.Background = myBrush;
// Does not change the background of the button.
myBrush.Color = Colors.Blue;
' VB .NET
Dim myBrush As new _
    System.Windows.Media.SolidColorBrush(System.Windows.Media.Colors.Yellow)
myBrush.Opacity = 0.5
myButton.Background = myBrush
' Does not change the background of the button.
        myBrush.Color = System.Windows.Media.Colors.Blue
```

To change the background of the button in this example, the programmer reassigns the modified brush to the button's background property:

```
// C#
SolidColorBrush myBrush = new SolidColorBrush(Colors.Yellow);
myBrush.Opacity = 0.5;
myButton.Background = myBrush;
// Does not change the background of the button.
myBrush.Color = Colors.Blue;
// Updates the background of the button.
myButton.Background = myBrush;
        ' VB .NET
Dim myBrush As new _
    System.Windows.Media.SolidColorBrush(System.Windows.Media.Colors.Yellow)
myBrush.Opacity = 0.5
myButton.Background = myBrush
' Does not change the background of the button.
myBrush.Color = System.Windows.Media.Colors.Blue
' Updates the background of the button.
        myButton.Background = myBrush
```

The programmer can also use the Copy method to retrieve a modifiable copy of a used Changeable object. The retrieved copy is still reassigned back to the property to have an effect:

```
// C#
SolidColorBrush myBrush = new SolidColorBrush(Colors.Yellow);
myBrush.Opacity = 0.5;
myButton.Background = myBrush;
SolidColorBrush anotherBrush = (SolidColorBrush)myButton.Background.Copy( );
anotherBrush.Color = Colors.Purple;
// Updates the background of the button.
myButton.Background = anotherBrush;
' VB .NET
Dim myBrush As new _
     System.Windows.Media.SolidColorBrush(System.Windows.Media.Colors.Yellow)
myBrush.Opacity = 0.5
myButton.Background = myBrush
Dim anotherBrush As new System.Windows.Media.SolidColorBrush
anotherBrush = _
     CType(myButton.Background.Copy, System.Windows.Media.SolidColorBrush)
anotherBrush.Color = System.Windows.Media.Colors.Purple
' Updates the background of the button.
          myButton.Background = anotherBrush
```

Because this is not an ideal behavior of a Changeable in all situations, e.g., consider the programmer wanting to modify the used version (the working copy) of the Changeable, the Changeable class enables the programmer to specify how it behaves when used by providing the StatusOfNextUse property.

The StatusOfNextUse provides three options of how a Changeable behaves when used:

Unchangeable: The default behavior, shown in the examples in the previous section. When the Changeable object is used, it creates an immutable copy of itself which is used in place of the original object. The programmer may continue to modify the original object; the used version (the copy that was made) is unaffected by modifications to the original object and cannot be modified. To modify the used version, the Copy method is used to obtain a modifiable version, that version is updated, and the new version replaces the used version.

ChangeableCopy: When the Changeable object is used, it creates a modifiable copy of itself which is used in place of the original object. The programmer may continue to modify the original object; the used version (the copy that was made) is unaffected by modifications to the original object, but is also modifiable. The used version has a StatusOfNextUse of Unchangeable.

ChangeableReference: When the Changeable object is used, it provides a reference to itself. The programmer may continue to modify the original object; changes to the original object affect the used version—they are the same object.

The ChangeableCopy alters the behavior of a Changeable so that when used it creates a modifiable copy of itself, not an unmodifiable copy (as is the case with the default setting of Unchangeable). The following code (shown previously) throws an exception because the StatusOfNextUse property of myBrush has a default setting of Unchangeable:

```
// C#
SolidColorBrush myBrush = new SolidColorBrush(Colors.Yellow);
myBrush.Opacity = 0.5;
myButton.Background = myBrush;
// Causes an exception to be thrown.
((SolidColorBrush)myButton.Background).Color = Colors.Blue;
' VB .NET
Dim myBrush As new _
     System.Windows.Media.SolidColorBrush(System.Windows.Media.Colors.Yellow)
myBrush.Opacity = 0.5
myButton.Background = myBrush
' Causes an exception to be thrown.
CType(myButton.Background, System.Windows.Media.SolidColorBrush).Color = _
          System.Windows.Media.Colors.Blue
```

However, if the StatusOfNextUse property of the brush is set to ChangeableCopy, the code works as intended:

```
        // C#
SolidColorBrush myBrush = new SolidColorBrush(Colors.Yellow);
myBrush.StatusOfNextUse = UseStatus.ChangeableCopy;
myBrush.Opacity = 0.5;
myButton.Background = myBrush;
// Works because the brush has a UseStatus of ChangeableCopy.
((SolidColorBrush)myButton.Background).Color = Colors.Blue;
        ' VB .NET
Dim myBrush As new _
    System.Windows.Media.SolidColorBrush(System.Windows.Media.Colors.Yellow)
myBrush.StatusOfNextUse = MSAvalon.Windows.UseStatus.ChangeableCopy
myBrush.Opacity = 0.5
myButton.Background = myBrush
' Works because the brush has a UseStatus of ChangeableCopy.
CType(myButton.Background, System.Windows.Media.SolidColorBrush).Color = _
        System.Windows.Media.Colors.Blue
```

The ChangeableCopy setting also keeps any sub-objects of the main object modifiable. In the following example, a LinearGradientBrush is given a StatusOfNextUse of ChangeableCopy. As a result, the LinearGradientBrush and its sub-objects remain modifiable after they've been used; the programmer does not have to set the StatusOfNextUse property of any Changeable objects contained by the object, such as the GradientStop in this example:

```
        // C#
LinearGradientBrush myBrush = new LinearGradientBrush( );
myBrush.StatusOfNextUse = UseStatus.ChangeableCopy;
myBrush.GradientStops.Add(new GradientStop(Colors.Blue, 0));
myBrush.GradientStops.Add(new GradientStop(Colors.Green, 1));
myButton.Background = myBrush;
// Works because the brush has a UseStatus of ChangeableCopy.
((LinearGradientBrush)myButton.Background).GradientStops[0].Color = Colors.LightBlue;
        ' VB .NET
Dim myBrush As new System.Windows.Media.LinearGradientBrush
myBrush.StatusOfNextUse = MSAvalon.Windows.UseStatus.ChangeableCopy
myBrush.GradientStops.Add( _
    new System.Windows.Media.GradientStop(System.Windows.Media.Colors.Blue,0))
myBrush.GradientStops.Add(new _
    System.Windows.Media.GradientStop(System.Windows.Media.Colors.Green, 1))
myButton.Background = my Brush
' Works because the brush has a UseStatus of ChangeableCopy.
CType(myButton.Background, _
    System.Windows.Media.LinearGradientBrush).GradientStops(0).Color = _
    System.Windows.Media.Colors.LightBlue
```

When using Changeable objects with a StatusOfNextUse of ChangeableCopy, the programmer can also retain a handle to the used version of the Changeable and use that reference to modify the object. In the following example, a reference to the used LinearGradientBrush is retrieved and used to modify the background of a button:

```
        // C#
LinearGradientBrush myBrush = new LinearGradientBrush( );
myBrush.StatusOfNextUse = UseStatus.ChangeableCopy;
myBrush.GradientStops.Add(new GradientStop(Colors.Blue, 0));
myBrush.GradientStops.Add(new GradientStop(Colors.Green, 1));
myButton.Background = myBrush;
LinearGradientBrush usedBrush = (LinearGradientBrush)myButton.Background;
// Works because the brush has a UseStatus of ChangeableCopy.
usedBrush.GradientStops[0].Color = Colors.LightBlue;
        ' VB .NET
Dim myBrush As new System.Windows.Media.LinearGradientBrush
myBrush.StatusOfNextUse = MSAvalon.Windows.UseStatus.ChangeableCopy
myBrush.GradientStops.Add( _
    new
```

-continued

```
System.Windows.Media.GradientStop(System.Windows.Media.Colors.Blue,0))
myBrush.GradientStops.Add( _
    new
System.Windows.Media.GradientStop(System.Windows.Media.Colors.Green,1))
myButton.Background = myBrush
Dim usedBrush As new System.Windows.Media.LinearGradientBrush
usedBrush = Ctype(myButton.Background, LinearGradientBrush)
' Works because the brush has a UseStatus of ChangeableCopy.
usedBrush.GradientStops(0).Color = System.Windows.Media.Colors.LightBlue
```

The ChangeableReference setting alters the behavior of a Changeable so that it provides a reference to itself when used. The programmer may continue to modify the original object; changes to the original object affect the used version because they are the same object. The following is an example:

```
// C#
SolidColorBrush changeableReferenceBrush = new SolidColorBrush( );
changeableReferenceBrush.Color = Colors.LimeGreen;
button1.Background = changeableReferenceBrush;
button2.Background = changeableReferenceBrush;
button3.Background = changeableReferenceBrush;
// Changes the color of the three buttons.
changeableReferenceBrush.Color = Colors.Purple;
// Also changes the color of all three buttons.
((SolidColorBrush)button1.Background).Color = Colors.Blue;
    ' VB .NET
Dim changeableReferenceBrush As new
System.Windows.Media.SolidColorBrush
changeableReferenceBrush.Color =
System.Windows.Media.Colors.LimeGreen
button1.Background = changeableReferenceBrush
button2.Background = changeableReferenceBrush
button3.Background = changeableReferenceBrush
' Changes the color of all three buttons.
changeableReferenceBrush.Color = System.Windows.Media.Colors.Purple
' Also changes the color of all three buttons.
CType(button1.Background,
System.Windows.Media.SolidColorBrush).Color = _
    System.Windows.Media.Colors.Blue
```

Brush and Pen

A brush is an object that represents a method to fill a plane. In addition to being able to fill a plane in an absolute way, brushes of the media integration layer are also able to adapt how they fill the plane relative to the size of the object that they are filling. Examples of types of brushes include Solid-ColorBrush, VisualBrush (which can reference a Visual), DrawingBrush (which can reference a vector graphics resource), LinearGradient, RadialGradient, ImageBrush and NineGridBrush. Default values for brush properties are specified below, and are generally values which result in no action. That is, colors default to transparent, and so on. Also, animation collections default to null.

As mentioned above, certain brush objects will have an idea of how they relate to the coordinate system when they are used, and an idea of how they relate to the bounding box of the geometry with which they are used. This size is based on from the object that the brush is filling.

The Brush base class has a Transform, a general opacity, and a blend mode:

```
public abstract class System.Windows.Media.Brush : Changeable
{
    internal Brush( );
```

-continued

```
    public new Brush Copy( ); // hides Changeable.Copy( )
    // Default is Transform.Identity
    public Transform Transform { get; set; }
    public Transform Transform { get; set; }
    [Animation("Opacity Animations")]
    public double Opacity { get; set; } // Default is 1.0
    public DoubleAnimationCollection OpacityAnimations { get;set; }
    /// The BlendMode to apply to this Brush and its destination when
    drawn.
    /// Default is BlendModes.Normal
    public BlendMode BlendMode {get; set; }
}
```

Brush (and other object resources in Vector Graphics and the MIL API) objects are Changeables and are writable after they have been created, and follow the general Changeable pattern for how they behave after they are used in qualified use.

The brushes (except for VisualBrush and DrawingBrush) have a simple syntax for use in markup, however, this simple syntax does not allow access to all properties and behavior. If a programmer needs more access than the simple syntax provides, the programmer will need to use complex syntax. Note that only the simple syntax is documented here to avoid redundancy, because the complex syntax follows the same pattern as other CLR classes.

The following are the brush types with simple syntax for markup in a current implementation:

```
brush:
    solid-color-brush |
    linear-gradient-brush |
    radial-gradient-brush |
    image-brush |
    video-brush |
    nine-grid-brush
```

Many of the brush types use a coordinate system for specifying some of their parameters. This coordinate system can be defined as relative to the simple bounding box of the geometry with which the brush is used, or it can be absolute, and interpreted in the coordinate space that is active at the time that the brush is used. These are known, respectively, as RelativeToBoundingBox mode and Absolute mode.

```
public enum System.Windows.Media.BrushMappingMode
{
    Absolute,
    RelativeToBoundingBox,
}
```

SolidColorBrush fills the plane with a solid color. If there is an alpha component of the color, it is combined in a multiplicative way with the corresponding opacity attribute in the Brush.

```
public sealed class System.Windows.Media.SolidColorBrush : Brush
{
    // Constructors
    public SolidColorBrush( ); // initialize to transparent
    public SolidColorBrush(Color color);
    public new SolidColorBrush Copy( ); // hides Changeable.Copy( )
    // Default is transparent
    [Animation("ColorAnimations")]
    public Color Color { get; set; }
    public ColorAnimationCollection ColorAnimations { get; set; }
}
```

Because this is a simple type, (that is, none of its properties are Changeables), the only protected method that needs to be implemented is CloneCore( ). Also, since there is no combination of values that make this object invalid, there is no need to provide a ValidateObjectState( ) method. These methods and other related methods are described in the attached Appendix.

The simple syntax for markup for SolidColorBrush:

```
solid-color-paint:
    color
```

The Brushes class contains static properties for the SolidColorBrush instances that are exposed. Each is set to a color value of the same name. Note that because these are standardized brushes, they have IsChangeable set to false, (e.g., the implementation calls MakeUnchangeable( ) upon construction).

The following set forth some standard colors:

```
public sealed class Brushes
{
    public static SolidColorBrush AliceBlue { get; }
    public static SolidColorBrush AntiqueWhite { get; }
    public static SolidColorBrush Aqua { get; }
    public static SolidColorBrush Aquamarine { get; }
    public static SolidColorBrush Azure { get; }
    public static SolidColorBrush Beige { get; }
    public static SolidColorBrush Bisque { get; }
    public static SolidColorBrush Black { get; }
    public static SolidColorBrush BlanchedAlmond { get; }
    public static SolidColorBrush Blue { get; }
    public static SolidColorBrush BlueViolet { get; }
    public static SolidColorBrush Brown { get; }
    public static SolidColorBrush BurlyWood { get; }
    public static SolidColorBrush CadetBlue { get; }
    public static SolidColorBrush Chartreuse { get; }
    public static SolidColorBrush Chocolate { get; }
    public static SolidColorBrush Coral { get; }
    public static SolidColorBrush CornflowerBlue { get; }
    public static SolidColorBrush Cornsilk { get; }
    public static SolidColorBrush Crimson { get; }
    public static SolidColorBrush Cyan { get; }
    public static SolidColorBrush DarkBlue { get; }
    public static SolidColorBrush DarkCyan { get; }
    public static SolidColorBrush DarkGoldenrod { get; }
    public static SolidColorBrush DarkGray { get; }
    public static SolidColorBrush DarkGreen { get; }
    public static SolidColorBrush DarkKhaki { get; }
    public static SolidColorBrush DarkMagenta { get; }
    public static SolidColorBrush DarkOliveGreen { get; }
```

-continued

```
    public static SolidColorBrush DarkOrange { get; }
    public static SolidColorBrush DarkOrchid { get; }
    public static SolidColorBrush DarkRed { get; }
    public static SolidColorBrush DarkSalmon { get; }
    public static SolidColorBrush DarkSeaGreen { get; }
    public static SolidColorBrush DarkSlateBlue { get; }
    public static SolidColorBrush DarkSlateGray { get; }
    public static SolidColorBrush DarkTurquoise { get; }
    public static SolidColorBrush DarkViolet { get; }
    public static SolidColorBrush DeepPink { get; }
    public static SolidColorBrush DeepSkyBlue { get; }
    public static SolidColorBrush DimGray { get; }
    public static SolidColorBrush DodgerBlue { get; }
    public static SolidColorBrush Firebrick { get; }
    public static SolidColorBrush FloralWhite { get; }
    public static SolidColorBrush ForestGreen { get; }
    public static SolidColorBrush Fuchsia { get; }
    public static SolidColorBrush Gainsboro { get; }
    public static SolidColorBrush GhostWhite { get; }
    public static SolidColorBrush Gold { get; }
    public static SolidColorBrush Goldenrod { get; }
    public static SolidColorBrush Gray { get; }
    public static SolidColorBrush Green { get; }
    public static SolidColorBrush GreenYellow { get; }
    public static SolidColorBrush Honeydew { get; }
    public static SolidColorBrush HotPink { get; }
    public static SolidColorBrush IndianRed { get; }
    public static SolidColorBrush Indigo { get; }
    public static SolidColorBrush Ivory { get; }
    public static SolidColorBrush Khaki { get; }
    public static SolidColorBrush Lavender { get; }
    public static SolidColorBrush LavenderBlush { get; }
    public static SolidColorBrush LawnGreen { get; }
    public static SolidColorBrush LemonChiffon { get; }
    public static SolidColorBrush LightBlue { get; }
    public static SolidColorBrush LightCoral { get; }
    public static SolidColorBrush LightCyan { get; }
    public static SolidColorBrush LightGoldenrodYellow { get; }
    public static SolidColorBrush LightGray { get; }
    public static SolidColorBrush LightGreen { get; }
    public static SolidColorBrush LightPink { get; }
    public static SolidColorBrush LightSalmon { get; }
    public static SolidColorBrush LightSeaGreen { get; }
    public static SolidColorBrush LightSkyBlue { get; }
    public static SolidColorBrush LightSlateGray { get; }
    public static SolidColorBrush LightSteelBlue { get; }
    public static SolidColorBrush LightYellow { get; }
    public static SolidColorBrush Lime { get; }
    public static SolidColorBrush LimeGreen { get; }
    public static SolidColorBrush Linen { get; }
    public static SolidColorBrush Magenta { get; }
    public static SolidColorBrush Maroon { get; }
    public static SolidColorBrush MediumAquamarine { get; }
    public static SolidColorBrush MediumBlue { get; }
    public static SolidColorBrush MediumOrchid { get; }
    public static SolidColorBrush MediumPurple { get; }
    public static SolidColorBrush MediumSeaGreen { get; }
    public static SolidColorBrush MediumSlateBlue { get; }
    public static SolidColorBrush MediumSpringGreen { get; }
    public static SolidColorBrush MediumTurquoise { get; }
    public static SolidColorBrush MediumVioletRed { get; }
    public static SolidColorBrush MidnightBlue { get; }
    public static SolidColorBrush MintCream { get; }
    public static SolidColorBrush MistyRose { get; }
    public static SolidColorBrush Moccasin { get; }
    public static SolidColorBrush NavajoWhite { get; }
    public static SolidColorBrush Navy { get; }
    public static SolidColorBrush OldLace { get; }
    public static SolidColorBrush Olive { get; }
    public static SolidColorBrush OliveDrab { get; }
    public static SolidColorBrush Orange { get; }
    public static SolidColorBrush OrangeRed { get; }
    public static SolidColorBrush Orchid { get; }
    public static SolidColorBrush PaleGoldenrod { get; }
    public static SolidColorBrush PaleGreen { get; }
    public static SolidColorBrush PaleTurquoise { get; }
    public static SolidColorBrush PaleVioletRed { get; }
    public static SolidColorBrush PapayaWhip { get; }
    public static SolidColorBrush PeachPuff { get; }
```

```
public static SolidColorBrush Peru { get; }
public static SolidColorBrush Pink { get; }
public static SolidColorBrush Plum { get; }
public static SolidColorBrush PowderBlue { get; }
public static SolidColorBrush Purple { get; }
public static SolidColorBrush Red { get; }
public static SolidColorBrush RosyBrown { get; }
public static SolidColorBrush RoyalBlue { get; }
public static SolidColorBrush SaddleBrown { get; }
public static SolidColorBrush Salmon { get; }
public static SolidColorBrush SandyBrown { get; }
public static SolidColorBrush SeaGreen { get; }
public static SolidColorBrush SeaShell { get; }
public static SolidColorBrush Sienna { get; }
public static SolidColorBrush Silver { get; }
public static SolidColorBrush SkyBlue { get; }
public static SolidColorBrush SlateBlue { get; }
public static SolidColorBrush SlateGray { get; }
public static SolidColorBrush Snow { get; }
public static SolidColorBrush SpringGreen { get; }
public static SolidColorBrush SteelBlue { get; }
public static SolidColorBrush Tan { get; }
public static SolidColorBrush Teal { get; }
public static SolidColorBrush Thistle { get; }
public static SolidColorBrush Tomato { get; }
public static SolidColorBrush Transparent { get; }
public static SolidColorBrush Turquoise { get; }
public static SolidColorBrush Violet { get; }
public static SolidColorBrush Wheat { get; }
public static SolidColorBrush White { get; }
public static SolidColorBrush WhiteSmoke { get; }
public static SolidColorBrush Yellow { get; }
public static SolidColorBrush YellowGreen { get; }
}
```

Gradients are drawn by specifying a set of gradient stops. These gradient stops specify the colors along some sort of progression. There are two types of gradients presently supported, namely linear and radial gradients. The gradient is drawn by doing interpolations between the gradient stops in the specified color space.

Gradients are composed of a list of gradient stops. Each of these gradient stops contains a color (with the included alpha value) and an offset. If there are no gradient stops specified, the brush is drawn as transparent (as if there were no brush specified). If there is only one gradient stop specified, the brush is drawn as a solid color with the one color specified. Any gradient stops with offsets in the range of zero to one (0.0 . . . 1.0) are considered, along with the largest stop in the range (−∞ . . . 0.0] and the smallest stop in the range [1.0 . . . +∞). If the set of stops being considered includes a stop which is outside of the range zero to one, an implicit stop is derived at zero (and/or one) which represents the interpolated color which would occur at this stop. Also, if two or more stops are set at the same offset, a hard transition (rather than interpolated) occurs at that offset. The order in which stops are added determines the behavior at this offset; the first stop to be added is the effective color before that offset, the last stop to be set is the effective color after this stop, and any additional stops at this offset are ignored.

This class is a Changeable like other resource classes:

```
public sealed class System.Windows.Media.GradientStop : Changeable
{
    public GradientStop( ); public GradientStop(Color color,
    double offset);
    public GradientStop(Color color, ColorAnimationCollection
    colorAnimations,
        double offset, DoubleAnimationCollection offsetAnimations);
    public new GradientStop Copy( ); // hides Changeable.Copy( )
    // Default is transparent
    [Animation("ColorAnimations")]
    public Color Color { get; set; }
    public ColorAnimationCollection ColorAnimations { get; set; }
    // Default is 0
    [Animation("OffsetAnimations")]
    public double Offset { get; set; }
    public DoubleAnimationCollection OffsetAnimations { get; set; }
}
```

Like SolidColorBrush, this has nested Changeables in the animation collections.

The GradientSpreadMethod enum specifies how the gradient should be drawn outside of the specified vector or space. There are three possible values, including Pad, in which the end colors (first and last) are used to fill the remaining space, Reflect, in which the stops are replayed in reverse order repeatedly to fill the space, and Repeat, in which the stops are repeated in order until the space is filled. The default value for properties of this type is Pad:

```
public enum System.Windows.Media.GradientSpreadMethod
{
    Pad,
    Reflect,
    Repeat
}
```

Figure 24:
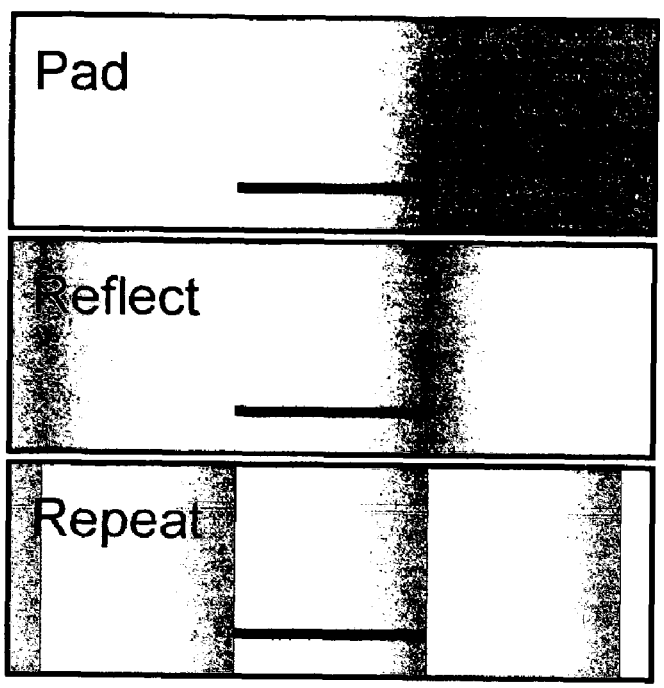
FIG. 24 is a representation of rendered graphics resulting from data in a linear gradient brush object, in accordance with an aspect of the present invention.

FIG. 24 provides some GradientSpreadMethod examples, (albeit in grayscale rather than in color). Each shape has a linear gradient going from white to grey. The solid line represents the gradient vector.

The ColorInterpolationMode enum defines the interpolation mode for colors within a gradient. The two options are PhysicallyLinearGamma and PerceptuallyLinearGamma.

```
public enum ColorInterpolationMode
{
    // Colors are interpolated in Gamma 1.0 space
    PhysicallyLinearGamma,
    // Colors are interpolated in Gamma 2.2 space
    PerceptuallyLinearGamma
}
```

This is an abstract base class.

```
public abstract class System.Windows.Media.GradientBrush : Brush
{
    internal GradientBrush( );
    public new GradientBrush Copy( ); // hides Changeable.Copy( )
    // Default is "PerceptuallyLinearGamma"
    public ColorInterpolationMode ColorInterpolationMode { get; set; }
    // Default is RelativeToBoundingBox
    public BrushMappingMode MappingMode { get; set; }
    // Default is Pad
    public GradientSpreadMethod SpreadMethod { get; set; }
    // Gradient Stops
    public void AddStop(Color color, double offset);
    public GradientStopCollection GradientStops { get; set; }
    // ColorInterpolationMode
    public ColorInterpolationMode ColorInterpolationMode { get; set; }
}
```

The LinearGradient specifies a linear gradient brush along a vector. The individual stops specify colors stops along that vector.

```
public sealed class System.Windows.Media.LinearGradient :
GradientBrush
{
    public LinearGradient( ); // initializes to transparent
    // Sets up a gradient with two colors and a gradient vector
    // specified to fill the object the gradient is applied to.
    // This implies RelativeToBoundingBox for the GradientUnits
    // property
    public LinearGradient(Color color1, Color color2, double angle);
    public LinearGradient(Color color1, Color color2,
           Point vectorStart, Point vectorEnd);
    public new LinearGradient Copy( ); // hides
    Changeable.Copy( )
    // Gradient Vector Start Point
    // Default is 0,0
    [Animation("StartPointAnimations")]
    public Point StartPoint { get; set; }
    public PointAnimationCollection StartPointAnimations { get; set; }
    // Default is 1,1
    [Animation("EndPointAnimations")]
    public Point EndPoint { get; set; }
    public PointAnimationCollection EndPointAnimations { get; set; }
}
```

The simple syntax for markup for LinearGradientBrush:

```
linear-gradient-brush:
    "HorizontalGradient" comma-wsp color comma-wsp color |
    "VerticalGradient" comma-wsp color comma-wsp color |
    "LinearGradient" comma-wsp coordinate-pair comma-wsp color comma-wsp color
```

The markup for LinearGradient allows specification of a LinearGradient with two color stops, at offsets zero and one. If the "LinearGradient" version is used, the start point and end point are specified, respectively. If "HorizontalGradient" is used, the start point is set to 0,0 and the end point is set to 1,0. If "VerticalGradient" is used, the start point is set to 0,0 and the end point is set to 0,1. In these cases, the default MappingMode is used, which is RelativeToBoundingBox.

Figure 25:
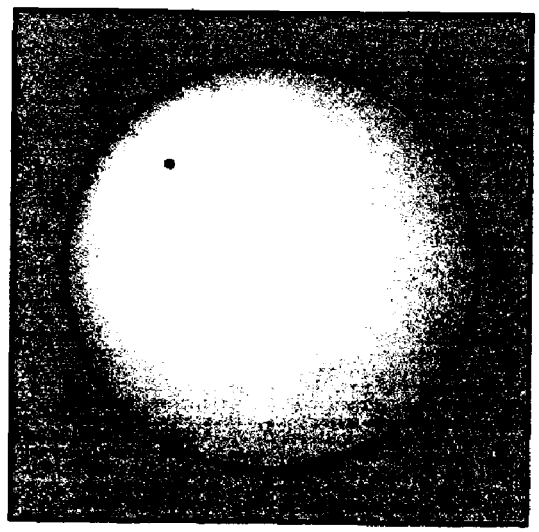
FIG. 25 is a representation of rendered graphics resulting from data in a radial gradient brush object, in accordance with an aspect of the present invention.

The RadialGradient is similar in programming model to the linear gradient. However, whereas the linear gradient has a start and end point to define the gradient vector, the radial gradient has a circle along with a focal point to define the gradient behavior. The circle defines the end point of the gradient—in other words, a gradient stop at 1.0 defines the color at the circle's circumference. The focal point defines center of the gradient. A gradient stop at 0.0 defines the color at the focal point. FIG. 25 represents a RadialGradient that (in grayscale) goes from white to grey. The outside circle represents the gradient circle while the solid dot denotes the focal point. This gradient has SpreadMethod set to Pad.

```
public sealed class System.Windows.Media.RadialGradient :
GradientBrush
{
    public RadialGradient( ); // initialize to transparent
    // Sets up a gradient with two colors.
    // This implies RelativeToBoundingBox for the GradientUnits
    // property along with a center at (0.5,0.5)
    // a radius of 0.5 and a focal point at (0.5,0.5)
    public RadialGradient(Color color1, Color color2);
```

```
-continued public new RadialGradient Copy( ); // hides Changeable.Copy( )
    // Default is 0.5,0.5
    [Animation("CenterAnimations")]
    public Point Center { get; set; }
    public PointAnimationCollection CenterAnimations { get; set; }
    // Default is 0.5
    [Animation("RadiusXAnimations")]
    public double RadiusX { get; set;}
    public DoubleAnimationCollection RadiusXAnimations { get; set; }
    // Default is 0.5
    [Animation("RadiusYAnimations")]
    public double RadiusY { get; set; }
    public DoubleAnimationCollection RadiusYAnimations
    { get; set; }
    // Default is 0.5,0.5
    [Animation("FocusAnimations")]
    public Point Focus { get; set; }
    public PointAnimationCollection FocusAnimations { get; set; }
}
```

The markup for RadialGradient allows specification of a RadialGradient with two color stops, at offsets 0 and 1 respectively. The default MappingMode is used, which is RelativeToBoundingBox, as are the default radii, 0.5:

```
radial-gradient-brush:
    "RadialGradient" comma-wsp color comma-wsp color
```

The TileBrush is an abstract base class which contains logic to describe a tile and a means by which that tile should fill an area. Subclasses of TileBrush contain content, and logically define a way to fill an infinite plane.

The Stretch enum is used to describe how a ViewBox (source coordinate space) is mapped to a ViewPort (destination coordinate space). This is used in TileBrush:

```
public enum System.Windows.Stretch
{
    // Preserve original size
    None,
    // Aspect ratio is not preserved, ViewBox fills ViewPort
    Fill,
    // Aspect ratio is preserved, VewBox is uniformly scaled as large as
    // possible such that both width and height fit within ViewPort
    Uniform,
    // Aspect ratio is preserved, VewBox is uniformly scaled as small as
    // possible such that the entire ViewPort is filled by the ViewBox
    UniformToFill
}
```

Figure 26:
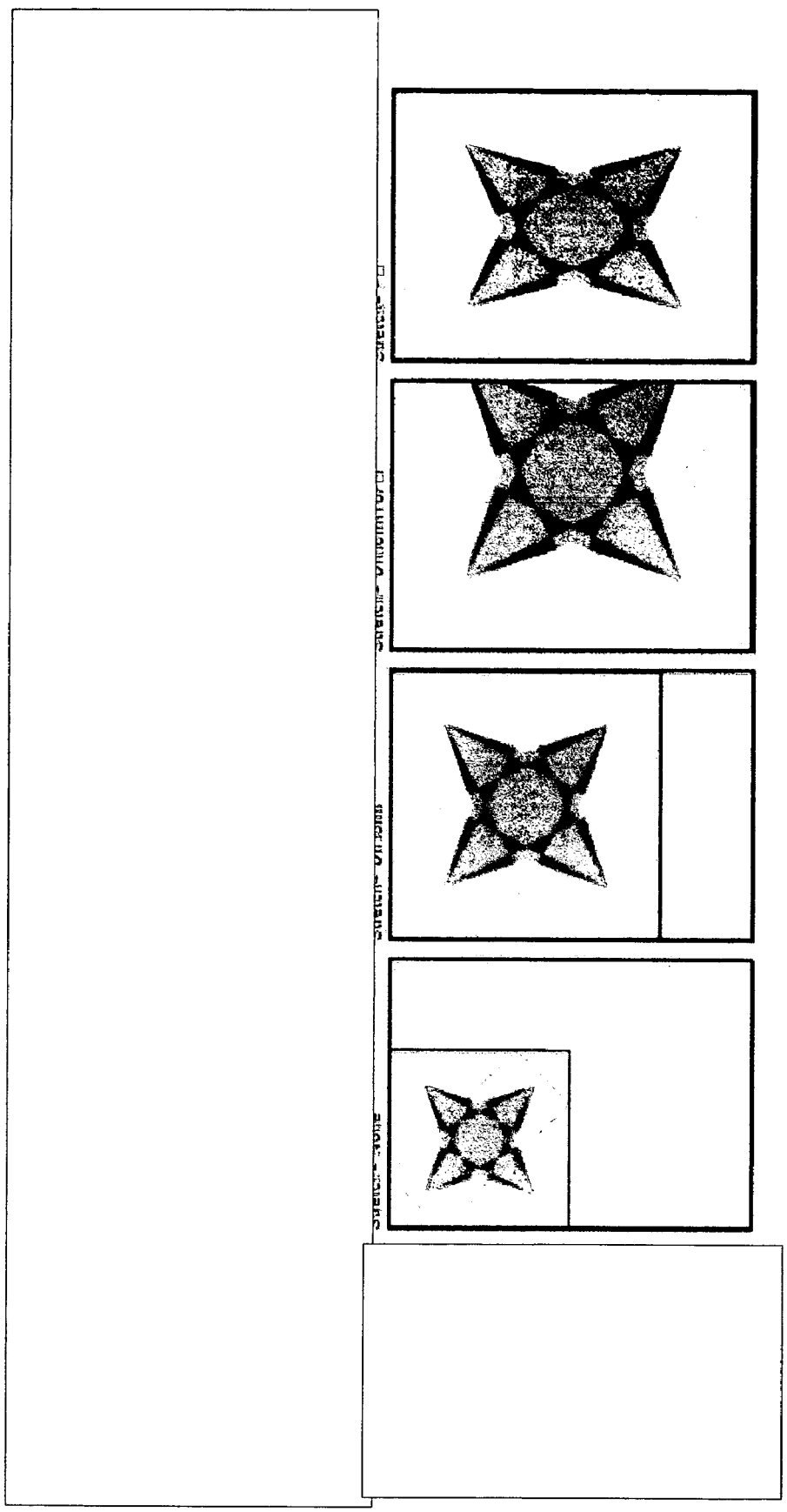
FIG. 26 is a representation of rendered graphics resulting from having various stretch values, in accordance with an aspect of the present invention.

FIG. 26 provides stretch examples. In these examples, the contents are top/left aligned.

The TileMode enum is used to describe if and how a space is filled by Tiles. A TileBrush defines where the base Tile is (specified by the ViewPort). The rest of the space is filled based on the TileMode value.

```
public enum System.Windows.Media.TileMode
{
    // Do not tile - only the base tile is drawn, the remaining area is
    // left as transparent
    None,
    // The basic tile mode - the base tile is drawn and the remaining area
    // is filled by repeating the base tile such that the right edge of one
    // tile butts the left edge of the next, and similarly for bottom and top
    Tile,
    // The same as tile, but alternate columns of tiles are flipped
    // horizontally. The base tile is drawn untransformed.
    FlipX,
    // The same as tile, but alternate rows of tiles are flipped vertically
    // The base tile is drawn untransformed.
    FlipY,
    // The combination of FlipX and FlipY. The base tile is drawn
    // untransformed
    FlipXY
}
```

Figure 27:
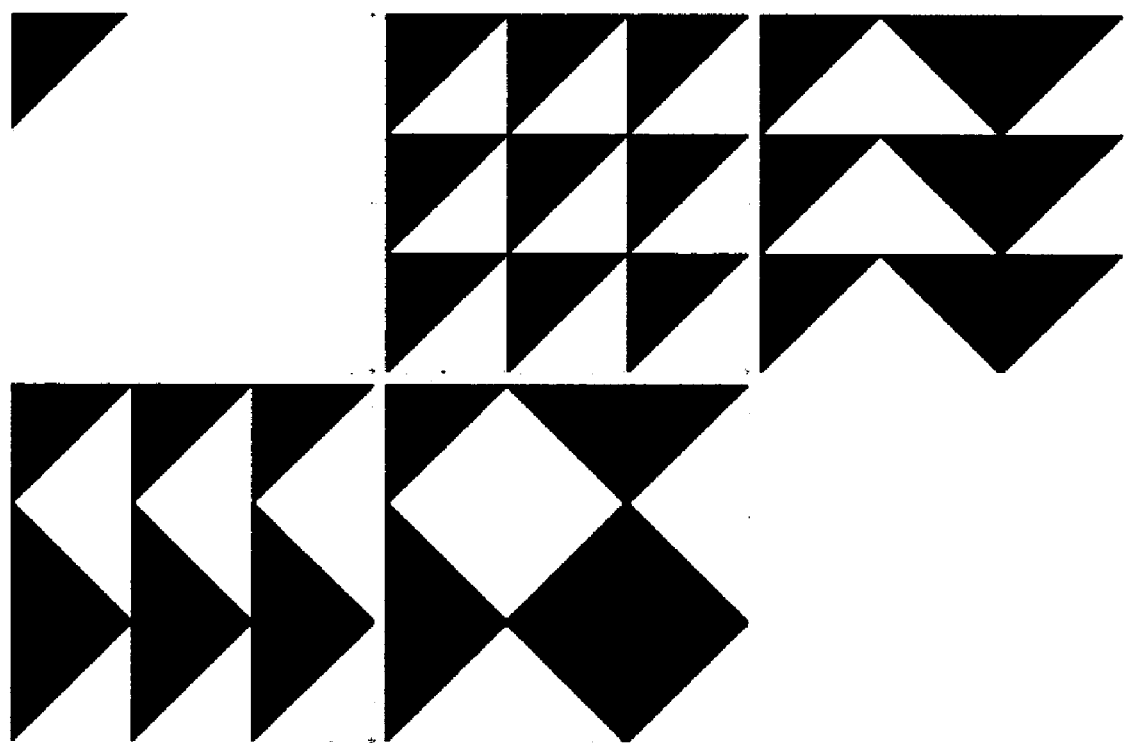
FIG. 27 is a representation of rendered graphics resulting from having various tile values, in accordance with an aspect of the present invention.

FIG. 27 provides TileMode examples. The top left-most tile in each example is the base tile. These examples represent None, Tile, FlipX, FlipY and FlipXY.

The VerticalAlignment enum is used to describe how content is positioned within a container vertically:

```
public enum System.Windows.VerticalAlignment
{
    // Align contents towards the top of a space
    Top,
    // Center contents vertically
    Center,
    // Align contents towards the bottom of a space
    Bottom,
}
```

The HorizontalAlignment enum is used to describe how content is positioned within a container horizontally.

```
public enum System.Windows.HorizontalAlignment
{
    // Align contents towards the left of a space
    Left,
    // Center contents horizontally
    Center,
    // Align contents towards the right of a space
    Right,
}
```

The TileBrush properties select a rectangular portion of the infinite plane to be a tile (the ViewBox) and describe a destination rectangle (ViewPort) which will be the base Tile in the area being filled. The remaining destination area will be filled based on the TileMode property, which controls if and how the original tile is replicated to fill the remaining space:

```
public abstract class System.Windows.Media.TileBrush : Brush
{
    public new TileBrush Copy( ); // hides Brush.Copy( )
    // Default is RelativeToBoundingBox
    public BrushMappingMode ViewPortUnits { get; set; }
    // Default is RelativeToBoundingBox
    public BrushMappingMode ContentUnits { get; set; }
    // Default is Rect.Empty
    [Animation("ViewBoxAnimations")]
    public Rect ViewBox { get; set; }
    public RectAnimationCollection ViewBoxAnimations { get; set; }
    // Default is Fill
    public Stretch Stretch { get; set; }
    // Default is None
    public TileMode TileMode { get; set; }
    // Default is Center
    public HorizontalAlignment HorizontalAlignment { get; set; }
    // Default is Center
    public VerticalAlignment VerticalAlignment { get; set; }
    // Default is 0,0,1,1
    [Animation("ViewPortAnimations")]
    public Rect ViewPort { get; set; }
    public RectAnimationCollection ViewPortAnimations { get; set; }
}
```

A TileBrush's contents have no intrinsic bounds, and effectively describe an infinite plane. These contents exist in their own coordinate space, and the space which is being filled by the TileBrush is the local coordinate space at the time of application. The content space is mapped into the local space based on the ViewBox, ViewPort, Alignments and Stretch properties. The ViewBox is specified in content space, and this rectangle is mapped into the ViewPort rectangle.

The ViewPort defines the location where the contents will eventually be drawn, creating the base tile for this Brush. If the value of ViewPortUnits is Absolute, the value of ViewPort is considered to be in local space at the time of application. If, instead, the value of ViewPortUnits is RelativeToBoundingBox, then the value of ViewPort is considered to be in the coordinate space where 0,0 is the top/left corner of the bounding box of the object being painted and 1,1 is the bottom/right corner of the same box. For example, consider a RectangleGeometry being filled which is drawn from 100,100 to 200, 200. Then, if the ViewPortUnits is Absolute, a ViewPort of (100,100,100,100) would describe the entire content area. If the ViewPortUnits is RelativeToBoundingBox, a ViewPort of (0,0,1,1) would describe the entire content area. If the ViewPort's Size is empty and the Stretch is not None, this Brush renders nothing.

The ViewBox is specified in content space. This rectangle is transformed to fit within the ViewPort as determined by the Alignment properties and the Stretch property. If the Stretch is None, then no scaling is applied to the contents. If the Stretch is Fill, then the ViewBox is scaled independently in both X and Y to be the same size as the ViewPort. If the Stretch is Uniform or UniformToFill, the logic is similar but the X and Y dimensions are scaled uniformly, preserving the aspect ratio of the contents. If the Stretch is Uniform, the ViewBox is scaled to have the more constrained dimension equal to the ViewPort's size. If the Stretch is UniformToFill, the ViewBox is scaled to have the less constrained dimension equal to the ViewPort's size. Another way to think of this is that both Uniform and UniformToFill preserve aspect ratio, but Uniform ensures that the entire ViewBox is within the ViewPort (potentially leaving portions of the ViewPort uncovered by the ViewBox), and UniformToFill ensures that the entire ViewPort is filled by the ViewBox (potentially causing portions of the ViewBox to be outside the ViewPort). If the ViewBox's area is empty, then no Stretch will apply. Alignment will still occur, and it will position the "point" ViewBox.

Once the ViewPort is determined (based on ViewPortUnits) and the ViewBox's destination size is determined (based on Stretch), the ViewBox needs to be positioned within the ViewPort. If the ViewBox is the same size as the ViewPort (if Stretch is Fill, or if it just happens to occur with one of the other three Stretch values), then the ViewBox is positioned at the Origin so as to be identical to the ViewPort. If not, then HorizontalAlignment and VerticalAlignment are considered. Based on these properties, the ViewBox is aligned in both X and Y dimensions. If the HorizontalAlignment is Left, then the left edge of the ViewBox will be positioned at the Left edge of the ViewPort. If it is Center, then the center of the ViewBox will be positioned at the center of the ViewPort, and if Right, then the right edges will meet. The process is repeated for the Y dimension.

If the ViewBox is Empty it is considered unset. If it is unset, then ContentUnits are considered. If the ContentUnits are Absolute, no scaling or offset occurs, and the contents are drawn into the ViewPort with no transform. If the ContentUnits are RelativeToBoundingBox, then the content origin is aligned with the ViewPort Origin, and the contents are scaled by the object's bounding box's width and height.

When filling a space with a TileBrush, the contents are mapped into the ViewPort as above, and clipped to the ViewPort. This forms the base tile for the fill, and the remainder of the space is filled based on the Brush's TileMode. If set, the Brush's transform is applied, which occurs after the other mapping, scaling, offsetting, and so forth.

A VisualBrush is a TileBrush whose contents are specified by a Visual. This Brush can be used to create complex patterns, or it can be used to draw additional copies of the contents of other parts of the scene.

```
public sealed class System.Windows.Media.VisualBrush : TileBrush
{
    public VisualBrush( ); // initializes to transparent
    public VisualBrush(Visual v);
    public new VisualBrush Copy( ); // hides TileBrush.Copy( )
    // Visual - Default is null (transparent Brush)
    public Visual Visual { get; set; }
}
```

As mentioned, a VisualBrush has no simple syntax for markup, though it can be described via complex syntax.

A DrawingBrush is a TileBrush whose contents are specified by a Drawing. This Brush can be used to create complex patterns which have been created via a DrawingContext.

```
public sealed class System.Windows.Media.DrawingBrush : TileBrush
{
    public DrawingBrush( ); // initializes to transparent
    public DrawingBrush(Drawing drawing);
    public new DrawingBrush Copy( ); // hides TileBrush.Copy( )
    // Drawing - Default is null (transparent Brush)
    public Drawing Drawing { get; set; }
}
```

As mentioned, a DrawingBrush has no simple syntax for markup, though it can be described via complex syntax.

ImageBrush is a TileBrush having contents specified by an ImageSource. This Brush can be used to fill a space with an image.

```
public sealed class System.Windows.Media.ImageBrush : TileBrush
{
    public ImageBrush( ); // Initializes to transparent contents
    // Sets the image, sets ViewBox to (0,0,Width,Height)
```

```
-continued

// and Stretch to Fill
    public ImageBrush(ImageData image);
    public new ImageBrush Copy( ); // hides TileBrush.Copy( )
    // Default is null
    public ImageSource ImageSource { get; set; }
    // Default is true
    // If this is true, the ViewBox property will be overridden
    // and effectively set to the native size of the Image
    public bool SizeViewBoxToContent { get; set; }
}
```

The simple syntax for markup for ImageBrush:

```
image-brush:
    "Image" image-uri
```

VideoBrush is a TileBrush having contents specified by a VideoData. This Brush can be used to fill a space with a Video.

```
public sealed class System.Windows.Media.VideoBrush : TileBrush
{
    public VideoBrush( ); // Initializes to transparent contents
    // Sets the image, sets ViewBox to (0,0,Width,Height) and the
    // Stretch to Fill
    public VideoBrush(VideoData video);
    public new VideoBrush Copy( ); //hides TileBrush.Copy( )
    // Default is null
    public VideoData VideoData { get; set; }
    // Default is true
    // If this is true, the ViewBox property will be overridden
    // and effectively set to the native size of the Video
    public bool SizeViewBoxToContent { get; set; }
}
```

The simple syntax for markup for VideoBrush:

```
video-brush:
    "Video" video-uri
```

Figure 28:
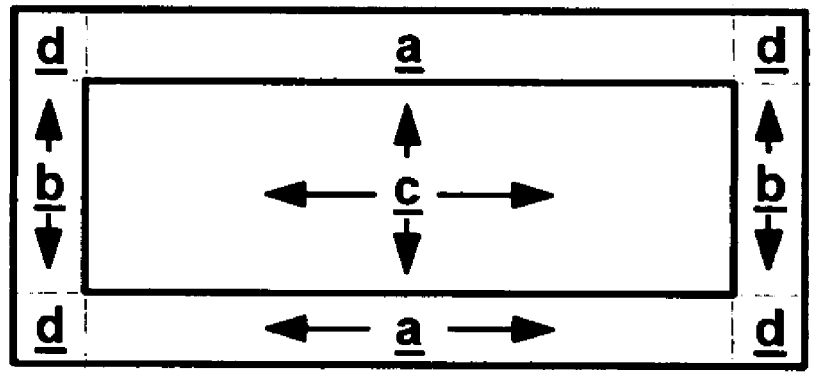
FIG. 28 is a representation of a rendered nine grid brush object in accordance with an aspect of the present invention.
Figure 28:
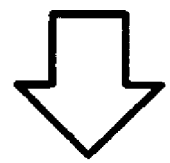
Figure 28:
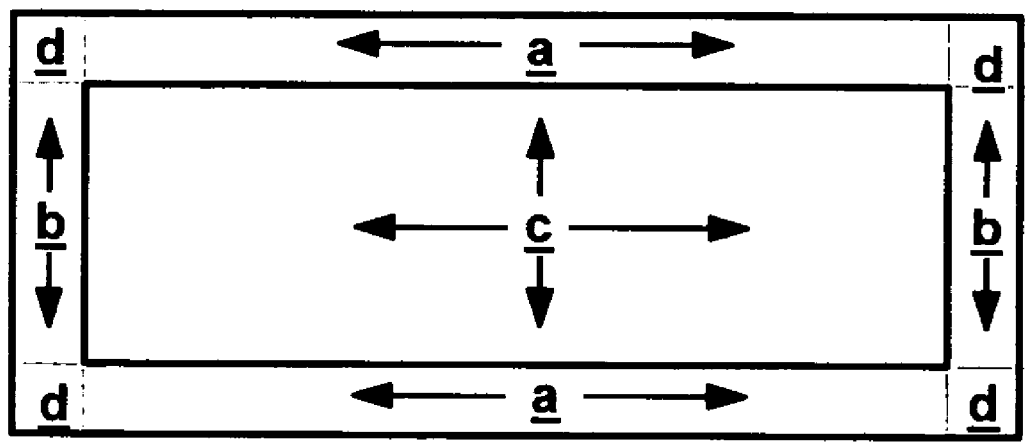

NineGridBrush is a Brush which always fills the object bounding box with its content image, and the image stretch isn't accomplished purely via a visual scale. The image source is divided into nine rectangles by four borders (hence the name NineGrid). The contents of the image in each of those nine regions are scaled in 0, 1 or 2 dimensions until they fill the object bounding box. The dimensions in which each section is scaled can be seen in this diagram: FIG. 28 represents the concept of a NineGrid, showing the nine grids which are defined by the Top, Left, Bottom and Right borders. The arrows in each grid square show the dimension(s) in which those contents will be stretched to meet the ViewPort size.

In addition to the nine grid regions pictured above, there is an optional "tenth" grid. This takes the form of an additional image which is centered in the ViewPort and which is not scaled. This can be used to place a shape in the center of a button, etc. This "tenth grid" is called a glyph, and is exposed by the GlyphImageSource property:

```
public sealed class System.Windows.Media.NineGridBrush : Brush
{
    public NineGridBrush(ImageSource imageSource,
        int LeftBorder,
        int RightBorder,
        int TopBorder,
        int BottomBorder);
    public NineGridBrush(ImageSource imageSource,
        int LeftBorder,
        int RightBorder,
        int TopBorder,
        int BottomBorder,
        ImageSource glyphImage);
    public new NineGridBrush Copy( ); // hides Brush.Copy( )
    // Default is null
    public ImageSource ImageSource { get; set; }
    // Default is 0
    public int LeftBorder { get; set; }
    // Default is 0
    public int RightBorder { get; set; }
    // Default is 0
    public int TopBorder { get; set; }
    // Default is 0
    public int BottomBorder { get; set; }
    // Default is null
    public ImageSource GlyphImageSource{ get; set; }
}
```

Note that the border members count in from the edge of the image in image pixels The simple syntax for markup for NineGridBrush:

```
nine-grid-brush:
    "NineGrid" image-uri int int int int [glyph-image-uri]
```

The four integers are the values for LeftBorder, RightBorder, TopBorder and BottomBorder respectively. The final URI for the tenth-grid, or glyph, is optional.

The Pen is an object that takes a Brush and other parameters that describe how to stroke a space/Geometry. Conceptually, a Pen describes how to create a stroke area from a Geometry. A new region is created which is based on the edges of the Geometry, the Pen's Thickness, the PenLineJoin, PenLineCap, and so forth. Once this region is created, it is filled with the Brush.

```
public sealed class System.Windows.Media.Pen : Changeable
{
    // Constructors
    Public Pen( );
    public Pen(Brush brush, double thickness);
    public new Pen Copy( ); // hides Changeable.Copy( )
    // Properties
    // Default is DashArrays.Solid (no dashes)
    public DoubleCollection DashArray { get; set;}
    // Default is 0
    [Animations(DashOffsetAnimations)]
    public double DashOffset { get; set;}
    public DoubleAnimationCollection DashOffsetAnimations { get; set;}
    // Default is Flat
    public PenLineCap StartLineCap { get; set;}
    // Default is Flat
    public PenLineCap EndLineCap { get; set;}
    // Default is Flat
    public PenDashCap DashCap { get; set;}
    // Default is Miter
    public PenLineJoin LineJoin { get; set;}
    // Default is 10
```

-continued

```
    public double MiterLimit { get; set;}
    // Default is null
    public Brush Brush { get; set;}
    // Default is 1.0
    [Animations(ThicknessAnimations)]
    public double Thickness { get; set;}
    public DoubleAnimationCollection ThicknessAnimations { get; set;}
}
```

The PenLineCap determines how the ends of a stroked line are drawn:

```
public enum System.Windows.Media.PenLineCap
{
    // This is effectively no line cap - the line is squared off
    // at the last point in the line
    Flat,
    // The line is capped by a hemi-circle of diameter equal to
    // the line width
    Round,
    // The dash is capped by a triangle
    Triangle,
    // The line is capped with a square of side with equal to the
    // line width, centered on the end point
    Square
}
```

The PenDashCap determines how the ends of each dash in a dashed, stroked line are drawn:

```
public enum System.Windows.Media.PenDashCap
{
    // This is effectively no dash cap - the line is squared off
    // at the last point in the line
    Flat,
    // The dash is capped by a hemi-circle of diameter equal to
    // the line width
    Round,
    // The dash is capped by a triangle
    Triangle
}
```

The PenLineJoin determines how joints are draw when stroking a line:

```
public enum System.Windows.Media.PenLineJoin
{
    // A sharp corner is created at the intersection of the outer
    // edges of the intersecting line segments
    Miter,
    // Similar to Miter, but the corner is rounded
    Round,
    // A beveled join, this produces a diagonal corner
    Bevel
}
```

The DashArrays class comprises static properties which provide access to common, well-known dash styles:

```
public sealed System.Windows.Media.DashArrays
{
    // A solid Dash array (no dashes)
    public static DoubleCollection Solid { get; }
```

-continued

```
        // Dash - 3 on, 1 off
        public static DoubleCollection Dash { get; }
        // Dot - 1 on, 1 off
        public static DoubleCollection Dot { get; }
        // DashDot - 3 on, 1 off, 1 on, 1 off
        public static DoubleCollection DashDot { get; }
        // DashDotDot - 3 on, 1 off, 1 on, 1 off, 1 on, 1 off
        public static DoubleCollection DashDotDot { get; }
}
```

Color

The color architecture is built upon some general principles, including that Color requires a context; therefore color values will have an explicitly assigned context or an implicitly assumed default to minimize color mismatches in workflows. Further, core platform design requires minimal code paths and APIs with long life spans for security, reliability, maintainability, future expansion and performance; therefore the rendering core may be limited to primarily an scRGB code path to which incoming content streams will be converted to and outgoing streams will be converted from (an additional sRGB legacy path that will have lower quality is also allowed). Note that "scRGB" refers to the internal vector graphics default representation, based upon the IEC 61966-2-2 international standard; (although no official definition has been provided for what "sc" means, "standard compositing" will be used herein to help clarify that this is the optimum space for composition processing).

Performance requires that complex processing be performed as close to the color object definition/specifications stage as possible, rather than at the real time rendering stage; this requires that color parameters to APIs be converted to scRGB (essentially immediately) upon specification and that scRGB color values be maintained and synchronized for non-scRGB defined objects. Ease of use requires a layered API in which the most common developer cases are exposed first, while the most advanced case have clean, but minimal APIs; therefore sRGB APIs are provided (but immediately converted to scRGB internally), scRGB APIs are provided, and a minimal context associated API is provided to support advanced CMYK (Cyan-Magenta-Yellow-Black), monochrome, human visual system and multichannel solutions. Since scRGB is essentially an "infinite" color gamut, additional device characterization and gamut mapping solutions are required to "hook" scRGB workflows with real world devices.

Color is a psychological perception most often typically caused by an external physical sensation. This means that computer-based color requires a physical context in order to effectively communicate the perceived colors across devices and between users. Historically various technologies have been inconsistent in providing reasonable contextual meaning for color architectural implementations, e.g., this resulted in "red" meaning "orange" for one device or user and "pink" for another, with little viable methods to resolve the mismatch.

The present architecture provides a combination of implicit (using defaults) and explicit color contexts for any color object. This means that there will be no color object without contextual meaning. This is an imperfect technology, and thus an aspect of the architecture is to provide consistent color contexts in a manner that can be evolved as technology progresses. Note that most computer users (and most developers) do not want to deal with color management, and prefer that color should simply work correctly.

In general, the architecture attempts to minimize internal code paths, which is accomplished to an extent by enabling two basic code paths internally, one for quality and the future hardware, and the other for legacy and memory/performance constraints. The MIL core internal rendering and composition engine supports 32 bpp sRGB and 128 bpp floating point scRGB (although 64 bpp scRGB is also under consideration and, some instances of 64 bpp support are best implemented with fixed point, some with float and some with integer).

The architecture provides 128 bpp scRGB path from capture to display to editing to storage to print (the display will be 128 bpp back buffer and 10 bpc or more front buffer), and allows legacy 32 bpp sRGB path that sacrifices quality for performance, memory, and/or bandwidth.

Color management of the present invention improves on prior drawbacks by providing devices and applications with additional flexibility and provides a profile-based color management solution. The most common scenarios are based on scRGB and sRGB color objects to support getting and setting the color values for common UI elements, and supports most content creation for the web, multimedia and computer graphics. Less common scenarios include using RGB color contexts with specific working space profiles for professional photography workflows, using CMYK color values to edit color object for prepress and graphics design work, and monochrome and multichannel color workflows, which support niche printing and press scenarios as well as provide the flexibility to support future workflows that have not been defined. HVSV (human visual system-based spaces) workflows support some niche professional photography editing scenarios.

To match capture sensor technology, which continues to progress in quality and bit depth, imaging will support at least the 64 bpp formats for every feature/API in order to support contemporary digital negative initiatives. As the present invention implements a new architecture for vector graphics, vector graphics will be implemented in 32 bit floating point per channel bit precision. This implementation is actually "hidden" in order to provide traditional 8 bpc color access as well as grayscale and HSV interfaces.

Another type of color data is named color data, such as "CornflowerBlue" or "Pantone" colors. By providing a color context that is based upon extending traditional color management profiles, a very generic and powerful color naming interface is provided. To maintain some legacy compatibility with previous APIs and common practice, the default constructors will be biased towards sRGB input.

Color space support for vector graphics is divided into native scRGB support, property support for sRGB and similar spaces that require no explicit color context, method support for color spaces closely related to sRGB or scRGB such as HSV (hue, saturation and value) that also require no explicitly associated color context, named colors and related color spaces such as palette and indexed color spaces that are based on either the implicitly or the explicitly associated color context, and color spaces that require additional color channels as well as explicitly associated color contexts, such as CMYK, hi-fi color (CMYK plus orange and green), CcMmYK inkjet color spaces and potentially spectral color support in the future.

While these color spaces are converted to scRGB or sRGB for rending in the MIL core or compositing engine, they can be stored or sent to printers (such as CMYK) using the vector graphic markup language as a program design language. The color markup syntax includes four basic specification mechanisms: hexadecimal, known colors, sRGB properties and advanced color context. The first three assume an sRGB color space color context.

The example below creates a gradient using these four mechanisms:

```
Example:
<Canvas Width="100px" Height="100px"
Background="Vertical Gradient #ee7711 CornFlowerBlue"
xmlns="using:System.Windows;System.Windows.Controls;System.Windows.Documents;
System.Windows.Shapes;System.Windows.Media;System.Windows.Presenters">
    <Rectangle Top="12.5%" Left="0" Width="100%" Height="12.5%">
        <Rectangle.Fill>
            <RadialGradient>
                <GradientStop Offset="0" Color="sGray.icc 0.5"/>
                <GradientStop Offset="0.5">
                    <GradientStop.Color>
                        <Color A="0.8" R="0.2" G="1" B="0.2"/>
                    </GradientStop.Color>
                </GradientStop>
                <GradientStop Offset="1" Color="mswopintent8.icm 0.9 0.2 0.1 0.3"/>
            </RadialGradient>
        </Rectangle.Fill>
    </Rectangle>
</Canvas>
```

The first background color is specified as hexadecimal (#ee7711). This hexadecimal representation is identical to how NET framework V1 and WinForms specified colors. It is flexible to allow four different variations; #RGB, #ARGB, #RRGBBB, or #AARRGGBB.

The second background color is specified as a known color (CornFlowerBlue). This representation is identical to how .NET framework V1 and WinForms specified colors. It is based upon named color values. The named color solutions will enable Pantone, Trumatch and other named colors to be supported with color contexts. This will also support alpha channel settings.

A first gradient stop is specified using a color context ("sGray.icc 0.5"). The text string specifies the color context file name, which may be a URL or URI. This sample is to illustrate clean support for monochrome printing without requiring RGB values to be translated first into monochrome values at print rendering time.

The second gradient stop is specified using sRGB properties (A="0.8" R="0.2" G="1" B="0.2"). This representation is identical to how .NET framework V1 and WinForms specified colors.

The third gradient stop is using a color context (="mswopintent8.icm 0.9 0.2 0.1 0.3"). The text string specifies the color context file name, which may be a URL or URI, and may support alpha channel settings. This sample shows CMYK support, such as required for Publisher and other such applications.

Taken together, these examples provide a very robust and clean syntax to support color requirements. Note that a color context may be globally specified and internal color references required to conform to this global context, e.g., for performance optimization.

As described above, a color context is required for color objects, whether they are vector or raster based. At a coarse level, a color context can be thought of as a profile, providing a relationship between the color space of the color object and the human visual system. The color context provides the information on the relationship between the user color space and the scRGB color space (or human visual system color). This allows for "round-tripping" CMYK and other color information that has not been previously feasible in an effective manner.

In practice today, there exist literally hundreds of different color spaces such as sRGB, scRGB, AdobeRGB, BruceRGB, AppleRGB, TomRGB, CorbisRGB, JoeRGB, HSV, HSB, XYZ, LAB, LUV, YUV, YCC, CMYK, CcMmYK, CMYKOG, lightness grayscale, luminance grayscale and many, many others. Many of these individual color spaces can be broken down into classes of color spaces such as RGB spaces that are primarily defined by three channels containing approximates to the visual perception of red, green and blue with defining semantics including gamma, primaries, white point and bit precision. Bit precision is necessary since lower bit precisions (such as 8 bits per channel) typically require extensive, nonlinear compensations to achieve reasonable encoding efficiencies.

Providing a color context class reduces the set of possible color space classes to a much smaller set, such as grayscale, RGB, HSV, CMYK, LAB, LCH, CcMmYK, CMYKOG, spectral colors and special effects spaces such as duotone, tritone and quadtone spaces used for artistic effects. A further reduction is possible by combining spaces which share the same underlying meaning but provide different coordinate systems (similar to rectilinear and polar geometries). This would make HSV a method on top of the RGB color space class and LCH a method on top of the LAB color space class.

It is also possible to combine special effects color spaces with spectral color and include support for CcMmYK and CMYKOG and have the color value in just this context be a dynamic array since only advanced users will use this feature. A further reduction is possible to reduce the color spaces to scRGB, which will support sRGB and other RGB spaces, and a multichannel color space with a color context. This leaves a reasonable number of basic color space classes to support, including just scRGB and multi-channel spaces.

The ColorContext is associated with either a vector graphics Color class or an ImageData object. Another alternative is to limit Visuals to a single ColorContext. This would help optimize the amount of color conversions and validations in many circumstances, and may be more natural for application developers, e.g., an individual control is not likely to use colors from multiple color systems. Note that the color profile is still allowed to be changed for advanced applications that explicitly use multiple color types via a mechanism that allows dynamic changes. A ColorContext also allows for the rendering intent or color gamut mapping between two device gamuts to be specified and thus associated with the color object. Since the ColorContext only deals with a single color object, the destination gamut can be a virtual device. This allows the ColorContext to contain both the objective description of the color space as well as the subjective rendering intent for the color.

Color names are simple lookup tables embedded in the profile that is associated with the color context that provide a link between a color value based on the type of ColorContext and the actual color name. This allows different color naming dictionaries for each color object. For example, it is possible to associate one type of naming system, such as Trumatch with process color objects and another type of naming system, such as Pantone with spot color objects.

The public vector graphics Color type matches the lower level system to optimize performance by minimizing conversions when transmitting data to that lower level system. A separate "native" (i.e. CMYK or such) set of floating point values is stored in the color context and is synchronized when any changes occur. The native ColorContext colorValue is a value type (structure) based on an array of floats in order to transparently support grayscale, RGB and even CMYK color spaces. The native ColorContext ColorValue array should be dynamic and not limited to 1, 3, 4 or even 8 color channels. This allows for spectral or abridged spectral color process solutions with this same architecture. Note that while the cost of the allocation is fairly significant relative to the cost of a five-element array that is sometimes only partially used, this insures a consistent, coherent, and flexible solution for the future, and there is no cost is null when scRGB workflows are used. The Alpha value is separate from the ColorContext ColorValue, because it is a different concept and is treated differently in most uses.

Note that obtaining the color value of system color UI objects may be dependent on other context, as are other more advanced types of theming, and should be collected with other system metrics with the application model/theming APIs.

| Name | Return Type | Description | Other Info |
|---|---|---|---|
| R | byte | The red sRGB value of red scRGB component of the current color | R/W |
| G | byte | The green sRGB value of red scRGB component of the current color | R/W |
| B | byte | The blue sRGB value of red scRGB component of the current color | R/W |
| A | byte | The alpha sRGB value of red scRGB component of the current color | R/W |
| ScR | float | The red scRGB value of red scRGB component of the current color | R/W |
| ScG | float | The green scRGB value of red scRGB component of the current color | R/W |
| ScB | float | The blue scRGB value of red scRGB component of the current color | R/W |
| ScA | float | The alpha scRGB value of red scRGB component of the current color | R/W |

Note that scRGB values can range below 0.0 and above 1.0 to support extended dynamic ranges and gamuts.

Operator overrides for Color objects are context specific, because mixing and adding colors is color space dependent. For example, luminance RGB spaces are additive and linear, so typical mathematical operations are fairly intuitive, but lightness RGB spaces as well as CMYK spaces are not both

| Name | Type | Description | Other Info |
|---|---|---|---|
| InternalColor | Float Red, Float Green, Float Blue, Float Alpha | Identical structure to internal rendering color structure to optimize performance | Internal struct, this second internal struct is used to support efficient marshaling of data. |
| context | ColorContext | Color context providing methods relating to using color context information | Carries native color values that are synchronized to InternalColor values |

| Name | Arguments | Description | Other Info |
|---|---|---|---|
| FromProfile(...) | String | ICC or other profile filename-based constructor | Public static |
| FromProfileAndRenderingIntent(...) | String, String | ICC or other profile filename-based constructor | Public static |
| FromAValues(...) | Float, float[ ], filename | General constructor based on alpha channel value, array of floating point values and an ICC or other profile filename | Public static |
| FromValues(...) | Float[ ], filename | Same as FromAValues(...) but alpha is assumed to be 1.0f | Public static |
| FromARGB(...) | byte, byte, byte, byte | Legacy sRGB constructor based on alpha, red, green and blue sRGB values | Public static, sRGB values are internally converted to scRGB for processing |
| FromRGB(...) | byte, byte, byte | Legacy sRGB constructor based on red, green and blue sRGB values (alpha is assumed to be 1.0f) | Public static, sRGB values are internally converted to scRGB for processing |
| FromScRGB(...) | Float, float, float, float | scRGB constructor based on alpha, red, green and blue scRGB values | Public static | linear and additive, whereby this operations result in different visual effects. Additionally, most Color operations can result in values beyond the desired gamut and thus requires gamut mapping compensation. This can be as simple as low quality clamping or it can be significantly more sophisticated.

Some animation operator overloads can be provided if they are limited specifically to the scRGB ColorContext since scRGB is based on physical light and mixes linearly and additively. CMYK, sRGB and other color spaces have very different mixing models.

| Name | Return Type | Arguments | Description | Other Info |
|---|---|---|---|---|
| + | Color | Color, Color | Context dependent color addition | RGB context is linear wrt luminance (how photons mix) which is correct for scRGB and computer graphics |
| Add | Color | Color, Color | Context dependent color addition | Public |
| − | Color | Color, Color | Context dependent color subtraction | Public |
| Subtract | Color | Color, Color | Context dependent color subtraction | Public |
| * | Color | Color, float | Context dependent color multiply a color by a floating point value | Public |
| Multiply | Color | Color, float | Context dependent color multiply a color by a floating point value | Public |
| Equals | Bool | Color, color | Returns true if two color values are equal | Public |
| Equals | Bool | Object | Returns true if color object is equal to current color | Public |
| == | Bool | Color, color | Returns true if two color values are equal | Public |
| IsEqual | Bool | Color, color | Returns true if two color values are equal | Public |
| != | Bool | Color, color | Returns true if two color values are not equal | public |
| IsNotEqual | Bool | Color, color | Returns true if two color values are not equal | public |

Similar methods as used in Multichannel colors can also be used to support HSB, YCC and YUV and similar color spaces that are closely related to sRGB or scRGB.

| Name | Return Type | Arguments | Description | Other Info |
|---|---|---|---|---|
| Clamp | Color | Void | Clamps color values in range [0.0 ... 1.0] | Public |
| GetHashCode | int | Void | Return Color hash code | Public |
| Name | String | Returns color name | Redundant with colorcontext call | |
| ToRgbColor | None | Color | Returns scRGB equivalent color of current color | Public |
| ToString | String | Void | Returns formatted string value of color | public |
| AreClose | Bool | Color, Color | Returns true if color values are close using FloatUtil function | Static |
| IsClose | Bool | Color | Returns true if color is close to current color using FloatUtil function | Public |

-continued

| Name | Return Type | Arguments | Description | Other Info |
|---|---|---|---|---|
| SetRenderingIntent | Bool | String | Returns true if rendering intent for ColorContext is successful | Public |

The float values in the rgb and argb forms based on sRGB are specified on a scale from 0.0 to 1.0. By definition, these values will never be outside of this range and so should be clamped. Conversely, scRGB based values are valid well below 0.0 and above 1.0. These values should only be clipped if the destination device cannot support the extended color gamut. This can be determined by querying the profile associated with the destination gamut. Ideally, for displays, the graphic hardware can take care of this issue using DX's gamut management functionality.

If the string being parsed in is invalid, the color will be initialized to ARGB=(0.0, 0.0, 0.0, 0.0)

When persisting, the value will be written as a known color name if the color was created as a known color. If not, then the rgb(float, float, float) form will be used if alpha is 1.0. If alpha is not 1.0 then the argb(float, float, float, float) form will be used.

Raster graphics or imaging or pixel formats are different compared with the vector graphics solutions above. Simply stated, imaging input can be nearly anything from 1 bpp up to 128 bpp with a variety of supported colors spaces from black and white to sRGB to scRGB to CMYK. Therefore, the color solution for ImageData requires a ColorContext for Image-Data or pixel formats. This can be generated from embedded profiles or embedded gamma and chromaticity information within standard file formats. This eliminates the need for providing gamma or other redundant properties or fields in the ImageData class.

The MILRender code understands 32-bpc color specifications (scRGB). Input color conversion should happen above the rendering code (but not necessarily outside of unmanaged code).

Animation of color values should primarily occur in a linear space. It could be a linearized HSV space or scRGB, but it is to be linear for "bounce" and other per-channel animations to make sense.

Three color fidelity modes are described, including:

Full—32 bpc through the system; 128 bpp back-buffer/10-bpc+front-buffer; full 32 bpc compositing.

Hybrid—32 bpc color specifications/interpolation; dither or clamp colors to 32 bpp pre-composite.

Legacy—32 bpc color specification-converted immediately to 32 bpp; 32 bpp compositing/output These modes will be supported with two back buffer formats, namely 128-bpp 1.0 gamma (scRGB) and 32-bpp 2.2 gamma (sRGB). Support is also provided for handling lower-bit-depth (16 and 8 bpp displays) front-buffer scenarios. The back-buffer is dithered on Present to prevent loss in the composition.

The Geometry class of objects can be used for clipping, hit-testing, and rendering of 2D vector-based data with the Pen and Brush. The derived Geometry classes provide more specific building and enumeration semantics. A number of shape-specific Geometry types are provided, as well as a generalized PathGeometry that allows for explicit definition of more complex shaped Geometry. For those familiar with GDI+ it is most similar to GraphicsPath.

| Textbook | GDI+ | Present Invention |
|---|---|---|
| Path | GraphicsPath | PathGeometry |
| SubPath | GraphicsPath | PathFigure |

Geometry is the abstract base class.

```
[TypeConverter(typeof(PathGeometryConverter))]
public abstract class Geometry : Animatable, IDisposable
{
    internal Geometry( );
    public new Geometry Copy( );
    // If animated, Bounds returns the "current" bounds
    // This does not take into account any pen
    public virtual Rect Bounds { get; }
    // This takes the pen into account. When animations are present
    // this takes the "current" values of both the geometry and pen.
    public virtual Rect GetBounds(Pen pen);
    // Returns identity if no transformation.
    public Transform Transform { get; set; }
    // Release resources cached by Geometry (tessellations, path data, etc)
    public virtual void Dispose( );
}
```

To set a transform that is applied to the geometry, set the Transform property.

A GeometryCollection is a collection of multiple Geometry objects that have been combined using particular boolean operations on their defined area. This object allows easier building visual combinations of Geometry objects than is possible using strictly PathFigure objects within a PathGeometry.

The combine mode enumeration directs the combination of geometry area in the collection. Boolean operations Union, XOR, Intersect are commutative and therefore apply order independent to the geometries. Complement and Exclude are not commutative and therefore are defined between the first geometry and the individual remaining geometry. In other words, an exclude combination of { g1, g2, g3} would be applied as ((g1 exclude g2) and (g1 exclude g3). Complement specifies that the existing region is replaced by the result of the existing region being removed from the new region. In other words, the existing region is excluded from the new region. Exclude specifies that the existing region is replaced by the result of the new region being removed from the existing region. In other words, the new region is excluded from the existing region. Intersect refers to combining regions by taking their intersection, union refers to combining regions by taking the union of both, and Xor refers to combining regions by taking only the areas enclosed by one or the other region, but not both:

```
public enum System.Windows.CombineMode
{
    Complement,
    Exclude,
    Intersect,
```

-continued

```
    Union,
    Xor
}
public sealed class GeometryCollection : Geometry, IAddChild, IList
{
    public GeometryCollection( );
    public GeometryCollection(int capacity);
    public GeometryCollection(
        CombineMode combineMode,
        params Geometry[ ] collection);
    public GeometryCollection(
        CombineMode combineMode,
        ICollection collection);
    public GeometryCollection(
        CombineMode combineMode,
        ICollection collection,
        Transform transform);
    public new GeometryCollection Copy( );
    // Specify how to combine geometry
    [DefaultValue(CombineMode.Union)]
    public CombineMode CombineMode { get; set; }
    // IEnumerable
    public IEnumerator GetEnumerator( );
    // ICollection
    public int Count { get; }
    public bool IsSynchronized { get; }
    public object SyncRoot( );
    public void CopyTo(Array array, int index);
    // IList
    public bool IsFixedSize { get; }
    bool IList.IsReadOnly { get; }
    object IList.this[int index] { get; set; }
    int IList.Add(object value);
    public void Clear( );
    bool IList.Contains(object value);
    int IList.IndexOf(object item);
    void IList.Insert(int index, object value);
    void IList.Remove(object value);
    public void RemoveAt(int index);
    // Extra functions
    public int Capacity { get; set; }
    public Geometry this[int index] { get; set; }
    public int Add(Geometry geometry);
    public bool Contains(Geometry geometry);
    public int IndexOf(Geometry geometry);
    public int IndexOf(Geometry geometry, int startIndex);
    public int IndexOf(Geometry geometry, int startIndex, int count);
    public int LastIndexOf(Geometry geometry);
    public int LastIndexOf(Geometry geometry, int startIndex);
    public int LastIndexOf(Geometry geometry, int startIndex,
        int count);
    public void Insert(int index, Geometry geometry);
    public void Remove(Geometry geometry);
    public void AddRange(GeometryCollection geometryCollection);
    public void SetRange(int index, GeometryCollection
        geometryCollection);
    public void InsertRange(int index, GeometryCollection
        geometryCollection);
    public void RemoveRange(int index, int count);
    public GeometryCollection GetRange(int index, int count);
    public Geometry GetOptimizedGeometry( );
}
```

The GetOptimizedGeometry( ) collapses the collection of geometry where possible, the result not necessarily being a GeometryCollection. This might include optimizations such as combining adjacent rectangle geometry into a single rectangle geometry, performing a boolean operation between adjacent path geometry to create a new path geometry, or flattening a GeometryCollection with the same combination mode. In situations where the geometry is used in many different contexts this provides a performance improvement in processing and storage.

The following sample demonstrates markup that uses a GeometryCollection:

```
<Path Fill="Red">
    <Path.Data>
        <GeometryCollection Transform="translate(425 25)"
            CombineMode="Xor">
            <RectangleGeometry Rect="0 0 100 100" />
            <RectangleGeometry Rect="50 50 100 100" />
        </GeometryCollection>
    </Path.Data>
</Path>
```

The PathGeometry is a collection of PathFigure objects. Each of the PathFigure objects is composed of one or more PathSegment objects which actually define their shape. The filled area of the PathGeometry is defined by taking the contained PathFigures that have their Filled property set to true and applying the FillRule to determine the enclosed area. FIG. 13 represents PathGeometry Object Relationships.

The FillRule enumeration specifies how the intersecting areas of Figure objects contained in a Geometry are combined to form the resulting area of the Geometry:

```
public enum System.Windows.Media.FillRule
{
    EvenOdd,
    NonZero
}
{
    public PathGeometry( );
    public PathGeometry(params PathFigure[ ] figures);
    public PathGeometry(ICollection figureCollection);
    public PathGeometry(
        ICollection figureCollection,
        FillRule FillRule,
        Transform transform);
    public new PathGeometry Copy( );
    [DefaultValue(FillRule.EvenOdd)]
    public FillRule FillRule { get; set; }
    // This method will add the Figures from the specific
    // Geometry to this PathGeometry, but will use the
    // current FillRule instead of the geometry's FillRule.
    public void AddGeometry(Geometry geometry);
    public void AddFigure(PathFigure figure);
    public void AddPointAndTypes(
        Point[ ] points,
        byte[ ] types);
    public PathFigureCollection Figures { get; set; }
    public PathGeometry GetWidenedPathGeometry(Pen pen);
    public PathGeometry GetOutlinedPathGeometry( );
}
```

The EvenOdd rule determines the "insideness" of a point on the canvas by drawing a ray from that point to infinity in any direction and then examining the places where a segment of the shape crosses the ray. Starting with a count of zero, add one each time a Segment crosses the ray from left to right and subtract one each time a path segment crosses the ray from right to left. After counting the crossings, if the result is zero then the point is outside the path. Otherwise, it is inside.

The NonZero rule determines the "insideness" of a point on the canvas by drawing a ray from that point to infinity in any direction and counting the number of path Segments from the given shape that the ray crosses. If this number is odd, the point is inside; if even, the point is outside.

To convert other geometry types into a path geometry for inclusion with other figures, AddGeometry method is used. This adds a figure which geometrically matches the input geometry. For non-animated geometry the match is exact, while animated geometry may be lossy in conversion. The reason for lossy conversion is the animated parameters of the input geometry do not match the form that fits a segment.

| Geometry | Lossless/Lossy | Figures |
|---|---|---|
| LineGeometry | Lossy w/animation | StartSegment and LineSegment |
| RectangleGeometry | Lossy w/animation | PolyLineSegment |
| EllipseGeometry | Lossy w/animation | ArcSegment and ArcSegment |
| GeometryCollection | Lossy w/animation | Many kinds of segments. |
| PathGeometry | Lossy w/animation | All except Arc and Quadratic segments. |

Enumeration and structure of resultant PathGeometry is not guaranteed to match the input geometry exactly.

A figure collection, is a collection of PathFigure objects and the primary contents defining a PathGeometry:

```
public sealed class PathFigureCollection : Animatable, IAddChild, IList
{
    public PathFigureCollection( );
    public PathFigureCollection(int capacity);
    public PathFigureCollection(params PathFigure[ ] figures);
    public PathFigureCollection(ICollection figureCollection);
    public new PathFigureCollection Copy( );
    // IEnumerable
    public IEnumerator GetEnumerator( );
    // ICollection
    public int Count { get; }
    public bool IsSynchronized { get; }
    public object SyncRoot( );
    public void CopyTo(Array array, int index);
    // IList
    public bool IsFixedSize { get; }
    bool IList.IsReadOnly { get; }
    object IList.this[int index] { get; set; }
    int IList.Add(object value);
    public void Clear( );
    bool IList.Contains(object value);
    int IList.IndexOf(object item);
    void IList.Insert(int index, object value);
    void IList.Remove(object value);
    public void RemoveAt(int index);
    // Extra functions
    public int Capacity { get; set; }
    public PathFigure this[int index] { get; set; }
    public int Add(PathFigure figure);
    public bool Contains(PathFigure figure);
    public int IndexOf(PathFigure figure);
    public int IndexOf(PathFigure figure, int startIndex);
    public int IndexOf(PathFigure figure, int startIndex, int count);
    public int LastIndexOf(PathFigure figure);
    public int LastIndexOf(PathFigure figure, int startIndex);
    public int LastIndexOf(PathFigure figure, int startIndex, int count);
    public void Insert(int index, PathFigure figure);
    public void Remove(PathFigure figure);
    public void AddRange(PathFigureCollection figureCollection);
    public void SetRange(int index, PathFigureCollection figureCollection);
    public void InsertRange(int index, PathFigureCollection figureCollection);
    public void RemoveRange(int index, int count);
    public PathFigureCollection GetRange(int index, int count);
}
```

A PathFigure is a sub-section of a Geometry that defines a segment collection. This segment collection is a single connected series of two-dimensional PathSegment objects. The PathFigure can be a closed shape with a defined area, or a connected series of Segments that define a curve, but no enclosed area. The PathFigure class includes a number of convenience functions to allow simpler construction of a PathFigure from explicit ArcTo/LineTo/(and other) method calls without requiring a PathSegment object. The explicit AddSegment call can be used to add a composed Segment.

```
public sealed class PathFigure : Animatable
{
    public PathFigure( );
    public PathFigure(params PathSegment[ ]segments);
    public PathFigure(ICollection segmentCollection);
    public PathFigure(ICollection segmentCollection, bool isFilled);
    public new PathFigure Copy( );
    [DefaultValue(true)]
    public bool IsFilled { get; set; }
    // Start the figure at an initial point.
    public void StartAt(Point pt);
    public void StartAt(Point pt, PointAnimationCollection ptAnimations);
    // Adds a line segment from the current point to the specified
    // new point. The current point is updated to the new location.
    public void LineTo(Point pt);
    public void LineTo(Point pt, PointAnimationCollection ptAnimations);
    // Adds a polyline starting at the current point, then to
    // each point in the points array. The current point is
    // updated to the last point of the array.
    public void PolyLineTo(Point[ ] points);
    public void ArcTo(
        Point pt,
        Size sz,
        double xRotation,
        bool largeArcFlag,
        bool sweepFlag);
    public void ArcTo(
        Point pt,
        PointAnimationCollection ptAnimations,
        Size sz,
        SizeAnimationCollection szAnimations,
```

```
        double xRotation,
        DoubleAnimationCollection xRotationAnimations,
        bool largeArcFlag,
        bool sweepFlag);
// Adds a cubic bezier segment using the current point as the
// first control point. The current point is updated to the
// the destination point.
public void BezierTo(
        Point pt1,
        Point pt2,
        Point ptDest);
public void BezierTo(
        Point pt1,
        Point pt1,
        PointAnimationCollection pt1Animations,
        Point pt2,
        PointAnimationCollection pt2Animations,
        Point ptDest,
        PointAnimationCollection ptDestAnimations);
// Adds cubic Bezier sections using the current point as the
// first control point, then iterating through 3 points at a
// time. The current point is updated to the last point of
// the array. When the number of points passed in is not a
// multiple of 3, we throw an invalid arg exception.
public void PolyBezierTo(Point[ ] points);
// Adds a quadratic Bezier section using the current point
// as the first control point. The current point is updated to
// destination point.
public void QuadraticBezierTo(Point pt1, Point ptDest);
public void QuadraticBezierTo(
        Point pt1,
        PointAnimationCollection pt1Animations,
        Point ptDest,
        PointAnimationCollection ptDestAnimations);
// Adds quadratic Bezier sections using the current point
// as the first control point, then iterating through 2 points
// at a time. The current point is updated to the last
// point of the array. When the number of points passed in is
// not a multiple of 2, we throw an invalid arg exception.
public void PolyQuadraticBezierTo(Point[ ] points);
// Close the figure. No new segments can be added.
public void CloseFigure( );
// Stroke the segments of new figure. Default is true.
public void StrokeNewSegments(bool strokeNewSegments);
// Add a new Segment to the PathFigure
public void AddSegment(PathSegment segment);
public PathSegmentCollection Segments { get; set; }
public PathFigure GetFlattenedPathFigure(float flatness);
}
```

A figure requires a starting point, since each segment maintains continuity relative to the last point added. To specify the starting point StartAt(pt) or Add(new StartSegment(pt)) is called. After adding segments, to add a properly closing segment that joins the last point back to the starting point, CloseFigure( ) or Add(new CloseSegment( )) is used. The start and close segments appear in the segment collection.

An exception is thrown if a PathFigure is built and the StartSegment is not the first segment in the collection or the CloseSegment, if present, is not at the last segment in the collection. The StartSegment and CloseSegment are not valid at any other positions in the figure, an exception being a completely empty segment collection.

The PathFigure.IsFilled property explicitly controls whether or not the contained area of a closed figure is to be used for hit-testing, rendering, and clipping. If this property is set to false, then only the outline of the PathFigure will be used, and its contained area will not contribute to the overall area of the PathGeometry. The default value for this property is true.

To enumerate the contents of a PathFigure as points, one straightforward way is to flatten the figure and examine the resulting PathSegmentCollection. The flattening process is lossy with respect to animation and curve segment parameters, however the raw point data is exposed through a PolyLineSegment for further point processing.

A PathSegmentCollection is a collection of PathSegment objects and the primary contents defining a PathFigure:

```
public sealed class PathSegmentCollection : Animatable, IAddChild, IList
{
    public PathSegmentCollection( );
    public PathSegmentCollection(int capacity);
    public PathSegmentCollection(params PathSegment[ ] segments);
    public PathSegmentCollection(ICollection segments);
    public new PathSegmentCollection Copy( );
    // IEnumerable
    public IEnumerator GetEnumerator( );
    // ICollection
    public int Count { get; }
    public bool IsSynchronized { get; }
    public object SyncRoot( );
    public void CopyTo(Array array, int index);
    // IList
    public bool IsFixedSize { get; }
```

```
    bool IList.IsReadOnly { get; }
    object IList.this[int index] { get; set; }
    int IList.Add(object value);
    public void Clear( );
    bool IList.Contains(object value);
    int IList.IndexOf(object item);
    void IList.Insert(int index, object value);
    void IList.Remove(object value);
    public void RemoveAt(int index);
    // Extra functions
    public int Capacity { get; set; }
    public PathSegment this[int index] { get; set; }
    public int Add(PathSegment segment);
    public bool Contains(PathSegment segment);
    public int IndexOf(PathSegment segment);
    public int IndexOf(PathSegment segment, int startIndex);
    public int IndexOf(PathSegment segment, int startIndex, int count);
    public int LastIndexOf(PathSegment segment);
    public int LastIndexOf(PathSegment segment, int startIndex);
    public int LastIndexOf(PathSegment segment, int startIndex,
        int count);
    public void Insert(int index, PathSegment segment);
    public void Remove(PathSegment segment);
    public void AddRange(PathSegmentCollection segmentCollection);
    public void SetRange(int index, PathSegmentCollection
        segmentCollection);
    public void InsertRange(int index, PathSegmentCollection
        segmentCollection);
    public void RemoveRange(int index, int count);
    public PathSegmentCollection GetRange(int index, int count);
```

A PathSegment represents a section of the outline of a PathFigure. Simple straight-line segments, elliptical-arc segments, cubic bezier segments, and quadratic bezier segments can be combined together to form a PathFigure.

```
public abstract class PathSegment : Animatable
{
    internal PathSegment( );
    public new PathSegment Copy( );
    [DefaultValue(true)]
    public bool IsStroked { get; set; }
}
public sealed class StartSegment : PathSegment
{
    public StartSegment( );
    public StartSegment(Point point);
    public StartSegment(Point point, PointAnimationCollection
        pointAnimations);
    public new StartSegment Copy( );
    [Animations("PointAnimations")]
    public Point Point { get; set; }
    public PointAnimationCollection PointAnimations { get; set; }
}
public sealed class CloseSegment : PathSegment
{
    public CloseSegment(bool isStroked);
    public new CloseSegment Copy( );
}
public sealed class LineSegment : PathSegment
{
    public LineSegment( );
    public LineSegment(Point point, bool isStroked);
    public LineSegment(
        Point point,
        PointAnimationCollection pointAnimations,
        bool isStroked);
    public new LineSegment Copy( );
    [Animations("PointAnimations")]
    public Point Point { get; set; }
    public PointAnimationCollection PointAnimations { get; set; }
}
public sealed class BezierSegment : PathSegment
{
    public BezierSegment( );
    public BezierSegment(
        Point point1,
        Point point2,
        Point point3,
        bool isStroked);
    public BezierSegment(
        Point point1, PointAnimationCollection point1Animations,
        Point point2, PointAnimationCollection point2Animations,
        Point point3, PointAnimationCollection point3Animations,
        bool isStroked);
    public new BezierSegment Copy( );
    [Animations("Point1Animations")]
    public Point Point1 { get; set; }
    public PointAnimationCollection Point1Animations { get; set; }
    [Animations("Point2Animations")]
    public Point Point2 { get; set; }
    public PointAnimationCollection Point2Animations { get; set; }
    [Animations("Point3Animations")]
    public Point Point3 { get; set; }
    public PointAnimationCollection Point3Animations { get; set; }
}
public sealed class QuadraticBezierSegment : PathSegment
{
    public QuadraticBezierSegment( );
    public QuadraticBezierSegment(
        Point point1,
        Point point2,
        bool isStroked);
    public QuadraticBezierSegment(
        Point point1, PointAnimationCollection point1Animations,
        Point point2, PointAnimationCollection point2Animations,
        Point point2, PointAnimationCollection point2Animations,
        bool isStroked);
    public new QuadraticBezierSegment Copy( );
    [Animations("Point1Animations")]
    public Point Point1 { get; set; }
    public PointAnimationCollection Point1Animations { get; set; }
    [Animations("Point2Animations")]
    public Point Point2 { get; set; }
    public PointAnimationCollection Point2Animations { get; set; }
}
public sealed class PolyLineSegment : PathSegment
{
    public PolyLineSegment( );
    public PolyLineSegment(Point[ ] points, bool isStroked);
    public PolyLineSegment(ICollection points, bool isStroked);
    public new PolyLineSegment Copy( );
    public void AddPoint(Point point);
    public PointCollection Points { get; set; }
}
public sealed class PolyBezierSegment : PathSegment
{
    public PolyBezierSegment( );
    public PolyBezierSegment(Point[ ] points, bool isStroked);
    public PolyBezierSegment(ICollection points, bool isStroked);
    public new PolyBezierSegment Copy( );
    public void AddPoint(Point point);
    public PointCollection Points { get; set; }
}
public sealed class PolyQuadraticBezierSegment : PathSegment
{
    public PolyQuadraticBezierSegment(Point[ ] points,
        bool isStroked);
    public PolyQuadraticBezierSegment(ICollection points,
        bool isStroked);
    public new PolyQuadraticBezierSegment Copy( );
    public void AddPoint(Point point);
    public PointCollection Points { get; set; }
}
public sealed class ArcSegment : PathSegment
{
    public ArcSegment( );
    public ArcSegment(
        Point point,
        Size arcSize,
        double xRotation,
        bool largeArcFlag,
        bool sweepFlag,
```

```
        bool isStroked);
    public ArcSegment(
        Point point,
        PointAnimationCollection pointAnimations,
        Size arcSize,
        SizeAnimationCollection arcSizeAnimations,
        double xRotation,
        DoubleAnimationCollection xRotationAnimations,
        bool largeArcFlag,
        bool sweepFlag,
        bool isStroked);
    public new ArcSegment Copy( );
    [Animations("PointAnimations")]
    public Point Point { get; set; }
    public PointAnimationCollection PointAnimations { get; set; }
    [Animations("Size Animations")]
    public Size Size { get; set; }
    public SizeAnimationCollection SizeAnimations { get; set; }
    [Animations("XRotationAnimations")]
    public double XRotation { get; set; }
    public DoubleAnimationCollection XRotationAnimations
        { get; set; }
    public bool LargeArc { get; set; }
    public bool SweepFlag { get; set; }
}
```

Each of the PathSegment objects that are added to a PathFigure also have the PathSegment.IsStroked property. If a PathSegment has this property set to true, then the particular PathSegment will contribute to the stroked area of the PathGeometry when rendering with a Pen. This also applies to hit-testing and to an explicit Widen of the PathGeometry. The particular behavior when switching between stroked and non-stroked PathSegment sections in a PathFigure is the same as if the Pen specified dashed, in that the appropriate dash caps will be applied at the PathSegment ends.

The following sample demonstrates markup that uses a PathGeometry, PathFigure, and PathSegments:

A RectangleGeometry defines a rectangle or rounded corner rectangle geometry object. The radius X and radius Y refer to the axis aligned radial length of the rounded corners:

```
public sealed class RectangleGeometry : Geometry
{
    public RectangleGeometry( );
    public RectangleGeometry(Rect rect);
    public RectangleGeometry(
        Rect rect,
        double radiusX,
        double radiusY);
    public RectangleGeometry(
        Rect rect, RectAnimationCollection rectAnimations,
        double radiusX, DoubleAnimationCollection
            radiusXAnimations,
        double radiusY, DoubleAnimationCollection
            radiusYAnimations);
    public RectangleGeometry(
        Rect rect, RectAnimationCollection rectAnimations,
        double radiusX, DoubleAnimationCollection
            radiusXAnimations,
        double radiusY, DoubleAnimationCollection
            radiusYAnimations,
        Transform);
    public new RectangleGeometry Copy( );
    [Animation("RectAnimations")]
    public Rect Rect { get; set; }
    public RectAnimationCollection RectAnimations { get; set; }
    [Animation("RadiusXAnimations")]
    [DefaultValue(0.0)]
    public double RadiusX { get; set; }
    public DoubleAnimationCollection RadiusXAnimations
        { get; set; }
    [Animation("RadiusYAnimations")]
    [DefaultValue(0.0)]
    public double RadiusY { get; set; }
    public DoubleAnimationCollection RadiusYAnimations
        { get; set; }
}
```

```
<Path Fill="#4000FF00" Stroke="Yellow" >
    <Path.Data>
        <PathGeometry Transform="translate(225 25)" FillRule="EvenOdd">
            <PathGeometry.Figures>
                <PathFigureCollection>
                    <PathFigure IsFilled="True">
                        <PathFigure.Segments>
                            <PathSegmentCollection>
                                <StartSegment Point="0 0" IsStroked="False" />
                                <LineSegment Point="100 0" />
                                <BezierSegment Point1="125 25" Point2="125 75" Point3="100 100"/>
                                <QuadraticBezierSegment Point1="50 50" Point2="0 100" />
                                <ArcSegment Point="100 150" Size="100 100" XRotation="45"
LargeArc="False" SweepFlag="True" />
                                <PolyLineSegment Points="100 175 0 175" />
                                <PolyBezierSegment Points="50 225 50 275 0 300 50 325 50 375 0 400" />
                                <PolyQuadraticBezierSegment Points="50 450 0 500 50 550 0 600" />
                                <CloseSegment IsStroked="True" />
                            </PathSegmentCollection>
                        </PathFigure.Segments>
                    </PathFigure>
                </PathFigureCollection>
            </PathGeometry.Figures>
        </PathGeometry>
    </Path.Data>
</Path>
```

The following sample demonstrates markup that uses a RectangleGeometry:

```
<Path Fill="#4000FF00">
    <Path.Data>
        <RectangleGeometry Rect="125 125 75 75"
            RadiusX="10" RadiusY="5"></RectangleGeometry>
    </Path.Data>
</Path>
```

An EllipseGeometry defines an elliptical area given axis aligned radial X and Y lengths:

```
public sealed class EllipseGeometry : Geometry
{
    public EllipseGeometry( );
    public EllipseGeometry(Rectangle rect);
    public EllipseGeometry(
        Point center,
        double radiusX,
        double radiusY);
    public EllipseGeometry(
        Point center, PointAnimationCollection
        centerAnimations,
        double radiusX, DoubleAnimationCollection
        radiusXAnimations,
        double radiusY, DoubleAnimationCollection
        radiusYAnimations);
    public EllipseGeometry(
        Point center, PointAnimationCollection
        centerAnimations,
        double radiusX, DoubleAnimationCollection
        radiusXAnimations,
        double radiusY, DoubleAnimationCollection
        radiusYAnimations,
        Transform transform);
    public new EllipseGeometry Copy( );
    [Animation("CenterAnimations")]
    public Point Center { get; set; }
    public PointAnimationCollection CenterAnimations { get; set; }
    [Animation("RadiusXAnimations")]
    public double RadiusX { get; set; }
    public DoubleAnimationCollection RadiusXAnimations { get; set; }
    [Animation("RadiusYAnimations")]
    public double RadiusY { get; set; }
    public DoubleAnimationCollection RadiusYAnimations { get; set; }
}
```

The following sample demonstrates markup that uses an EllipseGeometry:

```
<Path Fill="#4000FF00">
    <Path.Data>
        <EllipseGeometry Center="50 300"
            RadiusX="50" RadiusY="75"></EllipseGeometry>
    </Path.Data>
</Path>
```

A LineGeometry defines a line segment between two points and therefore contains no fill area:

```
public sealed class LineGeometry : Geometry
{
    public LineGeometry( );
    public LineGeometry(Point pt1, Point pt2);
    public LineGeometry(
        Point startPoint,
        PointAnimationCollection startPointAnimations,
        Point endPoint,
        PointAnimationCollection endPointAnimations);
    public LineGeometry(
        Point startPoint,
        PointAnimationCollection startPointAnimations,
        Point endPoint,
        PointAnimationCollection endPointAnimations,
        Transform transform);
    public new LineGeometry Copy( );
    [Animation("Point1Animations")]
    public Point StartPoint { get; set; }
    public PointAnimationCollection StartPointAnimations { get; set; }
    [Animation("Point2Animations")]
    public Point Point2 { get; set; }
    public PointAnimationCollection Point2Animations { get; set; }
}
```

The following sample demonstrates markup that uses a LineGeometry:

```
<Path Stroke="#4000FF00"
    StrokeThickness="20"
    StrokeStartLineCap="Flat"
    StrokeEndLineCap="Triangle"
    StrokeDashCap="Round"
    StrokeLineJoin="Bevel"
    StrokeMiterLimit="100"
    StrokeDashOffset="0"
    StrokeDashArray="1.0 2.0">
    <Path.Data>
        <LineGeometry StartPoint="125 25"
            EndPoint="175 75"></LineGeometry>
    </Path.Data>
</Path>
```

Imaging

ImageSource is an abstract class, comprising a basic building block for the imaging pipeline. An ImageSource conceptually represents a single, constant set of pixels at a certain size and resolution. For example, an ImageSource may be a single frame in an image file that a Decoder could provide, or it may be the results of a transform that operates on a certain ImageSource of its own. An ImageSource is not multiframe or animate. An ImageSource is changeable, not because its own properties can be changed, but because the properties of its sub-classes can potentially be changed.

For performance reasons, ImageSources support providing unmanaged access to the image, using the IMILBitmapSource interface. If the sub-class of ImageSource does not provide it, then the ImageSource base class does (using a wrapper class).

```
namespace System.Windows.Media
{
    public abstract class ImageSource : Changeable
    {
        /// Native format of the image's data.
        /// If the ImageSource is directly readable, this is the format the
```

-continued

```
/// pixels will be in when they are read.
public abstract PixelFormat Format { get; }
/// Whether the ImageSource can convert its data to the specified format.
/// If not, a format converter could be used to do the conversion.
/// Note: for best performance, ImageSources should provide support for
/// PixelFormat32bppPARGB.
public virtual bool CanConvertTo(PixelFormat targetPixelFormat)
/// Width, in pixels, of the image.
public abstract int PixelWidth { get; }
/// Height, in pixels, of the image.
public abstract int PixelHeight { get; }
/// Horizontal DPI of the image.
public abstract double DpiX { get; }
/// Vertical DPI of the image.
public abstract double DpiY { get; }
/// Get the width of the image in measure units (96ths of an inch).
public double Width { get; }
/// Get the width of the image in measure units (96ths of an inch).
public double Height { get; }
/// Get the Palette for the image, if there is one.
ImagePalette Palette { get; }
/// Copy the pixel data from the image into the array of pixels that has the
/// specified stride, starting at the pixelOffset (specified in number of
/// pixels from the beginning). The pixels should be copied into
/// the specified pixelFormat. To find out if the pixelFormat is supported,
/// call CanConvertTo first.
public void Copy(PixelFormat pixelFormat, byte[ ] pixels,
       int stride, int pixelOffset)
/// Copy a rect of pixel data from the image into the array of pixels that has
/// the specified stride, starting at the pixelOffset (specified in number of
/// pixels from the beginning). The pixels should be copied into
/// the specified pixelFormat. To find out if the pixelFormat is supported,
/// call CanConvertTo first. An empty rect (one with a width and/or height
/// of 0), means to ignore the rect and copy the entire image.
public abstract void Copy(IntegerRect sourceRect, PixelFormat pixelFormat,
           byte[ ] pixels, int stride, int pixelOffset);
/// If there is an embedded thumbnail, return it.
/// Otherwise, return null. This method does NOT create a
/// thumbnail for images that don't already have one.
public virtual ImageSource EmbeddedThumbnail { get; set; }
/// Get a thumbnail of the image.
/// This method always returns a thumbnail that is in approximately the
/// same aspect ratio as the original image.
///
/// If there is an embedded thumbnail, this method returns that
/// thumbnail, scaled to the specified size. If there is not an embedded
/// thumbnail, the image itself is scaled to the specified size.
///
/// The specified width and height of the thumbnail must both be > 0.
/// We choose whether to use the specified width value or the specified
/// height value by determining which will give the largest possible
/// thumbnail, while maintaining the aspect ratio and staying less than
/// or equal to both the width and height values.
///
/// Therefore, to specify that you wish to use only the width value, you
/// would use Int32.MaxValue for the height value.
public virtual ImageSource GetThumbnail(ImageSizeOptions sizeOptions);
/// Provides access to this image's metadata.
public virtual ImageMetaData MetaData { get; set; }
          /// Returns an IMILBitmapSource for this ImageSource.
          unsafe internal IntPtr BitmapSource { get; }
     }
}
```

ImageData is a sub-class of ImageSource. ImageData implements ImageSource for several different sources of images:

HICON
HBITMAP
Pixel data in managed memory.
Pixel data in unmanaged memory

-continued

Images in a System.IO.Stream (requiring a decoder)
Another ImageSource

ImageData provides services, including caching the decoded image in system memory, cropping the image to a specified source rect (to the cache) and sizing the image to a specified decode width and height (to the cache). For image decoding scenarios, ImageData enables the specification of which decoder to use or automatic codec discovery, based on the input stream and the mime type. ImageData does not support loading an image directly from a URI. The loader should be used to map the URI to a stream that can be used to construct an ImageData. Once an ImageData is constructed, its only changeable properties are its embedded thumbnail, its metadata, and its pixel data. The other properties are considered immutable.

The pixel data of the ImageData can be changed, including in one of two ways: (1) obtaining a Drawing Context for the ImageData and issuing commands via the Drawing Context to draw onto the image, or (2) using the ImageData as a destination (RenderTarget) for a VisualManager and issuing a command to render a visual tree (a scene) to the ImageData. In either case, the drawing is done to an image in memory, which means the pixel data first needs to be decoded and cached in memory. Only the cached memory image is changed—the image file itself is not affected (unless the ImageData is later encoded to the image file using an ImageEncoder).

```
namespace System.Windows.Media
{
    /// ImageData can be constructed with or without a cache.
    /// If constructed without a cache, the image will be decoded every time it is
    /// used. The advantage of this approach is that the cache is not stored in
    /// memory and that the decoding and filtering can be optimal for the size that
    /// it is being drawn. The disadvantage is that the decoding has to be done with
    /// every redraw. The other approach is to cache the decoded image. There are
    /// several options for creating the decoded, cached image. It can be created at
    /// a specific size and with a specific source rect (area of interest from the
    /// source image). There are no options if the image is not cached - it is
    /// decoded with no source cropping. If the image is cached, the cached version
    /// of the image becomes the source image, and the original image source will
    /// be discarded.
    public class ImageData : ImageSource
    {
        /// Construct an ImageData from a Stream.
        /// The caller owns the stream and is responsible for closing it.
        public ImageData(System.IO.Stream imageStream);
        /// Construct an ImageData from a Stream.
        /// The caller owns the stream and is responsible for closing it.
        public ImageData(System.IO.Stream imageStream,
            CodecInfo decoderInfo, // identifies the codec to be used (or null)
            bool createCache, // if false, sourceRect and sizeOptions are ignored
            IntegerRect sourceRect,
            ImageSizeOptions sizeOptions
            );
        /// Construct an ImageData from an array of pixels.
        unsafe public ImageData(
            int pixelWidth,
            int pixelHeight,
            double dpiX,
            double dpiY,
            PixelFormat pixelFormat,
            ImagePalette imagePalette,
            byte[ ] pixels,
            int stride,
            IntegerRect sourceRect,
            ImageSizeOptions sizeOptions
            );
        /// Construct an ImageData from an array of pixels in unmanaged memory
        /// (e.g. a DibSection).
        public ImageData(
            int pixelWidth,
            int pixelHeight,
            double dpiX,
            double dpiY,
            PixelFormat pixelFormat,
            ImagePalette imagePalette,
            IntPtr pixels, // unmanaged array of pixels, e.g. a DibSection
            int stride,
            bool createCache, // if false, sourceRect and sizeOptions are ignored
            IntegerRect sourceRect,
            ImageSizeOptions sizeOptions
            );
        /// Construct an ImageData from a HBITMAP.
        public ImageData(
            HBITMAP hbitmap,
            HPALETTE hpalette,
            IntegerRect sourceRect,
            ImageSizeOptions sizeOptions
            );
        /// Construct an ImageData from a HICON.
        public ImageData(
            HICON hicon,
```

```
            IntegerRect sourceRect,
            ImageSizeOptions sizeOptions
            );
        /// Construct an ImageData from an ImageSource.
        public ImageData(
            ImageSource imageSource,
            bool createCache, // if false, sourceRect and sizeOptions are ignored
            IntegerRect sourceRect,
            ImageSizeOptions sizeOptions
            );
        /// Get the information about the specific codec that was used
        /// to decode the image (if there a codec was required and we
        /// have that information).
        public CodecInfo DecoderInfo { get; }
        /// Get a DrawingContext to draw on the ImageData.
        public DrawingContext Open( );
    }
}
```

ImageDecoder is an abstract class that provides the base class for decoders. It provides a way to determine how many frames are in the image and to enumerate (or index) the frames. As mentioned above, image frames are each an ImageSource. Built-in codecs create an ImageData object for each requested frame. Add-in codecs may use a different sub-class to return an ImageSource for each frame. ImageDecoder is not an ImageSource itself, but rather is a container for one or more ImageSources. Note that each frame of the image could potentially have different attributes (different size, different resolution, etc.).

```
namespace System.Windows.Media
{
    /// ImageDecoder is essentially a container for image frames.
    /// Each image frame is an ImageSource.
    public abstract class ImageDecoder : ICollection, IEnumerable
    {
        /// The number of image frames in this image.
        public int Count { get; }
        /// Whether access to the ICollection is synchronized (thread-safe).
        public bool IsSynchronized { get; }
        /// Gets an object that can be used to synchronize access to the ICollection.
        public object SyncRoot { get; }
        /// Copies the frames to an Array, starting at a particular Array index.
        public void CopyTo(Array array, int index);
        /// Returns an enumerator to iterate through the frames of the image.
        public IEnumerator GetEnumerator( );
        /// Returns a codec-specific object that identifies the properties
        /// that were used to encode this image (if supported by the codec).
        /// These codec-specific properties can be passed back to the associated
        /// encoder (if there is one) to get the same type of encoding again.
        public virtual object CustomEncoderProperties { get; }
        /// The info that identifies this codec (including any associated encoder).
        public abstract CodecInfo Info { get; }
        /// Get the pixel format for the first frame.
        public virtual System.Windows.Media.PixelFormat Format { get; }
        /// Get the pixel width for the first frame.
        public virtual int PixelWidth { get; }
        /// Get the pixel Height for the first frame.
        public virtual int PixelHeight { get; }
        /// Get the horizontal dpi for the first frame.
        public virtual double DpiX { get; }
        /// Get the vertical dpi for the first frame.
        public virtual double DpiY { get; }
        /// Get the width of the image in measure units (96ths of an inch).
        public double Width { get; }
        /// Get the height of the image in measure units (96ths of an inch).
        public double Height { get; }
        /// If there is an embedded thumbnail for the first frame, return it.
        /// Otherwise, return null. This method does NOT create a
        /// thumbnail for images that don't already have one.
        public virtual ImageSource EmbeddedThumbnail { get; }
        /// Return an image frame, cropped by the specified sourceRect.
        /// An empty rect (one with a width and/or height of 0),
        /// means to ignore the rect and get the entire frame.
        public virtual ImageSource GetFrame(
            int frameIndex,
```

```
        bool createCache,
        IntegerRect sourceRect);
    /// Return an image frame, with all the specified cropping and sizing applied.
    /// An empty source rect (one with a width and/or height of 0),
    /// means to ignore the rect and get the entire frame.
    public virtual ImageSource GetFrame(
        int frameIndex,
        bool createCache,
        IntegerRect sourceRect,
        ImageSizeOptions sizeOptions);
    /// Indexer for returning a specific frame of the image (at full size).
    /// The index must be in the range: (NumFrames > index >= 0)
    public abstract ImageSource this[int frameIndex] { get; }
    /// Conversion from ImageDecoder to ImageSource by returning the first frame.
    public static explicit operator ImageSource(ImageDecoder decoder);
    /// Provides read-only access to this image's metadata.
    public abstract ImageMetaData MetaData { get; }
    }
}
```

A number of built-in decoders are provided with the MIL, including ImageDecoderBmp.cs, ImageDecoderGif.cs, ImageDecoderIcon.cs, ImageDecoderJpeg.cs, ImageDecoderPng.cs, ImageDecoderTiff.cs, and ImageDecoderWmp.cs. Each implement ImageDecoder and a single constructor which uses a System.IO.Stream to initialize the decoder, as in the following example:

```
    /// If this decoder cannot handle the image stream, it will
    /// throw an exception.
    public ImageDecoderJpeg(System.IO.Stream imageStream);
```

An ImageEncoder is a collection of ImageSources (image frames), each potentially with its own metadata and thumbnail. There can also be a global thumbnail and metadata associated with the entire set of frames. A codec may also choose to provide support for encoding properties, used to determine how to encode the image. The collection of frames can be saved (encoded) to any number of specified streams (one at a time). The collection can be cleared and then filled with a different collection and saved again.

```
namespace System.Windows.Media
{
    /// ImageEncoder collects a set of frames (ImageSource's) with their associated
    /// thumbnails and metadata and saves them to a specified stream. In addition
    /// to frame-specific thumbnails and metadata, there can also be an image-wide
    /// (global) thumbnail and metadata, if the codec supports it.
    public abstract class ImageEncoder : IList, IDisposable
    {
        public void Dispose( );
        /// Gets a value indicating whether the IList has a fixed size.
        public bool IsFixedSize { get; }
        /// Gets a value indicating whether the IList is read-only.
        public bool IsReadOnly { get { return false; } }
        /// Indexer for a specific frame of the image. The set method is
        /// a Replace operation for that frame. The object must be an ImageSource.
        public object IList.this[int frameIndex] { get; set; }
        public ImageSource this[int frameIndex] { get; set; }
        /// Add a frame to the image.
        public int IList.Add(object value);
        public int Add(ImageSource imageFrame);
        /// Reset the encoder to an empty state, with no frames,
        /// thumbnails, metadata, or encoding properties.
        public void Clear( );
        /// Determines whether the Encoder contains a specific frame.
        public bool IList.Contains(object value);
        public bool Contains(ImageSource imageFrame);
        /// Determines the index of the specified frame.
        public int IList.IndexOf(object value);
        public int IndexOf(ImageSource imageFrame);
        /// This method inserts the frame at specified frame location, with its
        /// associated thumbnail and metadata (if any).
        public void IList.Insert(int frameIndex, object value);
        public void Insert(int frameIndex, ImageSource imageFrame);
        /// Removes the first occurrence of the specified frame.
        public void IList.Remove(object value);
        public void Remove(ImageSource imageFrame);
        /// Remove the specified frame from the image. Subsequent frames
```

-continued

```
        /// are moved up in the list.
        public void RemoveAt(int frameIndex);
        /// The number of image frames in this image.
        public int Count { get; }
        /// Whether access to the ICollection is synchronized (thread-safe).
        public bool IsSynchronized { get; }
        /// Gets an object that can be used to synchronize access to the ICollection.
        public object SyncRoot { get; }
        /// Copies the frames to an Array, starting at a particular Array index.
        public void CopyTo(Array array, int index);
        /// Returns an enumerator to iterate through the frames of the image.
        public IEnumerator GetEnumerator( );
        /// The info that identifies this codec (including any associated decoder).
        public CodecInfo Info { get; }
        /// A codec-specific object that identifies the properties
        /// used to encode this image.
        public object CustomEncoderProperties { get; set; }
        /// Set or get the image's global embedded thumbnail, if there is one.
        public ImageSource EmbeddedThumbnail { get; set; }
        /// Provides access to this image's global metadata.
        public ImageMetaData MetaData { get; set; }
        /// Whether this codec supports images with more than one frame.
        public bool SupportsMultiFrame { get; }
        /// Copy the image from the specified decoder, including all the frames,
        /// all the thumbnails, and all the metadata, including the per-frame
        /// and global data. This does an implicit clear of any data that's already
        /// been set in the encoder.
        public void CopyImage(ImageDecoder decoder);
        /// Save (encode) the image to the specified stream.
        public void Save(System.IO.Stream destStream);
    }
}
```

A number of built-in encoders are provided with the MIL, including ImageEncoderBmp.cs, ImageEncoderGif.cs, ImageEncoderJpeg.cs, ImageEncoderPng.cs, ImageEncoderTiff.cs, and ImageEncoderWmp.cs.

ImageSizeOptions are used to specify the size of thumbnails and the size of cached images. The options include the width, height, whether to preserve the aspect ratio of the original image, and a rotation angle (multiple of 90 degrees).

```
namespace System.Windows.Media
{
    /// Sizing options for an image. The resulting image
    /// will be scaled based on these options.
    public class ImageSizeOptions
    {
        /// The rotation to be applied; only multiples of 90 degrees is supported.
        public enum Rotation
        {
            /// Do not rotate
            Rotate0 = 0,
            /// Rotate 90 degrees
            Rotate90 = 90,
            /// Rotate 180 degrees
            Rotate180 = 180,
            /// Rotate 270 degrees
            Rotate270 = 270,
        }
        /// Construct an ImageSizeOptions object.
        /// Still need to set the Width and Height Properties.
        public ImageSizeOptions( );
        /// Construct an ImageSizeOptions object.
        public ImageSizeOptions(
            bool preserveAspectRatio,
            int pixelWidth,
            int pixelHeight
            );
        /// Whether or not to preserve the aspect ratio of the original
        /// image. If so, then the PixelWidth and PixelHeight are
        /// maximum values for the image size. The resulting image
        /// is only guaranteed to have either its width or its height
        /// match the specified values. For example, if you want to
        /// specify the height, while preserving the aspect ratio for
        /// specify the height, while preserving the aspect ratio for
        /// the width, then set the height to the desired value, and
```

-continued

```
            /// set the width to Int32.MaxValue.
            ///
            /// If we are not to preserve aspect ratio, then both the
            /// specified width and the specified height are used, and
            /// the image will be stretched to fit both those values.
            public bool PreserveAspectRatio { get; set; }
            /// PixelWidth of the resulting image. See description of
            /// PreserveAspectRatio for how this value is used.
            ///
            /// PixelWidth must be set to a value greater than zero to be valid.
            public int PixelWidth { get; set; }
            /// PixelHeight of the resulting image. See description of
            /// PreserveAspectRatio for how this value is used.
            ///
            /// PixelHeight must be set to a value greater than zero to be valid.
            public int PixelHeight { get; set; }
            /// RotationAngle to rotate the image. Only multiples of 90 are supported.
            public Rotation RotationAngle { get; set; }
            /// Whether the size options are valid. To be valid,
            /// both must be greater than zero, and at most one
            /// can be set to Int32.MaxValue.
            public bool IsValid { get; }
        }
    }
```

The following provides a Pixel Format Definition for images and pixel-based surfaces:

```
namespace System.Windows.Media
{
    /// Pixel Format Definition for images and pixel-based surfaces
    public struct PixelFormat
    {
        /// Describes order of each channel of pixel data
        public enum ChannelDescription
        {
            /// Undefined channel description
            Undefined = 0,
            /// single channel indexed (palletized) formats
            Index = 1,
            /// single channel gray formats
            Gray = 2,
            /// red-green-blue
            RGB = 3,
            /// blue-green-red
            BGR = 4,
            /// alpha-red-green-blue
            ARGB = 5,
            /// Cyan-magenta-yellow-black
            CMYK = 6
        }
        /// op_equality - returns whether or not the two pixel formats are equal
        public static bool operator == (PixelFormat left, PixelFormat right);
        /// Equals - Returns whether or not the two pixel formats are equal
        public static bool Equals(PixelFormat left, PixelFormat right);
        /// op_inequality - returns whether or not the two pixel formats are not equal
        public static bool operator != (PixelFormat left, PixelFormat right);
        /// Equals - Returns whether or not this is equal to the Object
        public override bool Equals(Object obj);
        /// GetHashCode - Returns a hash code
        public override int GetHashCode( );
        /// The number of bits per pixel for this format.
        public int BitsPerPixel { get; }
        /// Whether this format is a palletized (indexed) format.
        public bool IsPalletized { get; }
        /// Whether this format is a set of gray values.
        public bool IsGray { get; }
        /// Whether this format is CMYK values (cyan, magenta, yellow, black)
        public bool IsCMYK { get; }
        /// Whether this format is SRGB (Gamma is approximately 2.2)
        public bool IsSRGB { get; }
        /// Whether this format is Linear (Gamma is 1.0)
        public bool IsScRGB { get; }
```

```
            /// Whether this format has premultiplied alpha.
            public bool IsPremultiplied { get; }
            /// Describes the data of this format and its order.
            public ChannelDescription Channel { get; }
            /// Get the mask to use for obtaining the red channel for this format.
            /// Shift the mask by the leftShift amount to get the mask to use.
            public void GetRedMask(out uint mask, out int leftShift);
            /// Get the mask to use for obtaining the green channel for this format.
            /// Shift the mask by the leftShift amount to get the mask to use.
            public void GetGreenMask(out uint mask, out int leftShift);
            /// Get the mask to use for obtaining the blue channel for this format.
            /// Shift the mask by the leftShift amount to get the mask to use.
            public void GetBlueMask(out uint mask, out int leftShift);
            /// Get the mask to use for obtaining the alpha channel for this format.
            /// Shift the mask by the leftShift amount to get the mask to use.
            public void GetAlphaMask(out uint mask, out int leftShift);
            /// Get the masks to use for obtaining each channel for this format.
            /// Shift the masks by the leftShift amount to get the masks to use.
            public void GetRGBMasks(out uint redMask, out int redLeftShift,
                    out uint greenMask, out int greenLeftShift,
                    out uint blueMask, out int blueLeftShift);
    }
}
```

Each codec (ImageEncoder and ImageDecoder) is required to supply a CodecInfo that gives information about the codec, provides create instance methods for its associated decoder/encoder, and provides a method that determines if this codec matches a supplied CodecFilter.

```
namespace System.Windows.Media
{
        /// Information about a specific codec and a factory for creating
        /// the codec. This is returned from the codec enumerator.
        public abstract class CodecInfo
        {
                /// The number of bytes needed from the image header to
                /// determine if the image is supported by this codec.
                public abstract int RequiredHeaderSize { get; }
                /// Whether the codec supports this image, based on looking
                /// at the first RequiredHeaderSize bytes from the image. The header
                /// must contain at least the first RequiredHeaderSize bytes from the image.
                public abstract bool IsImageSupported(byte[ ] header);
                /// The Friendly name of a codec
                public abstract string FriendlyName { get; }
                /// Which Mime Types the codec supports.
                public abstract string[ ] MimeTypes { get; }
                /// Who authored the codec.
                public abstract string CodecAuthor { get; }
                /// The version number of the codec.
                public abstract System.Version CodecVersion { get; }
                /// Whether there is a decoder associated with this codec.
                public abstract bool HasDecoder { get; }
                /// Whether there is an encoder associated with this codec.
                public abstract bool HasEncoder { get; }
                /// Whether this codec is one of the built-in ones.
                public bool IsBuiltIn { get; }
                /// Determine if this codec matches the specified filter.
                /// Note: this does NOT check/sniff the bytes in the stream.
                public virtual bool MatchesFilter(CodecFilter filter);
                /// Get an instance of the decoder associated with this codec (if there is one).
                /// Get an instance of the decoder associated with this codec (if there is one).
                public abstract ImageDecoder CreateDecoderInstance(System.IO.Stream imageStream);
                //Get an instance of the encoder associated with this codec (if there is one).
                public abstract ImageEncoder CreateEncoderInstance( );
        }
}
```

Built-in CodecInfo objects are provided with the MIL, including CodecInfoBmp.cs, CodecInfoGif.cs, CodecInfoIcon.cs, CodecInfoJpeg.cs, CodecInfoPng.cs, CodecInfoTiff.cs, and CodecInfoWmp.cs.

The CodecFilter is used by the codec enumerator to enumerate codecs based on the specified criteria. Criteria that are not specified are ignored when looking for a matching codec. For example, if the MimeType is not set, then codecs with any mime type are considered.

```
namespace System.Windows.Media
{
    /// Filter for enumerating codecs. Only those codecs that match the
    /// properties will be enumerated.
    public class CodecFilter
    {
        /// Find a codec that can handle this image stream (by
        sniffing the stream).
        public System.IO.Stream ImageStream { get; set; }
        /// The Friendly name of a codec
        public string FriendlyName { get; set; }
        /// Does the codec support this Mime Types.
        public string MimeType { get; set; }
        /// Does the codec match this author.
        public string CodecAuthor { get; set; }
        /// Is the codec's version >= this version.
        public System.Version MinVersion { get; set; }
        /// Is the codec's version <= this version.
        public System.Version MaxVersion { get; set; }
        /// Find those codecs that have a matching decoder.
        Setting this
        /// to false means that we don't filter on whether or not there is
        /// a decoder for that codec.
        public bool HasDecoder { get; set; }
        /// Find those codecs that have a matching encoder. Setting this
        /// to false means that we don't filter on whether or not there is
        /// an encoder for that codec.
        public bool HasEncoder { get; set; }
        /// Find those codecs that are built-in (not add-ins).
        Setting this
        /// to false means that we don't filter on whether or not the
        /// codec is one of the built-in ones.
        public bool IsBuiltIn { get; set; }
    }
}
```

When the enumerator is constructed (its ctors are internal), it is given a CodecFilter. That filter is used to determine which codecs to enumerate. Only those that match the filter (if any) are enumerated.

```
namespace System.Windows.Media
{
    /// The enumerator for Image frames.
    public class ImageCodecEnumerator : IEnumerator
    {
        /// Reset - resets the position to before the first object in
        the collection.
        // /A call to MoveNext must precede any call to Current after
        a Reset.
        public void Reset( );
        /// MoveNext - Move to the next object in the collection.
        Returns false if the enumerator
        /// has passed the end of the collection
        public bool MoveNext( );
        /// Current - returns the current object in the collection
        public object Current { get; }
    }
}
```

ImageEffect is the base class for raster-based imaging effects. An ImageEffect can be viewed as a collection of 0 or more inputs and 0 or more outputs. The inputs and outputs to an ImageEffect are all of type ImageSource. An ImageEffect is typically initialized with its inputs and its properties and then its outputs are used either to draw part of a scene or as frames for an ImageEncoder. Built-in effects include (but are not limited to) the following: ImageEffectBlur, ImageEffectFlipRotate, ImageEffectGammaCorrect, ImageEffectGlow, ImageEffectGrayscale, ImageEffectNegate, ImageEffectSharpen, ImageEffectTint.

Transform

Figure 7:
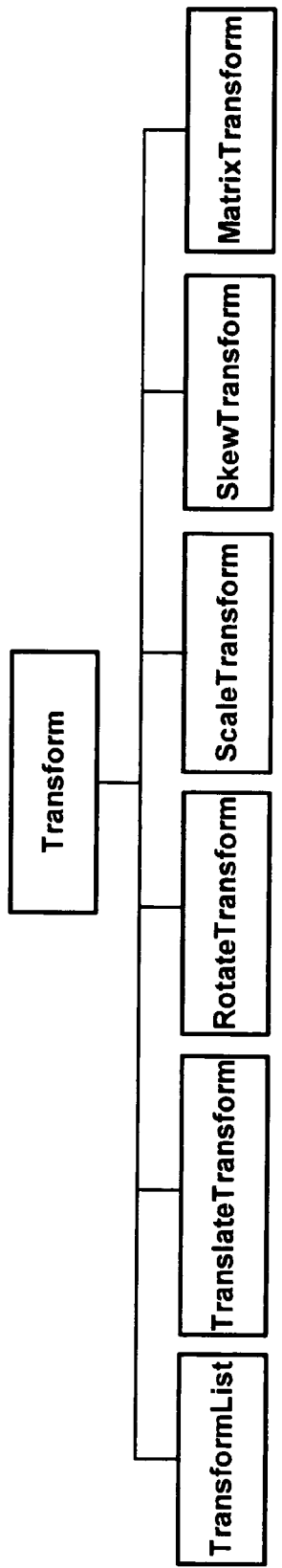
FIG. 7 is a representation of a transform class hierarchy, in accordance with an aspect of the present invention.

The Transform class of objects, represented in FIG. 7, can be used for scaling, rotating, translating and skewing vector and raster graphics. The derived Transform classes provide friendly usage and enumeration semantics. The transform class hierarchy differs from the Matrix struct by being a class and supporting animation and enumeration semantics:

TransformCollection (enumerating semantics, etc.)

TransformCollection.AddScale( . . . )

Animate MatrixTransform

Transform is the abstract base class:

```
[TypeConverter(typeof(TransformConverter))]
public abstract class Transform : Animatable, IDisposeable
{
    internal Transform( );
    public new Transform Copy( );
    public static MatrixTransform CreateMatrix(Matrix matrix);
    public static TranslateTransform CreateTranslation(double x,
        double y);
    public static RotateTransform CreateRotation(double angle);
    public static RotateTransform CreateRotation(double angle,
        Point center);
    public static ScaleTransform CreateScale(double scaleX, double
        scaleY);
    public static ScaleTransform CreateScale(
        double scaleX,
        double scaleY,
        Point center);
    public static SkewTransform CreateSkew(double angleX, double
        angleY);
    public static SkewTransform CreateSkew(
        double angleX,
        double angleY,
        Point center);
    // Identity transformation
    public static Transform Identity { get; }
    public abstract Matrix Value { get; }
}
```

A TransformCollection is a collection of Transform objects whose value is the matrix multiplication of the individual Transform values. The value is composed left to right, matching the first and last items of the collection:

```
public sealed class TransformCollection : Transform, IAddChild, IList
{
    public TransformCollection( );
    public TransformCollection(int capacity);
    public TransformCollection(params Transform[ ] transforms);
    public TransformCollection(ICollection transformCollection);
    public new TransformCollection Copy( );
    // IEnumerable
    public IEnumerator GetEnumerator( );
    // ICollection
    public int Count { get; }
    public bool IsSynchronized { get; }
    public object SyncRoot( );
```

```
    public void CopyTo(Array array, int index);
    // IList
    public bool IsFixedSize { get; }
    bool IList.IsReadOnly { get; }
    object IList.this[int index] { get; set; }
    int IList.Add(object value);
    public void Clear( );
    bool IList.Contains(object value);
    int IList.IndexOf(object item);
    void IList.Insert(int index, object value);
    void IList.Remove(object value);
    public void RemoveAt(int index);
    //Extra functions
    public int Capacity { get; set; }
    public Transform this[int index] { get; set; }
    public int Add(Transform transform);
    public bool Contains(Transform transform);
    public int IndexOf(Transform transform);
    public int IndexOf(Transform transform, int startIndex);
    public int IndexOf(Transform transform, int startIndex, int count);
    public int LastIndexOf(Transform transform);
    public int LastIndexOf(Transform transform, int startIndex);
    public int LastIndexOf(Transform transform, int startIndex, int count);
    public void Insert(int index, Transform transform);
    public void Remove(Transform transform);
    public void AddRange(TransformCollection transformCollection);
    public void SetRange(int index, TransformCollection transformCollection);
    public void InsertRange(int index, TransformCollection transformCollection);
    public void RemoveRange(int index, int count);
    public TransformCollection GetRange(int index, int count);
    // IAddChild
    void IAddChild.AddChild(Object o);
    void IAddChild.AddText(string s);
    public override Matrix Value { get; }
    public void AddMatrix(
        double m11,
        double m12,
        double m21,
        double m22,
        double offsetX,
        double offsetY);
    public void AddMatrix(Matrix matrix);
    public void AddTranslate(double translateX, double translateY);
    public void AddRotate(double angle);
    public void AddRotate(double angle, Point center);
    public void AddScale(double scaleX, double scaleY);
    public void AddScale(double scaleX, double scaleY, Point center);
    public void AddSkew(double angleX, double angleY);
    public void AddSkew(double angleX, double angleY, Point center);
    public Transform GetOptimizedTransform( );
}
```

A RotateTransform defines a rotation by an angle about a specific center point (the default being 0,0.) The angle is specified in degrees. A static matrix representation for rotation angle about point x,y is as follows.

$$\begin{bmatrix} 1 & 0 & 0 \\ 0 & 1 & 0 \\ -x & -y & 1 \end{bmatrix} * \begin{bmatrix} \cos(\text{angle}) & \sin(\text{angle}) & 0 \\ -\sin(\text{angle}) & \cos(\text{angle}) & 0 \\ 0 & 0 & 1 \end{bmatrix} * \begin{bmatrix} 1 & 0 & 0 \\ 0 & 1 & 0 \\ x & y & 1 \end{bmatrix}$$

```
public sealed class RotateTransform : Transform
{
    public RotateTransform( );
    public RotateTransform(double angle);
    public RotateTransform(
        double angle,
        Point center);
    public RotateTransform(
        double angle,
```

$$\begin{bmatrix} 1 & 0 & 0 \\ 0 & 1 & 0 \\ -x & -y & 1 \end{bmatrix} * \begin{bmatrix} \cos(\text{angle}) & \sin(\text{angle}) & 0 \\ -\sin(\text{angle}) & \cos(\text{angle}) & 0 \\ 0 & 0 & 1 \end{bmatrix} * \begin{bmatrix} 1 & 0 & 0 \\ 0 & 1 & 0 \\ x & y & 1 \end{bmatrix}$$

```
        DoubleAnimationCollection angle,
        Point center,
        PointAnimationCollection center);
    public new RotateTransform Copy( );
    [Animations("AngleAnimations")]
    public double Angle { get; set; }
    public DoubleAnimationCollection AngleAnimations { get; set; }
    [Animations("CenterAnimations")]
    public Point Center { get; set; }
    public PointAnimationCollection CenterAnimations { get; set; }
    public override Matrix Value { get; }
}
```

TranslateTransform defines an axis aligned translation in the x and y direction. The static matrix representation for translation by offset dx,dy is as follows.

$$\begin{bmatrix} 1 & 0 & 0 \\ 0 & 1 & 0 \\ dx & dy & 1 \end{bmatrix}$$

```
public sealed class System.Windows.Media.TranslateTransform : Transform
{
    public TranslateTransform( );
    public TranslateTransform(
        double offsetx,
        double offsety);
    public TranslateTransform(
        double offsetx, DoubleAnimationCollection offsetx,
        double offsety, DoubleAnimationCollection offsety);
    public new TranslateTransform Copy( );
    [Animations("XAnimations")]
    public double X { get; set; }
    public DoubleAnimationCollection XAnimations { get; set; }
    [Animations("YAnimations")]
    public double Y { get; set; }
    public DoubleAnimationCollection YAnimations { get; set; }
    public override Matrix Value { get; }
}
```

ScaleTransform defines a scale in the x and y direction about a center point (the default being 0,0.) The static matrix representation for scale sx, sy about the point x,y is as follows.

$$\begin{bmatrix} 1 & 0 & 0 \\ 0 & 1 & 0 \\ -x & -y & 1 \end{bmatrix} * \begin{bmatrix} sx & 0 & 0 \\ 0 & sy & 0 \\ 0 & 0 & 1 \end{bmatrix} * \begin{bmatrix} 1 & 0 & 0 \\ 0 & 1 & 0 \\ x & y & 1 \end{bmatrix}$$

```
public sealed class ScaleTransform : Transform
{
    public ScaleTransform( );
    public ScaleTransform(
        double scaleX,
        double scaleY);
    public ScaleTransform(
        double scaleX,
        double scaleY,
        Point center);
    public ScaleTransform(
        double scaleX,
        DoubleAnimationCollection scaleXAnimations,
        double scaleY,
```

$$\begin{bmatrix} 1 & 0 & 0 \\ 0 & 1 & 0 \\ -x & -y & 1 \end{bmatrix} * \begin{bmatrix} sx & 0 & 0 \\ 0 & sy & 0 \\ 0 & 0 & 1 \end{bmatrix} * \begin{bmatrix} 1 & 0 & 0 \\ 0 & 1 & 0 \\ x & y & 1 \end{bmatrix}$$

```
        DoubleAnimationCollection scaleYAnimations,
        Point center,
        PointAnimationCollection center);
    public new ScaleTransform Copy( );
    [Animations("XAnimations")]
    public double ScaleX { get; set; }
    public DoubleAnimationCollection ScaleXAnimations { get; set; }
    [Animations("YAnimations")]
    public double ScaleY { get; set; }
    public DoubleAnimationCollection ScaleYAnimations { get; set; }
    [Animations("CenterAnimations")]
    public Point Center { get; set; }
    public PointAnimationCollection CenterAnimations { get; set; }
    public override Matrix Value { get; }
}
```

SkewTransform defines a skew by angle degrees along the x and y direction. The skew angle is in degrees. The static matrix representation for skew by angle is as follows.

$$\begin{bmatrix} 1 & \tan(angleY) & 0 \\ \tan(angleX) & 1 & 0 \\ 0 & 0 & 1 \end{bmatrix}$$

```
public sealed class SkewTransform : Transform
{
    public SkewTransform( );
    public SkewTransform(
        double angleX,
        double angleY);
    public SkewTransform(
        double angleX,
        double angleY,
        Point center);
    public SkewTransform(
        double angleX,
        DoubleAnimationCollection angleXAnimations,
        double angleY,
        DoubleAnimationCollection angleYAnimations,
        Point center,
        PointAnimationCollection pointAnimations);
    public new SkewTransform Copy( );
    [Animations("AngleXAnimations")]
    public double AngleX { get; set; }
    public DoubleAnimationCollection AngleXAnimations { get; set; }
    [Animations("AngleYAnimations")]
    public double AngleY { get; set; }
    public DoubleAnimationCollection AngleYAnimations { get; set; }
    [Animations("CenterAnimations")]
    public Point Center { get; set; }
    public PointAnimationCollection CenterAnimations { get; set; }
    public override Matrix Value { get; }
}
```

MatrixTransform defines a transform through its mathematical representation:

```
public sealed class MatrixTransform : Transform
{
    public MatrixTransform( );
    public MatrixTransform(
        double m11,
        double m12,
        double m21,
        double m22,
        double offsetX,
        double offsetY);
    public MatrixTransform(Matrix matrix);
    public new MatrixTransform Copy( );
    public Matrix Matrix { get; set; }
    public override Matrix Value { get; }
}
```

When a Transform type property is specified in markup, the property system uses the Transform type converter to convert the string representation to the appropriate Transform derived object. There is currently no way to describe animated properties using this syntax.

The syntax is in vector graphics and the corresponding Transform construction is summarized as follows, wherein parameters denoted by "<>" represent optional parameters:

matrix(m11 m12 m21 m22 offsetX offsetY)
    AddMatrix(m11, m12, m21, m22, offsetX, offsetY)
translate(tx <ty>)
    AddTranslate(tx, ty).
    If ty is not specified it's assumed to be 0.
scale(sx <sy>)
    AddScale(sx, sy).
    If sy is not specified it's assumed to be same as sx.
rotate(angle <cx> <cy>)
    AddRotate(angle, Point(cx,cy)).
    If cx, cy is not specified it's assumed to be 0,0.
skewX(angle)
    AddSkew(angle, 0)
skewY(angle)
    AddSkew(0, angle)

```
transform-list:
    wsp* transforms? wsp*
transforms:
    transform
    | transform comma-wsp+ transforms
transform:
    matrix
    | translate
    | scale
    | rotate
    | skewX
    | skewY
matrix:
    "matrix" wsp* "(" wsp*
        number comma-wsp
        number comma-wsp
        number comma-wsp
        number comma-wsp
        number comma-wsp
        number wsp* ")"
translate:
    "translate" wsp* "(" wsp* number ( comma-wsp number )? wsp* ")"
scale:
    "scale" wsp* "(" wsp* number ( comma-wsp number )? wsp* ")"
rotate:
    "rotate" wsp* "(" wsp* number ( comma-wsp number comma-wsp number )? wsp* ")"
skewX:
    "skewX" wsp* "(" wsp* number wsp* ")"
skewY:
    "skewY" wsp* "(" wsp* number wsp* ")"
```

Effects

Effects provide a means to alter the visual contents of a scene in a rendering-centric manner. For example, ImageEffects (raster-based bitmap effects) operate on the image-based, fully composited representation of a portion of a scene. Effects are broken down into various types including ImageEffects, BlendModes and VectorEffects.

ImageEffects can be used in a retained-mode scene by applying it to a sub-graph or an Element, or it can be used in the standalone image pipeline. In general, a ImageEffect has zero or more inputs and zero or more outputs, which are of type ImageSource. In the immediate mode image pipeline, there need not be an output, as the ImageEffect can surface other properties which describe attributes of its input. For example, a ImageEffect could emit color histogram information or face-detection information. In the retained mode scene, there is an additional meta-input which provides access to the rendered contents of the sub-graph to which the effect is applied.

```
/// The ImageEffect class is the base class for all imaging effects (blur,
grayscale, etc)
///
/// It's possible for an effect to not have any inputs but an effect
must always have
/// at least one output. The default implementations of things assume this.
If a derived
/// effect is going to play with Output/Outputs be sure that at least
one is there.
public abstract class System.Windows.Media.ImageEffect: Changeable
{
    /// This constructor allows a derived class to specify the number
    of inputs and
    /// outputs for this effect, and this class will then handle the
    input and output
    /// arrays, inlcuding validation of indicies.
    /// This defaults to 1 and 1. If the effect wishes to have a
    variable
    /// number of inputs or outputs, it can pass −1 for either (or
    both) counts,
    /// and the input and output collections will allow this.
    /// Finally, these methods are all virtual, so derived classes may
    choose not
    /// to delegate back to the base class, in which case no extra cost
    is incurred.
    protected ImageEffect(int inputCount, int outputCount);
    /// This constructor allows a derived class to specify the number
    of inputs and
    /// outputs for this effect, and this class will then handle the
    input and output
    /// arrays, inlcuding validation of indicies.
    /// This defaults to 1 and 1. If the effect wishes to have a
    variable
    /// number of inputs or outputs, it can pass −1 for either (or
    both) counts,
    /// and the input and output collections will allow this.
    /// Finally, these methods are all virtual, so derived classes may
    choose not
    /// to delegate back to the base class, in which case no extra cost
    is incurred.
    protected ImageEffect(int inputCount, int outputCount, double
    scaleX, double scaleY);
    /// This is the first input, and is an alias for Inputs[0]
    ///
    /// Perfomance Warning:
    ///    If the input of the effect IS NOT in a format that
    ///    the effect supports the effect will convert the
    ///    input to a workable format for you.
    public virtual ImageSource Input { get; set; }
    /// This is the collection of inputs
    public virtual ImageSourceCollection Inputs { get; }
    /// This is the first output, and is an alias for Outputs[0]
    public virtual ImageSource Output { get; set; }
    /// This is the collection of outputs
    public virtual ImageEffectSourceCollection Outputs { get; }
    protected internal virtual ImageSource GetOutput(int
    outputIndex);
    /// These values contain the horizontal and vertical scale applied
    to this source.
    /// There are occasions when an effect needs to operate at a
    different resolution
    /// or a different coordinate space than the current, logical
    coordinate space.
    /// Thus, these properties enable the consumer to map between
    local space and
    /// ImageEffectSource space.
    protected internal virtual double GetScaleX(int outputIndex);
    protected internal virtual double GetScaleY(int outputIndex);
    protected internal virtual PixelFormat GetFormat(int outputIndex);
    /// Width, in pixels, of the image.
    protected internal virtual int GetPixelWidth(int outputIndex);
    /// Height, in pixels, of the image.
    protected internal virtual int GetPixelHeight(int outputIndex);
    /// Horizontal DPI of the image.
    protected internal virtual double GetDpiX(int outputIndex);
    /// Vertical DPI of the image.
    protected internal virtual double GetDpiY(int outputIndex);
    /// Get a palette for a particular output
    protected internal virtual ImagePalette GetPalette(int outputIndex);
    /// ImageSource abstract method implementation
    ///
    /// PixelOffset actually doesn't do anything. If you don't want to
    start at (0,0)
    /// in the input, then have your sourceRect start at the point
    you want.
    protected internal abstract void Copy(int outputIndex,
        IntegerRect sourceRect, PixelFormat pixelFormat, byte[ ]
        pixels, int stride,
        int pixelOffset);
}
```

BlendModes are a specific form of image-based effects. They can be applied to the retained mode scene in generally the same manner as ImageEffects. Thus there is an Element property ("BlendMode"), as well as a BlendMode property on Visual, a PushBlendMode method on IDrawingContext and a BlendMode property on Brush. Blend modes perform a combination of the source and destination colors as the source is composited. Example of Blend modes include Multiply, Add, and so forth. VectorEffects are another type of effects. As described in the Overview, BlendModes describe an operation which controls the way in which an image is composited into another image, or into the scene. BlendModes can be applied to the scene and to Brushes. Each BlendMode describes a way to combine a source pixel and a destination pixel, and is applied to every pixel being composited. BlendModes are applied after a source is scaled or otherwise transformed, and after any effects are applied (including Opacity). Note that when the BlendMode operations are applied, the source and destination are in pre-multiplied alpha format. To specify a BlendMode, the programmer can use one of the BlendModes specified in the BlendModes static class, or can explicitly set the source and destination multipliers. Because in one implementation the multipliers are not extensible and they have no parameters, they are represented by an enum:

```
/// The four values associated with each BlendModeMultiplier are
/// multiplied by the corresponding channel in the color to which
/// the BlendModeMultiplier is applied.
/// The factors are multiplied by the Alpha, Red, Green and Blue
/// channels, respectively
/// where in-gamut values range from [0..1].
public enum BlendModeMultipliers
{
    /// Zero - (0,0,0,0)
    Zero,
    /// One - (1,1,1,1)
```

```
    One,
    ///SourceColor - (Alpha_source, Red_source, Green_source,
    Blue_source)
    SourceColor,
    ///InverseSourceColor - (1-Alpha_source, 1-Red_source,
    1-Green_source,
    ///1-Blue_source)
    InverseSourceColor,
    ///SourceAlpha - (Alpha_source, Alpha_source, Alpha_source,
    Alpha_source)
    SourceAlpha,
    ///InverseSourceAlpha - (1-Alpha_source, 1-Alpha_source,
    1-Alpha_source,
    ///1-Alpha_source)
    InverseSourceAlpha,
    ///DestinationColor - (Alpha_destination, Red_destination,
    Green_destination,
    ///Blue_destination)
    DestinationColor,
    ///InverseDestinationColor -
    ///   (1-Alpha_destination, 1-Red_destination, 1-Green_destination,
    ///1-Blue_destination)
    InverseDestinationColor,
    ///DestinationAlpha - (Alpha_destination, Alpha_destination,
    ///Alpha_destination, Alpha_destination)
    DestinationAlpha,
    ///InverseDestinationAlpha -
    ///   (1-Alpha_destination, 1-Alpha_destination, 1-Alpha_destination,
    ///1-Alpha_destination)
    InverseDestionaAlpha,
    ///SourceAlphaSaturate - f = min(Alpha_source, 1 - Alpha_destination),
    ///(1, f, f, f)
    SourceAlphaSaturate
}
///This class represents a blend operation between a source and
///destination surface
public sealed class BlendMode: Changeable
{
    //Constructs a custom BlendMode from the provided
    //BlendModeMultipliers
    public BlendMode(BlendModeMultiplier sourceMultiplier,
        BlendModeMultiplier destinationMultiplier);
    public new BlendMode Copy( );
    public BlendModeMultiplier SourceMultiplier { get; }
    public BlendModeMultiplier DestinationMultiplier { get; }
}
///This is a collection of well-known BlendMode instances
public sealed class BlendModes
{
    ///Normal - Source is One, Destination is InverseSourceAlpha
    public static Normal {get;}
    ///SourceCopy - Source is One, Destination is Zero
    public static SourceCopy {get;}
}
```

Hit Testing

Hit testing is used to pick visuals in a scene. Some high-level scenarios include lasso selection and rubber band selection, keyboard navigation (used to find the next element to switch focus), determining mouse focus in the element tree, selecting overlapping elements with transparency (such as images), "thought bubble" hit testing and selecting a character hit in text.

In general, hit-testing provides consistency across Core, Framework and Controls, and operates by starting from the top of the control tree, and returning a control or set of controls by a point or geometry. A control can define whether it is hit or not with support services including rendered geometry, bounding box, out-of-band geometry (hit region), image opacity or mask, and its own logic. The control can return specific hit-related data on hit (e.g., line, character position, and so forth).

The hit test mechanism can filter hit test results in an efficient manner. Further, the hit test mechanism provides flexibility for extending to other types of Visuals and resolving down to sub-primitives within the Visual, e.g., a Retained3DVisual is one example of this.

The hit test walk is a deep right to left walk of the visual tree. There are three participants, the hit tester, the walker, and the control/visual. The hit tester implements two callbacks, one to steer the walker, and the other to end the walk early on certain hit visuals. The control implements a virtual method to define what is hit. The walker is a fixed part of the system and walks the visual tree based on callback behavior, essentially asking each control whether the control has been hit. Hits are reported through a callback in z-order, top-to-bottom fashion.

Internally, hit testing thus comprises a walk of the visual tree. When descending, the hit tester views the filtering in terms of element level relationships, for example, a canvas with shapes, or a dock panel with an inner canvas. When a hit occurs, the hit tester can either continue processing further hits (if any), or stop.

The control flow logic from the hit walker perspective is in the following pseudocode:

```
For each visual, starting at root:
    If hit point inside coalesced children hit bounds then
        (eg,
        HitTestBounds.Contains(HitPoint))
            Call hit tester delegate (e.g., HitTestFilterDelegate)
            If null or returns Continue then (e.g.,
            HitTestFilterBehavior.Continue)
                For each child visual
                    Transform hit point to its local space
                    Hit test against child visual (eg,
                    Visual.HitTest(...))
                    If child returns Stop then return (e.g.,
                    HitTestResultBehavior.Stop)
    If hit point inside visual (eg, Visual.HitTestCore(...))
        Call hit tester result delegate (HitTestResultDelegate)
        Either continue or stop (e.g.,
        HitTestResultBehavior.Continue)
```

The hit tester uses public methods to initiate the hit test and provides delegates for controlling behavior. The default behavior is to test against all visuals and return on the first hit. If no result delegate is given, an exception is thrown.

The control decides its hit test logic by overriding HitTestCore for point and geometry. When a hit test is initiated, internal visual tree walker calls HitTestCore, in effect asking the control whether it is hit. The HitTestBounds reflect tight bounds of the hit region and is used to optimize the walk. The default visual behavior is to test against the render content bounding box. The default hit bounds is the render content bounding box.

```
public class Visual : DependencyObject, IDisposable, IVisual
{
    // Ignore non hit testing stuff
    // HitTestCore is implemented by visual author to hit against its
    // content only.
    protected virtual PointHitTestResult HitTestCore(
        PointHitTestParameters point);
    protected virtual GeometryHitTestResult HitTestCore(
        GeometryHitTestParameters geometry);
    protected virtual Rect HitTestBounds { get; }
}
public delegate HitTestFilterBehavior
HitTestFilterDelegate(Visual visual);
public delegate HitTestResultBehavior
HitTestResultDelegate(HitTestResult result)
```

```
public interface IVisual
{
    // Ignore non hit testing stuff
    // Return top most visual hit
    public PointHitTestResult HitTest(Point point);
    // HitTest is called to initiates a hit test against a visual tree.
    void HitTest(
        HitTestFilterDelegate filterHitDelegate,
        HitTestResultDelegate resultHitDelegate,
        HitTestParameters hitTestParams);
}
```

The hit tester initiates the hit test by passing in a hit point or geometry and additional parameters in the HitTestParameters. The class is provided primarily to simplify the design and allow for extensibility going forward. Special hit testing requests can derive from this class to pass additional information to interested controls. Each control implements a specific HitTestCore against a point and geometry. It is expected that controls respect the hit testing parameters when implementing their HitTestCore logic.

```
public abstract class HitTestParameters
{
    // Common hit testing parameters
    internal HitTestParameters( );
}
public class PointHitTestParameters : HitTestParameters
{
    public PointHitTestParameters(Point point);
    Point HitPoint { get; }
}
// Returns detailed intersection information between
// two geometry objects.
enum IntersectionDetail
{
    // Intersection detail is empty or not requested.
    EmptyOrNotCalculated,
    // First geometry is fully inside second geometry.
    FullyInside,
    // Second geometry fully contains the first geometry.
    FullyContains,
    // First and second geometry edges intersect.
    Intersects
}
public class GeometryHitTestParameters : HitTestParameters
{
    Public GeometryHitTestParameters(
        Geometry geometry,
        bool computeIntersectionDetail);
    public Geometry HitGeometry { get; }
    public bool ComputeIntersectionDetail { get; }
}
```

The control returns specific data by deriving from HitTestResult. For example, a text control may want to return the character position hit. The PointHitTestResult contains the local coordinate space point. The GeometryHitTestResult contains the local coordinate space geometry (of the original hit test.) The visual transform functions can map the hit location to an ancestor space.

```
public abstract class HitTestResult
{
    internal HitTestResult(Visual visual);
    public Visual Visual { get; }
}
public class PointHitTestResult : HitTestResult
{
    public PointHitTestResult(Visual visual, Point point);
    public Point Point { get; }
}
public class GeometryHitTestResult : HitTestResult
    public GeometryHitTestResult(
        Visual visual,
        Geometry geometry,
        IntersectionDetail intersectionDetail);
    public Geometry Geometry { get; }
    // This is only set if the
    GeometryHitTestParameters.IntersectionDetail
    public IntersectionDetail IntersectionDetail { get; }
}
```

To illustrate use of delegates, consider a hit tester who wants the first top most hit using anonymous delegates:

```
public Visual HitTest(Visual visual, Point pt)
{
    Visual visualHit = null;
    visual.HitTest(
        new PointHitTestParameters(pt),
        null,
        HitTestResultDelegate(HitTestResult htr) {
            visualHit = htr.Visual;
            return HitTestResultBehavior.Stop;
        }
    );
    return visualHit;
}
```

Another example is a hit tester who wants to return all of the visuals that were hit:

```
public Visual[ ] HitTest(Visual visual, Point pt)
{
    ArrayList visualsHit = new ArrayList( );
    visual.HitTest(
        new PointHitTestParameters(pt),
        null,
        HitTestResultDelegate(HitTestResult htr) {
            visualsHit.Add(htr.Visual);
            return HitTestResultBehavior.Continue;
        }
    );
}
```

The hit tester uses enums to control hit test filtering and result behavior:

```
public enum HitTestFilterBehavior
{
    //
    ContinueSkipChildren,
    ContinueSkipVisualAndChildren,
    ContinueSkipVisual,
    Continue,
    Stop
}
```

The HitTestFilterBehavior enum controls filtering behavior in that specifying SkipChildren hit tests this visual, but not its children visuals. SkipVisualAndChildren specifies not to hit test the visual or children visuals. SkipVisual specifies not to hit test the visual, but hit test any children visuals. Continue specifies to hit test this visual and its children visuals. Stop specifies to not hit test any visuals in the visual tree and return to caller.

The HitTestResultBehavior enum controls hit test behavior:

```
public enum HitTestResultBehavior
{
    Stop,
    Continue
}
```

Stop specifies to return to the hit test entry, skipping any further filter or hit test operations. Continue specifies to hit test against the next visual.

Although hit test identifiers may be used to mark specific content for positive hit identification, performance was poor because such a model broke up the render stream, added to walk overhead and was difficult to manage when hit testing. With the combining of element and visual into a unified type, the basic level of granularity is the visual itself, and controls can structure themselves to get the level of granularity they desire.

The control author writes logic for hit by overriding HitTestCore and doing its own computation and/or using the services described below.

The following are some examples that demonstrate the power of these services.

A first example demonstrates a control having a public HitRegion property that represents the hit sensitive region of the control. Note that the hit region need not match the rendered contents, and may be optimized by some applications. If the hit region is not set (_hitRegion==null) the control defers to the base implementation services to determine a hit.

```
public class HitRegionControl : Control    // derives from visual.
{
    private Geometry _hitRegion;
    public Geometry HitRegion
    {
        get
        {
            return _hitRegion;
        }
        set
        {
            _hitRegion = value;
        }
    }
    protected virtual PointHitTestResult
    HitTestCore(PointHitTestParameters htParams)
    {
        bool IsHit = (_hitRegion != null) ?
            _hitRegion.DoesContain(htParams.Point) :
            IsHitRenderContents(htParams);
        return isHit ? new PointHitTestResult(this, htParams.Point) :
            null;
    }
    protected virtual GeometryHitTestResult HitTestCore(
        GeometryHitTestParameters htParams)
    {
        IntersectionDetail intersectDetail = (_hitRegion != null) ?
            _hitRegion.DoesContain(
                htParams.Geometry,
                htParams.ComputeIntersectionDetail) :
            HitTestRenderContents(htParams);
        return (intersectDetail != IntersectionDetail.Empty) ?
            new GeometryHitTestResult(
                this,
                htParams.Geometry,
                intersectDetail) : null;
    }
    protected virtual Rect HitTestBounds
    {
        get
        {
            return (_hitRegion != null) ? _hitRegion.Bounds :
                GetContentBoundingBox( )
        }
    }
}
```

To override IsHit behavior use additional support services.

The Geometry classes perform a hit test against its interior area:

```
public abstract class Geometry : Changeable
{
    public virtual bool DoesContain(Point point);
    public virtual bool DoesContain(Geometry geometry);
    public virtual IntersectionDetail DoesContainWithDetail(Geometry
        geometry);
}
```

The visual provides protected functions to hit test against the rendered contents (of itself). If a visual is retained, this will trigger a content validation. This helper examines the drawing instruction stream stored on the visual, one instruction at a time, hit testing the point or geometry for each with the rendered geometry.

```
public class Visual : DependencyObject, IDisposable, IVisual
{
    protected Rect VisualDescendantBounds { get; }
    protected Rect VisualContentBounds { get; }
}
```

The code will return if the image pixel at the point is above the alpha threshold. The point is in visual space and the transform is to device space where the pixel based test occurs.

```
public class ImageData : ImageSource
{
    public virtual bool HitTestImageContents(
        HitTestParameters htParams,
        Transform transform);
}
```

Animation

The animation system is comprised of two main sets of components, namely a timing control engine and a set of animation objects. The timing engine is a service that can be used by any objects that exhibit time-varying behaviors, the main examples being animations and audio or video media objects. Animation objects implement a set of functions that map time spans into other data types, which are then used as inputs into other higher-level objects.

Graphical animation is achieved by associating an animation collection with a rendering operation. For example, the IDrawingContext.DrawLine method takes a pen and two end points. One of the end points may be associated with a collection of PointAnimation objects, in which case the line will move over time. Similarly, the pen may have an associated collection of ColorAnimation objects. In such cases, each animation used in a rendering operation may be run on a separate clock, sometimes referred to as a called a "timeline." Once an animated primitive is drawn, the rendering system takes care of redrawing the scene at regular intervals. Each time a frame is rendered the current value of the animations involved in the scene is computed, based on the elapsed time (in most cases measured by the system clock), and then the animated primitives are redrawn.

Programming animations requires an understanding both of the animation objects provided by the system as well as the timing engine driving those animations. The following terms are used in several places in this section.

A Timing model is provided in which timed objects participate in a hierarchical timing system where individual timelines have attributes that define their behavior relative to their parent timeline, or, for top-level timelines, relative to a root "document" (or "page", or "frame") timeline. Timing attributes are a set of parameters that defines the time behavior of an object. Timing attributes are exclusively descriptive and have no run-time state. In addition, timing attributes are immutable.

A timeline is an instance of a timing entity that maintains a run-time state according to a set of timing attributes. A timeline defines the concept of "now" for a timed object. A timing tree is a data structure containing a set of timelines arranged in a hierarchical fashion. The relationship between the timelines is defined by a set of inheritance rules and by the timing attributes associated with each timeline.

A timed object is any object that exhibits a time-varying behavior. The description of the time behavior of a timed object is specified by a set of timing attributes, whereas its run-time timing state is maintained by one or more timelines. An animation function is a function that takes a base value of a particular data type as an input and produces a value of the same type as its output. An animation function may or may not take other implicit or explicit input parameters, such as the current time value of a Timeline. In that respect, an animation function may not be constant, in that the same input may produce different outputs at different times.

A modifier is an object that implements an animation function and is used to modify the value of a property of an Element, some other complex object, or a parameter to a rendering call. A timed modifier is a modifier that is associated with a Timeline, and whose animation function explicitly depends on the run-time state of that Timeline. An animation is a timed modifier that implements a certain known set of animation functions.

An animation collection is a collection of modifiers that process the same data type. An animation collection chains the output of a modifier to the input of another, creating a modifying pipeline. Since the whole collection takes one input and produces one output, the collection itself behaves as a modifier.

Timelines can be thought of as stopwatches that control time-varying processes, such as the playback of a video clip or an animation. Times that are specified in the attributes of a timeline are relative to something. In most cases they are relative to a parent timeline, but for timelines at the root of the tree the values are relative to "document time," where document time is an implicit timeline that starts when the application is launched, or when a page or frame is navigated. The clock in a timeline is exposed in two ways: as an offset from the begin point, or as a progress ratio between 0 and 1. The latter is simply the ratio of the current time to the duration.

Figure 29:
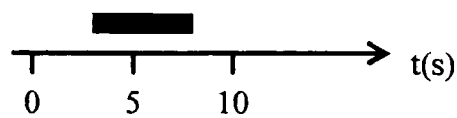
FIGS. 29-40 are graphical representations of example timelines used in animation, in accordance with an aspect of the present invention.

The simplest timeline has a begin time and a duration. For example, a timeline with a begin time of three seconds and a duration of five seconds "begins" three seconds after the reference t=0 time (by default, the moment application is loaded), and "ends" five seconds later. During those five seconds the timeline is said to be "on." If this timeline controls an animation, this animation is changing (e.g., moving) for that time, but it is static before and after. FIG. 29 shows a timeline with a Begin time of three and a Duration of five.

Figure 30:
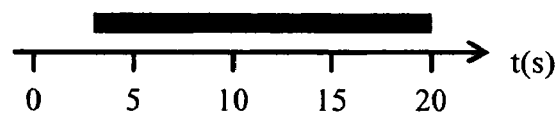

A timeline can also be programmed to repeat its behavior. This repeat can be specified as an iteration count, or a repeat duration. The timeline goes through as many begin to end runs as necessary to fill the requested count or duration. If the repeat count is not an integer value, the last iteration is interrupted in the middle. FIG. 30 shows a timeline with Begin=3, Duration=5 and RepeatDuration=17 (meaning the animation will repeat, every five seconds, until seventeen seconds after the begin time or twenty seconds).

Figure 31:
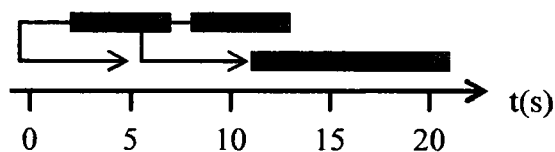

The begin time for a timeline is normally relative to its parent timeline (or to document time), but a begin time may also be specified relative to another timeline's begin or end. In such a situation, every begin (or end) in the source timeline causes a corresponding begin to be scheduled for the target timeline. FIG. 31 shows a timeline with a begin time 3 s after another's timeline.

Figure 32:
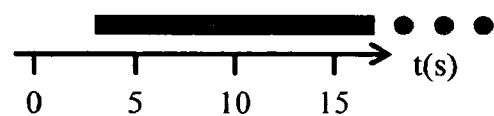

When a timeline reaches the end point it is immediately turned "off." At that time, the timed object that it controls ceases to have an effect on the presentation. For example, if the timed object is an animation then when the controlling timeline reaches the end point the animation is removed, i.e., it reverts back to its base value. There are cases, however, where it is desirable to have the final steady state of an animation be frozen at the last value. In other words, the timeline progresses from 0 to 1 between the begin and end points, but after the end point it remains "on" with a progress of 1. This is called a "fill" behavior. FIG. 32 represents a timeline with Begin=3, Duration=5 and Fill=Freeze Time flows linearly from a progress value of 0 to a progress value of 1, from the point of view of a timeline. However, the relationship between the passage of time inside a timeline and inside its parent can be altered from the default direct correlation, in that time may be reversed in a timeline so that it appears to flow backwards, the rate at which time passes may be sped up or slowed down by a multiplicative factor, and/or the progress curve may be morphed so that instead of progressing linearly from 0 to 1, it accelerates from a standstill at the begin point to a maximum rate of progress, and then decelerates towards a standstill at the end point. This produces an "ease-in, ease-out" effect for any animations controlled by this timeline.

Figure 33:
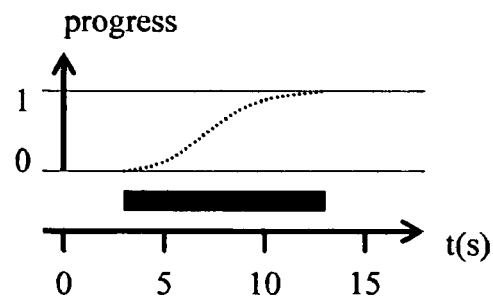

More particularly, the progress/time curve is linear by default. When this linear curve is used to control certain animations, the user perceives a "jerk" effect at the begin and end points because the animation starts and ends suddenly. For those cases, a timeline can be programmed to accelerate the passage of time from a standstill to a maximum rate using a smooth acceleration curve. Similarly, time may be programmed to decelerate towards zero near the end point. The acceleration and deceleration effects are specified as the percentage of the duration spent in the acceleration or deceleration phases. The two values are positive, and their sum is not to exceed one. FIG. 33 shows A timeline with Begin=3, Duration=10, Acceleration=0.2 and Deceleration=0.4

Figure 34:
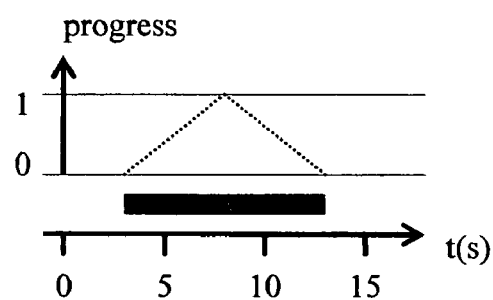

One straightforward time manipulation involves programming a timeline to go from a progress value of zero to one, and then back to zero. In that case, the timeline is active for twice the specified duration, once for the "forward" part and once again for the "backwards" part. FIG. 34 shows a timeline with Begin=3, Duration=5 and AutoReverse=True.

Figure 35:
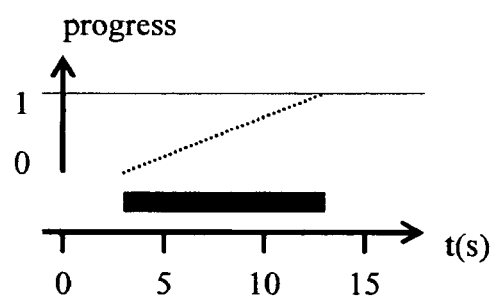

The apparent passage of time for a timeline can be faster or slower than that for its parent, by a constant factor. By default this factor is 1, which means time in a timeline and its parent passes at the same rate. If instead this value is greater than one, then time for the timeline progresses at a faster rate than for its parent. For example, a factor of three makes the timeline go between the begin and end points three times faster than the specified duration. Conversely, if the factor is between zero and one then time passes at a slower rate. If the factor is negative then time in the timeline always appears to move backwards relative to its parent. Note that the begin time itself is an offset in the frame of reference of that parent timeline. As a result, while the duration of the timeline is affected by the speed factor, the begin time is not. FIG. 35 shows a timeline with Begin=3, Duration=5 and Speed=0.5

Timelines may be organized in a tree structure. Every document, frame or window has some implicit "root" timeline, which can be thought of as representing real-world, wall-clock time. However, time t=0 for the root timeline is the time when that timeline is created, that is, when a document is loaded, a frame is navigated or a window is opened.

Given the hierarchical nature of the timing system, it makes sense to refer to the passage of time as occurring in one of three frames of reference. A simple frame of reference is the frame of reference experienced by an individual timeline. In this frame of reference, the progress value of a timeline is always 0 at t=0 and 1 at t=d, where d is the simple duration of the timeline. The duration of a timeline is always specified in the simple frame of reference. The parent timeline's frame of reference is the simple frame of reference for the timeline that is the parent of any given timeline. For example, the Begin time for a timeline is always specified in the parent timeline's frame of reference. The global frame of reference is the simple frame of reference of the root timeline. In that frame of reference, time t=5 s occurs five seconds after the timeline is created, and a duration of 10 s lasts for exactly ten real-world seconds.

In addition, the various timing control rules apply to timing subtrees, including that if a timeline is active, its parent timeline also needs to be active. Conversely, it a timeline is not active, then none of its children may be active, and none may be started. If a timeline is explicitly paused (via a call to the ITimingControl.Pause method) then its children are implicitly paused. When that timeline is resumed, any of its children that were not explicitly paused are also resumed. If a timeline is started (for any of a variety of reasons, including crossing a repeat point) then its children are reset.

A timeline may be explicitly parented to another timeline, in which case the shape of the timing tree is explicit and clear. In many cases, however, it is useful to let the system parent a timeline automatically, based on some default timing parent. A timeline that is not explicitly parented is said to be auto-parented, and its effective parent timeline depends on how the timeline is used. Two types of auto-parenting are supported: parenting to the visual parent, or parenting to the root.

The visual parent of a timeline is determined implicitly by how the timeline is used. For example, if the timeline controls a color animation which, in turn, animates a brush used as the background of some visual V, then V is the "visual parent" of that timeline. If that Visual has an associated default timeline, that timeline is the parent of our original timeline in this example. Otherwise, the parent of the Visual is examined, recursively. The root of a Visual tree is always implicitly associated with the root timeline, so if the Visual is in the Visual tree then any auto-parented timelines within it are guaranteed to be parented somewhere in the timing tree. However, if the Visual is not yet in the Visual tree then its timelines remain outside of the timing tree until such time as the Visual gets inserted into a tree.

The default "root" timeline is also defined by visual parentage, except that, in that case, the closest Visual parent that has a timeline is not necessarily used. Rather, with root parentage a timeline is always associated with the highest Visual in the tree (which may be a Frame or Window object, or the root Visual associated with a VisualManager).

Once a timeline is automatically parented, it may need to be re-parented if anything happens that changes the implicit default parent timeline. For example, if the immediate visual parent of the timeline doesn't initially have a default timeline of its own but then one is set then the timeline needs to be re-parented. This re-parenting occurs automatically. Auto-parenting and re-parenting are implemented by the Animatable interface, described below.

Timelines and timed objects share a number of behaviors in common. For example, an animation can be paused or restarted, and a list of animations may be active or inactive. To maintain consistency, timed objects implement one or more interfaces that allow access to timing methods and properties.

The ITimingControl interface is implemented by timed objects that can be controlled at run-time:

```
public interface System.Windows.Media.Animation.ITimingControl
{
    // Timing attributes
    double Acceleration { get; set; }
    bool AutoReverse { get; set; }
    TimeSyncValue Begin { get; set; }
    double Deceleration { get; set; }
    Time Duration { get; set; }
    TimeSyncValue End { get; set; }
    TimeEndSync EndSync { get; set; }
    TimeFill Fill { get; set; }
    TimeFill FillDefault { get; set; }
    Timeline ParentTimeline { get; set; }
    double RepeatCount { get; set; }
    Time RepeatDuration { get; set; }
    TimeRestart Restart { get; set; }
    TimeRestart RestartDefault { get; set; }
    double Speed { get; set; }
    // Run-time timing state
    int CurrentRepeat { get; }
    Time CurrentTime { get; }
    void Disable( );
    void Enable( );
    bool IsChanging { get; }
    bool IsEnabled { get; }
    bool IsForwardProgressing { get; }
    bool IsOverridingBaseValue { get; }
    bool IsPaused { get; }
    bool IsReversed { get; }
    double Progress { get; }
    // Run-time timing control
    void BeginIn(Time offset);
    void Disable( );
    void Enable( );
    void EndIn(Time offset);
    void Pause( );
    void Resume( );
    void Seek(Time offset, TimeSeekOrigin origin);
    void OverrideSpeed(double speed);
    // Event notifications
    event EventHandler Begun { add; remove; }
    event EventHandler Changed { add; remove; }
    event EventHandler Ended { add; remove; }
    event EventHandler Paused { add; remove; }
    event EventHandler Repeated { add; remove; }
    event EventHandler Resumed { add; remove; }
```

```
    event EventHandler Reversed { add; remove; }
    event EventHandler Seeked { add; remove; }
}
```

The following table summarizes the semantics of the ITimingControl interface:

| Method, Property or Event | Meaning |
|---|---|
| Acceleration | A value between 0 and 1 representing the fraction of the simple duration spent in the time acceleration phase. The sum of this attribute and the Deceleration attribute may not exceed 1. |
| AutoReverse | If this attribute is "True" then the timeline progresses from beginning to end and then immediately progresses backwards from end to beginning. In that case, the timeline will be active for twice the amount of time specified by the Duration attribute. |
| Begin | The time at which this timeline should begin. By default this time is relative to the parent timeline's begin time, but the offset may also be specified to be relative to some other timeline's begin or end time. In the latter case, the other timeline is parented to the same timeline as this one. |
| BeginIn | Triggers an interactive begin at the specified point in time in the future or past. The parameter is in the frame of reference of this timeline's parent timeline. If the parent timeline is not active, this method has no effect. |
| Begun | Raised whenever the object enters a period in which its internal state is continually changing. |
| Changed | Raised by the modifier whenever its internal state changes. |
| Ended | Raised whenever the object leaves a period in which its internal state is continually changing. |
| CurrentRepeat | The current iteration of the timeline, if it repeats. The first iteration is iteration 1. If IsOverridingBaseValue is false this property returns 0. |
| CurrentTime | The current time local to this timeline. If IsOverridingBaseValue is false this property returns Time.Unspecified. |
| Deceleration | A value between 0 and 1 representing the fraction of the simple duration spent in the time deceleration phase. The sum of this attribute and the Acceleration attribute may not exceed 1. |
| Disable | Disables this timeline, effectively removing it from the timing tree. |
| Duration | The duration of a single period from begin to end. |
| Enable | Enables this timeline, effectively inserting it into the timing tree. This method has no effect if this is an auto-parented timeline and a default parent has not been specified. |
| End | The maximum end time for this timeline. If this value is less than the sum of the Begin and Duration properties, then the activation period is cut short by this attribute. In addition, all begins (scheduled or interactive) past the time specified by this attribute are ignored. |
| EndIn | Triggers an interactive end at the specified point in time in the future or past. The parameter is in the frame of reference of this timeline's parent timeline. If the parent timeline is not active, this method has no effect. |
| EndSync | This attribute is used to define the implicit duration of a timeline, which is used if the Duration attribute is not set explicitly. The implicit duration of a timeline may be defined by the timed object that it controls or by other timelines that may be parented to it. |
| Fill | The behavior of the timeline after the end time passes. By default, the timeline is only "on" from begin to end, but if this attribute is set to "Freeze" then the timeline remains on past the end time. In that case, the progress value after the end time is equal to whatever it was at the end time. The possible values are Remove (the global default), Freeze, Hold, Transition and Auto. |
| FillDefault | The default value for the Fill attribute. If the Fill attribute is not specified then this attribute is used to determine the fill behavior. In addition, this default is inherited by timelines parented to this one, unless they have their own FillDefault attribute set. The possible values are the same as for the Fill attribute. |
| IsChanging | True if the timeline is active, false otherwise. |
| IsEnabled | True if the timeline is part of a timing sub-tree, false otherwise. If this property is true this doesn't guarantee that the sub-tree this timeline is a part of is, itself, enabled. |
| IsForwardProgressing | True if progress in this timeline moves from 0 to 1, as compared to wall-clock time. This property takes into account the effect of being nested in potentially reversed timelines. If IsOverridingBaseValue is false this property returns the same value as that which this timeline's parent timeline would return. |
| IsOverridingBaseValue | True if the timeline is active or in a fill period. |
| IsPaused | True if the timeline is active, but in a paused state. |
| IsReversed | True if the timeline is in a reversed period, as seen from the timeline's own local frame of reference. This property does not take into account the effect of being nested in potentially reversed timelines. If IsOverridingBaseValue is false this property returns false. |
| ParentTimeline | The timeline that is the timing parent of this timeline. This may be a reference to any other timeline, or one of two special reference values: Timeline.VisualParent or Timeline.RootTimeline. If this property is set to Timeline.VisualParent then this timeline is auto-parented on use to the timeline associated with the Visual in which it is used (if the Visual doesn't have an associated DefaultTimeline, then the parent Visual is inspected, recursively). If it is set to Timeline.RootTimeline then this timeline is auto-parented on use to the "root" of the timing tree. |

-continued

| Method, Property or Event | Meaning |
|---|---|
| Pause | Pauses this timeline and all of its children timelines. If this timeline is not active this method has no effect. |
| Paused | Raised by the timeline whenever it or one of its descendants is paused. |
| Progress | The current progress value of the timeline. If IsOverridingBaseValue is false this property returns 0. In all cases, the return value of this property is always a value between 0 and 1, inclusive. |
| RepeatCount | The number of times a begin to end period should be repeated. This may be a fractional value, as well as the special value float.PositiveInfinity to indicate that the timeline should repeat forever. If both this attribute and the RepeatDuration attribute are specified, the total active duration is the minimum of the two. |
| RepeatDuration | The length of time for which a begin to end period should be repeated. This may imply a fractional repeat count, or it may be the special value Time.Indefinite to indicate that the timeline should repeat forever. If both this attribute and the RepeatCount attribute are specified, the total active duration is the minimum of the two. |
| Repeated | Raised by the timeline whenever it repeats its simple duration. |
| Restart | The behavior of the timeline when a second (or later) begin time is reached. By default, a begin time interrupts any active period and goes back to time t = 0 for the timeline, but if this attribute is set to WhenNotActive then a begin time that would interrupt an active period is ignored. The possible values are Always, WhenNotActive and Never. |
| RestartDefault | The default value for the Restart attribute. If the Restart attribute is not specified then this attribute is used to determine the restart behavior. In addition, this default is inherited by timelines parented to this one, unless they have their own RestartDefault attribute set. The possible values are the same as for the Restart attribute. |
| Resume | Resumes this timeline and all of its children timelines. If this timeline is not active and paused this method has no effect. |
| Resumed | Raised by the timeline whenever it is resumed. |
| Reversed | Raised by the timeline whenever the direction of time changes. |
| Seek | Changes the current time for this timeline, which may have an effect on all of its children timelines. If this timeline is not active this method has no effect. |
| Seeked | Raised by the timeline whenever its time changes as a result of a seek operation. |
| Speed | The relative speed at which time should pass for this timeline, compared to its parent timeline. E.g., A value of 1 means normal speed, whereas a value of 2 means that time elapses twice as fast (and, therefore, the perceived duration ends up being only half that specified by the Duration attribute). This value may be negative, in which case time flows backwards in this timeline, from end to begin times, as if the parent timeline was reversed. |

Graphics scenes can be animated by specifying animated parameters to some rendering operations, or by adding animations to certain element properties. An animation is a function that takes some arbitrary set of inputs (at least one of which generally being a timeline) and produces an output of the right type to be passed to a rendering operation. For example, a PointAnimation converts a timeline progress value into a Point value type. At the same time, various rendering operations that take one or more Point values as parameters can also receive a PointAnimation instead of a Point, in which case the animation function is evaluated at each frame to calculate the Point to use in that frame.

Animations are grouped into collections. An animation collection works as a pipeline, taking as an input the base value of a property and producing as its output the current value that should be used for that property. The collection chains zero or more animation objects, each supporting similar semantics of taking an input value and producing an output of similar type. The pipeline is evaluated at regular intervals, and the output is used in rendering operations, producing the effect of animation.

Since the values that can be animated have various types, there are also various differently typed animations. However, all animations follow a common pattern and all implement a set of common interfaces. Animation objects are organized into three groups of classes, namely modifiers, timed modifiers and animations.

Figure 36:
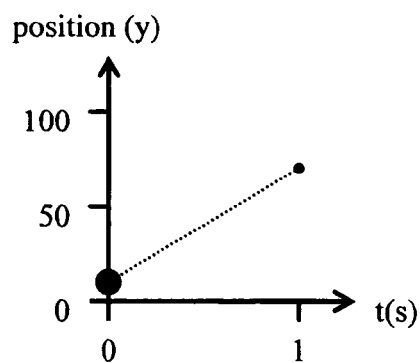

A straightforward animation interpolates a value between the begin and end points. When both the begin and end points are specified, the base value is ignored for the time the animation is "on". When the animation is "off", the value of the property may revert to the base value. Note that an animation is "on" as long as its associated timeline is "on". Therefore, a from-to animation can be made to permanently override the base value by setting the Fill timing attribute to "Freeze". FIG. 36 shows a point animated in y with From=10 and To=70.

If only the begin or the end point is specified, but not both, the base value of the property is used for the value of the other point. While this seems redundant with the previous example, there is a key difference in that in this case, the base value is not ignored, but composed with the animation. This can produce interesting effects if the base value is changing (because the property is being modified by another process), or if the animation is chained to another animation.

Another way to specify the animation function is to specify a delta from the base value. This is conceptually similar to a from-to animation that interpolates from the base value to the base value plus the delta. However, in this case both the begin and end points are composed with the base value.

Figure 37:
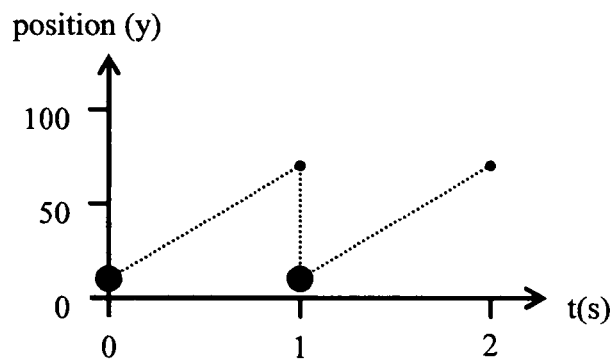
Figure 38:
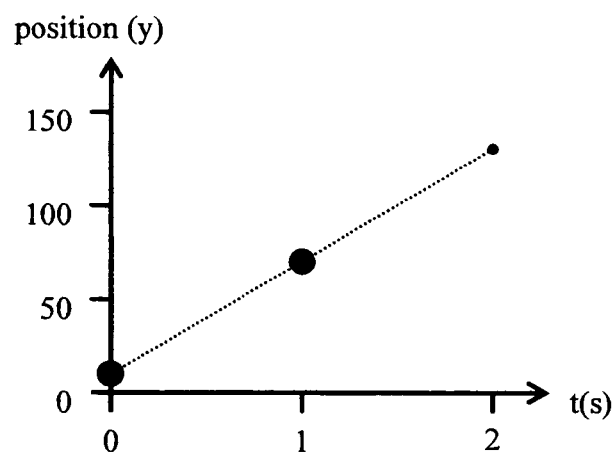

If the timeline associated with an animation is set to repeat, the animation runs from begin to end several times. FIG. 37 shows an point animated in y with From=10, By=60 and RepeatCount=2. Instead of repeating the same trajectory on every iteration, an animation can be programmed to accumulate the effect of each iteration, in essence composing with itself. FIG. 38 shows a point animated in y with From=10, By=60, RepeatCount=2 and IsAccumulating=True.

Although the default behavior of a from-to animation is to ignore the base value of the animated property, this behavior can be changed to an additive behavior, where the from and to values are both deltas from the base value.

The following table summarizes the basic animation types.

| Type | Output value |
|---|---|
| From | The "From" value at t = 0 and the base value at t = 1. |
| To | The base value at t = 0 and the "To" value at t = 1. |
| From-To | The "From" value at t = 0 and the "To" value at t = 1. |
| By | The base value at t = 0 and the sum of the base value and the "By" value at t = 1. |

| Type | Output value |
|---|---|
| From-By | The "From" value at t = 0 and the sum of the "From" and "By" values at t = 1. |

Figure 39:
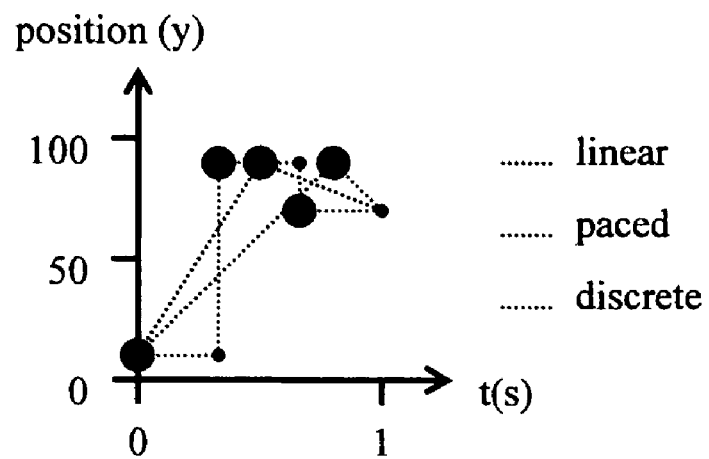

With basic animations, the output value at the begin and end points are specified, and a linear interpolation is used to compute the values in between. For more complex animation functions, a list of values can be specified instead. Each value corresponds to a key frame. In a simple case, these key frames occur at regular intervals. Animations can also be programmed to use a paced spacing between the key frames. In the paced interpolation method, the space between each pair of key frames is proportional to the ratio of the "distance" between the two key values to the "total distance" covered by the animation. This is possible for those animations whose types have a meaningful concept of "distance," such as, for example, float or point animations. In such a case, the interpolation between key frames is linear. A third option is to not interpolate at all, in which case the output value function is discrete. FIG. 39 shows a point animated in y with KeyValues=10,90,70 and various interpolation methods.

Figure 40:
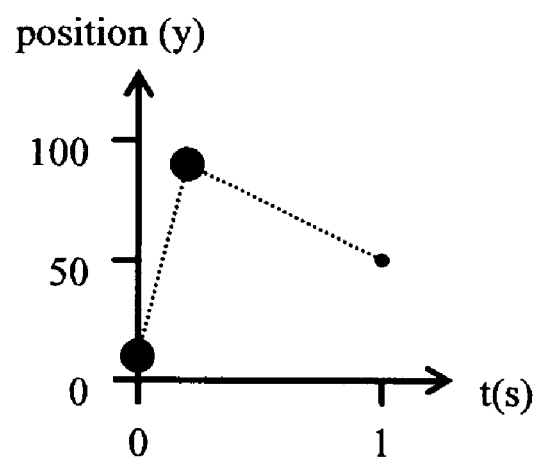

For additional control, the time for each key frame can be explicitly specified. The interpolation between the key frames can be linear or discrete. The key times are specified as percentages of the total animation duration, and must cover the entire period. In other words, the first key time is 0, and for linear interpolation the last key time is 1. FIG. 40 shows a point animated in y with KeyValues=10,90,50 and Key-Times=0,.2,1.

For still further control over the interpolation, a set of cubic Bezier curves can be used to describe the time curve used for the animation. This should not be confused with a Bezier curve rendered on screen; the curve is used to modify the shape of the timing curve, but the key frame values still interpolate linearly over the progress value. This spline interpolation method adds a filter that converts the linear 0-1 progress value provided by the timeline associated with the animation into a non-linear 0-1 progress curve.

The following table contains a list of animation-specific attributes and their meanings. This list is a template followed by all animations objects. Where the type of an attribute is "<ValueType>", a real object would expose the attribute with a type matching the animation type. For example, a Color-Animation object types these attributes as "Color." In addition to the attributes listed below, animation objects support the attributes specified in the ITimingAttributes interface.

| Attribute | Type | Meaning |
|---|---|---|
| By | <ValueType> | The delta value at the end of the animation. The value at the beginning is either the From value, if specified, or the base value of the property. |
| From | <ValueType> | The initial value of the animation. |
| InterpolationMethod | InterpolationMethod | The method used to interpolate between key values. The possible values are Discrete, Linear, Paced or Spline. |
| KeySplines | KeySplineCollection | A set of Bezier control points associated with a KeyTimes list, which defines a cubic function that controls the interval pacing of the animation. This list must contain one less element than the KeyTimes list. This list is only used if the InterpolationMethod attribute is set to Spline. |
| KeyTimes | KeyTimeCollection | A list of time values used to control the pacing of the animation. This list must contain the same number of elements as the KeyValues list. The list is ordered in increasing time values, and the first value in this list needs to be 0 and the last 1, unless InterpolationMethod is set to Discrete, in which case the last value may be anything less than or equal to 1. |
| KeyValues | <ValueType>KeyValueCollection | A list of values for the animation. |
| To | <ValueType> | The value at the end of the animation. |

The Animatable class is derived from the Changeable class. It is used as a base class by any object or object collection that may be animated or contain animated values, such as a media resource. Modifiers, TimedModifiers, and Animations ironically derive from Changeable instead of Animatable because their individual properties are not animatable.

```
public abstract class Animatable : Changeable
{
    public abstract bool HasAnimations { get; }
    public abstract bool IsAnimating { get; }
    public abstract bool IsOverridingBaseValue { get; }
```

```
                        -continued public abstract Animatable GetCurrentValue( );
        public abstract void SetDefaultParentTimeline(Timeline
        defaultParentTimeline);
    }
```

| Method, Property or Event | Meaning |
| --- | --- |
| HasAnimations | True if the object may vary with time. In general, this property is true if the object is holding on to any animation collections. |
| IsAnimating | True if any of the animations in the object are changing (see Modifier.IsChanging). |
| IsOverridingBaseValue | True if any of the animations in the object are changing or in a fill state and therefore currently active and modifying the object. |
| GetCurrentValue | Returns an object that has the same value as the instantaneous value of this object, but which doesn't vary over time. If the DoesChange property is false, the CurrentValue property may return the object itself rather than a new copy. |
| SetDefaultParentTimeline | The timeline that is the parent of any auto-parented timelines. If this property is set, any auto-parented timelines are re-parented, but a new clone is not created either for the timelines or for this object. |

Modifier classes, and therefore TimedModifiers and Animations, will derive from Changeable instead of Animatable because their individual properties should not be animated. This enforces the fact that programmers should not be able to animate the From property on an animation.

Modifier classes cannot have a StatusOfNextUse property value of Unchangeable. The default value for StatusOfNextUse for Modifiers is ChangeableCopy, however it can also be set to ChangeableReference if the user wishes to re-use a Modifier. If the user sets the StatusOfNextUse to ChangeableReference an exception is thrown if any attached Modifier does not have a ParentTimeline property set. This will prevent situations having conflicting inherited parent timelines. Non-animated, non-changeable branches of an Animatable may have a StatusOfNextUse value of Unchangeable, and may be made unchangeable on use. Properties on a Modifier class, such as From, To, or By remain changeable throughout the lifetime of that Modifier.

Modifiers are changeable throughout their lifetime, so MakeUnchangeable will throw an exception on these classes. For an Animatable that currently contains an animation, MakeUnchangeable will throw an exception.

If the user signs up for Changed notifications on an Animatable class, the user will receive notifications for changes caused either by property changes or through the nature of animation. That is, the user will receive changed notifications when the Timelines associated with animations used by the Animatable are Seeked or moved forward as they are on each frame that is presented.

In the case of independently animated properties (e.g., Opacity) or Animatables (e.g., SolidColorBrush), the Changed notifications sent to any user who has provided a handler will occur at the UI thread frame rate not at the compositor frame rate. The exact value of an animation in this case is not guaranteed to be exactly what is on the screen, although the values should be close.

If the animation is dependent or MIL dependent it is possible to get a value that matches what will be on the screen although it is not currently possible to tell which notification corresponds to the rendering pass and therefore which one reflects the value about to be displayed. If the timing tree is changed during the rendering pass, as may often occur, it is possible for the user to receive multiple notifications, and therefore even less likely that the user will know which one corresponds to the eventual value on the screen.

A modifier is an object that implements a GetValue method which takes as an input an object, called the "base value", of a certain type, and returns another object of the same type as the input. The value of the output depends both on the input and on the internal state of the modifier. In particular, this means that calling GetValue more than once with the same input is not guaranteed to return the same output. Graphical animation occurs when a modifier's GetValue method is called once per frame producing a new value for each frame.

In a general case there are no guarantees about the return value of the GetValue method, and every time the method is called it may return a different value. Objects consuming modifiers may assume that this is the case and call the modifier repeatedly, as in the following example:

```
class MyObject
{
    private Modifier myModifier;
    private object myBaseValue;
    public DoSomeWork( )
    {
        object currentValue =
        myModifier.GetValue(myBaseValue);
        DoSomethingWithCurrentValue(currentValue);
        PostCallbackToDoSomeWork( ); // Causes this
        method to be called again
    }
}
```

In practice, however, there may be times when a modifier expects to produce the same output given the same input, depending on its internal state. A modifier is said to "be changing" when it is in a period in which the return value of GetValue may be different on each invocation. It is "not changing" when the return value of GetValue is the same on each invocation. If a modifier is "not changing" a user of that modifier may safely cache the return value of the GetValue method, and perhaps avoid evaluating the GetValue method repeatedly and unnecessarily, as in the following example:

```
class MyObject
{
    private Modifier myModifier;
    private object myBaseValue;
    public Initialize( )
    {
        myModifier.ChangeBegun += new
        EventHandler(this.OnChangeBegun);
    }
    public DoSomeWork( )
    {
        object currentValue = myModifier.GetValue(myBaseValue);
        DoSomethingWithCurrentValue(currentValue);
        if(myModifier.IsChanging)
        {
            PostCallbackToDoSomeWork( ); // Do more work shortly
        }
```

-continued

```
        else
        {
            // Do nothing, since the modifier isn't going to change
            // any time soon. If it does start to change, the delegate
            // above will restart our processing loop.
        }
    }
    public OnChangeBegun( )
    {
        // The modifier is changing again, so start doing work on
        // a schedule again
        PostCallbackToDoSomeWork( );
    }
}
```

An abstract Modifier class is implemented, from which modifiers need to inherit. This class provides default implementations for all but the GetValue and GetUniqueInstance methods:

```
public abstract class System.Windows.Media.Animation.Modifier
{
    public virtual Timeline ParentTimeline { get; set; }
    public virtual bool IsChanging { get; }
    public virtual bool IsOverridingBaseValue { get; }
    Modifier abstract GetUniqueModifierInstance(Timeline
    defaultParentTimeline);
    object abstract GetValue(object baseValue);
    public virtual bool UsesBaseValue { get; }
    // Event notifications
    public virtual event EventHandler Changed { add; remove; }
}
```

The following table summarizes the semantics of the Modifier class:

| Method, Property or Event | Meaning |
| --- | --- |
| Changed | Raised by the modifier whenever its internal state changes. |
| ParentTimeline | The timeline that is the parent of any auto-parented timelines in this modifier. If this property is set, any auto-parented timelines in this modifier are reparented to the new parent timeline. |
| GetUniqueInstance | Returns an instance of this modifier that can maintain its own run-time state separately from other instances. If this modifier contains auto-parented timelines, the returned instance has those timelines parented to the timeline passed in as a parameter. |
| GetValue | Calculates the current output value of this modifier, based on the base value passed in as an argument and the internal state of the modifier. When the IsOverridingBaseValue property is false, this function is guaranteed to return the base value. |
| IsChanging | True if the modifier is currently changing, false if it's in a period of non-change. This flag is best used in conjunction with the ChangeBegun and ChangeEnded events. If this flag is true, the IsOverridingBaseValue also needs to be true. |
| IsOverridingBaseValue | True if the return value of the GetValue method is currently being affected by the modifier. When this value is false, GetValue is guaranteed to return the same object that is passed to it as an argument. Note that a modifier may be overriding the base value but not changing. |
| UsesBaseValue | True if the return value of GetValue depends on the base value. If this property is false, it means that the modifier ignores the base value altogether. If the modifier is in a list, this property allows an optimization where only a subset of the modifiers need to be evaluated in some cases. |

In addition, a set of type-specific classes is implemented that inherit from Modifier but expose type-safe versions of the interface methods. The following example shows the FloatModifier class:

```
public abstract class System.Windows.Media.Animation.FloatModifier :
Modifier
{
    // Type-specific methods
    public sealed override object GetValue(object baseValue)
    {
        return GetValue((float)baseValue);
    }
    public abstract float GetValue(float baseValue);
}
```

A timed modifier is a modifier whose behavior is controlled at least partially by a Timeline object. The aforementioned modifier rules apply, but in addition a timed modifier implements the ITimingControl interface to expose controlling the modifier's timeline. There is no abstract TimeModifier class. Instead, type-specific classes inherit from the type-specific Modifier classes. The following example shows the FloatTimedModifier class:

```
public abstract class
System.Windows.Media.Animation.FloatTimedModifier : FloatModifier,
        ITimingControl
{
    protected FloatTimedModifier(FloatTimedModifier example);
    // FloatModifier methods, properties and events
    public override Timeline ParentTimeline { get; set; }
    public override bool IsChanging { get; }
    public override bool IsOverridingBaseValue { get; }
    public override FloatModifier GetUniqueInstance(Timeline
    defaultParentTimeline);
    public override event EventHandler Changed { add; remove; }
    // ITimingControl methods, properties and events
    double Acceleration { get; set; }
    bool AutoReverse { get; set; }
    TimeSyncValue Begin { get; set; }
    double Deceleration { get; set; }
    Time Duration { get; set; }
    TimeSyncValue End { get; set; }
    TimeEndSync EndSync { get; set; }
    TimeFill Fill { get; set; }
    TimeFill FillDefault { get; set; }
    Timeline ParentTimeline { get; set; }
    double RepeatCount { get; set; }
    Time RepeatDuration { get; set; }
    TimeRestart Restart { get; set; }
    TimeRestart RestartDefault { get; set; }
    double Speed { get; set; }
    int CurrentRepeat { get; }
    Time CurrentTime { get; }
    bool IsForwardProgressing { get; }
```

-continued

```
    bool IsPaused { get; }
    bool IsReversed { get; }
    double Progress { get; }
    void BeginIn(Time offset);
    void EndIn(Time offset);
    void Pause( );
    void Resume( );
    void Seek(Time offset, TimeSeekOrigin origin);
    event EventHandler ChangeBegun { add; remove; }
    event EventHandler ChangeEnded { add; remove; }
    event EventHandler Paused { add; remove; }
    event EventHandler Repeated { add; remove; }
    event EventHandler Resumed { add; remove; }
    event EventHandler Reversed { add; remove; }
    event EventHandler Seeked { add; remove; }
    // Data
    protected Timeline Timeline;
}
```

Note that the Modifier and ITimingControl interface have some similar methods, properties and events. A Timed Modifier exposes a single implementation for those. A Timed Modifier is free to implement ITimingControl by forwarding all calls to the controlling Timeline, though it is not required to do so. The default implementation of ITimingControl provided by the type-specific Timed Modifier implementations does forward calls to the controlling Timeline.

An animation is a timed modifier implementing a particular animation function.

```
public sealed class System.Windows.Media.Animation.FloatAnimation :
FloatTimedModifier
{
    public FloatAnimation(float from, float to, Time duration);
    public FloatAnimation(float from, float to, Time duration,
    TimeFill fill);
    public FloatAnimation(float to, Time duration);
    public FloatAnimation(float to, Time duration, TimeFill fill);
    // All FloatTimedModifier methods, properties and events
    are inherited,
    // plus the following are added:
    public float By { get; set; }
    public float From { get; set; }
    public InterpolationMethod InterpolationMethod { get; set; }
    public bool IsAccumulating { get; set; }
    public KeySplineEnumerator KeySplines { get; set; }
    public KeyTimeEnumerator KeyTimes { get; set; }
    public FloatKeyValueEnumerator KeyValues { get; set; }
    public float To { get; set; }
}
```

An animation collection is a list of animation objects (inheriting from <Type>Modifier) where the output of the GetValue method from the first object is used as the base value parameter for the GetValue method on the second object, and so on. For flexibility, the objects contained in an animation collection are actually of type type-specified Modifier. The collection as a whole supports a GetValue method which looks like IModifier.GetValue. In fact, animation collections support most of the IModifier interface, but they do not actually implement IModifier because they do not support the "UsesBaseValue" property (this property is always assumed to be "true" for the collection as a whole).

```
public sealed class
System.Windows.Media.Animation.FloatAnimationCollection :
ICollection
```

-continued

```
{
    public Timeline DefaultParentTimeline { get; set; }
    public bool IsChanging { get; }
    public bool IsOverridingBaseValue { get; }
    public FloatAnimationCollection GetUniqueInstance(Timeline
    defaultParentTimeline);
    public float GetValue(float baseValue);
    // Event notifications
    public event TimeEventHandler ChangeBegun { add; remove; }
    public event TimeEventHandler Changed { add; remove; }
    public event TimeEventHandler ChangeEnded { add; remove; }
    // ICollection MPEs supported
    public FloatModifier this[int index] { get; }
}
```

Events fired from animation collections are coalesced.

Path animations are a specialization of the TimedMatrixModifier class. A MatrixModifier can be used along with a MatrixTransform. A MatrixTransform has a Matrix property, and MatrixAnimations property, and since a PathAnimation is a MatrixModifier, it can be used as a MatrixAnimation.

```
public sealed class System.Windows.Media.Animation.PathAnimation :
    TimedMatrixModifier
{
    public PathGeometry PathGeometry          { get; set; }
    public bool         DoesRotateWithTangent { get; set; }
}
```

| Method, Property or Event | Meaning |
|---|---|
| Geometry | This can be any geometry. For ellipses, an appropriate starting point for progress 0 is selected. If the geometry has many sub geometries, each of their paths will be moved along in turn in the order they were defined inside the geometry. |
| DoesRotateWithTangent | If this property is set to false, the object will move along the geometry path with no rotation. If set to true, the object will rotate to match the tangent of the path at any given location. |

Markup usage:

```
<Canvas>
    <Canvas.TransformEffect>
        <MatrixTransform> <!-- default Matrix base value is identity -->
            <MatrixTransform.Matrix>
                <PathAnimation Begin="0" Duration="10"
                DoesRotateWithTangent="true"/>
                    <PathAnimation.Geometry>
                        <PathGeometry> ... </PathGeometry>
                    </PathAnimation.Geometry>
                </PathAnimation>
            </MatrixTransform.Matrix>
        </MatrixTransform>
    </Canvas.TransformEffet>
</Canvas>
```

Every resource, method or object that may be animated follows a number of rules, including that it implements the Animatable interface. For every animatable property (or parameter) called "Foo", of type "Bar", there is another property (or parameter) called "FooAnimations", of type "BarAnimationCollection". Wherever animation is desirable, animation collections are used. Basic Modifiers or Animation objects are not directly used because that precludes animation composition.

Resources can be animated by adding animation collections to individual properties. The following example shows how to create a SolidColorBrush with an animate color:

```
ColorAnimation anim = new ColorAnimation ( );
animBuilder.From = new Color(1.0f, 0.0f, 0.0f, 0.0f);
animBuilder.Begin = new Time(0);
animBuilder.To = new Color(1.0f, 1.0f, 0.0f, 0.0f);
animBuilder.Duration = new Time(1000);
animBuilder.AutoReverse = true;
animBuilder.RepeatDuration = Time.Indefinite;
SolidColorBrush brush = new SolidColorBrush ( );
brush.Color = new Color(1.0f, 0.0f, 0.0f, 0.0f);
brush.ColorAnimations = anim;
```

Animate resources can be used in rendering operations or as values for Element properties.

A rendering operation can be animated by adding animation collections to drawing context method calls, or by using animate resources. The following example shows how to push an animated opacity value into a drawing context:

```
FloatAnimation anim = new FloatAnimation ( );
anim.From = 0.0f;
anim.Begin = Time.Immediately;
anim.To = 1.0f;
anim.Duration = new Time(1000);
anim.Fill = TimeFill.Freeze;
myDrawingContext.PushOpacity(0.0f, anim);
```

Elements can be animated by adding animation collections to Element properties. The following example shows how to animate the width of a button in C#:

```
LengthAnimation anim = new LengthAnimation ( );
anim.From = new Length(50);
anim.Begin = Time.Immediately;
anim.To = new Length(100);
anim.Duration = new Time(1000);
anim.Acceleration = 0.2;
anim.Deceleration = 0.2;
anim.Fill = TimeFill.Freeze;
myButton.Width = new Length(50);
myButton.WidthAnimations = anim;
```

The following shows the same example in XAML:

```
<Button ID="myButton" Width="50">
    <Button.Width>
        <LenthAnimationCollection>
            <LengthAnimation
                From="50"
                Begin="Immediately"
                To="100"
                Duration="1"
                Acceleration="0.2"
                Deceleration="0.2"
                Fill="Freeze"
            />
        </LengthAnimationCollection>
```

-continued

```
    </Button.Width>
</Button>
```

Whenever an animation (or an animated resource) is used, the animation (or resource) is cloned (in a shallow, efficient way) to provide the destination with a unique, independently controllable timeline. A side-effect of this behavior is that the original animation is not part of a visual scene, and therefore it does not respond to control calls through the ITimingControl interface. To achieve this effect, the calling code first uses an animation and then reads the animation back. The value that is read back can then be cached and used for timing control. The following example shows a pattern that code intending to control animations may follow:

```
private FloatAnimation myOpacityAnimation;
public void Initialize( )
{
    FloatAnimation anim = new FloatAnimation ( );
    // Set the Begin property to Indefinite because we want to start
    // this animation interactively, not automatically.
    anim.Begin = Time.Indefinitely;
    anim.From = 1.0f; // Fully opaque
    anim.Duration = new Time(500); // half a second
    anim.To = 0.5f; // Half transparent
    anim.AutoReverse = true;
    // Animate the opacity of some element we own
    myElement.Opacity = 1.0f;
    myElement.OpacityAnimations = anim;
    // ERROR: The following line doesn't have the intended result:
    // myOpacityAnimation = animation;
    //
    // This line caches an animation "template", not the
    actual animation
    // that controls the opacity of the element.
    // This caches the right animation -- the one that is
    actually in use:
    myOpacityAnimation =
        (FloatAnimation)myElement.OpacityAnimations[0];
}
public void OnSomeEvent( )
{
    // Whenever we detect some event, "blink" the element
    myOpacityAnimation.BeginIn(0);
}
```

The user will create a new class using AnimationEffect as a base class to implement an AnimationEffect. The user will also need to create a builder for their AnimationEffect.

```
public abstract class AnimationEffect : Changeable
{
    protected AnimationEffect(AnimationEffect effect);
    public abstract AnimationEffect GetUniqueInstance(Timeline
    defaultParentTimeline);
    protected void        Invalidate( );
    protected void        InvalidatePassive( );
    protected bool        IsInvalid { get; }
    protected Element Element { get; }
    protected virtual void AttachImpl( );
    protected virtual void DetachImpl( );
    protected virtual void PreLayoutReadImpl( );
    protected virtual void PreLayoutWriteImpl( );
    protected virtual void PostLayoutReadImpl( );
}
```

| Method, Property or Event | Meaning |
|---|---|
| Invalidate | The user will call this when they want their AnimationEffect placed in the list of AnimationEffects to be processed during the next RenderQueueItem and they want to make sure a RenderQueueItem is scheduled. The list of invalid animations is reset at the beginning of the RenderQueueItem. |
| InvalidatePassive | The user will call this when they want their AnimationEffect placed in the list of AnimationEffects to be processed during the next RenderQueueItem, but they don't want to cause a RenderQueueItem to be scheduled. |
| IsInvalid | Returns true if the animation is currently in the list of AnimationEffects to be processed during the next RederQueueItem. It could be true because Invalidate has been called. |
| Element | This is the Element that the AnimationEffect is attached to. If the AnimationEffect attached to an Element, this will throw an exception. The user should not do any setup until OnAttach has been called. |
| AttachImpl | When an AnimationEffect is attached to an element, it is automatically cloned and the new clone is added to the collection of AnimationEffects on the element and has OnAttach called. At this point, the protected Element property on the AnimationEffect will be set. If the user has added an AnimationEffect to a collection, only the new AnimationEffect will have OnAttach called. There are no guarantees that when OnAttach is called that the Element will have its markup properties set or that the Element's children will all be in place. An AnimationEffect is cloned. Although the Element could be passed to the AnimationEffect when calling every function, it cannot be passed to event handlers for events from other elements which will be where the AnimationEffect needs it most. The AnimationEffect may set up event handlers on other elements but will still need to know that it's assigned to this Element. |
| DetachImpl | This will be called on an AnimationEffect when it is detached from an Element. |
| PreLayoutReadImpl | This will be called on an AnimationEffect if it is dirty before we run layout in the RenderQueueItem. This is the time when the AnimationEffect should read values it needs. The reason reading and writing are separate is that reading causes layout to run immediately and if every AnimationEffect reads and writes in turn it will slow the whole process down. |
| PreLayoutWriteImpl | This will be called on an AnimationEffect if it is dirty before we run layout in the RenderQueueItem. Although we don't guarantee the order in which AnimationEffects will be processed, we do guarantee that all dirty AnimationEffects will have had OnPreLayoutRead called before this is called. |
| PostLayoutReadImpl | This will be called on an AnimationEffect if it is dirty after we run layout in the RenderQueueItem. If the IsAlwaysDirty flag is not set, |

| Method, Property or Event | Meaning |
|---|---|
| | the dirty flag on this AnimationEffect will have been set to false and it will have been removed from the list of AnimationEffects to be processed during the next RenderQueueItem. If the AnimationEffect calls SetDirty in this method, it will effectively keep it dirty for processing during the next RenderQueueItem. If the AnimationEffect would like to stay dirty, it's much more efficient to set the IsAlwaysDirty flag. |

Primitive Types

The base length unit in the MIL is a double, whereby the other primitive types and APIs are based on doubles. Generally these doubles are evaluated as user units that are initially equal to 1/96th of an inch. For colors, each of the color channels is represented by a float, and not a double. For angle measurements, double values are in degrees. When a float or double is evaluated as a time measurement, it is assumed to be seconds.

A Time structure represents a particular point in time or a span of time. In addition, a special time value called "Indefinite" represents either a point in time infinitely in the future or a span of time infinitely long. Time values are designed to be used in a property system, so a special value called "Unspecified" may be used to clear a property, or to indicate explicitly that the property is not set. Time values are internally stored as integer counts:

```
time:
    ( full-clock-value | partial-clock-value | timecount-value |
    special-value )
full-clock-value:
    hours ":" minutes ":" seconds ("." fraction)?
partial-clock-value:
    minutes ":" seconds ("." fraction)?
timecount-value:
    timecount ("." fraction)? (metric)?
special-value:
    ( "Indefinite" | "Unspecified" )
metric:
    "h" | "min" | "s" | "ms"
hours:
    digit+
minutes:
    2digit
seconds:
    2digit
fraction:
    digit+
timecount:
    digit+
2digit:
    digit digit
digit:
    "0" | "1" | "2" | "3" | "4" | "5" | "6" | "7" | "8" | "9"
```

In addition to the above grammar, note that "minutes" and "seconds" need to be specified in the range "00" to "59" to be considered valid. Also, if the "timecount-value" format is used without units, the value is assumed to be in seconds. The following are a few examples of Time values and their meanings:

| Time | Value |
|---|---|
| 02:30:03 | 2 hours, 30 minutes and 3 seconds |
| 50:00:10.25 | 50 hours, 10 seconds and 250 milliseconds |
| 02:33 | 2 minutes and 33 seconds |
| 00:10.5 | 10 seconds and 500 milliseconds |
| 3.2 h | 3 hours and 12 minutes |
| 45 min | 45 minutes |
| 30 s | 30 seconds |
| 5.45 ms | 5.45 milliseconds |
| 12.467 | 12 seconds and 467 milliseconds |
| 1 d | 1 day |

The Time structure is used to store a single Time value:

```
public struct System.Windows.Media.Animation.Time : IComparable
{
    public Time(int milliseconds);
    public bool IsFinite { get; }
    public static Time Abs(Time t);
    public int CompareTo(Time other);
    public override bool Equals(object obj);
    public override int GetHashCode( );
    public static Time Max(Time a, Time b);
    public static Time Min(Time a, Time b);
    public override string ToString( );
    public static Time operator +(Time a, Time b);
    public static Time operator −(Time t);
    public static Time operator −(Time a, Time b);
```

-continued

```
    public static Time operator *(double s, Time t);
    public static Time operator *(Time t, double s);
    public static Time operator /(Time t, double s);
    public static double operator /(Time a, Time b);
    public static Time operator %(Time a, Time b);
    public static bool operator ==(int n, Time time);
    public static bool operator ==(Time time, int n);
    public static bool operator ==(Time a, Time b);
    public static bool operator !=(int n, Time time);
    public static bool operator !=(Time time, int n);
    public static bool operator !=(Time a, Time b);
    public static bool operator >=(Time a, Time b);
    public static bool operator <=(Time a, Time b);
    public static bool operator >(Time a, Time b);
    public static bool operator <(Time a, Time b);
    public static readonly Time Immediately;
    public static readonly Time Indefinite;
    public static readonly int MaxValue;
    public static readonly int MinValue;
    public static readonly Time Unspecified;
}
```

Other basic types are set forth below, in which the following notation is used:

\*:0 or more
+:1or more
?:0 or 1
{n}: n times
( ): grouping
|: separates alternatives
double quotes surround literals

```
wsp:
    whitespace+
digit:
    "0" | "1" | "2" | "3" | "4" | "5" | "6" | "7" | "8" | "9"
hex-digit:
    digit | "a" | "A" | "b" | "B" | "c" | "C" | "d" | "D" | "e" | "E" | "f" | "F"
digit-sequence:
    digit+
sign:
    "−" | "+"
exponent:
    ( "e" | "E" ) sign? digit-sequence
fractional-constant:
    ( digit-sequence? "." digit-sequence ) | (digit-sequence "." )
floating-point-constant:
    ( fractional-constant exponent?) | ( digit-sequence exponent )
integer-constant:
    digit-sequence
comma:
    ","
comma-wsp:
    ( wsp comma? wsp* ) | (comma wsp* )
number:
    ( sign? ( integer-constant | floating-point-constant ) ) | "Unset"
number-wsp:
    number-wsp*
coordinate:
    number-wsp
coordinate-pair:
    coordinate comma-wsp coordinate
coordinate-pairs:
    ( coordinate-pair comma-wsp )* coordinate-pair
filename:
    wsp* ( """ valid-filename-char+ """ | valid-filename-char-no-whitespace ) wsp*
```

Markup syntax for colors:

```
numeric-color:
    "#" ( hex-digit{3} | hex-digit{4} | hex-digit{6} | hex-digit{8} )
color:
    numeric-color | [a-zA-Z]+
```

The Colors object contains static members, comprising many well known colors such as Red and Blue:

```
public sealed class Colors
{
    public static Color AliceBlue { get; }
    public static Color AntiqueWhite { get; }
    public static Color Aqua { get; }
    public static Color Aquamarine { get; }
    public static Color Azure { get; }
    public static Color Beige { get; }
    public static Color Bisque { get; }
    public static Color Black { get; }
    public static Color BlanchedAlmond { get; }
    public static Color Blue { get; }
    public static Color BlueViolet { get; }
    public static Color Brown { get; }
    public static Color BurlyWood { get; }
    public static Color CadetBlue { get; }
    public static Color Chartreuse { get; }
    public static Color Chocolate { get; }
    public static Color Coral { get; }
    public static Color CornflowerBlue { get; }
    public static Color Cornsilk { get; }
    public static Color Crimson { get; }
    public static Color Cyan { get; }
    public static Color DarkBlue { get; }
    public static Color DarkCyan { get; }
    public static Color DarkGoldenrod { get; }
    public static Color DarkGray { get; }
    public static Color DarkGreen { get; }
    public static Color DarkKhaki { get; }
    public static Color DarkMagenta { get; }
    public static Color DarkOliveGreen { get; }
    public static Color DarkOrange { get; }
    public static Color DarkOrchid { get; }
    public static Color DarkRed { get; }
    public static Color DarkSalmon { get; }
    public static Color DarkSeaGreen { get; }
    public static Color DarkSlateBlue { get; }
    public static Color DarkSlateGray { get; }
    public static Color DarkTurquoise { get; }
    public static Color DarkViolet { get; }
    public static Color DeepPink { get; }
    public static Color DeepSkyBlue { get; }
    public static Color DimGray { get; }
    public static Color DodgerBlue { get; }
    public static Color Firebrick { get; }
    public static Color FloralWhite { get; }
    public static Color ForestGreen { get; }
    public static Color Fuchsia { get; }
    public static Color Gainsboro { get; }
    public static Color GhostWhite { get; }
    public static Color Gold { get; }
    public static Color Goldenrod { get; }
    public static Color Gray { get; }
    public static Color Green { get; }
    public static Color GreenYellow { get; }
    public static Color Honeydew { get; }
    public static Color HotPink { get; }
    public static Color IndianRed { get; }
    public static Color Indigo { get; }
    public static Color Ivory { get; }
    public static Color Khaki { get; }
    public static Color Lavender { get; }
    public static Color LavenderBlush { get; }
    public static Color LawnGreen { get; }
    public static Color LemonChiffon { get; }
    public static Color LightBlue { get; }
    public static Color LightCoral { get; }
    public static Color LightCyan { get; }
    public static Color LightGoldenrodYellow { get; }
    public static Color LightGray { get; }
    public static Color LightGreen { get; }
    public static Color LightPink { get; }
    public static Color LightSalmon { get; }
    public static Color LightSeaGreen { get; }
    public static Color LightSkyBlue { get; }
    public static Color LightSlateGray { get; }
    public static Color LightSteelBlue { get; }
    public static Color LightYellow { get; }
    public static Color Lime { get; }
    public static Color LimeGreen { get; }
    public static Color Linen { get; }
    public static Color Magenta { get; }
    public static Color Maroon { get; }
    public static Color MediumAquamarine { get; }
    public static Color MediumBlue { get; }
    public static Color MediumOrchid { get; }
    public static Color MediumPurple { get; }
    public static Color MediumSeaGreen { get; }
    public static Color MediumSlateBlue { get; }
    public static Color MediumSpringGreen { get; }
    public static Color MediumTurquoise { get; }
    public static Color MediumVioletRed { get; }
    public static Color MidnightBlue { get; }
    public static Color MintCream { get; }
    public static Color MistyRose { get; }
    public static Color Moccasin { get; }
    public static Color NavajoWhite { get; }
    public static Color Navy { get; }
    public static Color OldLace { get; }
    public static Color Olive { get; }
    public static Color OliveDrab { get; }
    public static Color Orange { get; }
    public static Color OrangeRed { get; }
    public static Color Orchid { get; }
    public static Color PaleGoldenrod { get; }
    public static Color PaleGreen { get; }
    public static Color PaleTurquoise { get; }
    public static Color PaleVioletRed { get; }
    public static Color PapayaWhip { get; }
    public static Color PeachPuff { get; }
    public static Color Peru { get; }
    public static Color Pink { get; }
    public static Color Plum { get; }
    public static Color PowderBlue { get; }
    public static Color Purple { get; }
    public static Color Red { get; }
    public static Color RosyBrown { get; }
    public static Color RoyalBlue { get; }
    public static Color SaddleBrown { get; }
    public static Color Salmon { get; }
    public static Color SandyBrown { get; }
    public static Color SeaGreen { get; }
    public static Color SeaShell { get; }
    public static Color Sienna { get; }
    public static Color Silver { get; }
    public static Color SkyBlue { get; }
    public static Color SlateBlue { get; }
    public static Color SlateGray { get; }
    public static Color Snow { get; }
    public static Color SpringGreen { get; }
    public static Color SteelBlue { get; }
    public static Color Tan { get; }
    public static Color Teal { get; }
    public static Color Thistle { get; }
    public static Color Tomato { get; }
    public static Color Transparent { get; }
    public static Color Turquoise { get; }
    public static Color Violet { get; }
    public static Color Wheat { get; }
    public static Color White { get; }
    public static Color WhiteSmoke { get; }
    public static Color Yellow { get; }
    public static Color YellowGreen { get; }
}
```

A point struct is set forth below:

```
public struct System.Windows.Point
{
        public Point( ); // initializes to 0,0
        public Point(double x, double y);
    public static Boolean Equals(Point point1, Point point2)
    public virtual Boolean Equals(Object o)
    public Double X { get; set; }
    public Double Y { get; set; }
    public virtual Int32 GetHashCode( )
    public static Point operator+(Point point, Vector vector)
    public static Boolean operator==(Point point1, Point point2)
    public static Boolean operator!=(Point point1, Point point2)
    public static Point operator*(Point point, Matrix matrix)
    public static Point operator-(Point point, Vector vector)
    public static Vector operator-(Point point1, Point point2)
    // This will take the absolute value of X and Y, since Size
    cannot be negative
    public static explicit operator Size(Point point) //
    public static explicit operator Vector(Point point)
    public static Point Add(Point point, Vector vector)
    public static Point Multiply(Point point, Matrix matrix)
    public Void Offset(Double dx, Double dy)
    public static Point Subtract(Point point, Vector vector)
    public static Vector Subtract(Point point1, Point point2)
    public virtual String ToString( )
}
```

Markup syntax for a point object:

```
point:
    coordinate-pair
```

A Vector object is set forth below:

```
public struct System.Windows.Vector
{
        public Vector( ); // initializes to 0,0
        public Vector(double x, double y);
        public double X { get; set; }
        public double Y { get; set; }
    public static Boolean Equals(Vector vector1, Vector vector2)
    public virtual Boolean Equals(Object obj)
    public Double Length { get; }
    public Double LengthSquared { get; }
    public Double X { get; set; }
    public Double Y { get; set; }
    public virtual Int32 GetHashCode( )
    public static Point operator+ (Vector vector, Point point)
    public static Vector operator+ (Vector vector1, Vector vector2)
    public static Vector operator/ (Vector vector, Double scalar)
    public static Boolean operator==(Vector vector1,
    Vector vector2)
    public static Boolean operator!= (Vector vector1,
    Vector vector2)
        // return the dot product: vector1.X*vector2.X +
        vector1.Y*vector2.Y
    public static Double operator*(Vector vector1, Vector vector2)
    public static Vector operator* (Double scalar, Vector vector)
    public static Vector operator* (Vector vector, Double scalar)
    public static Vector operator* (Vector vector, Matrix matrix)
    public static Vector operator-(Vector vector1, Vector vector2)
    public static Vector operator- (Vector vector)
        // This will take the absolute value of X and Y, since Size
        cannot be negative
    public static explicit operator Point (Vector vector)
    public static explicit operator Size (Vector vector)
    public static Vector Subtract(Vector vector1, Vector vector2)
    public static Double Multiply(Vector vector1, Vector vector2)
    public static Vector Multiply(Double scalar, Vector vector)
    public static Vector Multiply(Vector vector, Double scalar)
    public static Vector Multiply(Vector vector, Matrix matrix)
    public static Vector Divide(Vector vector, Double scalar)
    public static Point Add(Vector vector, Point point)
    public static Vector Add(Vector vector1, Vector vector2)
    public Void Normalize( )
        // return the angle required to rotate v1 into v2, in degrees
        // This will return a value between (-180, 180] degrees
    public static Double AngleBetween(Vector vector1, Vector vector2)
    public static Double CrossProduct(Vector vector1, Vector vector2)
        // return the Determinant: vector1.X*vector2.Y -
        vector1.Y*vector2.X
    public static Double Determinant(Vector vector1, Vector vector2)
    public virtual String ToString( )
}
```

Markup syntax for a Vector object:

```
size:
    coordinate-pair
```

Note that size is not a Vector, and thus it cannot be added, subtracted or transformed. Also, size cannot have a negative width or height. An ArgumentException will be thrown if an attempt is made to set one.

With respect to rectangles, the name Rect is used instead of Rectangle so as to not collide with the Rectangle element. While it is possible to specify a negative width and height, there is no standard way to normalize the rectangle and many operations on the rectangle may give non-intuitive results. Rect's Width and Height cannot be set to non-negative values. If such values are passed to the constructor, the result will be normalized. If Width or Height is set to negative, this will result in an ArgumentException.

A Rect contains the points inside it, as well as all points lying on its edges. Thus, the edges of a Rect are inclusive. As a consequence, a Rect of 0 Width or 0 Height is not empty, as it contains the set of points found on the 1-dimensional line segment represented by the Rect. If both Width and Height are 0, then the Rect contains the one Point at Location. This means that the truly empty Rect is a special value, and can be accessed via the static EmptyRect property. The Empty Rect's Width and Height properties will return negative infinity (the only case where either can be negative), the X and Y properties will return positive infinity, and none of these properties will be modifiable. This is to ensure that there is not an "empty" width but normal height, or vice versa.

```
public struct System.Windows.Rect
{
        public Rect ( ); // Sets all values to 0
        public Rect (Point location, Size size);
        public Rect (double x, double y, double width, double height);
        // Both of these will normalize the rectangle
        public Rect (Point point1, Point point2);
        public Rect (Point point, Vector vector);
        public static Rect FromLTRB(double left, double top,
        double right, double bottom);
    public static Rect Empty { get; } // returns the Empty Rect
    public bool IsEmpty { get; }
    public static Rect Infinite( get; }
    public Point Location { get; set; }
    public Size Size { get; set; }
    public double X { get; set; }
    public double Y { get; set; }
    public double Width { get; set; }
```

```
-continued
    public double Height { get; set; }
    public double Left { get; }        // Alias to X
    public double Top { get; }         // Alias to Y
    public double Right { get; }       // X + Width
    public double Bottom { get; }      // Y + Height
    public Point TopLeft { get; }
    public Point TopRight { get; }
    public Point BottomLeft { get; }
    public Point BottomRight { get; }
    public Point Center { get; }
    public bool Contains(Point point);
    public bool Contains(Rect rect);
    public bool Contains(double x, double y);
    public bool IntersectsWith(Rect rect);
    public void Intersect(Rect rect);
    public static Rect Intersect(Rect rect1, Rect rect2);
    public void Union(Rect rect);
    public static Rect Union(Rect rect1, Rect rect2);
    public void Union(Point point);
    public static Rect Union(Rect rect, Point point);
    public void Offset(Vector offset);
    public void Offset(double dx, double dy);
    public static Rect Offset(Rect rect, Vector offset);
    public static Rect Offset(Rect rect, double dx, double dy);
    public void Inflate(Size size);
    // If –width > Width*2 or –height > Height*2, the Rect
    becomes Empty
    public void Inflate(double width, double height);
    public static Rect Inflate(Rect rect, double width, double
    height);
    public static Rect Inflate(Rect rect, Size size);
    // Transforms 4 corners and sets new axis aligned rect.
    public void Transform(Matrix matrix);
    public static Rect Transform(Rect rect, Matrix matrix);
    public static Boolean Equals(Rect rectangle1, Rect rectangle2)
    public virtual Boolean Equals(Object o)
    public virtual Int32 GetHashCode( )
    public static Boolean operator==(Rect rectangle1, Rect rectangle2)
    public static Boolean operator!=(Rect rectangle1, Rect rectangle2)
    public virtual String ToString( )
}
```

As shown, the rect provides a number of methods. IsEmpty returns true if the instance is equal to the Empty Rect. The FromLTRB method essentially returns a rectangle initialized with (left, top, right-left, bottom-top). Then Contains method returns true if The Rect is not Empty, p.x>=r.x, p.x<=r.x+r.width, p.y>=r.y and p.y <=r.y+r.height. This means that this method will return false if the rectangle has a negative width or height.

IntersectsWith returns true if neither Rect is Empty, r1.x<=r2.x+r2.width, r2.x<=r1.x+r1.width, r1.y<=r2.y+r2.height, and r2.y<=r1.y+r1.height. The intersection of two rectangles is computed by taking the max of the left and top dimensions and the min of the right and bottom dimensions. If either Rect is Empty, the Empty Rect is returned.

The union of two rectangles is computed by taking the min of the left and top dimensions and the max of the right and bottom dimensions. If either Rect is Empty, the other Rect is returned.

For the Offset method, the offset is simply added to the location of the rectangle. This method has no effect if the Rect is Empty.

For Inflate, the inflation amount is simply applied equally to all sides. Adjustments are made, comprising, r.x=r.x–s.width; r.y=r.y–s.height; r.width=r.width+2*s.width and r.height=r.height+2*s.height. This method has no effect if the Rect is Empty, because an Empty Rect has no location.

The following markup syntax specifies the x, y, width and height. It should be noted that this is equivalent to what the type converter for System.Drawing.Rectangle does.

rectangle:
    ( coordinate comma-wsp ){3} coordinate | "Empty"

Matrices for 2D computations are represented as a 3×3 matrix. The MIL uses row-vector syntax. The mil only allows affine transforms, and thus only requires only six values, rather than a full 3×3 matrix. These are named and defined as follows.

$$\begin{bmatrix} m11 & m12 & 0 \\ m21 & m22 & 0 \\ offsetX & offsetY & 1 \end{bmatrix}$$

When a matrix is multiplied with a point, it transforms that point from the new coordinate system to the previous coordinate system:

$$\begin{bmatrix} x_{newCoordSys} & y_{newCoordSys} & 1 \end{bmatrix} \cdot \begin{bmatrix} m11 & m12 & 0 \\ m21 & m22 & 0 \\ offsetX & offsetY & 1 \end{bmatrix} = \begin{bmatrix} x_{oldCoordSys} & y_{oldCoordSys} & 1 \end{bmatrix}$$

Transforms can be nested to any level. Whenever a new transform is applied it is the same as pre-multiplying it onto the current transform matrix:

$$\begin{bmatrix} x_{newCoordSys} & y_{newCoordSys} & 1 \end{bmatrix} \cdot \begin{bmatrix} m11_2 & m12_2 & 0 \\ m21_2 & m22_2 & 0 \\ offsetX_2 & offsetY_2 & 1 \end{bmatrix} \cdot \begin{bmatrix} m11_1 & m12_1 & 0 \\ m21_1 & m22_1 & 0 \\ offsetX_1 & offsetY_1 & 1 \end{bmatrix} = \begin{bmatrix} x_{oldCoordSys} & y_{oldCoordSys} & 1 \end{bmatrix}$$

Most places in the API do not take a Matrix directly. Instead, the Transform class supports animation in a deep way.

```
public struct System.Windows.Media.Matrix
{
        // Construction and setting
        public Matrix( ); // defaults to identity
        public Matrix(
            double m11, double m12,
            double m21, double m22,
            double offsetX, double offsetY);
        // Identity
        public static Matrix Identity { get; }
        public void SetIdentity( );
        public bool IsIdentity { get; }
        // Unset support
        public static Matrix Unset { get; } // all values are NaN
        public bool IsSet { get; } // false if any NaN
        // Math operations
        public void Prepend(Matrix matrix); // "this" becomes:
        matrix * this
        public void Append(Matrix matrix); // "this" becomes:
        this * matrix
        // Matrix operations
        public void Rotate(double angle); // Appends a rotate
        public void RotatePrepend(double angle); // Prepends a rotate
        public void RotateAt(double angle, Point center); //
        Appends a rotate
        public void RotateAtPrepend(double angle, Point
        center); // Prepends a rotate
        public void Scale(Double scaleX, Double scaleY); //
        Appends a scale
        public void ScalePrepend(Double scaleX, Double scaleY);
        // Prepends a scale
        public void ScaleAt(Double scaleX, Double scaleY, Point
        point); // Appends a scale
        public void ScaleAtPrepend(Double scaleX, Double scaleY,
        Point point); // Prepends a scale
        public void Skew(Double skewX, Double skewY);
        // Appends a skew, in degrees
        public void SkewPrepend(Double skewX, Double skewY);
        // Prepends a skew
        public void Translate(Double offsetX, Double offsetY);
        // Appends a translation
        public void TranslatePrepend(Double offsetX, Double offsetY);
        // Prepends a translation
        public static operator * (Matrix matrix1, Matrix matrix2);
        // Transformation services
        public Point Transform(Point point);
        public void Transform(Point[ ] points);
        // Since this is a vector ignores the offset parts of the matrix
        public Vector Transform(Vector vector);
        public void TransformVectors(Vector[ ] vectors);
        // Inversion
        public double Determinant { get; }
        public bool HasInverse { get; }
        public Matrix Inverse { get; } // Throws ArgumentException
            InvalidOperationException if !HasInverse
        // Individual members
        public double M11 { get; set; }
        public double M12 { get; set; }
        public double M21 { get; set; }
        public double M22 { get; set; }
        public double OffsetX { get; set; }
        public double OffsetY { get; set; }
};
```

For the markup syntax, the order is M11, M12, M21, M22, OffsetX, OffsetY:

```
matrix:
    ( coordinate comma-wsp ){5} coordinate | "Identity"
```

Three-Dimensional Visuals and Elements

Figure 41:
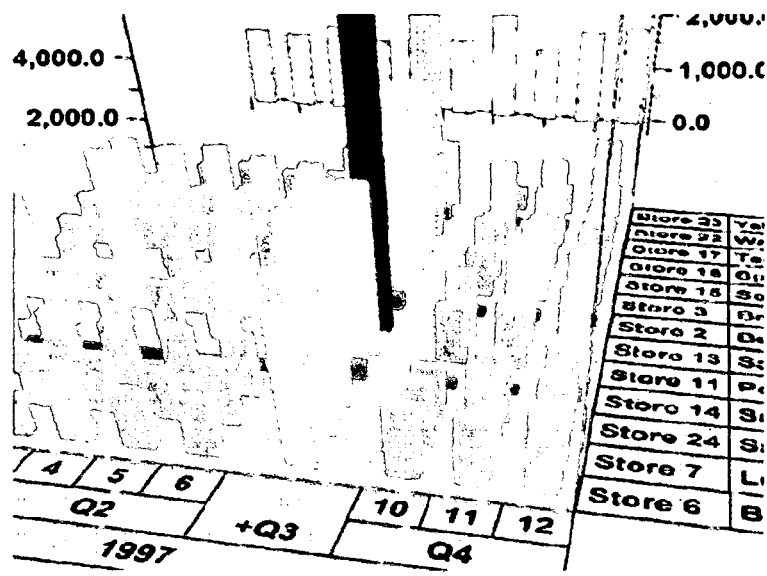
FIG. 41 is a representation of an example three-dimensional image constructed via a three-dimensional visual in accordance with an aspect of the present invention.

This section is directed towards three-dimensional effects, primarily for providing straightforward three-dimensional effects via the media integration layer for applications to use. Such effects are integrated with remoting, printing, desktop composition, and participate cleanly in the MIL architecture and element model, and the composability of media across the MIL. For example, business visualization has some requirements for three-dimensional presentation and interactivity. This may require hit testing resolution into thousands or tens of thousands of objects, and will result in interactive visualizations that might look something like the image shown in FIG. 41.

The features described herein are generally directed towards runtime rendering and interaction, rather than functionality that is provided via modeling tools. The modeling functionality that is provided is more targeted for situations where animation or runtime construction will be needed to be exposed to the runtime. For instance, 3D text extrusion may be provided, even though it is really a modeling feature, since applications will want to databind text in, thus requiring this to be a runtime feature.

As described above, Visuals in the MIL system represent the 2D compositing tree of what ultimately gets rendered. Note that UiElements and Controls are Visuals. Additionally, Visuals have a collection of child Visuals that are rendered in front (in painter's algorithm terms) of the Visual's own content. As also described above, there are a variety of concrete Visual subclasses, including RetainedVisual, SurfaceVisual, HwndVisual, and so forth. A RetainedVisual represents a set of 2D drawing instructions that the user either creates directly onto the Visual, or does so as the result of receiving an OnRender( ) callback from the layout system.

As will be understood, 3D fits naturally into the 2D visual world. To this end, a Retained3DVisual is provided, that, like its 2D counterpart, represents a list of drawing instructions that is imperatively filled in by opening a drawing context, and rendering into that drawing context. This will effectively result in building a scene graph, or a metafile, or an instruction list into the Visual itself.

A Retained3DVisual is essentially a set of three-dimensional (rendering instructions/scene graph/metafile) including lights, a camera to define the 2D projection of that scene, a rectangular two-dimensional viewport in local coordinate space for mapping the projection to, and other ambient parameters, such as antialiasing switches, fog switches, and the like.

Note that an on-demand OnRender( ) capability is not provided for the Retained3DVisual. This functionality exists for 2D, to help manage the amount of data drawn in the 2D world. Like 2D, rendering happens via a DrawingContext where "immediate-mode feeling" calls get made. For instance, in 2D, the following may be in a drawing context:

```
DrawingContext ctx = ...;
ctx.DrawRectangle(...);
ctx.PushTransform(...);
ctx.DrawGeometry(...);
ctx.PushTransform(...);
ctx.DrawEllipse(...);
ctx.Pop( );
ctx.Pop( );
```

For consistency with 2D, a similar model is provided in 3D that looks like:

```
DrawingContext3 ctx = ...;
ctx.DrawMesh(mesh, material);
ctx.PushTransform(transform3);
ctx.DrawMesh(...);
ctx.PushTransform(...);
ctx.DrawMesh(...);
ctx.Pop( );
ctx.Pop( );
```

Note that this model of rendering works well for both a Retained Mode 3D visual (where the "instructions" are simply saved), and an Immediate Mode 3D visual (where the rendering happens directly, and a camera needs to be established up front). In fact, in the retained mode case, what happens internally is a 3D modeling hierarchy is getting built up and retained. Alternatively, in the immediate mode case, no such thing is happening, instructions are being issued directly, and a context stack (for transforms, for example) is being maintained.

The following is an example showing programming with the 3DVisual API. This example creates a Retained3DVisual, obtains a drawing context to render into, renders primitives and lights into it, sets a camera, and adds the visual to the visual children of a control:

```
// Create a 3D visual
Retained3DVisual visual3 = new Retained3DVisual( );
// Render into it
using (Drawing3DContext ctx = visual3.Models.RenderOpen( ))
{
    // Render meshes and lights into the geometry
    ctx.DrawMesh(mesh, material);
    ctx.PushTransform(transform3);
    ctx.DrawMesh(...);
    ctx.PushTransform(secondTransform3);
    ctx.AddLight(...);
    ctx.DrawMesh(...);
    ctx.Pop( );
    ctx.Pop( );
}
// Establish ambient properties on the visual
visual3.Camera = new ProjectionCamera(...);
// Add it to the compositing children of some control called myControl
((IVisual)myControl).AddChild(visual3);
```

The integration of 2D into 3D is a significant feature, and enables the very interesting scenarios of having 2D UI interact in a 3D world, be mapped onto 3D surfaces, and so forth. 2D integrates into 3D in separate ways. One way is as a texture onto a 3D primitive. Any Avalon 2D Brush (as well as more complex material specifications) can be used to texture 3D. A special case of this is the VisualBrush which can host an arbitrary Visual (and thus Controls, or entire Application UIs). Mechanisms are provided to resolve hit testing and further hit test into that visual for applications that desire to do so and, in certain cases, the hit-testing resolution will be done such that those Visuals can be live. Note that since the Visual itself is not a bitmap, Visual-texturing can be implemented through more sophisticated techniques, such as taking the 2D geometry in the Visual and bringing it into 3D, thus having 3D vector graphics rather than 2D bitmaps used as textures.

Another way that 2D integrates into 3D is as a rendering instruction on a 3D context. It is also desirable to be able to simply render a 2D visual, screen aligned, and unscaled without any perspective effects, at a particular z depth, e.g., to stack a sphere, a 2D visual, and a cube while still allowing them all to share the same z-buffer, thus allowing, for instance, a sphere to pass through a piece of 2D UI. This will be exposed by a "DrawVisual" instruction on the Drawing3DContext.

As described herein, Animation should operate intuitively, and 2D animation technology is directly transferable to 3D. An exception is rationalizing the timelines.

The above shows an imperative rendering style of usage where drawing instructions are issued to the context. This is not a declarative usage, and thus this imperative approach is not appropriate for declarative markup.

Because with the above mechanism there is no 3D Model being explicitly constructed externally, (even though internally it is), a programmer cannot address a 3D model or enumerate its contents. As a result, there is no place with which to write "effects" that take a model as input and generate a new model.

To provide a declarative way of building up and using 3D "resources" as in 2D with Brushes, Pens, Geometry, Paths, and so forth, a number of types are provided that allow users to construct what goes into the 3D instruction stream, and the constructed object can be set into a Retained3DVisual instead of using the context.

For example, the above Drawing3DContext-based sample code could be rewritten as:

```
// Create a 3D visual
Retained3DVisual visual3 = new Retained3DVisual( );
visual3.Models.Add(new MeshPrimitive3D(mesh, material));
Model3DCollection innerGroup1 = new Model3DCollection( );
innerGroup1.Transform = transform3;
innerGroup1.Add(new MeshPrimitive3D(mesh, material));
Model3DCollection innerGroup2 = new Model3DCollection( );
innerGroup2.Transform = secondTransform3;
innerGroup2.Add(new Light(...));
innerGroup2.Add(new MeshPrimitive3D(...));
innerGroup1.Add(innerGroup2);
visual3.Models.Add(innerGroup1);
// Everything else is the same as before...
// Establish ambient properties on the visual
visual3.Camera = new ProjectionCamera(...);
// Add it to the compositing children of some control called myControl
((IVisual)myControl).AddChild(visual3);
```

Here, a model is being built, and then assigned into the Retained3DVisual. PushTransform/Pop pairs are replaced by construction of a Model3DCollection which itself has a transform and Models beneath it. Providing both the modeling approach and the imperative context-based approach provides a solution for element-level declarative markup, visual enumeration, scene graph effects and modifiability of visual contents, and is done in an architecturally viable way.

The root of the modeling class tree is Model3D, which represents a three-dimensional model that can be attached to a Retained3DVisual. Ultimately, lights, meshes, .X file streams (so it can come from a file, a resource, memory, and so forth), groups of models, and 3D-positioned 2D visuals are all models. Thus, there is the following hierarchy:

```
Model3D
    Model3DCollection - is a collection of Model3D
    Primitive3D
        MeshPrimitive3D(mesh, material, hitTestID)
        ImportedPrimitive3D(stream, hitTestID) (for .x files)
    Light
```

-continued

```
        AmbientLight
        SpecularLight
            DirectionalLight
            PointLight
                SpotLight
    VisualModel3D - has a Visual and a Point3 and a hitTestID
```

The Model3D class itself supports a number of operation, including Get 3D bounding box., Get and set the Transform of the Model3D, Get and set other "node" level properties, like shading mode and Get and set the hitTestObject. Note that explicit 3D-initiated hit testing is not being exposed within a 3D scene. In other words, there is not an API to project an arbitrarily directed ray into a 3D scene to see what is hit. The hit testing functionality will be accessed by performing a hit test against the 2D projection in the Retained3DVisual.

Incorporating 3D poses a challenge when it comes to rationalizing the 2D coordinate system with the 3D coordinate system. In 2D, the coordinate system has the origin in the upper left, +x to the right, and +y down.

The 3D coordinate system may be a right-handed one, where +z is coming out of the screen, +x is to the right (which is the same as 2D), and +y is up (which is different from 2D). This is because a left handed coordinate system in a 3D graphics context tends to create large numbers of unnecessary programming errors. Note that modern hardware has the ability to download per-vertex shaders, thus making it possible to use whatever coordinate system convention is desired.

Another aspect of coordinate system rationalization is the u,v space that textures live in. There is no particular default convention for u,v space, but models with "+v going down" will allow a more direct mapping of 2D UI through texturing than models with "+v going up" (for those the texture will likely appear upside down). In the event where the model being textured does not have the properly oriented u,v grid, the Transform property on the Material's Brushes can be used to counteract.

A number of experiments have been performed to look into the most viable way to get text to look attractive in 3D; (note that this doesn't necessarily imply "3D Text" with width, height, and depth). To this end, an application may construct 2D Visuals holding the text (and other arbitrary 2D elements) to be used in 3D, ensure that that Visual gets oversampled (e.g., by 4x-8x), and then use this Visual as a Material onto a plane or any arbitrary 3D object. If the resultant texturing is anisotropic, the result is attractive text.

Note that declarative types specified in this section (e.g., the vectors, points, lights, meshes, materials, primitives, transforms, and the like) are all readily describable through XAML-based markup using the standard XAML CLR class type description mechanisms. Types may have TypeConverters, but if not, they are specifiable in markup through the standard simple and complex property description mechanisms that XAML offers. Note that TypeConverter specifications are for interpreting pure string-based representations of types as they appear in XAML. Thus, for example, for a Vector3D that's used in a ScaleTransform3D, the XAML markup would be:

```
<ScaleTransform3D scaleVector="1,2,8" />
```

Note that the "ScaleTransform3D" and the "scaleVector" are parsed and understood by the generic XAML parser, but the "1,2,8" is fed to the Vector3D's TypeConverter and expected to generate a Vector3D (since that's the type of the "ScaleVector" property of ScaleTransform3D.) Further, Note that while not explicitly listed for each type, these types have the following methods (shown here for Vector3D, but applicable to others):

```
public static bool operator == (Vector3D vector1, Vector3D vector2)
public static bool Equals(Vector3D vector1, Vector3D vector2)
public static bool operator != (Vector3D vector1, Vector3D vector2)
public override bool Equals(object o)
public override int GetHashCode( )
public override string ToString( )
```

Also, any type that derives from Changeable (either directly or indirectly) will need to have a "public new MyType Copy( )" method on it. These primitive types simply exist in support of the other types described in this section. Wherever possible, they mirror the primitive types used in 2D, and this similarity is a design goal for these types.

The Point3D object is a straightforward analog to the 2D Point type System.Windows.Point:

```
public struct System.Windows.Media3D.Point3D
{
    public Point3D( ); // initializes to 0,0,0
    public Point3D(double x, double y, double z);
    public double X { get; set; }
    public double Y { get; set; }
    public double Z { get; set; }
    public void Offset(double dx, double dy, double dz);
    public static Point3D operator +(Point3D point, Vector3D vector);
    public static Point3D operator -(Point3D point, Vector3D vector);
    public static Vector3D operator -(Point3D point1, Point3D point2);
    public static Point3D operator *(Point3D point, Matrix3D matrix);
    public static Point3D operator *(Point3D point, Transform3D
        transform);
    public static explicit operator Vector3D(Point3D point);
    // Explicit promotion of a 3D point to a 4D point. W coord
    becomes 1.
    public static explicit operator Point4D(Point3D point);
}
```

```
coordinate:
    double-number-representation
comma-wsp:
    one comma with any amount of whitespace before or after
coordinate-triple:
    (coordinate comma-wsp){2} coordinate
point3D:
    coordinate-triple
```

Vector3D is a straightforward analog to the 2D Vector type System.Windows.Vector:

```
public struct System.Windows.Media3D.Vector3D
{
    public Vector3D( ); // initializes to 0,0,0
    public Vector3D(double x, double y, double z);
    public double X { get; set; }
    public double Y { get; set; }
    public double Z { get; set; }
    public double Length { get; }
    public double LengthSquared { get; }
    public void Normalize( ); // make the Vector3D unit length
```

-continued

```
public static Vector3D operator -(Vector3D vector);
public static Vector3D operator +(Vector3D vector1, Vector3D
  vector2);
public static Vector3D operator -(Vector3D vector1, Vector3D
  vector2);
public static Point3D operator +(Vector3D vector, Point3D point);
public static Point3D operator -(Vector3D vector, Point3D point);
public static Vector3D operator *(Vector3D vector, double scalar);
public static Vector3D operator *(double scalar, Vector3D vector);
public static Vector3D operator /(Vector3D vector, double scalar);
public static Vector3D operator *(Vector3D vector, Matrix3D
  matrix);
public static Vector3D operator *(Vector3D vector, Transform3D
  transform);
// return the dot product: vector1.X*vector2.X +
  vector1.Y*vector2.Y
public static double DotProduct(Vector3D vector1, Vector3D
  vector2);
// return the normal vector between the two input vectors by
// computing the cross product.
public static Vector3D CrossProduct(Vector3D vector1, Vector3D
  vector2);
// return the angle required to rotate v1 into v2, in degrees
// This will return a value between (-180, 180] degrees
public static double AngleBetween(Vector3D vector1, Vector3D
  vector2);
public static explicit operator Point3D(Vector3D vector);}
// Explicit promotion of a 3D vector to a 4D point. W coord
  becomes 0.
public static explicit operator Point4D(Vector3D point);
```

```
point3D:
    coordinate-triple
```

Point4D adds in a fourth, w, component to a 3D point, and is used for transforming through non-affine Matrix3D's. There is no Vector4D, as the 'w' component of 1 translates to a Point3D, and a 'w' component of 0 translates to a Vector3D:

```
public struct System.Windows.Media3D.Point4D
{
    public Point4D( ); // initializes to 0,0,0,0
    public Point4D(double x, double y, double z, double w);
    public double X { get; set; }
    public double Y { get; set; }
    public double Z { get; set; }
    public double W { get; set; }
    public static Point4D operator -(Point4D point1, Point4D point2);
    public static Point4D operator +(Point4D point1, Point4D point2);
    public static Point4D operator *(double scalar, Point4D point);
    public static Point4D operator *(Point4D point, double scalar);
    public static Point4D operator *(Point4D point, Matrix3D matrix);
    public static Point4D operator *(Point4D point, Transform3D
      transform);
}
```

```
point4D:
    coordinate-quad
```

Quaternions are distinctly 3D entities that represent rotation in three dimensions. Their power comes in being able to interpolate (and thus animate) between quaternions to achieve a smooth, reliable interpolation. The particular interpolation mechanism is known as Spherical Linear Interpolation.

Quaternions can either be constructed from direct specification of their components (x,y,z,w), or as an axis/angle representation. The first representation may result in unnormalized quaternions, for which certain operations do not make sense (for instance, extracting an axis and an angle).

The components of a Quaternion cannot be set once the Quaternion is constructed, since there is potential ambiguity in doing so, e.g., setting the Angle on a non-normalized Quaternion has no meaning.

```
public struct System.Windows.Media3D.Quaternion
{
    public Quaternion( ); // initializes to 0,0,0,0
    // Non-normalized quaternions are allowed
    public Quaternion(double x, double y, double z, double w);
    // allow construction through axis and angle
    public Quaternion(Vector3D axisOfRotation, double angleInDegrees);
    // fundamental Quaternion components
    public double X { get; }
    public double Y { get; }
    public double Z { get; }
    public double W { get; }
    // axis/angle access. Will raise an exception if the quaternion
    // is not normalized.
    public Vector3D Axis { get; }
    public double Angle { get; } // in degrees, just like
      everything else
    // Magnitude of 1? Only normalized quaternions can be used in
    // RotateTransform3D's.
    public bool IsNormalized { get; }
    public Quaternion Conjugate( ); // return conjugate of the
      quaternion
    public Quaternion Inverse( ); // return the inverse of the
      quaternion
    public Quaternion Normalize( ); // return a normalized
      quaternion
    public static Quaternion operator +(Quaternion left,
      Quaternion right);
    public static Quaternion operator -(Quaternion left,
      Quaternion right);
    public static Quaternion operator *(Quaternion left,
      Quaternion right);
    // smoothly interpolate between two quaternions
    public static Quaternion Slerp(Quaternion left, Quaternion right,
      double t);
}
```

```
quaternion:
    coordinate-quad |              // x,y,z,w representation
    "(" coordinate-triple ")" coordinate   // axis,angle representation
```

Matrix3D is a 3D analog to System.Windows.Matrix. Like Matrix, most APIs don't take Matrix3D, but rather Transform3D, which supports animation in a deep way. Matrices for 3D computations are represented as a 4×4 matrix. The MIL uses row-vector syntax:

$$\begin{bmatrix} m11 & m12 & m13 & m14 \\ m21 & m22 & m23 & m24 \\ m31 & m32 & m33 & m34 \\ offsetX & offsetY & offsetZ & m44 \end{bmatrix}$$

When a matrix is multiplied with a point, it transforms that point from the new coordinate system to the previous coordinate system.

Transforms can be nested to any level. Whenever a new transform is applied it is the same as pre-multiplying it onto the current transform matrix:

```
public struct System.Windows.Media3D.Matrix3D
{
    // Construction and setting
    public Matrix( ); // defaults to identity
    public Matrix(
        double m11, double m12, double m13, double m14,
        double m21, double m22, double m23, double m24,
        double m31, double m32, double m33, double m34,
        double offsetX, double offsetY, double offsetZ, double
            m44);
    // Identity
    public static Matrix3D Identity { get; }
    public void SetIdentity( );
    public bool IsIdentity { get; }
    // Math operations
    public void Prepend(Matrix3D matrix); // "this" becomes:
    matrix * this
    public void Append(Matrix3D matrix); // "this" becomes:
    this * matrix
    // Rotations - Quaternion versions. If you want axis/angle
    rotation,
    // build the quaternion out of axis/angle.
    public void Rotate(Quaternion quaternion);
    public void RotatePrepend(Quaternion quaternion);
    public void RotateAt(Quaternion quaternion, Point3D center);
    public void RotateAtPrepend(Quaternion quaternion, Point3D
    center);
    public void Scale(Vector3D scalingVector);
    public void ScalePrepend(Vector3D scalingVector);
    public void ScaleAt(Vector3D scalingVector, Point3D point);
    public void ScaleAtPrepend(Vector3D scalingVector, Point3D
    point);
    public void Skew(Vector3D skewVector); // Appends a skew, in
    degrees
    public void SkewPrepend(Vector3D skewVector);
    public void SkewAt(Vector3D skewVector, Point3D point);
    public void SkewAtPrepend(Vector3D skewVector, Point3D point);
    public void Translate(Vector3D offset); // Appends a
    translation
    public void TranslatePrepend(Vector3D offset); // Prepends a
    translation
    public static Matrix3D operator * (Matrix3D matrix1, Matrix3D
    matrix2);
    // Transformation services. Those that operate on Vector3D and
    Point3D
    // raise an exception if IsAffine == false.
    public Point3D Transform(Point3D point);
    public void Transform(Point3D[ ] points);
    public Point4D Transform(Point4D point);
    public void Transform(Point4D[ ] points);
    // Since this is a vector ignores the offset parts of the
    matrix
    public Vector3D Transform(Vector3D vector);
    public void Transform(Vector3D[ ] vectors);
    // Characteristics of the matrix
    public bool IsAffine { get; } // true if
    m{1,2,3}4 == 0, m44 == 1.
    public double Determinant { get; }
    public bool HasInverse { get; }
    public Matrix3D Inverse { get; } // Throws
    InvalidOperationException if !HasInverse
    // Individual members
    public double M11 { get; set; }
    public double M12 { get; set; }
    public double M13 { get; set; }
    public double M14 { get; set; }
    public double M21 { get; set; }
    public double M22 { get; set; }
    public double M23 { get; set; }
    public double M24 { get; set; }
    public double M31 { get; set; }
    public double M32 { get; set; }
    public double M33 { get; set; }
    public double M34 { get; set; }
    public double OffsetX { get; set; }
```

-continued

```
    public double OffsetY { get; set; }
    public double OffsetZ { get; set; }
    public double M44 { get; set; }
};
```

```
matrix3D:
    ( coordinate comma-wsp ){15} coordinate | "Identity"
```

Transform3D, like the 2D Transform, is an abstract base class with concrete subclasses representing specific types of 3D transformation. Specific subclasses of Transform3D are also where animation comes in.

In one implementation, the overall hierarchy of Transform3D is set forth below:

```
Transform3D
    Transform3DCollection
    AffineTransform3D
        TranslateTransform3D
        ScaleTransform3D
        RotateTransform3D
    MatrixTransform3D
```

Root Transform3D has static methods for constructing specific classes of Transform; (note that it does not expose a Matrix3D representation, as this Transform may be broader):

```
public abstract class System.Windows.Media.Media3D.Transform3D :
Animatable
{
    internal Transform3D( );
    public new Transform3D Copy( );
    // static helpers for creating common transforms
    public static MatrixTransform3D CreateMatrixTransform(Matrix3D
    matrix);
    public static TranslateTransform3D CreateTranslation(Vector3D
    translation);
    public static RotateTransform3D CreateRotation(Vector3D axis,
    double angle);
    public static RotateTransform3D CreateRotation(Vector3D axis,
    double angle,
        Point3D rotationCenter);
    public static RotateTransform3D CreateRotation(Quaternion
    quaternion);
    public static RotateTransform3D CreateRotation(Quaternion
    quaternion,
        Point3D rotationCenter);
    public static ScaleTransform3D CreateScale(Vector3D scaleVector);
    public static ScaleTransform3D CreateScale(Vector3D scaleVector,
        Point3D scaleCenter);
    public static Transform3D Identity { get; }
    // Instance members
    public bool IsAffine { get; }
    public Point3D Transform(Point3D point);
    public Vector3D Transform(Vector3D vector);
    public Point4D Transform(Point4D point);
    public void Transform(Point3D[ ] points);
    public void Transform(Vector3D[ ] vectors);
    public void Transform(Point4D[ ] points);
}
```

Note that the Transform( ) methods that take Point3D/Vector3D will raise an exception if the transform is not affine.

Transform3DCollection will mimic TransformCollection, with the Add* methods modified in the same way that the Create* methods above are modified:

```
public sealed class System.Windows.Media3D.Transform3DCollection :
Transform3D, IList
{
    // follow the model of TransformCollection
}
```

AffineTransform3D is a base class that concrete affine 3D transforms derive from (translate, skew, rotate, scale), and it exposes read access to a Matrix3D:

```
public abstract class System.Windows.Media3D.AffineTransform3D :
Transform3D
{
    internal AffineTransform3D( ); // non-extensible
    public virtual Matrix3D Value { get; }
}
```

TranslateTransform3D:

```
public sealed class System.Windows.Media3D.TranslateTransform3D :
AffineTransform3D
{
    public TranslateTransform3D( );
    public TranslateTransform3D(Vector3D offset);
    public TranslateTransform3D(Vector3D offset,
        Vector3DAnimationCollection offsetAnimations);
    public new TranslateTransform3D Copy( );
    [Animations("OffsetAnimations")]
    public Vector3D Offset { get; set; }
    public Vector3DAnimationCollection OffsetAnimations { get; set; }
    public override Matrix3D Value { get; }
}
```

ScaleTransform3D:

```
public sealed class System.Windows.Media3D.ScaleTransform3D :
AffineTransform3D
{
    public ScaleTransform3D( );
    public ScaleTransform3D(Vector3D scaleVector);
    public ScaleTransform3D(Vector3D scaleVector, Point3D
        scaleCenter);
    public ScaleTransform3D(Vector3D scaleVector,
        Vector3DAnimationCollection scaleVectorAnimations,
        Point3D scaleCenter,
        Point3DAnimationCollection scaleCenterAnimations);
    public new ScaleTransform3D Copy( );
    [Animations("ScaleVectorAnimations")]
    public Vector3D ScaleVector { get; set; }
    public Vector3DAnimationCollection
        ScaleVectorAnimations { get; set; }
    [Animations("ScaleCenterAnimations")]
    public Point3D ScaleCenter { get; set; }
    public Point3DAnimationCollection
        ScaleCenterAnimations { get; set; }
    public override Matrix3D Value { get; }
}
```

RotateTransform3D is more than just a simple mapping from the 2D rotate due to the introduction of the concept of an axis to rotate around (and thus the use of quaternions):

```
public sealed class RotateTransform3D : AfineTransform3D
{
    public RotateTransform3D( );
    public RotateTransform3D(Vector3D axis, double angle);
    public RotateTransform3D(Vector3D axis, double angle, Point3D
        center);
    // Quaternions supplied to RotateTransform3D methods must be
        normalized,
    // otherwise an exception will be raised.
    public RotateTransform3D(Quaternion quaternion);
    public RotateTransform3D(Quaternion quaternion, Point3D center);
    public RotateTransform3D (
        Quaternion quaternion,
        QuaternionAnimationCollection quaternionAnimations,
        Point3D center,
        Point3DAnimationCollection centerAnimations);
    public new RotateTransform3D Copy( );
    // Angle/Axis are just a different view on the
        QuaternionRotation parameter. If
    // Angle/Axis changes, QuaternionRotation will change
        accordingly, and vice-versa.
    public double Angle { get; set; }
    public Vector3D Axis { get; set; }
    [Animations("QuaternionRotationAnimations")]
    public Quaternion QuaternionRotation { get; set; }
    public QuaternionAnimationCollection
        QuaternionRotationAnimations { get; set; }
    [Animations("CenterAnimations")]
    public Point3D Center { get; set; }
    public Point3DAnimationCollection CenterAnimations { get;
        set; }
    public override Matrix3D Value { get; }
}
```

Note that only the Quaterion property here is animatable. In general, animations of axis/angles don't tend to work out well. Better to animate the quaternion, and we can extract axes and angles from the base value of the quaternion. If you do want to simply animate an angle against a fixed axis, the easy way to specify this is to build two quaternions representing those positions, and animate between them.

MatrixTransform3D may build a Transform3D directly from a Matrix3D:

```
public sealed class System.Windows.Media3D.MatrixTransform3D :
Transform3D
{
    public MatrixTransform3D( );
    public MatrixTransform3D(Matrix3D matrix);
    public new MatrixTransform3D Copy( );
    public Matrix3D Value { get; set; }
}
```

When a Transform3D type property is specified in markup, the property system uses the Transform type converter to convert the string representation to the appropriate Transform derived object. Animated properties are not described using this syntax, however the complex property syntax can be used for animation descriptions.

The syntax is modeled off of the 2D Transform, wherein "<>" represents an optional parameter:

```
matrix(m00 m01 m02 m03 m11 ... m33)
translate(tx ty tz)
scale(sx <sy> <sz> <cx> <cy> <cz>)
    If <sy> or <sz> is not specified it is assumed to be a uniform
    scale.
```

-continued

```
If <cx> <cy> <cz> are specified, then they all need to be
specified, and <sx> <sy> do as well. They are used for the
scaling center. If they're not, center is assumed to be 0,0,0.
rotate(ax ay az angle <cx> <cy> <cz>)
    ax,ay,az specifies axis of rotation
    angle is the angle through that axis
    If cx, cy, cz is not specified it's assumed to be 0,0,0.
```

The following is example grammar:

```
transform-list:
    wsp* transforms? wsp*
transforms:
    transform
    | transform comma-wsp+ transforms
transform:
    matrix
    | translate
    | scale
    | rotate
    | skewX
    | skewY
matrix:
    "matrix" wsp* "(" wsp*
    number comma-wsp
    number comma-wsp
    ... 13 more times ...
    number wsp* ")"
translate:
    "translate" wsp* "(" wsp* number ( comma-wsp
    number comma-wsp number )? wsp* ")"
scale:
    "scale" wsp* "(" wsp* number (comma-wsp number
    comma-wsp number
        (comma-wsp number comma-wsp number comma-wsp
        number)?
        )? wsp* ")"
rotate:
    "rotate" wsp* "(" wsp* number wsp* number wsp*
    number wsp* number
        ( comma-wsp number comma-wsp number comma-wsp
        number )? wsp* ")"
```

Retained3DVisual derives from Visual, and in so doing gets its properties, including opacity, 2D Geometric Clip, 2D Blend Mode, Hit Testing API, 2D Bounds query and Participation in the Visual tree. Note that all of the opacity, clip, blend mode, and bounds apply to the 2D projection of the 3D scene.

```
public class System.Windows.Media.Visuals.Retained3DVisual : Visual
{
    public Retained3DVisual( );
    public Retained3DVisual(UIContext Context);
    // Modeling-oriented semantics. Default value is an empty
    Model3DCollection
    public Model3DCollection Models { get; set; }
    // Ambient properties
    // Camera - there's no default, it's an error not to provide one.
    public Camera Camera { get; set; }
    // ViewPort establishes where the projection maps to in 2D.
    Default is 0,0,1,1
    [Animation("ViewPortAnimations")]
    public Rect ViewPort { get; set; }
    public RectAnimationCollection ViewPortAnimations { get; set; }
    public Fog Fog { get; set; }
}
```

The ViewPort box establishes where the projection determined by the Camera/Models combination maps to in 2D local coordinate space. Note that there is no Bounds3D method on Retained3DVisual. This is available as Models.Bounds.

The Drawing3DContext very much parallels the 2D DrawingContext, and is accessible from the Model3DCollection of a Retained3DVisual via RenderOpen/RenderAppend. It resembles an immediate-mode rendering context, even though it is retaining instructions internally.

```
public class System.Windows.Media3D.Drawing3DContext : IDisposable
{
    internal Drawing3DContext( ); // can't be publicly constructed
    // Rendering
    public void DrawMesh(Mesh3D mesh, Material material, object
    hitTestToken);
    // These are for drawing imported primitives like .x files
    public void DrawImportedPrimitive(ImportedPrimitive3DSource
    primitiveSource,
            object hitTestToken);
    public void DrawImportedPrimitive(ImportedPrimtive3DSource
    primitiveSource,
            Material overridingMaterial,
            object hitTestToken);
    public void DrawVisual(Visual visual, Point3D centerPosition,
        object hitTestToken);
    public void DrawModel(Model3D model);
    public void AddLight(Light light);
    // Stack manipulation
    public void PushTransform(Transform3D transform);
    public void Pop( );
    public void Close( ); // Also invoked by Dispose( );
}
```

Specific details on the semantics of these Drawing3DContext operations are described below with reference to the Modeling API, for which the Drawing3DContext is a convenience. For example, DrawImportedPrimitive (ImportedPrimitive3DSource primitiveSource, objectHitTestToken) creates an ImportedPrimitive3D, and adds it into the currently accumulating Model3D (which in turn is manipulated by Push/Pop methods on the context).

DrawModel( ) is another crossover point between the "context" world and the "modeling" world, allowing a Model3D to be "drawn" into a context. There is no explicit "readback" from the Drawing3DContext, because it has the Model3DCollection backing it, and that collection can be enumerated as needed.

The modeling API is the public and protected API for these classes, (not showing inherited members), wherein Model3D is the abstract model that everything builds from:

```
public abstract class Model3D : Animatable
{
    public Transform3D Transform { get; set; } // defaults to Identity
    public ShadingMode ShadingMode { get; set; }
    public object HitTestToken { get; set; }
    public Rect3D Bounds3D { get; } // Bounds for this model
    // singleton "empty" model.
    public static Model3D EmptyModel3D { get; }
}
```

Model3DCollection is where a combination of models is constructed, and treated as a unit, optionally transforming or applying other attributes to them:

```
public sealed class Model3DCollection : Model3D, IList
{
    public Model3DCollection(params Model3D[ ] models);
    public Model3DCollection(ICollection collection);
    // Drawing3DContext semantics
    public Drawing3DContext RenderOpen( );
    public Drawing3DContext RenderAppend( );
    // IList interface (bunch of stuff I'm not going into here, plus...)
    public int Add(Model3D model);
    public Model3D this[int index] { get; set; }
    public void Insert(...);
    // etc...
}
```

Note that Model3DCollection also has RenderOpen/Append, which returns a Drawing3DContext. Use of this context modifies the ModelCollection itself. The difference between RenderOpen( ) and RenderAppend( ) is that RenderOpen( ) clears out the collection first. Further note that in this implementation, only one Drawing3DContext may be open at a time on a Model3DCollection, and when it is opened, applications may not directly access (for read or write) the contents of that Model3DCollection.

Lights are Model3D's. These include Ambient, Positional, Directional and Spot lights. Lights have an additional property of being part of a modeling hierarchy, and are thus subject to coordinate space transformations. Provided are ambient, diffuse, and specular colors on lights. Note also that there are no lights that are hierarchically scoped or scoped to a particular volume. A suitable light hierarchy is set forth below:

```
              Model3D
                 Light (abstract)
                     AmbientLight (concrete)
                     DirectionalLight (concrete)
                     PointLight (concrete)
                         SpotLight (concrete)
```

The base light class is an abstract class:

```
public abstract class Light : Model3D
{
    internal Light( ); // only allow public construction - no 3rd
    party lights
    [Animation("AmbientColorAnimations")]
    public Color AmbientColor { get; set; }
    public ColorAnimationCollection AmbientColorAnimations { get;
    set; }
    [Animation("DiffuseColorAnimations")]
    public Color DiffuseColor { get; set; }
    public ColorAnimationCollection DiffuseColorAnimations { get;
    set; }
    [Animation("SpecularColorAnimations")]
    public Color SpecularColor { get; set; }
    public ColorAnimationCollection SpecularColorAnimations { get;
    set; }
}
```

Ambient lights light objects uniformly, regardless of their shape:

```
public sealed class AmbientLight : Light
{
    public AmbientLight(Color ambientColor);
}
```

Directional lights have no position in space and project their light along a particular direction, specified by the vector that defines it:

```
public sealed class DirectionalLight : Light
{
    public DirectionalLight(Color diffuseColor, Vector3D direction); //
    common usage
    [Animation("DirectionAnimations")]
    public Vector3D Direction { get; set; }
    public Vector3DAnimationCollection DirectionAnimations { get;
    set; }
}
```

The direction need not be normalized, but it needs to have non-zero magnitude.

Positional lights have a position in space and project their light in all directions. The falloff of the light is controlled by attenuation and range properties:

```
[ strong name inheritance demand so 3rd parties can't derive...
we can't seal, since SpotLight
       derives from this ...]
public class PointLight : Light
{
    public PointLight(Color diffuseColor, Point3D position); // common
    usage
    [Animation("PositionAnimations")]
    public Point3D Position { get; set; }
    public Point3DAnimationCollection PositionAnimations { get;
    set; }
    // Range of the light, beyond which it has no effect. This is
    specified
    // in local coordinates.
    [Animation("RangeAnimations")]
    public double Range { get; set; }
    public DoubleAnimationCollection RangeAnimations { get; set; }
    // constant, linear, and quadratic attenuation factors defines how
    the light
    // attenuates between its position and the value of Range.
    [Animation("ConstantAttenuationAnimations")]
    public double ConstantAttenuation { get; set; }
    public DoubleAnimationCollection ConstantAttenuationAnimations
    { get; set; }
    [Animation("LinearAttenuationAnimations")]
    public double LinearAttenuation { get; set; }
    public DoubleAnimationCollection LinearAttenuationAnimations
    { get; set; }
    [Animation("QuadraticAttenuationAnimations")]
    public double QuadraticAttenuation { get; set; }
    public DoubleAnimationCollection QuadraticAttenuationAnimations
    { get; set; }
}
```

Note that PointLight needs to have a strongname inheritance demand on it; to enable SpotLight to derive from it, but not third parties.

The SpotLight derives from PointLight as it has a position, range, and attenuation, but also adds in a direction and parameters to control the "cone" of the light. In order to control the "cone", outerConeAngle (beyond which nothing is illuminated), and innerConeAngle (within which everything is fully illuminated) needs to be specified. Lighting between the outside of the inner cone and the outer cone falls off linearly. (Note that there is an "angular" falloff between the edge of the inner cone and the outer cone, and a falloff in distance, relative to the position of the light, and is affected by attenuation and range.)

```
public sealed class SpotLight : PointLight
{
    public SpotLight(Color color,
        Point3D position,
        Vector3D direction,
        double outerConeAngle,
        double innerConeAngle);
    [Animation("DirectionAnimations")]
    public Vector3D Direction { get; set; }
    public Vector3DAnimationCollection DirectionAnimations { get; set; }
    [Animation("OuterConeAngleAnimations")]
    public double OuterConeAngle { get; set; }
    public DoubleAnimationCollection OuterConeAngleAnimations { get; set; }
    [Animation("InnerConeAngleAnimations")]
    public double InnerConeAngle { get; set; }
    public DoubleAnimationCollection InnerConeAngleAnimations { get; set; }
}
```

Note that, like everywhere in the MIL API, angles are specified in degrees.

Primitive3D's are leaf nodes that result in rendering in the tree. Concrete classes bring in explicitly specified meshes, as well as imported primitives (.x files). The constructor is internal; (extensibility is available via MeshPrimitive3D).

```
public abstract class Primitive3D : Model3D
{
    internal Primitive3D(object hitTestToken);
}
```

MeshPrimitive3D is for modeling with a mesh and a material:

```
public sealed class MeshPrimitive3D : Primitive3D
{
    public MeshPrimitive3D(Mesh3D mesh, Material material, object hitTestToken);
    public Mesh3D Mesh { get; set; }
    public Material Material { get; set; }
}
```

Note that MeshPrimitive3D is a leaf geometry, and that it contains but is not itself, a Mesh. This means that a Mesh can be shared amongst multiple MeshPrimitive3D's, with different materials, subject to different hit testing, without replicating the mesh data.

ImportedPrimitive3D represents an externally acquired primitive (potentially with material and animation) brought in and converted into the appropriate internal form. It is treated as a rigid model. The canonical example of this is an .X File, and there is a subclass of ImportedPrimitive3DSource that explicitly imports XFiles.

```
public sealed class ImportedPrimitive3D : Primitive3D
{
    public ImportedPrimitive3D(ImportedPrimitive3DSource primitive,
        object hitTestToken);
```

```
    public ImportedPrimitive3DSource PrimitiveSource { get; set; }
    // Allow overriding the imported material(s) if there was any. If not
    specified,
    // this is null, and the built in material is used.
    public Material OverridingMaterial { get; set; }
}
```

Since .x files are expected to be commonly included in scenes, a simple TypeConverter format for expressing this is supported, such as:

```
<ImportedPrimitive3D xfile="myFile.x" />
```

The VisualModel3D takes any Visual (2D, by definition), and places it in the scene. When rendered, it will be screen aligned, and its size will not be affected, but it will be at a particular z-plane from the camera. The Visual will remain interactive.

```
public sealed class VisualModel3D : Model3D
{
    public VisualModel3D(Visual visual, Point3 centerPoint, object
        hitTestToken);
    public Visual Visual { get; set; }
    public Point3D CenterPoint { get; set; }
}
```

Rendering a VisualModel3D first transforms the CenterPoint into world coordinates. It then renders the Visual into the pixel buffer in a screen aligned manner with the z of the transformed CenterPoint being where the center of the visual is placed. Under camera motion, the VisualModel3D will occupy the same amount of screen real estate, and will be forward facing, and not be affected by lights, or the like. The fixed point during this camera motion of the visual relative to the rest of the scene will be the center of the visual, since placement happens based on that point.

The Visual provided is fully interactive, and is effectively "parented" to the Retained3DVisual enclosing it, which means that a given Visual can only be used once in any VisualModel3D, just like a Visual can only have a single parent. Note that this is one of the two mechanisms for embedding interactive Visuals into 3D. The other is to use a VisualMaterial and use it on a primitive.

DrawMesh and DrawVisual both take a hitTestToken "object." This will be returned by IVisual.HitTest( ) when a 3D Visual gets hit. This is then used to disambiguate what gets hit in 3D. Note that "pick paths" are not necessary here, since each DrawMesh, even if it gets the same mesh, can be provided with a different "hitTestToken."

In one implementation, HitTesting is implemented via the Direct3D RayIntersect utility, which provides distance to hit, u,v coordinates of hit point, allows for hit testing beyond the initially hit object, and so forth. Note also that the hit testing result has sufficient information to give the u,v coordinate of the primitive that was hit, to allow translation into a hit test query on whatever texture was wrapping it. Further, for VisualModel3D, as well as the use of a VisualMaterial, the hit test will proceed into the 2D visual at the correct mapping point. This results by allowing the hit test context to come in from the outer 2D environment, continue through the 3D environment, and pick up again in a nested 2D environment, potentially forever. An end result of this is that when providing this pass-through, user-interaction into live, texture mapped Avalon 2D controls operates properly.

The present invention supports a general notion of importing 3D primitives from external sources. One implementation of this in v1 will be from a .x file format.

```
public abstract sealed class ImportedPrimitive3DSource
{
    // Don't allow external derivation
    internal ImportedPrimitive3DSource( );
}
```

.X Files come into the system as an XFile3DSource, and are used to construct a ImportedPrimitive3D. It is separated out into a separate data type so that it can be used and shared in multiple ImportedPrimitive3Ds. The appropriate conversions and processing of the .x file may happen on construction of this, or may be delayed. Note that .x files are imported as a unit, and nothing inside of it is separately addressable.

```
public sealed class XFile3DSource : ImportedPrimitive3DSource
{
    // .X file data is specified as a stream, allowing it to come from
    // arbitrary sources (files, resources, memory, URLs).
    public XFile3DSource(IStream xFileStream);
}
```

The Mesh3D primitive is a straightforward triangle primitive (allowing both indexed and non-indexed specification) that can be constructed programmatically. Note that this supports what is expected to be the most common usage of the primitive (namely position, normal, color, and texture information, with the last three being optional). The mesh also allows selection of whether it is to be displayed as triangles, lines, or points. It also supports the three topologies for interpreting indices, namely triangle list, triangle strip, and triangle fan.

For vertex formats and other primitive construction that are not supported directly by Mesh3D, an .x file can be constructed and imported.

```
public sealed class System.Windows.Media3D.Mesh3D : Animatable
{
    public Mesh3D( );
    // Vertex data. Normals, Colors, and TextureCoordinates are all
    optional.
    public Point3DCollection Positions { get; set; }
    public Vector3DCollection Normals { get; set; } // assumed to
    be normalized
    public ColorCollection      Colors { get; set; }
    public ColorCollection      SpecularColors { get; set; }
    public PointCollection      TextureCoordinates { get; set; }
    // Topology data. If null, treat as non-indexed primitive
    public IntegerCollection TriangleIndices { get; set; }
    // Primitive type - default = TriangleList
    public MeshPrimitiveType MeshPrimitiveType { get; set; }
}
```

MeshPrimitiveType is defined as:

```
public enum System.Windows.Media3D.MeshPrimitiveType
{
    TriangleList,
    TriangleStrip,
    TriangleFan,
    LineList,
    LineStrip,
    PointList
}
```

The per-vertex data in Mesh3D is divided up into Positions, Normals, Colors, and TextureCoordinates. Of these, only Positions is required. If any of the other are provided, they need to have the exact same length as the Positions collection, otherwise an exception will be raised.

The Normals, if provided, are assumed to be normalized. Note that the system will not attempt to calculate normals based on topology/proximity; instead, when normals are desired, they need to be supplied.

The TriangleIndices collection has members that index into the vertex data to determine per-vertex information for the triangles that compose the mesh. This collection is interpreted based upon the setting of MeshPrimitiveType. For TriangleList, every three elements in the TriangleIndices collection defines a new triangle. For TriangleFan, indices 0,1,2 determine the first triangle, then each subsequent index, i, determines a new triangle given by vertices 0,i,i−1. For TriangleStrip, indices 0,1,2 determine the first triangle, and each subsequent index i determines a new triangle given by vertices i−2, i−1, and i. LineList, LineStrip, and PointList have similar interpretations, but the rendering is in terms of lines and points, rather than triangles.

If TriangleIndices is null, then the Mesh is implemented as a non-indexed primitive, which is equivalent to TriangleIndices holding values 0,1, . . . ,n−2,n−1 for a Positions collection of length n.

Upon construction of the Mesh, the implementation creates the optimal D3D structure that represents this mesh. At this point, the actual Collection data structures can be thrown away by the Mesh implementation to avoid duplication of data. Subsequent readback of the mesh if accessed in through some other mechanism (traversing the Retained3DVisuals model hierarchy for instance) will likely reconstruct data from the D3D information that is being held onto, rather than retaining the original data.

The mesh derives from Changeable (through Animatable), and thus can be modified. The implementation will need to trap sets to the vertex and index data, and propagate those changes to the D3D data structures. There is no explicit support for declarative animations of the vertex or index data in a mesh. In other words, Point3DAnimationCollections are not seen here, for instance. This is consistent with the 2D polyline paths, for example.

Like other types, the XAML complex property syntax can be used to specify the collections that define Mesh3D. However, that can be unwieldy and verbose, and thus TypeConverters are provided to make the specification more succinct.

Each collection defined in mesh can take a single string of numbers to be parsed and used to create the collection. For instance, a Mesh representing an indexed triangle strip with only positions and colors could be specified as:

```
<Mesh3D
    meshPrimitiveType="TriangleStrip"
    positions="1,2,3, 4,5,6, 7,8,9, 10,11,12, 13,14,15, 16,17,18"
    colors="red blue green cyan magenta yellow"
    triangleIndices="1,3,4,1,2,3,4,5,6,1,2,4,2"
/>
```

Of course, any of these could be represented much more verbosely in the complex property syntax.

The methods that construct Primitive3D's take a Material to define their appearance. Material is an abstract base class with three concrete subclasses: BrushMaterial, VisualMaterial, and AdvancedMaterial. BrushMaterial and VisualMaterial are both subclasses of another abstract class called BasicMaterial. Thus:

```
Material
    BasicMaterial
        BrushMaterial
        VisualMaterial
    AdvancedMaterial
```

The BrushMaterial method takes a single Brush and can be used for a wide range of effects, including achieving transparency (either per-pixel or scalar), having a texture transform (even an animate one), using video textures, implicit auto-generated mipmaps, and so forth. Specifically, for texturing solid colors, images, gradients, or even another Visual, a SolidColorBrush, ImageBrush, GradientBrush, or VisualBrush would be used to create the BrushMaterial.

The VisualMaterial method is designed to construct a material out of a Visual. This material will be interactive in the sense that input will pass into the Visual from the 3D world in which it is embedded. One difference between this and a BrushMaterial with a VisualBrush is that the BrushMaterial is non-interactive.

The AdvancedMaterial class, whiles considerably more complex than simply using a BrushMaterial or VisualMaterial, provides for further flexibility.

```
public abstract class Material : Animatable
{
    internal Material( ); // don't allow external subclassing
    public new Material Copy( ); // shadows Changeable.Copy( )
    public static Material Empty { get; } // singleton material
}
public abstract class BasicMaterial : Material
{
    internal BasicMaterial( ); // don't allow external subclassing
    public new BasicMaterial Copy( ); // shadows Changeable.Copy( )
}
```

Materials gain flexibility and "economy of concept" by being based on a Brush. For example, there need not be a separate Texture hierarchy reflecting things like video textures, gradient textures, or the like, since those are all specifiable as Brushes. Brushes already encapsulate both alpha-mask and scalar opacity values, so those both become available to texturing. Brushes already have a 2D Transform associated with them which, in the case of texturing, will be interpreted as a texture transform for transforming uv coordinates in the mesh to map into the texture. Brushes are the right place to hang stock procedural shaders such as a wood grain shader. This would then be usable in 2D as a fill or pen, and in 3D as a texture. No specific API support need be given in the 3D space for procedural shaders.

Note that pixel or vertex shaders may be provided as "stock" shaders, many of which will be parameterized. The way that these will be accessible in the API is that for shaders that make sense in the 2D world, they will be exposed as concrete subclasses of Brush, with their parameterization expressed either through the constructors on the class, or as properties on the class. They can then be applied to 2D objects. Shaders that only make sense in 3D will be exposed as concrete subclasses of Material (perhaps as subclasses of BasicMaterial), where they can also be parameterized through their constructor. This exposure will then allow the shaders to be applied to 3D (and 2D where appropriate) meshes.

As described above, BrushMaterial encapsulates a Brush. A BrushMaterial applied to a Primitive3D is treated as a texture. Textures will be mapped directly—that is, the 2D u,v coordinates on the primitive being mapped will index directly into the correspond x,y coordinates on the Texture, modified by the texture transform. Note that, like other 2D, the texture's coordinate system runs from (0,0) at the top left with positive y pointing down.

A VisualBrush used for the Brush will not accept input, but it will update according to any animations on it, or any structural changes that happen to it. To use a Visual as a Material and still receive input, the VisualMaterial is used, as described herein.

```
public sealed class BrushMaterial : BasicMaterial
{
    public BrushMaterial (Brush brush);
    public new BrushMaterial Copy( ); // shadows Material.Copy( )
    public Brush Brush { get; set; }
    // Additional texturing specific knobs.
}
```

As described above, VisualMaterial encapsulates an interactive Visual. This differs from BrushMaterial used with a Visual in that the Visual remains live in its textured form. Note that since the mapping is based on the u,v grid associated with a primitive, there are situations where user-input will not have full fidelity with its 2D counterpart. For example, consider a mouse-capture scenario where a 2D control captures the mouse (for implementing scroll bar behavior, for instance). In these scenarios, the mouse is allowed to stray from the scroll bar, but the system is able to figure out what, for instance, y position the mouse is at with respect to the scroll bar and operate properly. In a situation where the control is textured onto a primitive with a u,v grid, and the mouse strays off of the primitive, then in general, there is no way to make this determination. There are certain things that can be done while authoring to counteract this, but in general, this is going to be a limitation of mapping onto a 2D space. Note that the Visual is then, in effect, parented in some fashion to the root Retained3DVisual. In one implementation, it is illegal to use a single UiElement in more than one Material, or to use a VisualMaterial in more than one place, due to the fact that the framework is based on single parenting of controls.

```
public sealed class VisualMaterial : BasicMaterial
{
    public VisualMaterial(Visual visual);
    public new VisualMaterial Copy( ); // shadows Changeable.Copy( )
    public Visual Visual { get; set; }
    --(need to add viewport/viewbox stuff for positioning...)
    // Additional texturing specific knobs.
}
```

BrushMaterialsIVisualMaterials and BumpMaps are used to define AdvancedMaterials:

```
public class AdvancedMaterial : Material
{
    public AdvancedMaterial( );
    // Add common constructors.
    public new AdvancedMaterial Copy( ); // shadows
    Changeable.Copy( )
    public BasicMaterial DiffuseTexture { get; set; }
    public BasicMaterial SpecularTexture { get; set; }
    public BasicMaterial AmbientTexture { get; set; }
    public BasicMaterial EmissiveTexture { get; set; }
    [ Animations("SpecularPowerAnimations") ]
    public double SpecularPower { get; set; }
    public DoubleAnimationCollection SpecularPowerAnimations
    { get; set; }
    public BumpMap DiffuseBumpMap { get; set; }
    public BumpMap ReflectionBumpMap { get; set; }
    public BumpMap RefractionBumpMap { get; set; }
    public BrushMaterial ReflectionEnvironmentMap { get;
    set; }
    public BrushMaterial RefractionEnvironmentMap { get;
    set; }
}
```

Note that the EnvironmentMaps are textures that are expected to be in a particular format to enable cube-mapping. Specifically, the six faces of the cube map will need to be represented in the sections of the Brush associated with the Texture (likely something like a 3×2 grid on the Brush). Note that the Ambient, Diffuse, and Specular properties take a BasicMaterial, and not a general Material since they're not allowed to be specified as AdvancedMaterials themselves. Further, note that the environment maps are BrushMaterials exclusively, since the interactivity that VisualMaterial provides does not make sense for environment maps.

Bump maps are grids that, like textures, get mapped onto 3D primitives via texture coordinates on the primitives. However, the interpolated data is interpreted as perturbations to the normals of the surface, resulting in a "bumpy" appearance of the primitive. To achieve this, bump maps carry information such as normal perturbation, and potentially other information. They do not carry color or transparency information. Because of this, it is inappropriate to use a Brush as a bump map. Therefore, a new BumpMap class may be provided, as an ImageSource of a particular pixel format.

Material provides a simple TypeConverter that allows the string specification of a Brush to automatically be promoted into a BrushMaterial:

```
Material:
    ... delegate to Brush type converter ...
```

This allows specifications such as:

```
<MeshPrimitive3D ... Material="yellow" />
<MeshPrimitive3D ... Material="LinearGradient blue green" />
<MeshPrimitive3D ... Material="HorizontalGradient orange purple" />
<MeshPrimitive3D ... Material="*Resource(myImageResource)" />
Also compound property notation,
<MeshPrimitive3D>
<MeshPrimitive3D.Material>
    <LinearGradientBrush>
        ............
```

Ambient parameters of the model, which are not embeddable at arbitrary levels in the geometric hierarchy, may be provided. For example, fog can be added to the scene by setting a Fog property on the Retained3DVisual, e.g., the Fog available is "pixel fog." Fog is represented as an abstract class, and hierarchy as shown below:

```
public abstract class Fog : Animatable
{
    // only constructable internally
    internal Fog(Color color);
    public new Fog Copy( ); // hides Changeable.Copy( )
    [Animation("ColorAnimations")]
    public Color Color { get; set; }
    public ColorAnimationCollection ColorAnimations { get; set; }
    // singleton representation of "no fog"
    public static Fog NoFog { get; }
}
public sealed class LinearFog : Fog
{
    public LinearFog(Color color, double fogStart, double fogEnd);
    [Animation("FogStartAnimations")]
    public double FogStart { get; set; }
    public DoubleAnimationCollection FogStartAnimations { get;
    set; }
    [Animation("FogEndAnimations")]
    public double FogEnd { get; set; }
    public DoubleAnimationCollection FogEndAnimations { get; set; }
}
public sealed class ExponentialFog : Fog
{
    public ExponentialFog(Color color, double fogDensity, bool
    squaredExponent);
    [Animation("FogDensityAnimations")]
    public double FogDensity { get; set; }
    public DoubleAnimationCollection FogDensityAnimations { get;
    set; }
    public bool SquaredExponent { get; set; }
}
```

The fogDensity ranges from 0-1, and is a normalized representation of the density of the fog. The fogStart and fogEnd comprise z-depths specified in device space [0,1] and represent where the fog begins and ends.

The Camera is a mechanism by which a 3D model is projected onto a 2D visual. The Camera itself is an abstract type, with two concrete subtypes—ProjectionCamera and MatrixCamera. ProjectionCamera takes well-understood parameters such as Position, LookAtPoint, and FieldOfView to construct the Camera. MatrixCamera takes a Matrix3D used to define the World-To-Device transformation.

```
public abstract class Camera : Animatable
{
    // Only allow to be built internally.
    internal Camera( );
    public new Camera Copy( ); // hides Changeable.Copy( )
}
```

In a Retained3DVisual, a Camera is used to provide a view onto a Model3D, and the resultant projection is mapped into the 2D ViewPort established on the Retained3DVisual. Note that the 2D bounding box of the Retained3DVisual will simply be the projected 3D bbox of the 3D model, wrapped with its convex, axis-aligned hull, clipped to the clip established on the visual.

Figure 42:
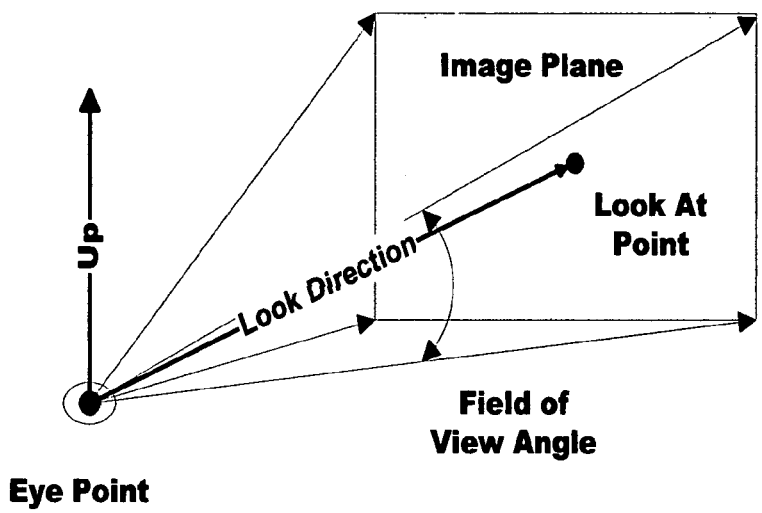
FIG. 42 is a representation of three-dimensional concepts for providing three-dimensional support in accordance with an aspect of the present invention.

The ProjectionCamera is the means by which a camera is constructed from parameters such as Position, LookAtPoint, and FieldOfView. It encapsulates both perspective projections and orthographic projections. FIG. 42 provides a good indication of the relevant aspects of a ProjectionCamera showing viewing and position, (where FieldOfView should be in the horizontal direction).

```
public class ProjectionCamera : Camera
{
    // Common constructors
    public ProjectionCamera( );
    public ProjectionCamera(Point3D position,
        Vector3D lookDirection,
        Vector3D Up,
        double fieldOfView);
public new ProjectionCamera Copy( ); // hides Changeable.Copy( )
    // Camera data
    public bool IsOrthographic { get; set; } // default == false:
    Perspective
    [Animations("NearPlaneDistanceAnimations")]
    public double NearPlaneDistance { get; set; } // default = 0
    public DoubleAnimationCollection NearPlaneDistanceAnimations
    { get; set; }
    [Animations("FarPlaneDistanceAnimations")]
    public double FarPlaneDistance { get; set; } // default =
    infinity
    public DoubleAnimationCollection FarPlaneDistanceAnimations
    { get; set; }
    [Animations("FieldOfViewAnimations")]
    public double FieldOfView { get; set; }
    public DoubleAnimationCollection FieldOfViewAnimations
    { get; set; }
    [Animations("PositionAnimations")]
    public Point3D Position { get; set; }
    public Point3DAnimationCollection PositionAnimations { get;
    set; }
    [Animations("LookDirectionAnimations")]
    public Vector3D LookDirection { get; set; }
    public Vector3DAnimationCollection LookDirectionAnimations
    { get; set; }
    [Animations("UpAnimations")]
    public Vector3D Up { get; set; }
    public Vector3DAnimationCollection UpAnimations { get;
    set; }
}
```

Note that the FieldOfView represents the horizontal field of view, and is specified in degrees (like other MIL angles). The Near and Far PlaneDistances represent 3D world-coordinate distances from the camera's Position along the LookDirection vector. The NearPlaneDistance defaults to zero and the FarPlaneDistance defaults to infinity.

Upon actual projection, if the NearPlaneDistance and FarPlaneDistance are still zero and infinity, respectively, then the model is examined and its bounding volume is projected according to the camera projection. The resulting bounding volume is then examined so that the near plane distance is set to the bounding volume's plane perpendicular to the LookDirection nearest the camera position. This is essentially the same for the far plane, but using the farthest plane. This results in optimal use of z-buffer resolution while still displaying the entire model. If IsOrthographic is true, then an orthographic projection is used, and FieldOfView is ignored.

Note that the "projection plane" defined by the parameters of the ProjectionCamera is then mapped into the ViewPort rectangle on the Retained3DVisual, and that represents the final transition from 3-space to 2-space.

The MatrixCamera subclass of Camera provides a means for directly specifying a Matrix as the projection transformation. This is useful for applications that have their own projection matrix calculation mechanisms.

```
public class MatrixCamera : Camera
{
    // Common constructors
    public MatrixCamera( );
    public MatrixCamera(Matrix3D matrix);
    public new MatrixCamera Copy( ); // hides Changeable.Copy( )
    // Camera data
    public Matrix3D Matrix { get; set; } // default = identity
}
```

Note that the MinimumZ and MaximumZ values directly control the z-buffer range. They are considered after the application of the Matrix as the projection matrix.

The resultant projection is mapped into the ViewPort rectangle on the Retained3DVisual, and that represents the final transition from 3-space to 2-space.

The following are more complete markups showing specification of an entire Model3D hierarchy in XAML. Note that some of the syntax may change.

The following example simply creates a Model with two imported .x files and a rotation transform (about the z-axis by 45 degrees) one on of them, and a single white point light sitting up above at 0,1,0.

```
<Model3DCollection>
    <!-- Model children go as children here -->
    <PointLight position="0,1,0" diffuseColor="white" />
    <ImportedPrimitive3D xfile="myFile.x" />
    <Model3DCollection transform="rotate(0, 0, 1, 45), scale(2)" >
        <ImportedPrimitive3D xfile="mySecondeFile.x" />
    </Model3DCollection>
</Model3DCollection>
```

This markup may be in a file, a stream, a resource or any suitable entity. A client program will invoke loading of that XAML, and that will in turn construct a complete Model3DCollection, to be used by the application as desired.

The following example provides an explicitly declared MeshPrimitive3D, through the use of the complex-property XAML syntax. The mesh will be textured with a LinearGradient from yellow to red. There is also a light in the scene.

```
<Model3DCollection>
    <!-- Model children go as children here -->
    <PointLight position="0,1,0" diffuseColor="white" />
    <MeshPrimitive3D material="LinearGradient yellow red">
        <MeshPrimitive3D.Mesh>
            <Mesh3D
                meshPrimitiveType="TriangleStrip"
                positions="1,2,3, 4,5,6, 7,8,9, 10,11,12,
                13,14,15, 16,17,18"
                normals="... sensible normal vectors ..."
                textureCoordinates=".5,.5, 1,1, 0,0, .25,.25,
                .3,.4, .7,.8"
                triangleIndices="1,3,4,1,2,3,4,5,6,1,2,4,2" />
        </MeshPrimitive3D.Mesh>
    </MeshPrimitive3D>
</Model3DCollection>
```

The example takes the first .x file and adds in a XAML-specified animation. This particular example adds a uniform scale that scales the .x file from 1x to 2.5x over 5 seconds, reverses, and repeats indefinitely. It also uses acceleration/deceleration to slow-in/slow-out of its scale:

```
<Model3DCollection>
    <!-- Model children go as children here -->
    <PointLight position="0,1,0" diffuseColor="white" />
    <ImportedPrimitive3D xfile="myFile.x">
        <ImportedPrimitive3D.Transform>
            <ScaleTransform3D>
                <ScaleTransform3D.ScaleVector>
                    <VectorAnimation
                        from="1,1,1"
                        to="2.5,2.5,2.5"
                        begin="immediately"
                        duration="5"
                        autoReverse="true"
                        repeatDuration="indefinite"
                        acceleration="0.1"
                        deceleration="0.1" />
                </ScaleTransform3D.ScaleVector>
            <ScaleTransform3D>
        </ImportedPrimitive3D.Transform>
    </ImportedPrimitive3D>
</Model3DCollection>
```

This example imports a .x file and applies a live UI as its material:

```
<Model3DCollection>
    <!-- Model children go as children here -->
    <PointLight position="0,1,0" diffuseColor="white" />
    <ImportedPrimitive3D xfile="myFile.x" >
        <ImportedPrimitive3D.OverridingMaterial>
            <VisualMaterial>
                <Button Text="Press Me"
                    OnClick="button_OnClick" />
            </VisualMaterial>
        </ImportedPrimitive3D.OverridingMaterial>
    </ImportedPrimitive3D>
</Model3DCollection>
```

XAML supports syntax for referencing resources. "Resources" in this context is a broad term, and it implies both a "resource" section of a XAML file, as well as loading from the managed resource "fork" of a managed assembly. Both mechanisms are supported, and resources can be referenced from multiple places in order to share them. There is currently no mechanism for directly loading native Win32 resources, however, implementation of an IResourceLoader interface allows for that.

Although this is not directly related to XAML, it is related to how applications will be constructed that share things like meshes and materials. Note that the 3D "modeling" objects (Lights, Model3DCollections, MeshPrimitive3D's, Materials, Mesh3D, Brush, and the like) are of type Changeable. As described above, changeable values provide a Copy( ) method that conceptually make a deep copy, but in fact do on demand shallow-cloning. Use of this Copy( ) method results in optimal sharing of objects while still allowing subparts of those objects to change.

Two-dimensional "shapes", like Rectangle, Polygon, Ellipse, and the like, are introduced into the Windows Presentation Framework via the Shape class, which is itself a UiElement. Shapes like Rectangle can be placed on a Canvas, which itself is a UiElement intended for use as a container of shapes. The following is one example:

```
<Canvas Background='black" Top="100" Left="100"Height="600"
Width="800">
    <Rectangle Top="600" Left="100" Width="100" Height="50"
    Fill="red" Stroke="blue" Stroke Width="10"/>
    <Line x1="100" y1="300" x2="300" y2="100"
    Stroke="green" StrokeWidth="5" />
</Canvas>
```

In this case, the Canvas is a UiElement, and the Rectangle and Line are each UiElements. Everything that is contained in the Canvas, in this case, is a UiElement.

However, consider combining Paths in markup, as this example shows:

```
<Canvas ...>
    <Path Fill="Red" Stroke="Blue>
        <Path.Data>
            <CircleGeometry ... />
            <RectangleGeometry ... />
            <PathGeometry ... />
        </Path.Data>
    </Path>
</Canvas>
```

In this case, the CircleGeometry, RectangleGeometry, (i.e., what is inside Path.Data), themselves are not UiElements, but the Path container is.

An element level "3D Shape" poses a problem in that the 3D characteristics of a Retained3DVisual does not go beyond the Visual itself. That is, the contents of two Visual's will never interpenetrate in z (e.g., one cannot have an arrow visual piercing an apple visual). Since Controls and Shapes derive from Visual, this also means that there is no support for having interpenetrating Controls or Shapes. They are always 2D projections of their content.

To have 3D "objects" interpenetrate at the Element level, and also to express that in markup, a Viewport3D element is provided that can contain a complex 3D model with the needed interpenetration. However, it will not interact in z with any other Viewport3Ds (and is called a Viewport3D because it is a 2D viewport into 3D space).

Viewport3D derives from the same class that Shape derives from (either FrameworkElement or Control). Note that Viewport3D should not derive from Shape, since Shape has properties like Fill, Stroke, and so on which do not make sense for 3D. Thus, Viewport3D, Shape, and Image are all siblings. Viewport3D will have a number of properties that can be set, including some of the properties that exist on Shape (Top, Left, Width, Height, Transform and Clip). These properties, while they not relevant in 3D, do make sense for the 2D projection of 3D, which is what Viewport3D, being a UiElement, is.

Viewport3D will also have a Camera associated with it (and a reasonable default will be provided) as well as 3D scene-wide properties like fog (i.e., properties that are also on Retained3DVisual). Viewport3D also has a Model3DCollection-valued property (which is itself a Model3D) that represents a collection of 3D objects to be presented through the shape. This model can also include lights. Whatever an application wants to allow to interact in z will be placed into this single Model3DCollection for a single Viewport3D.

If the camera is not specified, a default one will be used that provides a projection such that the Viewport3D bounds determined by Top, Left, Width, Height are filled with the model, the near/far clip planes are set to just in front of and just behind the model, the camera is looking down the z axis, with y being up. If no lights are specified, a white directional light pointing down the y-axis will be implicitly used.

The markup for Viewport3D is similar that for Path shown above, since that is an example where non-UiElements are specified inside of the Path markup. The following is an example of Viewport3D markup:

```
<Canvas ...>
    <!-- 2D elements go here, and Viewport3D is a 2D element. -->
    <Viewport3D optionaLCamera="..." >
        <XFilePrimitive path="..."/>
        <Mesh ...>
            <BrushMaterial>
                <SolidColorBrush color="yellow">
            </BrushMaterial>
        </Mesh>
        <Mesh ...>
            <VisualMaterial>
                <Button .../>
            </VisualMaterial>
        </Mesh>
        <SpotLight ... />
        <Model3DCollection Transform="3DTransform">
            <Mesh ... />
            <More models, meshes, lights, groups, etc./>
        </Model3DCollection>
    </Viewport3D>
    <!-- More 2D elements -->
    <Rectangle ... />
</Canvas>
```

Inside the <Viewport3D> tags, the Model3DCollection-valued member is being populated from individual, markup-specified Model3D's. Note that there is a one-to-one mapping between the tags here and the subclasses of Model3D . Further, note that the second Mesh in this example has a Visual material comprising a markup specified control (a Button in this case). This control will be fully interactive, and can specify an OnClick and the like.

The direct child nodes of Viewport3D are Model3D's, because the "default" collection is the Models collection. They syntax of this may change generally to require specification of <Viewport3D.Model> in complex-property syntax. This markup will follow the same path for resources that regular 2D markup follows, e.g., to define a Material and use it in multiple places. That functionality is provided by the general resource mechanism.

Generally, hit testing occurs at the UiElement or Control level. However, hit testing would be limited on Viewport3D as a whole, or otherwise to hit test would require splitting models up into multiple Viewport3D's and hit test on them. However, as soon as they are in multiple Viewport3D's, they no longer are part of the same 3D environment. This is resolved this by allowing an event handler to be specified on individual members of a Model3D in the markup or code, as well as an "id". When hit testing resolves, the appropriate method will be invoked (the sender will still be the Viewport3D as a whole), and the identifier will come down as part of the EventArgs. Applications should then be able to isolate their logic either in different event handlers, or by switching off of the "id".

The use of a VisualMaterial is an indication to the system that hit testing should proceed into that embedded element. The system ensures that this does, in fact, happen. Thus the hit test operation transitions from 2D into 3D and back into 2D. The following is an API specification for Viewport3D:

```
public class Viewport3D : UIElement // (or Control / FrameworkElement)
{
    // Stock 2D properties
    public BoxUnit Top { get; set; }
    public BoxUnit Left { get; set; }
    public BoxUnit Width { get; set; }
    public BoxUnit Height { get; set; }
    public Transform Transform { get; set; }
    public Geometry Clip { get; set; }
    // 3D scene-level properties
    public Fog Fog { get; set }
    public Camera Camera { get; set; } // have good default
    // The 3D Model itself
    public Model3D Model { get; set; }
}
```

To do transparency correctly in 3D, primitives (and, in the limit, individual triangles) are sorted to render back to front, whereby the z-buffer does not participate. This is necessary to insure correct blending.

An EmbeddingHostVisual is also provided. This is a subclass of Visual that cannot be constructed by external parties, and can only be built internally. EmbeddingHostVisual contains a Visual that represents that the specified Visual is being used as an "embedding host" for some Visual-to-Visual relationship other than parent/child. 2D Visuals that are embedded in a 3D scene are another example of this. Effects may be another example of one non-parent/child relationship between Visuals.

A definition is set forth below:

```
public class EmbeddingHostVisual : Visual
{
    internal EmbeddingHostVisual(Visual hostingVisual);
    // can't be externally built
    public Visual HostingVisual { get; }
    // All IVisual read services will result in exceptions raised.
}
```

Because the relationship to an EmbeddingHostVisual "parent" is defined to not be the typical parent/child relationship, that means that read services like extracting a Transform between Visuals do not make sense because there is not a uniform mapping. These operations are handled in the 3D subsystem itself, but note that the mechanism is unique to Retained3DVisual.

Media

MediaData can be used to play any audio/video content via the following object, also described in the attached Appendix:

```
public System.Windows.Media.MediaData : Changeable,
    IDisposable, ITimingControl
{
    public MediaData (string source);
    //
    // MediaData properties
    //
    public MediaState State { get; }
    public Time MediaDuration { get; }
    public bool HasAudio { get; }
    public bool HasVideo { get; }
    public long Width { get; }
    public long Height { get; }
    public double Volume { get; set; }
    public bool Mute { get; set; }
```

-continued

```
//
// MediaData Methods
//
public void Play( );
//
// Changeable
//
public bool IsChangeable { get; } // defaults to true
public Changeable Copy( );
public void MakeUnchangeable( );
public UseStatus StatusOfNextUse { get; set; }
// defaults to false
public event EventHandler Changed { add; remove; }
public UIContext UIContext { get; }
//
// IDisposable interface
//
public void Dispose( );
//
// ITimingControl interface
//
double Acceleration { get; set; }
bool AutoReverse { get; set; }
TimeSyncValue Begin { get; set; }
double Deceleration { get; set; }
Time Duration { get; set; }
TimeSyncValue End { get; set; }
TimeEndSync EndSync { get; set; }
TimeFill Fill { get; set; }
TimeFill FillDefault { get; set; }
Timeline ParentTimeline { get; set; }
double RepeatCount { get; set; }
Time RepeatDuration { get; set; }
TimeRestart Restart { get; set; }
TimeRestart RestartDefault { get; set; }
double Speed { get; set; }
int CurrentRepeat { get; }
Time CurrentTime { get; }
bool IsForwardProgressing { get; }
bool IsPaused { get; }
bool IsReversed { get; }
double Progress { get; }
bool IsChanging { get; }
bool IsEnabled { get; }
bool IsOverridingBaseValue { get; }
bool HasChanged { get; }
void Enable( );
void Enable(Timeline parentTimeline);
void Disable( );
void BeginIn(Time offset);
void EndIn(Time offset);
void Pause( );
void Resume( );
void Seek(Time offset, TimeSeekOrigin origin);
event EventHandler Begun { add; remove; }
event EventHandler Ended { add; remove; }
event EventHandler Paused { add; remove; }
event EventHandler Repeated { add; remove; }
event EventHandler Resumed { add; remove; }
event EventHandler Reversed { add; remove; }
event EventHandler Seeked { add; remove; }
}
```

The AudioData object is provided for audio data:

```
public System.Windows.Media.AudioData : MediaData
{
    public AudioData (string source);
    //
    // MediaData
    //
    public MediaState State { get; }
    public Time MediaDuration { get; }
    public bool HasAudio { get; }
    public bool HasVideo { get; }
    public long Width { get; }
    public long Height { get; }
    public double Volume { get; set; }
    public bool Mute { get; set; }
    public void Play( );
    public void Dispose( );
    public bool IsChangeable { get; } //defaults to true
    public Changeable Copy( );
    public void MakeUnchangeable( );
    public UseStatus StatusOfNextUse { get; set; } //
    defaults to false
    public event EventHandler Changed { add; remove; }
    public UIContext UIContext { get; }
    double Acceleration { get; set; }
    bool AutoReverse { get; set; }
    TimeSyncValue Begin { get; set; }
    double Deceleration { get; set; }
    Time Duration { get; set; }
    TimeSyncValue End { get; set; }
    TimeEndSync EndSync { get; set; }
    TimeFill Fill { get; set; }
    TimeFill FillDefault { get; set; }
    Timeline ParentTimeline { get; set; }
    double RepeatCount { get; set; }
    Time RepeatDuration { get; set; }
    TimeRestart Restart { get; set; }
    TimeRestart RestartDefault { get; set; }
    double Speed { get; set; }
    int CurrentRepeat { get; }
    Time CurrentTime { get; }
    bool IsForwardProgressing { get; }
    bool IsPaused { get; }
    bool IsReversed { get; }
    double Progress { get; }
    bool IsChanging { get; }
    bool IsEnabled { get; }
    bool IsOverridingBaseValue { get; }
    bool HasChanged { get; }
    void Enable( );
    void Enable(Timeline parentTimeline);
    void Disable( );
    void BeginIn(Time offset);
    void EndIn(Time offset);
    void Pause( );
    void Resume( );
    void Seek(Time offset, TimeSeekOrigin origin);
    event EventHandler Begun { add; remove; }
    event EventHandler Ended { add; remove; }
    event EventHandler Paused { add; remove; }
    event EventHandler Repeated { add; remove; }
    event EventHandler Resumed { add; remove; }
    event EventHandler Reversed { add; remove; }
    event EventHandler Seeked { add; remove; }
}
```

The VideoData object is provided for video data:

```
public System.Windows.Media.VideoData : MediaData
{
    public VideoData (string source);
    //
    // MediaData
    //
        public MediaState State { get; }
        public Time MediaDuration { get; }
        public bool HasAudio { get; }
        public bool HasVideo { get; }
        public long Width { get; }
        public long Height { get; }
        public double Volume { get; set; }
        public bool Mute { get; set; }
        public void Play( );
        public void Dispose( );
        public bool IsChangeable { get; } //
        defaults to true
```

-continued

```
        public Changeable Copy( );
        public void MakeUnchangeable( );
        public UseStatus StatusOfNextUse { get;
            set; } // defaults to false
        public event EventHandler Changed { add;
            remove; }
        public UIContext UIContext { get; }
        double Acceleration { get; set; }
        bool AutoReverse { get; set; }
        bool IsOverridingBaseValue { get; }
        bool HasChanged { get; }
        void Enable( );
        void Enable(Timeline parentTimeline);
        void Disable( );
        void BeginIn(Time offset);
        void EndIn(Time offset);
        void Pause( );
        void Resume( );
        void Seek(Time offset, TimeSeekOrigin origin);
        event EventHandler Begun { add; remove; }
        event EventHandler Ended { add; remove; }
        event EventHandler Paused { add; remove; }
        event EventHandler Repeated { add;
            remove; }
        event EventHandler Resumed { add;
            remove; }
        event EventHandler Reversed { add;
            remove; }
        event EventHandler Seeked { add; remove; }
}
```

An element level Video object is also provided:

```
public System.Windows.Controls.Video : FrameworkElement
{
    public Video( );
    //
    // Video Element properties
    //
    public VideoData Source { get; set; }
    public MediaState MediaState { get; }
    public double Volume { get; set; }
    public bool Mute { get; set; }
    public int NativeVideoHeight { get; }
    public int NativeVideoWidth { get; }
    public Time MediaDuration { get; }
    public TimeSyncValue Begin { get; set; }
    public TimeSyncValue End { get; set; }
    public Time Duration { get; set; }
    public double RepeatCount { get; set; }
    public Time RepeatDuration { get; set; }
    public HorizontalAlignment HorizontalAlignment { get; set; }
    public VerticalAlignment VerticalAlignment    { get; set; }
    public Stretch Stretch { get; set; }
    //
    // Video Element methods
    //
    public void BeginIn(Time offset);
    public void EndIn(Time offset);
    public void Pause( );
    public void Resume( );
    public void Seek(Time offset, TimeSeekOrigin origin);
}
```

An element level Audio object is also provided:

```
public System.Windows.Controls.Audio: FrameworkElement
{
    public Audio( );
    //
    // Audio Element properties
    //
```

-continued

```
    public AudioData Source { get; set; }
    public MediaState MediaState { get; }
    public double Volume { get; set; }
    public bool Mute { get; set; }
    public Time MediaDuration { get; }
    public TimeSyncValue Begin { get; set; }
    public TimeSyncValue End { get; set; }
    public Time Duration { get; set; }
    public double RepeatCount { get; set; }
    public Time RepeatDuration { get; set; }
    //
    // Audio Element methods
    //
    public void BeginIn(Time offset);
    public void EndIn(Time offset);
    public void Pause( );
    public void Resume( );
    public void Seek(Time offset, TimeSeekOrigin origin);
}
```

CONCLUSION

As can be seen from the foregoing detailed description, there is provided a media integration layer including interfaces and an object model that provide program code with the ability to interface with a scene graph. The system, method and object model are straightforward to use, yet powerful, flexible and extensible.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer-implemented method for arranging graphics data for processing into an output, the method comprising:
    receiving a function call via an application programming interface (API) provided by a media integration layer (MIL),
    the API providing access to the functionality of the MIL,
    the MIL comprising a plurality of objects,
    the objects including a plurality of types of VisualManager objects, the types of VisualManager objects comprising screen, print, and surface,
    each VisualManager object comprising the methods DeviceUnitsFromMeasureUnits, Dispose, Equals, Finalize, GetHashCode, GetType, HandleMessage, MeasureUnitsFromDeviceUnits, MemberwiseClone, ReferenceEquals, SetContext, and ToString,
    the objects including a plurality of types of Visual objects, each Visual object comprising the methods ClearValue, Equals, Finalize, GetHashCode, GetLocalValueEnumerator, GetType, GetValue, HitTestCore, InvalidateProperty, MemberwiseClone, OnDelavedinvalidate, OnPropertInvalidated, ReadLocalValue, ReferenceEquals, SetContext, SetValue, ToString, ValidateProperty, and ValidatePropertyCore,
    each VisualManager object connecting a Visual Tree to a particular medium, the Visual Tree comprising nodes which are visual objects,
    each VisualManager object having a relationship with a window in which graphic data is output, and each VisualManager managing a rendering process to the particular medium;
interpreting the function call;
connecting, by a VisualManager, a Visual Tree to a render target which is a particular medium, the Visual Tree comprising a plurality of Visuals;
causing data in a scene graph data structure to be modified;
traversing each node of the Visual Tree;
rendering, by a VisualRenderer, the Visual Tree to the particular medium.

2. The method of claim 1 wherein causing data in a scene graph data structure to be modified comprises invoking a function to initialize a new instance of a non-drawing visual class.

3. The method of claim 2 further comprising, receiving a function call via an interface corresponding to a transform associated with the visual.

4. The method of claim 1 wherein causing data in a scene graph data structure to be modified comprises invoking a function to initialize a new instance of a drawing visual class.

5. The method of claim 4 further comprising, receiving a function call via an interface to open the drawing visual instance for rendering, and in response, causing a drawing context to be returned, the drawing context providing a mechanism for rendering into the drawing visual.

6. The method of claim 1 further comprising, receiving brush data in association with the function call, and wherein causing data in a scene graph data structure to be modified comprises invoking a brush function to modify a data structure in the scene graph data structure such that when a frame is rendered from the scene graph, an area will be filled with visible data corresponding to the brush data.

7. The method of claim 6 wherein receiving brush data comprises receiving data corresponding to a solid color.

8. The method of claim 6 wherein receiving brush data comprises receiving data corresponding to a linear gradient brush and a stop collection comprising at least one stop.

9. The method of claim 6 wherein receiving brush data comprises receiving data corresponding to a radial gradient brush.

10. The method of claim 6 wherein receiving brush data comprises receiving data corresponding to an image.

11. The method of claim 10 further comprising, receiving a function call via an interface corresponding to an image effect to apply to the image.

12. The method of claim 1 further comprising, receiving pen data in association with the function call, and wherein causing data in a scene graph data structure to be modified comprises invoking a pen function that defines an outline of a shape.

13. The method of claim 1 wherein causing data in a scene graph data structure to be modified comprises invoking a geometry-related function to represent an ellipse in the scene graph data structure.

14. The method of claim 1 wherein causing data in a scene graph data structure to be modified comprises invoking a geometry-related function to represent a rectangle in the scene graph data structure.

15. The method of claim 1 wherein causing data in a scene graph data structure to be modified comprises invoking a geometry-related function to represent a path in the scene graph data structure.

16. The method of claim 1 wherein causing data in a scene graph data structure to be modified comprises invoking a geometry-related function to represent a line in the scene graph data structure.

17. The method of claim 1 wherein causing data in a scene graph data structure to be modified comprises invoking a function related to hit-testing a visual in the scene graph data structure.

18. The method of claim 1 wherein causing data in a scene graph data structure to be modified comprises invoking a function related to transforming coordinates of a visual in the scene graph data structure.

19. The method of claim 1 wherein causing data in a scene graph data structure to be modified comprises invoking a function related to calculating a bounding box of a visual in the scene graph data structure.

20. The method of claim 1 wherein causing data in a scene graph data structure to be modified comprises invoking a function via a common interface to a visual object in the scene graph data structure.

21. The method of claim 1 further comprising invoking a visual manager to render a tree of at least one visual object to a rendering target.

22. The method of claim 1 wherein causing data in a scene graph data structure to be modified comprises invoking a function to place a container object in the scene graph data structure, the container object configured to contain at least one visual object.

23. The method of claim 1 wherein causing data in a scene graph data structure to be modified comprises invoking a function to place image data into the scene graph data structure.

24. The method of claim 23 wherein causing data in a scene graph data structure to be modified comprises invoking a function to place an image effect object into the scene graph data structure that is associated with the image data.

25. The method of claim 1 wherein causing data in a scene graph data structure to be modified comprises invoking a function to place data corresponding to text into the scene graph data structure.

26. The method of claim 1 wherein causing data in a scene graph data structure to be modified comprises invoking a function to provide a drawing context in response to the function call.

27. The method of claim 26 wherein the function call corresponds to a retained visual, and further comprising, calling back to have the drawing context of the retained visual returned to the scene graph data structure.

28. The method of claim 1 wherein causing data in a scene graph data structure to be modified comprises invoking a function to place a three-dimensional visual into the scene graph data structure.

29. The method of claim 28 wherein causing data in a scene graph data structure to be modified comprises mapping a two-dimensional surface onto the three dimensional visual.

30. The method of claim 1 wherein causing data in a scene graph data structure to be modified comprises invoking a function to place animation data into the scene graph data structure.

31. The method of claim 30 further comprising communicating timeline information corresponding to the animation data to a composition engine at another layer of the media integration layer.

32. The method of claim 31 wherein the composition engine interpolates graphics data based on the timeline to animate an output corresponding to an object in the scene graph data structure.

33. The method of claim 1 wherein receiving a function call via an API comprises receiving markup, and wherein causing data in a scene graph data structure to be modified comprises parsing the markup into a call to an interface of an object.

34. The method of claim 1 wherein causing data in a scene graph data structure to be modified comprises invoking a function to place an object corresponding to audio and/or video data into the scene graph data structure.

35. The method of claim 1 wherein causing data in a scene graph data structure to be modified comprises changing a mutable value of an object in the scene graph data structure.

36. A computer program product comprising one or more computer-readable storage media having computer-executable instructions encoded thereon which, when executed by suitable computing equipment, implement the method of claim 1.

* * * * *